US006401079B1

(12) United States Patent
Kahn et al.

(10) Patent No.: US 6,401,079 B1
(45) Date of Patent: Jun. 4, 2002

(54) SYSTEM FOR WEB-BASED PAYROLL AND BENEFITS ADMINISTRATION

(75) Inventors: David Kahn, Los Altos Hills; Barinder Singh Saini, San Jose; Svetlana E. Kreimer, Mt. View; Shelley S. Ferguson, Sacramento, all of CA (US)

(73) Assignee: InLeague, Inc., San Bruno, CA (US)

( * ) Notice: Subject to any disclaimer, the term of this patent is extended or adjusted under 35 U.S.C. 154(b) by 0 days.

(21) Appl. No.: 09/411,332

(22) Filed: Oct. 1, 1999

(51) Int. Cl.[7] .............................................. G06F 17/60
(52) U.S. Cl. ........................................................ 705/30
(58) Field of Search ............................... 705/40, 30, 32

(56) References Cited

U.S. PATENT DOCUMENTS

| | | | |
|---|---|---|---|
| 5,600,554 A | | 2/1997 | Williams .................... 395/201 |
| 5,717,867 A | * | 2/1998 | Wynn et al. .................. 705/32 |
| 5,966,698 A | * | 10/1999 | Pollin ........................... 705/34 |
| 6,035,285 A | * | 3/2000 | Schlect et al. ............... 705/30 |
| 6,115,690 A | * | 9/2000 | Wong ............................. 705/7 |
| 6,119,107 A | * | 9/2000 | Polk ............................. 705/40 |

FOREIGN PATENT DOCUMENTS

WO    WO 01/45321    *    6/2001    ........... H04L/29/00

OTHER PUBLICATIONS

Hoke, Henry—Direct Marketing V61 N8 pp41 12/98.*
Lorna Fernandes, "Net Lets Small Firms Run Faster Without an IT Team," *San Francisco Business Times* (Feb. 12, 1999), <www.bizjournals.com/SanFrancisco/stories/1999/02/15/focus3.html>.

(List continued on next page.)

Primary Examiner—Vincent Millin
Assistant Examiner—Geoffrey Akers

(74) *Attorney, Agent, or Firm*—Chien-Wei Chris Chou; Oppenheimer Wolff & Donnelly LLP

(57) ABSTRACT

The system provides an automated, centralized back-end payroll service with a full-featured web-based payroll system. Both aspects of the system have access to a central database, which includes, for example: profile information on employers and employees; timesheet, salary and hourly wage data; overtime data; employee benefit data; and information regarding third-party providers and miscellaneous payees.

The full-featured payroll system functionality is implemented in a manner that provides employers and employees (to the extent security policies permit) with a robust, data-driven user interface via a standard web browser. The central database provides the system's back-end (server-side) payroll service functionality with constant access to the data. The system implements and enforces compliance with a wide variety of tax-related and employment-related rules across federal, state and local jurisdictions relating, for example, to overtime pay, benefit limits, payment frequency, and scheduled reporting requirements. The system can automatically receive and implement electronic updates to these rules, modifying its own functionality to conform to these changes and ensure compliance with current rules. The payroll system functionality includes the automated collection of employee data and the calculation of employee income, taxes, and pre- and post-tax deductions. The system automatically calculates overtime, imputed income, and paid-time-off benefits, and allocates the sharing of payments for other benefit programs between employers and employees, as well as enabling employers to set up custom policies. Employers can review and validate employees' paychecks and print paychecks locally and/or submit the payroll to the system's automated back-end payroll service.

The system's back-end payroll service functionality generates disbursement information for payments to employees, benefit providers, miscellaneous payees, and various tax authorities, subject to compliance with the system's database of rules and automatically effects transfers of funds, payment information, and reports, whether electronic or otherwise, at the appropriate times.

40 Claims, 88 Drawing Sheets

OTHER PUBLICATIONS

Robert W. Scott, "Web–based Payroll: Always Open," *The Electronic Accountant* (Web page last modified Jul. 12, 1999), <www.electronicaccountant.com/html/features/f40199_1.htm>.

Jeffrey Zygmont, "The Perfect Host," *CFO Magazine* (May 1999) <http://207.87.9.12/html/Articles/CFO/1999/99MYthep.html>.

Automatic Data Processing, Inc., "ADP Introduces Secure Internet–Based Payroll Solution for Small Businesses" (Aug. 31, 1998) <www.investquest.com/iq/a/aud/ne/news/audinternet.htm>.

Best Software, Inc., "Best Software and Sage Software Unveil MAS 90 Interface for Abra Suite" (Apr. 22, 1999) <www.bestsoftware.com/news+room/press+release/_042299.htm>.

PeopleSoft, Inc. "IBM and PeopleSoft Announce Human Resources and Payroll Solution" (Dec. 14, 1998) <http://www5.peoplesoft.com/events.nsf/5cc57ee5f4a6b6dd88256683007e6f0c/39caf9c843f8f9ca882566da002b2a19!OpenDocument>.

PeopleSoft, Inc. "Olsten Delivers 70,000 Automated Paychecks to Employees Using PeopleSoft HRMS" (May 19, 1999) <http://www5.peoplesoft.com/events.nsf/5cc57ee5f4a6b6dd88256683007e6f0c/36f636f7da371a43882567760071136f!OpenDocument>.

PayMaxx, Inc., "PayMaxx® Launches POWERPayroll™," (Nov. 24, 1998) <www.paymaxx.com/news.cfm!getnews=21>.

Payroll Online, Corp. "Payroll Online Launches Business to Business Web Portal Designed to Provide Real–Time Payroll, Benefit and Human Resources Content to Employers and Their Employees," (Mar. 19, 1999) <http://payrollonline.com/pr_mar99.htm>.

ProBusiness Services, Inc., "ProBusiness Delivers First Integrated Portal for Employee Services," (Sep. 27, 1999) <www.probusiness.com/news_pr_integrated_portal.htm>.

Solomon Software, Inc. "Solomon Software Announces Abra Suite™ for Solomon IV®," (Aug. 27, 1998) <www.bestsoftware.com/News+Room/Press+Releases/_082798.htm>.

Information Management Consultants & Associates, Inc., "Welcome to the Abra Payroll Screen Gallery" [Web page] (Web page last modified Sep. 8, 1999) <www.imcsite.com/abra/abrapayroll/abrapayrollscre.htm>.

Information Management Consultants & Associates, Inc., "Check Out the Extensive Reports Offered in Abra Payroll" [Web page] (Web page last modified Sep. 9, 1999) <www.imcsite.com/abra/abrapayroll/extensivereports.htm>.

Information Management Consultants & Associates, Inc., "Review the Features of Abra Payroll" [Web page] (Web page last modified Sep. 9, 1999) <www.imcsite.com/abra/abrapayroll/reviewfeaturespayr.htm>.

The Bee Group, Inc., "Solomon IV—Payroll (with Direct Deposit)" [Web page] (Web page last modified Dec. 12, 1996) <www.beegroup.com/solomon/pr.htm>.

Virtual Payroll, Inc., "System Features" [Web page] (Web page last modified Jan. 26, 1999) <www.virtualpayroll.com/whatwedo.htm>.

Virtual Payroll, Inc., "System Benefits" [Web page] (Web page last modified Jan. 26, 1999) <www.virtualpayroll.com/why.htm>.

\* cited by examiner-

FIG. 6(a)

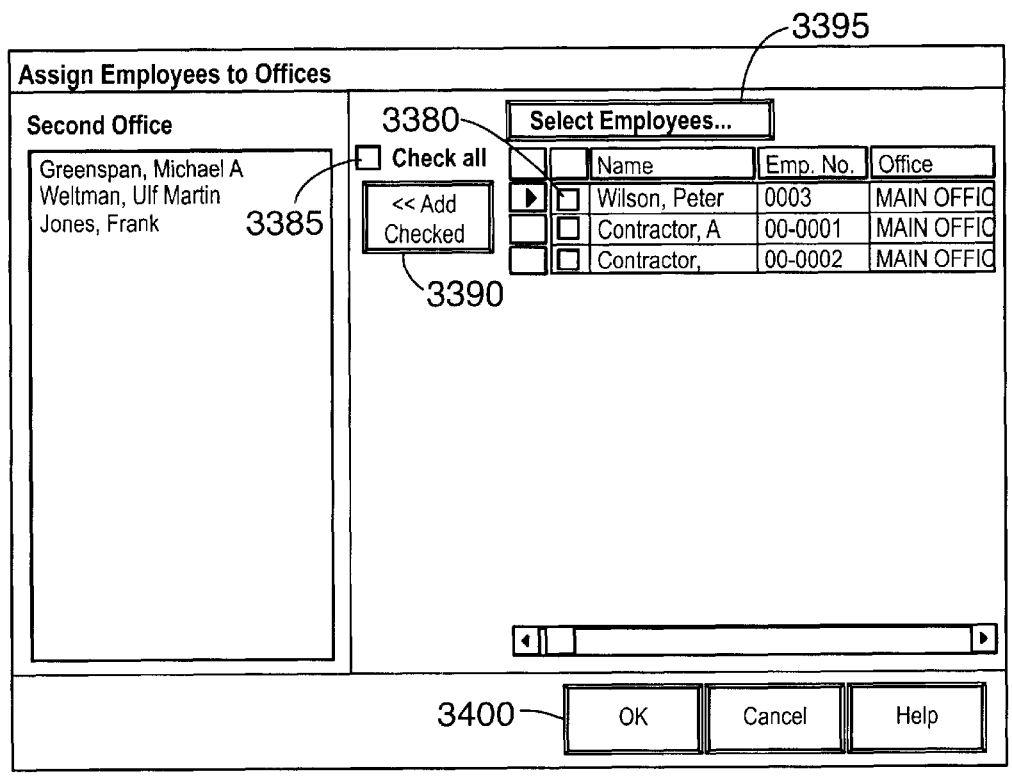
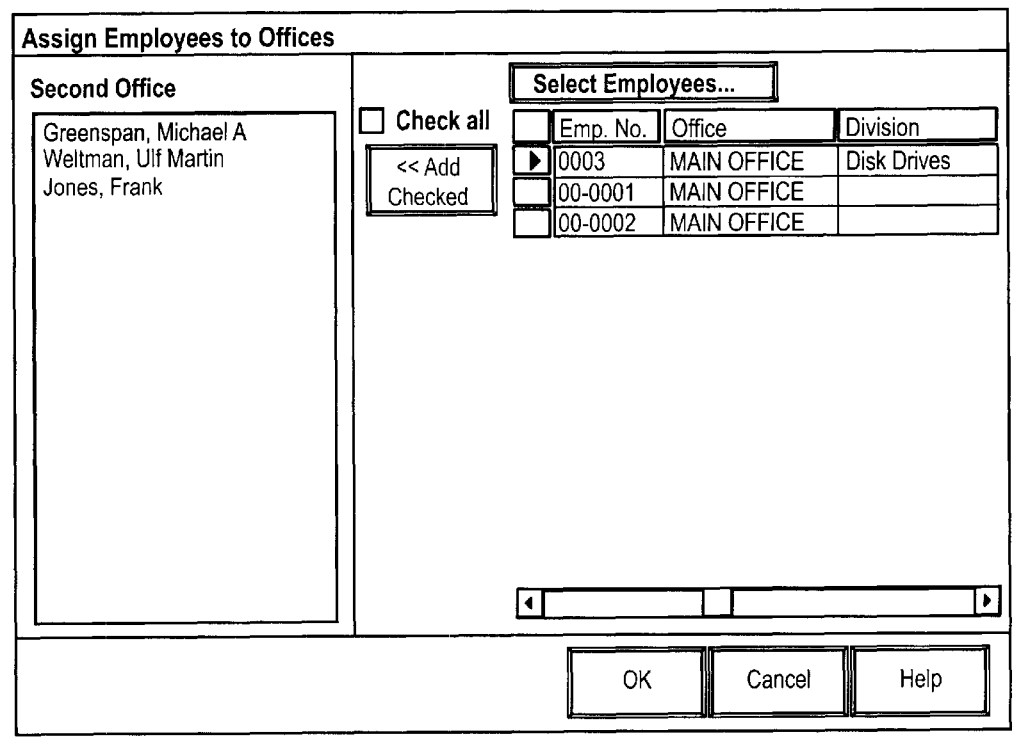
FIG. 8(a)

| Paid Time Off Accrual |
|---|
| To fill the accrual rates table for this PTO Accrual Schedule answer following questions, so the System will fill it for you, or write to the table directly. Then you may test and correct it. |

Starting number of days of the benefit:   [10] days
    Benefit is increased every:   [24] months
    During this time benefit is increased by:   [5] days
    Max number of days of the benefit is:   [25] days

[OK] [Cancel]
    3540

FIG. 10(b)

| Test Paid Time Off Accrual |
|---|
| Enter the number of months employed and check calculated accrual rate. |

After employed [8] months [Check Accrual Rate]
employee's annual accrual rate is:     3542
[40] hours [5] days

[Close] —3544

FIG. 10(c)

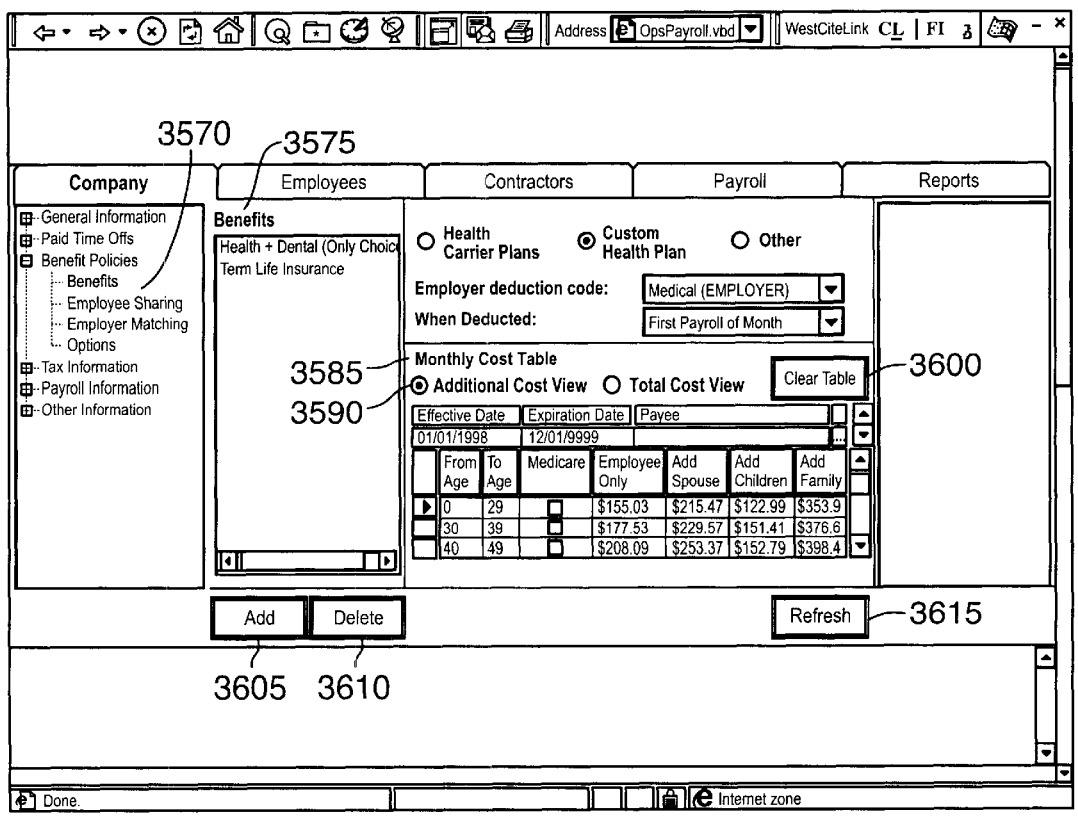
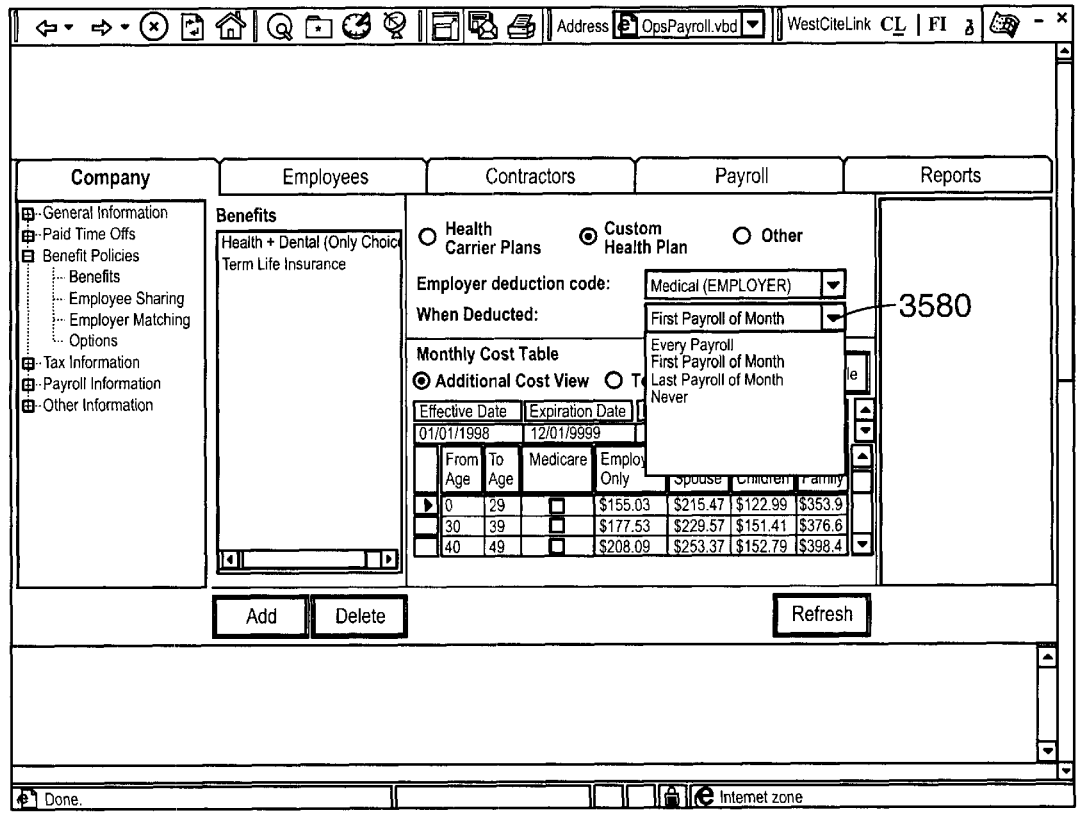
FIG. 12(a)

FIG. 12(c)

| Payees | | | |
|---|---|---|---|
| Payees | Payment Method: | ○ Check  ⊙ Direct deposit | |
| Office of Child Support<br>Fidelity Pension Funds<br>Prudential Life Assurance Co. | Payer information: | T-666-8765H | |
| | Payee type: | Term Life-Insurance ▼ | |
| | Account Type: | ⊙ Checking  ○ Savings | |
| | Bank Routing Number: | 44434456 | |
| | Bank Account Number: | 7787878 | |
| | Zipcode | 940411261 | |
| | State | CA | |
| | Country | Santa Clara | |
| | City | Mountain View ▼ | |
| | Street address | 888 Villa Street, Ste 500 | |

Add  Delete     OK  Cancel  Help
3640  3645      3650

| Payees | | |
|---|---|---|
| Payees | Payment Method: | ○ Check  ⊙ Direct deposit |
| Office of Child Support<br>Fidelity Pension Funds<br>Prudential Life Assurance Co. | Payer information: | T-666-8765H |
| | Payee type: | Term Life-Insurance ▼ |
| | | Medical Insurance<br>Pension Administrator<br>Cafeteria Plan Administrator<br>Tan Agency Having Lien<br>Individual<br>Term Life-Insurance |
| | Account Type: | |
| | Bank Routing Number: | |
| | Bank Account Number: | |
| | Zipcode | |
| | State | CA |
| | Country | Santa Clara |
| | City | Mountain View ▼ |
| | Street address | 888 Villa Street, Ste 500 |

3635

Add  Delete     OK  Cancel  Help

FIG. 13

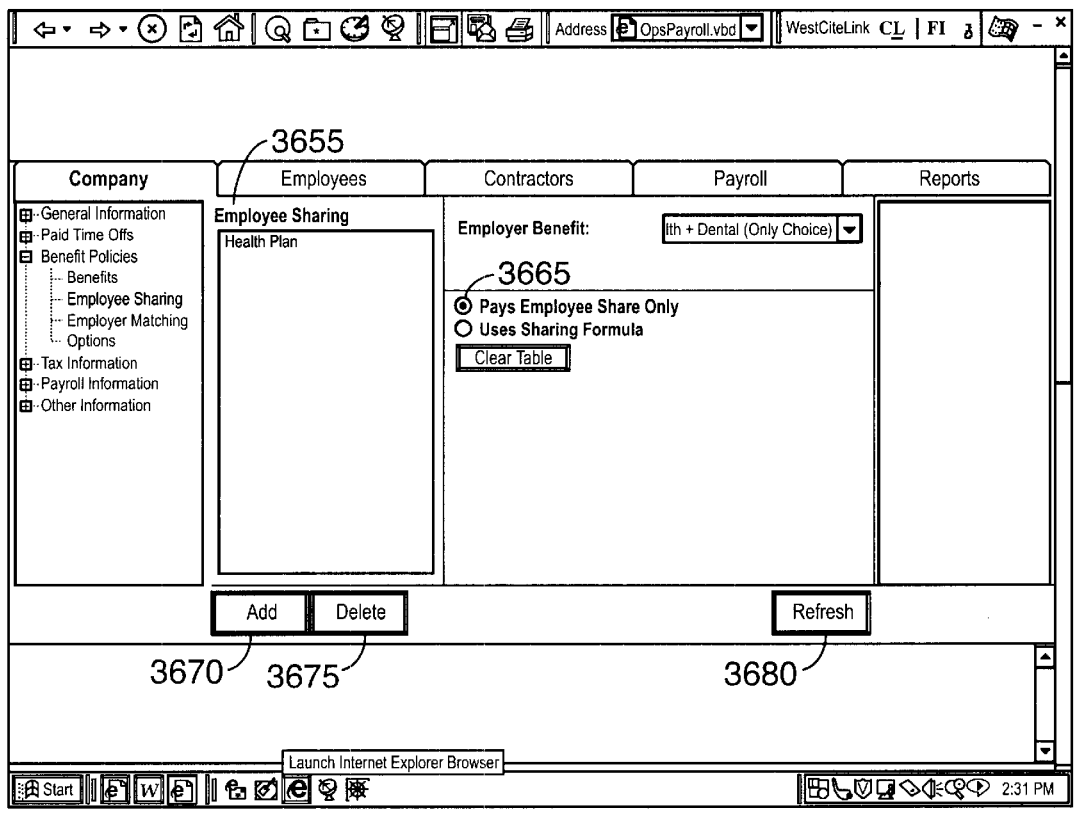
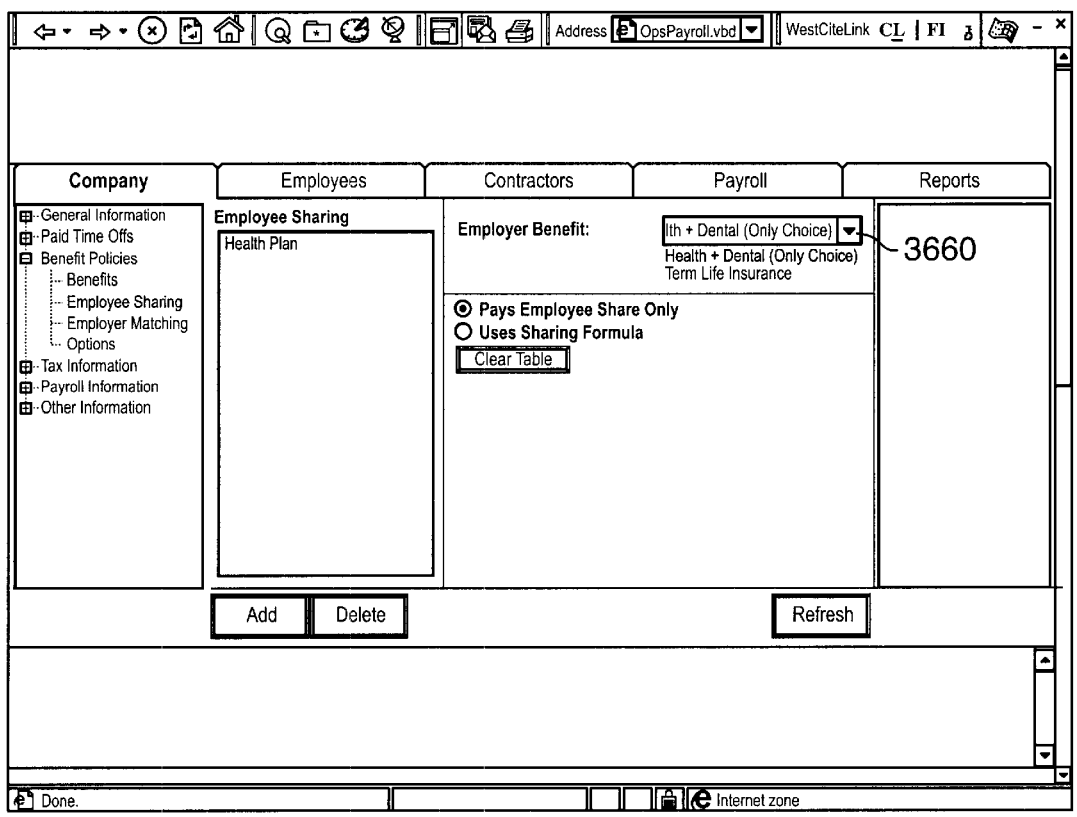
FIG. 14(a)

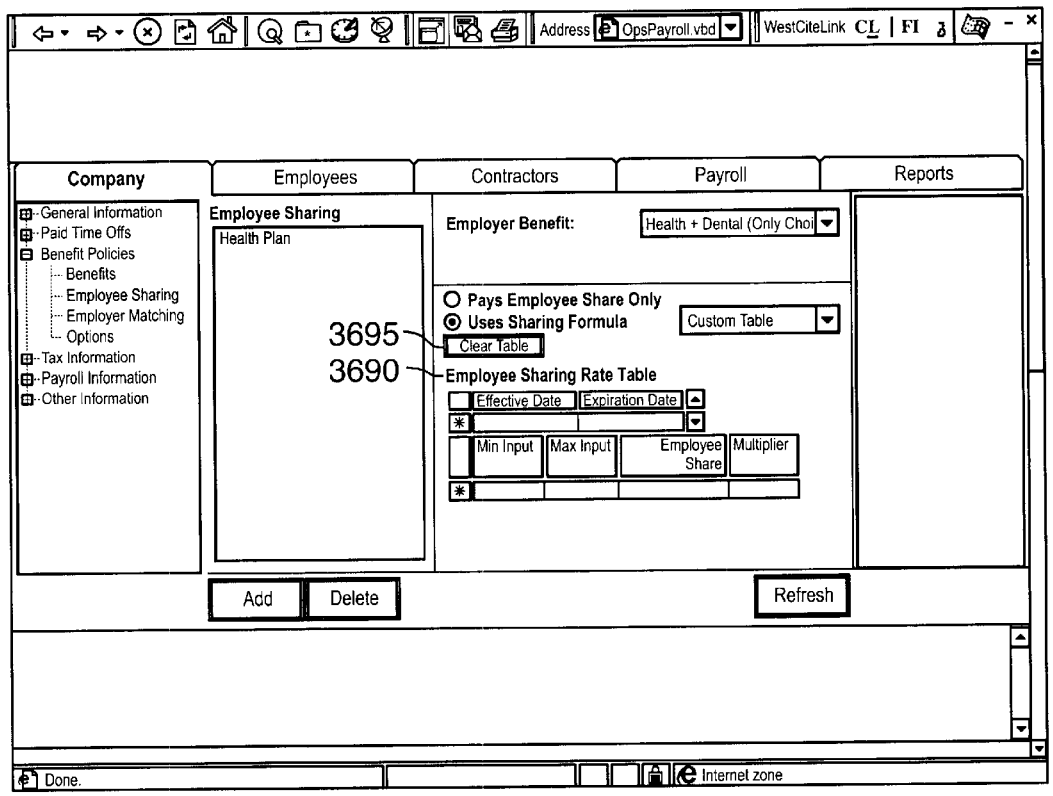
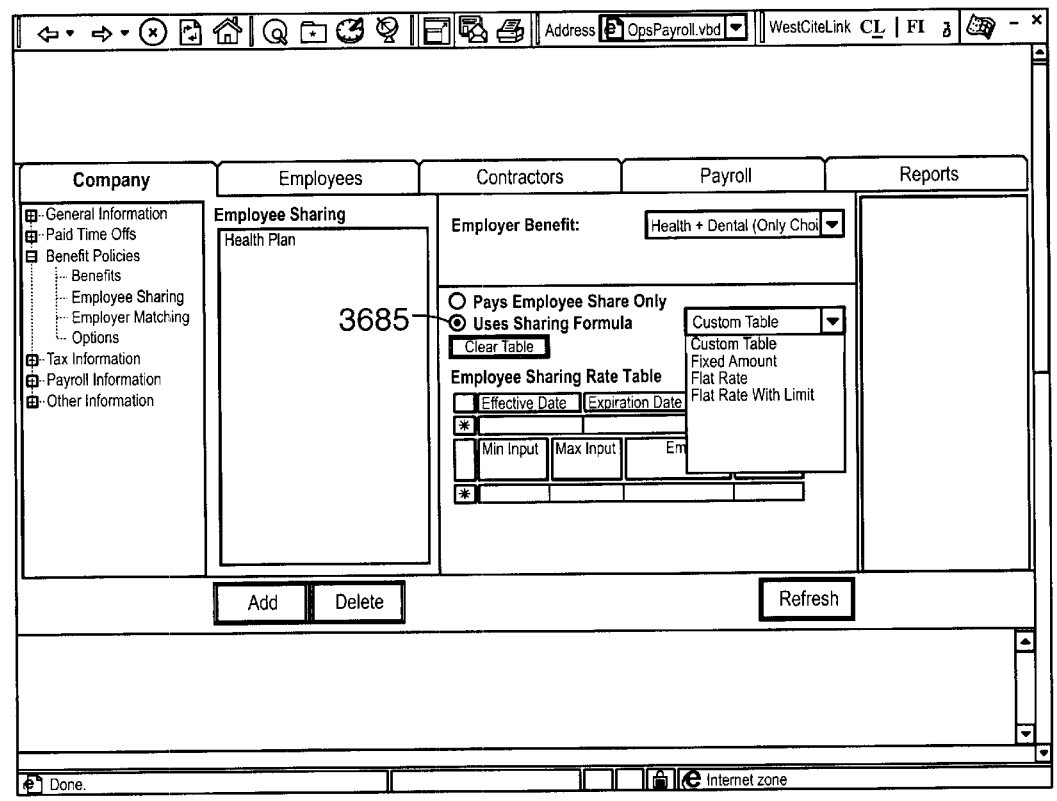
FIG. 14(b)

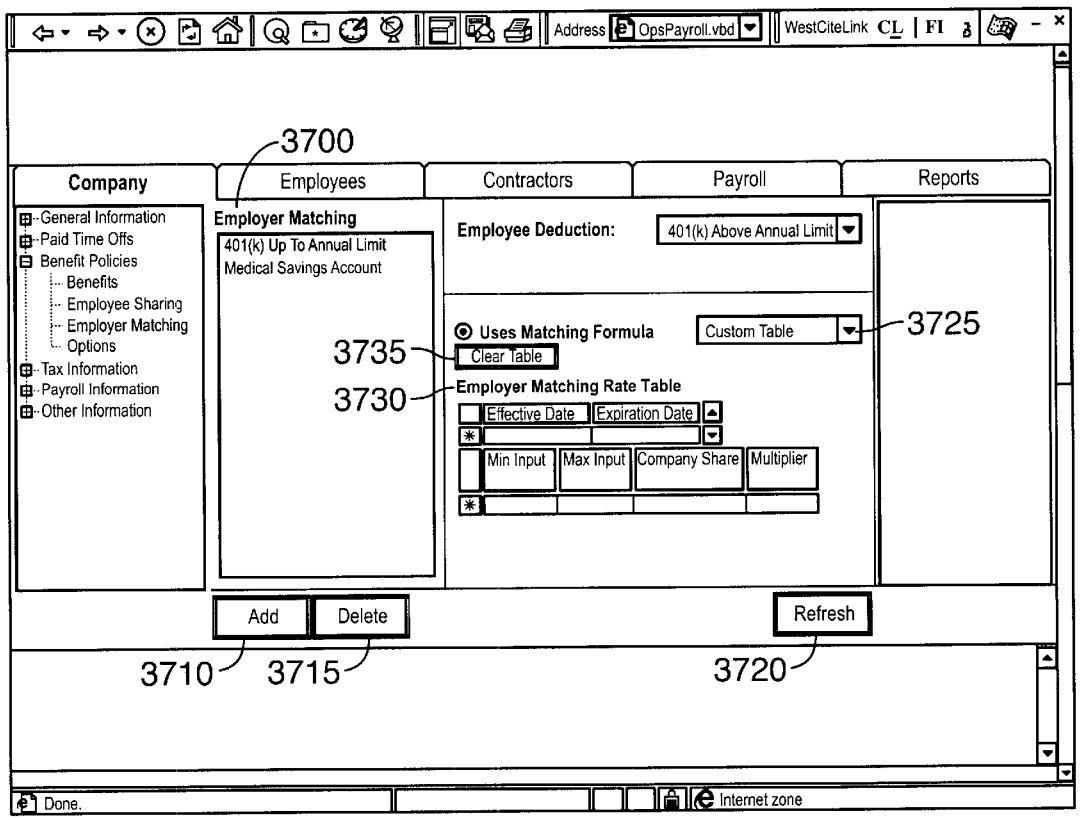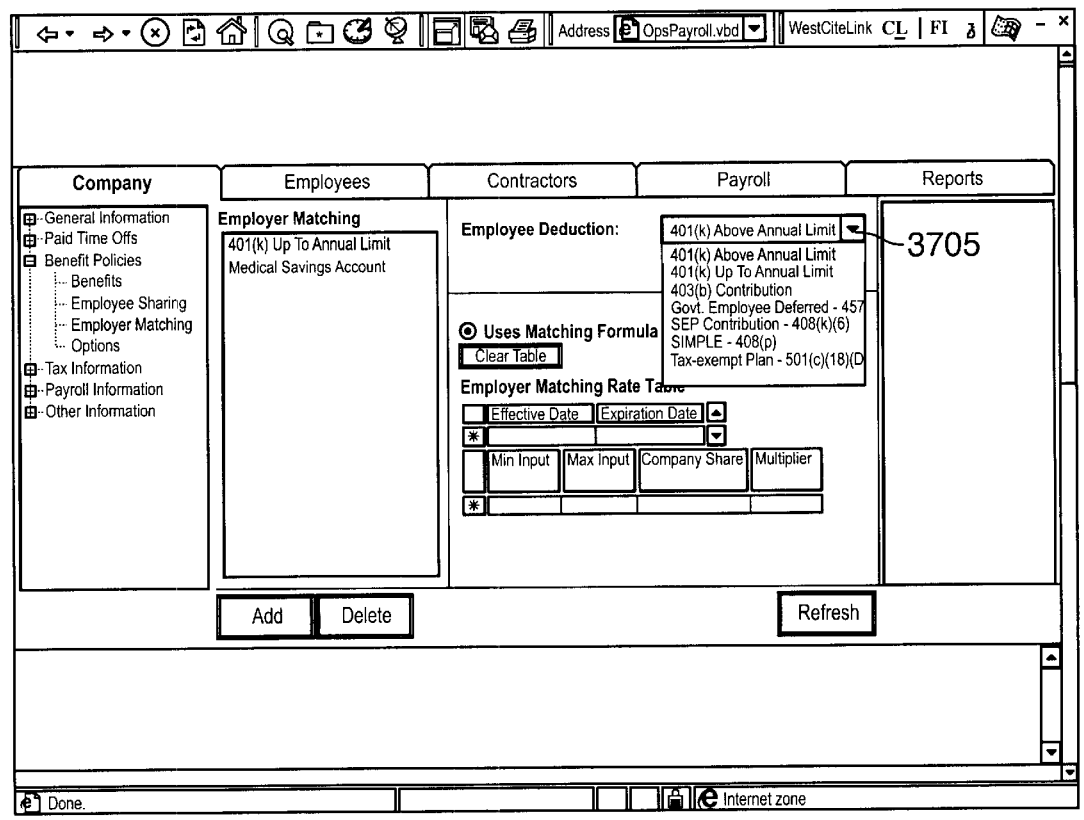
FIG. 15(a)

Process Payroll

Pay Date:
9/30/1999

OK — 4615

Cancel

Payroll Funding Method:
eOps Initiated ACH Debit

4605 — ☐ Prepay All employees
4610 — ☐ All Checks (No Direct Deposit)

---

Process Payroll

Pay Date:
9/30/1999

OK

Cancel

Payroll Funding Method:
4600 — eOps Initiated ACH Debit
eOps Initiated ACH Debit
eOps Initiated FedWire Debit
Client Initiated FedWire Credit
t)

Report Viewer

Direct Deposit

\*\*\*\*\*\*\*\*\*VOID\*\*\*\*\*\*\*\*\*VOID\*\*\*\*\*\*\*\*\*VOID\*\*\*\*\*\*\*\*\*VOID\*\*\*\*\*\*\*\*\*VOID\*\*\*\*\*\*\*\*\*

11/10/99      $0.00

Michael A. Greenspan
67 Post Office Dr.
Los Altos Hills, CA 94022

\*\*\*\*VOID\*\*\*\*\*\*\*\*\*VOID\*\*\*\*

| Name | ID | Social Security | Pay/Hour | Salaried | Exempt | Paydate | Net Pay |
|---|---|---|---|---|---|---|---|
| Greenspan, MA | 0002 | 123-45-6999 | $ 193.23 | X | | 11/10/99 | $1,088.68 |

| Earnings | Hours | Amount | YTD | Taxes and Deductions | Amount | YTD |
|---|---|---|---|---|---|---|
| Regular | 20.0 | $2,220.00 | $2,220.00 | CA INCOME TAX | $154.54 | $154.54 |
| Health Ins. - Domestic Partner | | $51.97 | $51.97 | CA SDI | $11.36 | $11.36 |
| Total: | 20.0 | $2,271.97 | $2,271.97 | FICA | $128.46 | $128.46 |

Report Viewer

| Earnings | Hours | Amount | YTD | Taxes and Deductions | Amount | YTD |
|---|---|---|---|---|---|---|
| Regular | 20.0 | $2,220.00 | $2,220.00 | CA INCOME TAX | $154.54 | $154.54 |
| Health Ins. - Domestic Partner | | $51.97 | $51.97 | CA SDI | $11.36 | $11.36 |
| Total: | 20.0 | $2,271.97 | $2,271.97 | FICA | $128.46 | $128.46 |
| | | | | INCOME TAX | $481.92 | $481.92 |
| | | | | MEDICARE | $30.04 | $30.04 |
| | | | | Child Support | $100.00 | $100.00 |
| | | | | Cafeteria Contrib. - Health Ins. | $200.00 | $200.00 |
| | | | | Health Ins. - Domestic Partner | $51.97 | $51.97 |
| | | | | After-tax Employee Disbursem | $25.00 | $25.00 |
| | | | | Total: | $1,183.29 | $1,183.29 |

Direct Deposits

| Bank | Tracking Number | Routing Number | Acct. Number | Type | Deposit |
|---|---|---|---|---|---|
| Employees Bank | 3941 | 987654359 | 5-555 | Savings | $950.00 |
| Mechanics Bank | 3942 | 123344559 | 22222 | Checking | $138.68 |
| Total: | | | | | $1,088.68 |

| Paid Time Off | Used YTD | Available |
|---|---|---|
| Sick | 0.0 | 75.5 |
| Vacation for Bosses | 0.0 | 122.8 |
| Special Benefit For Test | 0.0 | 66.2 |

FIG. 45(b)

SYSTEM FOR WEB-BASED PAYROLL AND BENEFITS ADMINISTRATION

FIELD OF THE INVENTION

This invention relates generally to the field of electronic payroll and benefit systems, and in particular to various aspects of online systems designed to facilitate online payroll and benefits administration.

BACKGROUND

The processing of a company's payroll involves many steps that are susceptible to automation. Although the advent of PC-based standalone payroll systems facilitated the widespread automation of certain of these steps for small as well as large businesses, there remains a significant "manual break" in the process—between functionality relating to the calculation of employee/contractor paychecks (including income derived from raw timesheet and salary data, as well as taxes and pre-tax and post-tax deductions) and functionality relating to the calculation and disbursement of employer tax liabilities (to federal, state and local tax authorities), as well as compliance with various associated reporting requirements and distribution of paychecks.

The latter functions typically are performed manually within a company or delegated to an outside payroll service. The convenience of a payroll service cannot be overestimated. Keeping track of the legal payment and reporting requirements across federal, state and local tax authorities, and complying with the many employment-related laws, is a complex task for which most companies are ill-suited. The process is not only difficult and time consuming, but often results in errors, which ultimately may cause the company to incur significant liability in the form of back payments and penalties, as well as substantial expenditures of time and money to determine the cause of and resolve such errors.

Moreover, it is inefficient for most companies to set up the infrastructure necessary to handle this task. A centralized payroll service can deploy this infrastructure once to implement employment-related laws and payment and reporting requirements to federal, state and local tax authorities for numerous companies on a nationwide, or even worldwide, basis. It can automate the disbursement of funds and the generation and, often even, transfer of information necessary to meet the various reporting requirements. The cost to a company of hiring an outside payroll service can be offset by the elimination of the need for certain part-time or full-time accounting personnel.

Yet, many small companies continue to handle the payroll process themselves, relying on standalone payroll systems to provide total control and flexibility with limited out-of-pocket cost. As a tradeoff for saving the cost of an outside payroll service, such companies simply accept the inconvenience of having to act as their own manual payroll service, often making mistakes, as noted above, by failing to comply with particular employment-related laws or missing payment or reporting deadlines to the various relevant tax authorities.

Examples of such standalone payroll systems include the payroll modules of the "MAS 90 Accounting System" from Sage Software, Inc. of Irvine, Calif. (www.sota.com), the "AbraSuite" human resources and payroll management software from Best Software, Inc. of Reston, Va. (www.bestsoftware.com), and the "Solomon IV" business management suite from Solomon Software Inc. of Findlay, Ohio (wwvw.solomon.com).

Although such systems are relatively full-featured and are designed to assist companies in acting as their own in-house payroll service (e.g., calculating employer tax liabilities), they require a significant amount of manual intervention in areas of a process that is susceptible to automation. They also require knowledgeable accounting personnel and dedicated computing infrastructure, such as database servers.

These systems do not, for example, enforce compliance with the many tax-related and employment-related laws and other regulations that span federal state and even local jurisdictions. As noted above, such a task is far better-suited to a centralized payroll service than an individual company or even the developer of a mass-marketed PC-based software product (which would have to be upgraded frequently to track all such relevant changes). Most payroll services (including centralized services), however, do not attempt to enforce or automate compliance. Rather, such services merely calculate taxes and mail tax payments and required reports to tax authorities.

Moreover, once the relevant calculations are performed, the company still must, in addition to printing and distributing paychecks, manually schedule and make the required payments to the relevant tax authorities at the appropriate time, in addition to meeting the various reporting requirements. These standalone payroll systems do not automate such tasks. It is therefore not surprising, for example, that Best Software, Inc. (identified above) also offers the "Abra TaxFile Payroll Tax Filing Service" to complement the "Abra Payroll" module of its AbraSuite software, in order to guard against tax filing errors and provide employers with the benefits of AbraSuite's electronic funds transfer infrastructure.

Some very small companies rely exclusively on an outside payroll service, performing only those calculations necessary to supply the payroll service with the summary data that it requires, and in the format that it specifies. As a tradeoff for saving the cost of certain part-time or full-time accounting personnel, such companies accept payroll service fees in order to gain the convenience of having the payroll service manage the entire process of calculating and distributing employee/contractor paychecks, calculating employer/employee tax liabilities and distributing the required payments and reports to the appropriate tax authorities.

Yet, with the convenience of a payroll service comes the loss of flexibility and control over the payroll process. The companies that rely on such services must manually calculate the components of the summary payroll data required by the payroll service, including gross income (hourly or salaried, along with any overtime, bonuses, commissions, etc.) and various medical and other benefits, as well as allocations among pre-tax and post-tax deductions. Such companies must also conform to the time deadlines imposed by the payroll service, or risk missing a payroll. Exceptions (which occur fairly frequently in any reasonably sized company) are difficult for a payroll service to manage. Even a change in direct deposit requirements may not be implemented by an outside payroll service for two or three pay periods from the time of the initial request. Finally, the company must manually extract (and perhaps translate) the summary data into the particular data format required by the payroll service, often making each payroll a special case.

Well-known payroll services from ADP (Automatic Data Processing, Inc.) of Roseland, N.J. (ww.adp.com), Paychex, Inc. of Rochester, N.Y. (www.paychex.com), and PayMaxx, Inc. of Franklin, Tenn. (www.paymaxx.com) all enable companies to outsource the calculations necessary to generate employee paychecks and employer/employee tax liabilities, and to make scheduled tax filings and payments to the relevant tax authorities. As noted above, however, companies must first generate the summary information for each pay period (including income, overtime, bonuses, commissions, pre-tax and post-tax deductions, etc.) and provide it to the payroll service in the specified format.

Larger companies in particular have attempted to get the "best of both worlds" by adopting a hybrid approach, using a standalone payroll system to calculate payroll-related data, and then manually transferring summary payroll data to an outside payroll service. One problem with this approach, however, is that payroll services require summary data in a particular format, which is not necessarily compatible with the output generated by standalone payroll systems (which typically are designed to enable companies to act as their own in-house payroll service). As a result, companies must manually integrate these two incompatible systems.

For example, not only must a company make manual modifications to transfer this summary data to the payroll service in the appropriate format, but any subsequent changes made to the raw data (e.g., a timesheet adjustment, added bonus, etc.) necessitate repeating this process to regenerate the summary data. In many cases, to avoid missing a payroll, companies must move certain changes to the next payroll, requiring additional modifications to the payroll system data. In short, keeping these two different systems synchronized often requires numerous manual modifications.

Companies offering such hybrid systems, often with human resource information systems ("HRIS") as well as payroll functionality, include ProBusiness, Inc. (www.probusiness.com) and PeopleSoft, Inc. (www.peoplesoft.com), both of Pleasanton, Calif., and Payroll Online Corporation of Bellevue, Wash. (www.payrollonline.com).

Larger companies that rely on enterprise-level HRIS and payroll systems must perform a significant amount of manual processing to synchronize the output of their payroll systems with the data format expected by their outside payroll services. As noted above, there is a distinct "manual break" in between two relatively automated processes.

Moreover, standalone payroll systems, even if used in conjunction with an outside payroll service, are inherently difficult to maintain. They must be updated frequently to reflect constant changes not only in tax laws and tax tables, but in the various employment-related laws that span federal, state and local jurisdictions. Frequently distributing such changes on a mass-market basis is simply not practical, even via the Internet, particularly when the local databases maintained by such systems must, in effect, be synchronized with those of a company's outside payroll service.

Recent trends toward outsourcing resource-intensive tasks such as HRIS and payroll management are gradually leading enterprise-level software vendors such as Oracle Corporation and PeopleSoft to offer "online leases" of their enterprise-level applications via the Internet. See, for example, "Net Lets Small Firms Run Faster Without an IT Team" (Lorna Fernandes, *San Francisco Business Times*, week of Feb. 15, 1999) and "The Perfect Host" (Jeffrey Zygmont, *CFO Magazine*, May 1999).

With the advent of the Internet and, in particular, the World Wide Web, payroll services have gradually attempted to migrate some of their functionality online, in an effort to reach a broader audience and to simplify communication with their customers. Similarly, standalone payroll system vendors are beginning to offer payroll-service fuctionality, often utilizing the Internet to facilitate the transfer of data.

Unfortunately, such systems do not adequately integrate payroll system functionality with that of a centralized payroll service. Companies still are forced to perform preliminary manual calculations to provide summary payroll data to an outside payroll service, or manually extract such summary data from a standalone payroll system.

Vendors seeking to integrate payroll service functionality with their existing standalone payroll systems still rely on PC-based client software that maintains a local database. As noted above, it is difficult to update such systems on a sufficiently frequent basis to enable them to enforce compliance with current employment-related laws. As a result, such systems leave this task to the employer, resulting in frequent errors that even a sophisticated payroll service may not detect. Moreover, synchronizing the data from the system's local database with that of an outside payroll service (even from the same vendor) results in the "manual break" in the process referred to above, requiring additional personnel and other resources within both the employer and the system vendor.

Vendors seeking to integrate a company's existing payroll system functionality with their outside payroll services face similar problems. These "web-based payroll services" offer little more than a web-based form that enables companies to enter summary payroll data directly into a browser (as opposed to using a telephone or fax machine), and perhaps see summary reports for approval before submitting the payroll. They do not address the problems described above with respect to integrating payroll system functionality with an outside payroll service.

Examples of such "integrated" products include "EasyPayWin" and "EasyPayNet" from ADP (www.adp.com), "Millenium" and "ESN Extranet" from Payroll Online Corporation (www.payrollonline.com), and "Virtual Payroll" from Virtual Payroll, Inc. of Margate, Fla. (www.virtualpayroll.com).

Existing payroll systems and payroll services, including those discussed above, also have not adequately integrated employee benefits into the payroll process, despite claims to the contrary. For example, certain medical benefits result in both pre-tax and post-tax deductions. Although existing payroll systems permit such deductions to be entered, they do not enable companies to set up custom policies pursuant to which the system will calculate automatically (for each pay period) the appropriate pre-tax and post-tax amounts for all employees/contractors. Moreover, existing payroll services do not typically handle employer disbursements to medical, life insurance and other benefit providers, requiring companies to manage such payments (and generate and transfer associated reports) themselves.

More generally, existing payroll systems and payroll services do not enforce compliance with the various employment-related and tax-related rules governing this process. For example, such systems and services would permit an employee to include a $1000/month paycheck deduction for a 401(k) plan on a pre-tax basis, despite the current $10,000 annual pre-tax deduction limit on such plans (which changes most years). Existing payroll systems and services also do not enable employees to designate miscellaneous payees for salary deduction payments, such as out-of-pocket medical expenses, mortgage payments, and child-care payments.

What is needed is an online payroll and benefits system that provides employers with the flexibility and control of an automated standalone payroll as well as the convenience of a seamlessly integrated outside payroll service.

SUMMARY

The present invention addresses the above-described concerns by seamlessly integrating an automated, centralized back-end payroll service with a full-featured web-based payroll system. Both aspects of this tightly integrated system have access to the same database of raw information, which includes, for example, general profile information on the employer and each employee/contractor, employee/contractor timesheet, salary and hourly wage data, company overtime, medical, life insurance and other benefit policy data, as well as information on third-party providers and miscellaneous payees.

Full-featured payroll system functionality is implemented, in one embodiment, both on the server side and on the client side, using "ActiveX" controls that provide employers and employees (to the extent security policies permit) with a robust user interface via a standard web browser. In this embodiment, a centralized database is maintained on the server side (though it could be embodied as separately synchronized client-side and server-side components) to provide the system's back-end (server-side) payroll service functionality with constant access to the same raw data. The system user interfaces are driven by the data contained within the centralized database.

The system implements and enforces compliance with a wide variety of tax-related and employment-related rules across federal, state and local jurisdictions (relating, for example, to overtime pay, benefit limits, payment frequency, and scheduled reporting requirements, as well as various tax rules and tables). The system can automatically receive and implement electronic updates to these rules, modifying its own functionality to conform to these changes and ensure compliance with current example. Moreover, these rules can include employers' own custom policies, e.g., an overtime policy that provides benefits beyond those required by law.

Full-featured payroll system functionality includes the automated collection of employee data (e.g., timesheets that can be entered manually or automatically via an interface with time clock devices) and the calculation of employee/contractor income, taxes, and pre-tax and post-tax deductions. The system automatically calculates overtime, imputed income, and paid-time-off benefits, and allocates the sharing of payments for other employee benefit programs between employers and employees, as well as enabling employers to set up custom policies, e.g., for overtime, 401(k) and medical "cafeteria" plans.

In addition, the system enables employees to specify policies for payments to miscellaneous third-party payees, such as an automatic deduction for an employee's mortgage payment. In fact, employees could elect to use the system as a centralized bill payment system for their personal bills. Employees can even be given the option of selecting among multiple medical, 401(k), life insurance and other benefit providers, with the system automatically implementing the appropriate benefit plan policies for each employee, e.g., affecting allocations among pre-tax and post-tax deduction amounts. Employers also can specify custom reports (in addition to those required by law), which the system will generate and transfer automatically to the appropriate party (employer, employee, benefit provider, etc.) at the specified reporting interval.

Employers can review and validate paychecks for each employee/contractor, modify virtually any of the raw data and immediately recalculate paychecks, and even print some or all paychecks locally, submitting the remainder of the payroll (with a single click of the mouse or push of a button) to the system's automated back-end payroll service.

Once a payroll has been submitted, the system's back-end payroll service functionality uses this same raw data to generate disbursement information for payments to employees/contractors, benefit providers, miscellaneous payees, and various tax authorities. These calculations remain subject to compliance with the same database of rules that was used to calculate employee paychecks.

The system applies these rules to determine the source, destination and scheduled timing for disbursement of funds and transfer of information (e.g., reports, tax filings, and associated payment information) among the various payers and payees, and then automatically effects such transfers (whether electronic or otherwise) at the appropriate times. For example, for each pay period, funds are transferred (typically electronically) from the employer's account to that of the payroll service, from which paychecks are automatically transferred electronically, or printed and mailed (if not printed locally by the employer), to each employee/contractor. At the appropriate time (not necessarily corresponding with a pay period), funds are also transferred (as are any automatically generated reports) to the appropriate tax authorities, benefit providers and miscellaneous payees (e.g., lienholders, child care providers, etc.).

Various other features have been added (as described below) to provide employers and employees with additional flexibility and control over the payroll process, and to facilitate automated communication and integration of functionality not only between the company and its payroll service, but with miscellaneous payees, benefit providers and other third parties as well.

BRIEF DESCRIPTION OF THE FIGURES

The above objects and description of the present invention nay be better understood with the aid of the following text and accompanying drawings:

FIG. 6(a) shows a screen print of an interactive user interface for displaying an Employer's address information in an embodiment of the present invention.

FIG. 8(a) shows a screen print of an interactive user interface for assigning employees to an Employer's offices in an embodiment of the present invention.

FIG. 10(b) shows a screen print of an interactive user interface for calculating paid-time-off accrual in an embodiment of the present invention.

FIG. 10(c) shows a screen print of an interactive user interface for testing a paid-time-off accrual rates table in an embodiment of the present invention.

FIG. 12(a) shows a screen print of an interactive user interface for displaying employee benefit plans in an embodiment of the present invention.

FIG. 12(c) shows a screen print of another view of an interactive user interface for displaying employee benefit plans in an embodiment of the present invention.

FIG. 13 shows a screen print of an interactive user interface for displaying payee information in an embodiment of the present invention.

FIG. 14(a) shows a screen print of an interactive user interface for displaying employee shared deduction information in an embodiment of the present invention.

FIG. 14(b) shows a screen print of another view of an interactive user interface for displaying employee-shared deduction information in an embodiment of the present invention.

FIG. 15(a) shows a screen print of an interactive user interface for displaying Employer-matching deduction information in an embodiment of the present invention.

FIG. 16(a) shows a screen print of another view of an interactive user interface for displaying information regarding payroll taxes in an embodiment of the present invention.

FIG. 18(a) shows a screen print of an interactive user interface for displaying Employer-defined payroll groups in an embodiment of the present invention.

FIGS. 24 and 24(a) shows a screen print of an interactive user interface for displaying information regarding payees to whom payments will be made from payroll deductions in an embodiment of the present invention.

FIG. 26(b) shows a screen print of an interactive user interface for inputting information regarding a new employee in a workflow sequence in an embodiment of the present invention.

FIG. 27(a) shows a screen print of an interactive user interface for displaying personal information regarding a particular employee in an embodiment of the present invention.

FIG. 27(b) shows a screen print of an interactive user interface for displaying home address information regarding a particular employee in an embodiment of the present invention.

FIG. 27(c) shows a screen print of an interactive user interface for displaying Employer contact information regarding a particular employee in an embodiment of the present invention.

FIG. 28(a) shows a screen print of an interactive user interface for displaying payroll information regarding a particular employee in an embodiment of the present invention.

FIG. 28(b) shows a screen print of another view of an interactive user interface for displaying payroll information regarding a particular employee in an embodiment of the present invention.

FIG. 30(b) shows a screen print of another view of an interactive user interface for displaying pay rate information regarding a particular employee in an embodiment of the present invention.

FIG. 31 shows a screen print of an interactive user interface for displaying periodic earnings information regarding a particular employee in an embodiment of the present invention.

FIG. 32 shows a screen print of an interactive user interface for displaying periodic deductions information regarding a particular employee in an embodiment of the present invention.

FIG. 33 shows a screen print of an interactive user interface for displaying paid-time-off information regarding a particular employee in an embodiment of the present invention.

FIG. 34(a) shows a screen print of an interactive user interface for displaying insurance plan information regarding a particular employee in an embodiment of the present invention.

FIG. 34(b) shows a screen print of another view of an interactive user interface for displaying insurance plan information regarding a particular employee in an embodiment of the present invention.

FIG. 35(a) shows a screen print of an interactive user interface for displaying payroll tax information regarding a particular employee in an embodiment of the present invention.

FIG. 35(b) shows a screen print of another view of an interactive user interface for displaying payroll tax information regarding a particular employee in an embodiment of the present invention.

FIG. 37 shows a screen print of an interactive user interface for displaying year-to-date tax deductions of a particular employee in an embodiment of the present invention.

FIG. 38 shows a screen print of an interactive user interface for displaying direct deposit information regarding a particular employee in an embodiment of the present invention.

FIG. 40(c) shows a screen print of an interactive user interface for displaying a paycheck of a particular employee in the current payroll in an embodiment of the present invention.

FIG. 41(a) shows a screen print of an interactive user interface for displaying a timesheet summary of a selected payroll group in an unscheduled payroll in an embodiment of the present invention.

FIG. 41(c) shows a screen print of an interactive user interface for displaying a paycheck of a particular employee in an unscheduled payroll in an embodiment of the present invention.

FIG. 42 shows a screen print of an interactive user interface for selecting parameters for electronic processing of a particular payroll in an embodiment of the present invention.

FIG. 45(a) shows a printout of a paycheck and pay stub generated by an embodiment of the present invention.

FIG. 45(b) shows a printout of a direct deposit pay stub generated by an embodiment of the present invention.

DETAILED DESCRIPTION OF THE INVENTION

General Architecture

One embodiment of the present invention described herein is an online Internet-based (World Wide Web) system that combines the flexibility and functionality of a standalone payroll system with the convenience of a payroll service, and automatically integrates the interface between the payroll system and payroll service functionality, in addition to providing other novel features.

Figure 1:
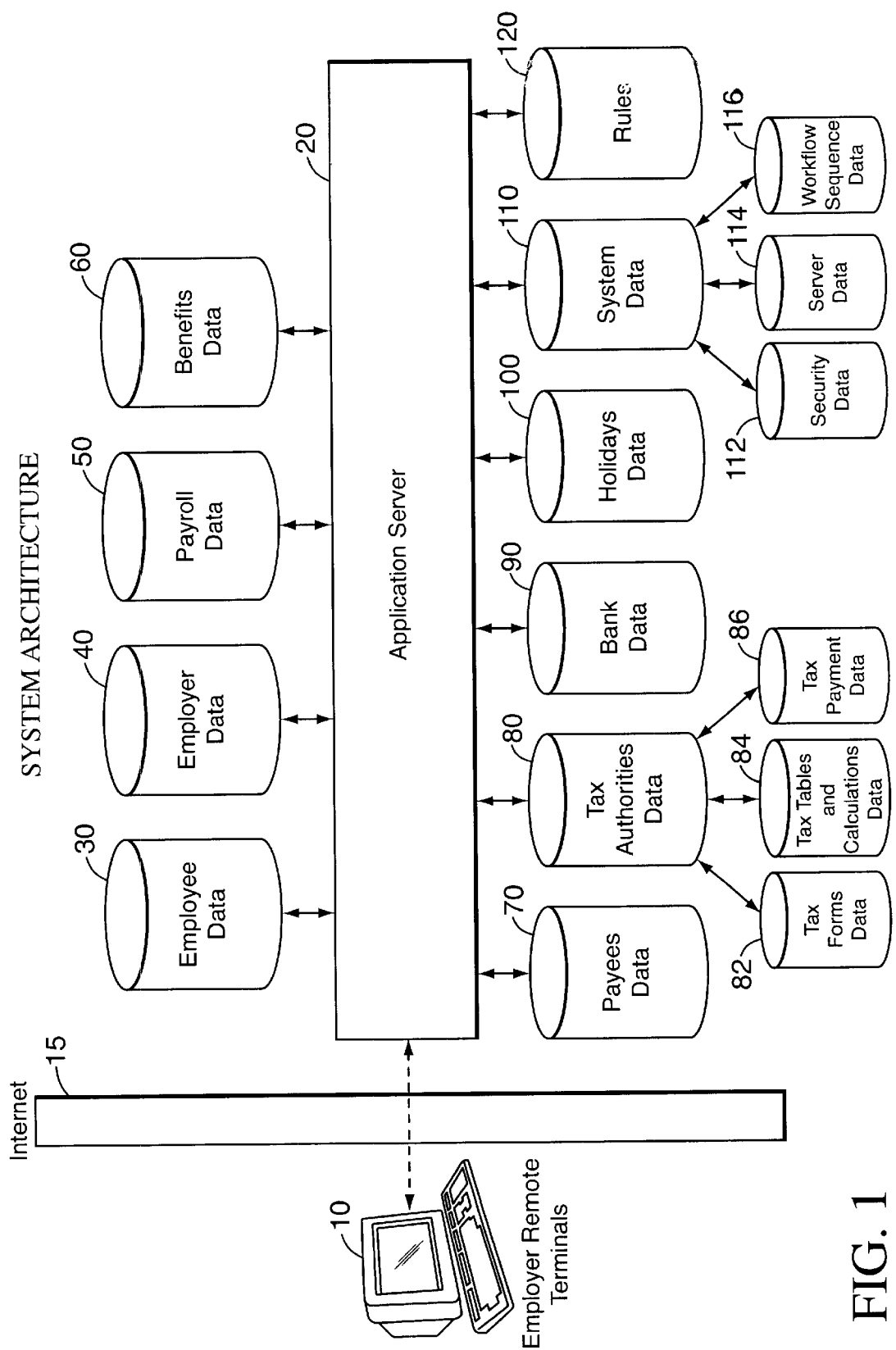
FIG. 1 shows the high-level architecture of an embodiment of the present invention.

FIG. 1 illustrates the high-level architecture of an embodiment of the invention. Users, e.g., the payroll administrator of a company with employees and/or contractors (an "Employer"), access the system via remote terminals 10, such as personal computers that are equipped with hardware and software to provide an interactive connection to the Internet 15. Processing related to Employers' communications and interactions with the system are coordinated by application server 20. Application server 20 coordinates and controls a variety of applications (some of which may be installed locally on the remote terminals 10) that comprise the system's features and functionality, including software that performs various calculations, rule applications, disbursements, electronic funds transfers, and report generation related to the administration and processing of Employers' payrolls and benefit plans.

In performing its coordination and control functions, application server 20 communicates with a plurality of data collections. These collections may be implemented as databases, tables, or other data structures, and comprise the primary categories of data manipulated by the system. These data collections are shown in FIG. 1 and described below at a high level, with greater detail subsequently provided in the context of a specific example of an embodiment of this invention.

For each Employer, employee data 30 consists of information about the Employer's employees and/or contractors, including: personal information (e.g., name, employee number, social security number, date of birth, etc.), address information, company contact information (e.g., office, division, department, telephone number, etc.), payroll information (e.g., salary or hourly status, payroll group, exempt status indicators, etc.), pay rate information (e.g., salary, hourly rate, overtime rate, etc.), periodic earnings information (e.g., bonuses, commissions, tips, etc.), periodic deductions information (e.g., 401(k), child support, medical plan contributions, etc.), benefit information (e.g., paid time off, insurance, etc.), tax information (e.g., tax type, withholding allowances, etc.), and direct deposit information (e.g., bank name, routing number, account number, etc.). The Employer typically inputs this information into the system, though some information, such as benefit elections, automatic deductions, and direct deposit elections may be input directly by the employees.

For each Employer, employer data 40 includes information specific to the Employer, including: address information (for headquarters and other locations), structure information (e.g., departments, divisions), bank information (for bank account(s) from which payroll is funded), paid-time-off policies (e.g., vacation time and sick time payment schedules, including calculation and accrual parameters), holiday information (regarding holidays recognized by one or more of Employer's offices), benefit information (regarding standard and custom health plans, insurance plans, etc.), deduction information (regarding shared and matching contributions by Employer for employee benefits), tax information (regarding tax authorities applicable to Employer's payroll), payroll group information (regarding Employer-defined payroll groups), and pay rate information (regarding Employer-defined pay rates). The Employer typically inputs this information into the system.

For each Employer, payroll data 50 includes the total payroll for each pay period, including timesheet and paycheck summaries for all employees and contractors employed during a given pay period. This information is compiled during and after processing of employee data 30 and employer data 40.

For each Employer, benefits data 60 includes information regarding employee benefits, such as health insurance, dental insurance, life insurance, disability insurance, and 401(k) plans. The stored information includes: provider name and address, benefit plan type, plan name, plan group number, effective date, expiration date, amount to be paid by Employer to provider, billing cycle, Employer-to-provider payment method (e.g., Automated Clearinghouse ("ACH") or "FedWire" debit), bank routing number, and account number. The Employer typically inputs this information into the system.

For each Employer, payees data 70 includes information regarding payees to whom periodic or ad hoc payments will be made by the Employer from employee paycheck deductions, such as mortgage lenders, investment banks, insurance companies, child support agencies, and charities. The stored information includes: payee name and address, payee type (lender, investment bank, insurance company, child support agency, charity, etc.), payer's (i.e., employee's) name, payer's account number with payee, amount to be paid by Employer to payee, billing cycle, Employer-to-payee payment method (e.g., check, direct deposit), bank routing number, and account number. The Employer or third-party administrator typically inputs this information into the system; however, an employee could do this as well if the employee elects to use the system as a centralized bill payment system.

Tax authorities data 80 includes information regarding tax authorities applicable to Employers' payrolls, as determined each payroll period by application server 20 based on Employers' particular data (i.e., addresses of Employer's offices) and employees'/contractors' home addresses. This information is common to multiple Employers that use the system, though not all Employers pay taxes to the same tax authorities. Tax authorities include the U.S. Internal Revenue Service, as well as state and local tax agencies. In some embodiments of this invention, tax authorities data 80 may also include international tax agencies. The stored information includes: name, address, and payment information (e.g., bank routing number and account number for electronic payment, address for payment by check, TXP Addendum information for ACH tax payments). In addition, for each tax authority included in tax authorities data 80, there is at least one entry in tax forms data 82, tax tables and calculations data 84, and tax payment data 86. Tax forms data 82 includes, for each tax authority, copies of required forms in printable PDF format or "Report Writer" format (where signatures are required) or EDI format (where electronic filing is permitted) that are filed by the system for Employers, as well as filing deadlines based on accumulated tax liabilities during the filing period and other related information. The system determines which forms are required in particular situations and provides the users with the requisite forms. Tax tables and calculations data 84 includes, for each tax authority, tax formula steps and tables necessary to calculate payroll and withholding taxes. Tax payment data 86 includes, for each tax authority, rules and information regarding tax payment, including electronic payment.

Bank data 90 includes information regarding system bank accounts from which Employers' payments to employees, tax authorities, benefit providers, and miscellaneous payees will be funded. This information is common to multiple Employers that use the system, though not all Employers use the same accounts. The stored information includes: bank name, bank routing number, and account number for the bank account.

Holidays data 100 includes information regarding standard holidays (both U.S. and international) applicable to Employers' payrolls. This information is common to multiple Employers that use the system, though not all Employers recognize all holidays included in the data. The stored information includes: holiday name, actual date of holiday (e.g., July 4 for Independence Day holiday), and description of holiday (e.g., first Monday in September for Labor Day holiday).

System data 110 includes information related to and used in administration of the system. This information includes security data 112, server data 114, and workflow sequence data 116. Security data 112 includes numeric security levels that can be used by an Employer to limit the access of particular users to certain user interface screens, fields within screens, employee data, office data, payroll group data, and/or other groupings of data. Server data 114 includes information regarding servers communicating with the system application server 20, including database servers and web servers of each Employer using the system. The system uses server data 114 in order to dynamically reconfigure and load balance Employers' servers. The system performs such reconfiguring and load balancing in the event of server failures or to improve performance.

Workflow sequence data 116 includes information and executable code that enables Employers to create customized, automated workflows through the system user interface screens. Such a workflow can be invoked via a keystroke or by clicking a button and automatically guides the user through a pre-selected sequence of interface screens, rather than requiring the user to select each interface screen along the way. The system provides software "wizards" that enable the user to navigate forwards or backwards through a series of interface screens, while preserving the data already entered by the user on any of the screens. Some workflows may be provided by the system, including new company and new employee or contractor sequences (see, e.g., FIGS. 26(*a*)–(*b*), 39(*a*)–(*b*)). The automated workflows provide the user with increased speed and efficiency in using the system and provide Employers with a method of imposing security restrictions over certain system functionality.

Rules data 120 includes a variety of rules applied by application server 20 in perforaing payroll and benefits processing. Rules data 120 contains system-defined rules related to such functionality as overtime calculation (e.g., different rules based on daily, weekly, and bi-weekly overtime limits, as applicable), payment calculation, tax calculation, reporting, and legal compliance. For example, the system applies a legal compliance rule that will determine that ail employee who contributes $1000 per monthly paycheck to her 401(k) account has exceeded the annual $10,000 limit and, accordingly, will notify the user regarding processing of the additional $2000 contribution.

In some embodiments of this invention, such rules are implemented in the form of "stored procedures," i.e., executable, optimized SQL statements and data tables. The stored procedures are created by a source code generator based on steps contained within the data tables, such as tax calculation steps. Rules and calculations can be easily modified by adding or deleting steps within the data tables, without manually modifying the SQL statements within the stored procedures. Customized steps can be combined with standard steps to create customized rules and calculations. Further, such rules and calculations are easily auditable.

For example, the "Apply Nonexempt Limits" stored procedure contains SQL statements that calculate legally-required overtime for employees who are not exempt from overtime rules. After checking that the selected payroll group belongs to Employer, the stored procedure will cause the system to collect the list of non-exempt employees in the payroll group and, for each such employee, save the employee's timesheet data for the current payroll period in a temporary table. Next, the stored procedure will retrieve the employee's time entries for the 14-day period prior to the payroll date (i.e., the workdays covered in the current payroll date) and subtract out any previously awarded calculated overtime.

The stored procedure will next retrieve the employee's overtime hours and insert the hours into a calculation area. The overtime hours will be treated differently depending upon how the employee's overtime is calculated: (i) if calculated on a daily basis, the overtime hours will be inserted as negative hours and subtracted from any overtime calculated on a weekly or bi-weekly basis; (ii) if calculated on a weekly basis, the overtime hours (excluding any hours determined on a daily basis) will be inserted as negative hours and subtracted from any overtime calculated on a bi-weekly basis; (iii) if calculated on a bi-weekly basis, the overtime hours (excluding any hours determined on a daily or weekly basis) will be inserted as negative hours. The stored procedure will check that the calculated overtime hours do not exceed any overtime limits applicable to the employee. Next, the stored procedure will clear out any previously calculated overtime from the employee's timesheet and insert the newly calculated overtime hours; the system will reverse the sign of the overtime hours in order to produce a positive number (for calculation purposes). Finally, using these hours, the employee's pay rate, and the applicable overtime multiplier, the stored procedure will calculate the employee's overtime pay and insert that value into the employee's paycheck.

As another example, the "Calculate Taxes" stored procedure contains SQL statements that calculate the payroll taxes for each employee. After checking that the selected payroll group belongs to Employer, the stored procedure will cause the system to collect the list of employees in the payroll group and, for each employee, calculate all applicable taxes, usually starting at the federal level and moving down to the smallest applicable tax authority, if there is more than one tax at a particular level (e.g., multiple state income taxes), the stored procedure will set the desired order for calculating the taxes. The stored procedure also directly processes taxes that are a percentage of another tax (e.g., a state income tax that is a percentage of federal income tax), and ensures that such taxes are calculated in the correct order. In some circumstances, this means that the stored procedure automatically calculates the "smaller" tax before the "larger" tax, e.g., the federal unemployment tax ("FUTA") is calculated as a percentage of the "smaller" state unemployment insurance tax.

Rules data 120 will be updated automatically as existing rules are modified or new rules are created. For example, in the embodiment of the invention described herein, the system automatically updates tax rules by running proprietary, automated parser software on a monthly basis against tax law CD-ROMs that are commercially available from CCH Incorporated of Riverwoods, Ill. The parser software reviews the tax rules for relevant updates and uploads such updates to rules data 120. The system then processes the updates and dynamically generates data table entries from which executable SQL statements are generated.

Payroll System Functionality

In one embodiment of the invention described herein, the system includes functionality that is typically associated with stand alone payroll systems, functionality that is typically associated with payroll services, an "interface" between the payroll system and payroll service functionality, and other novel features.

Figure 2:
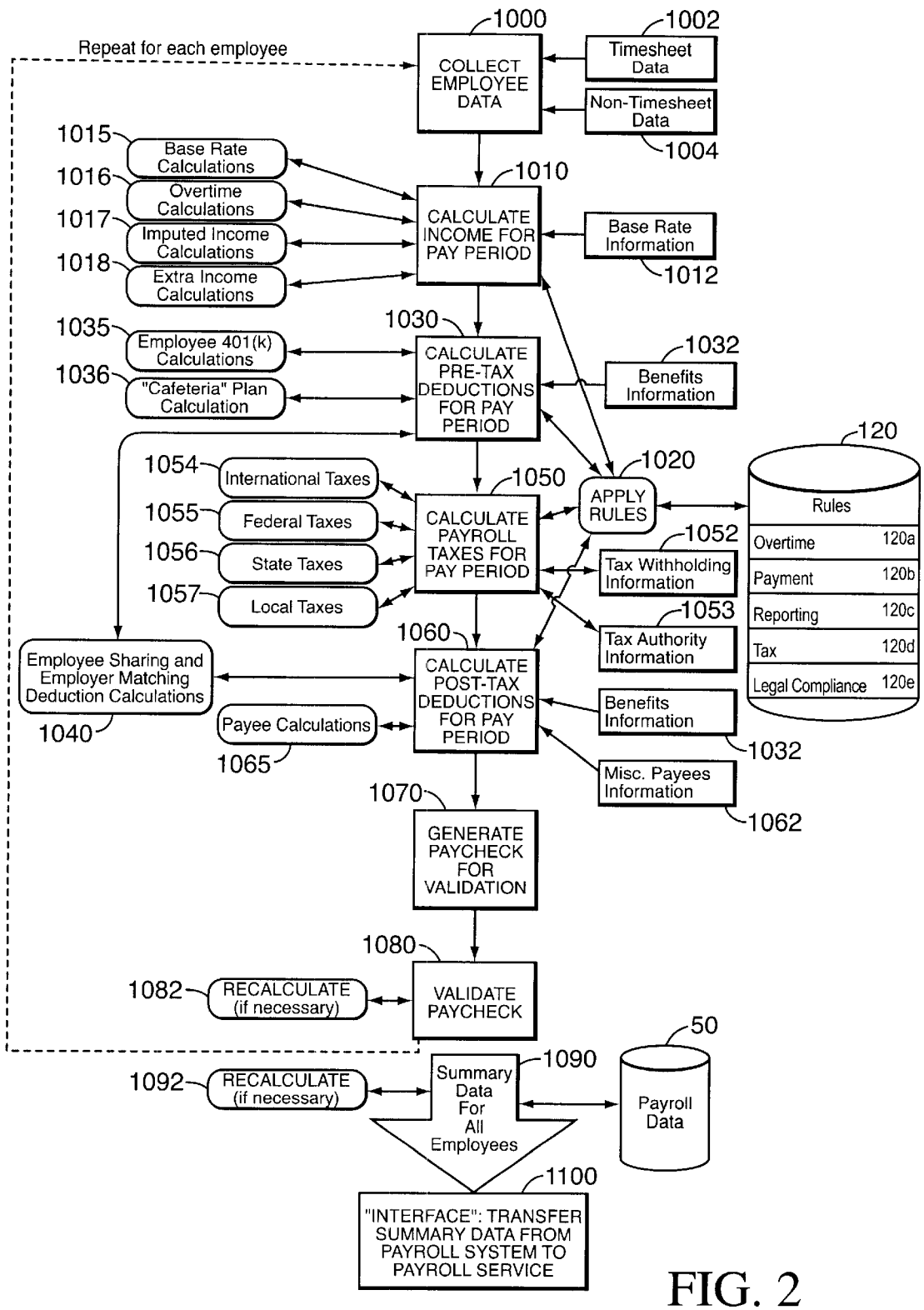
FIG. 2 shows the functionality and dynamic flow of information through a payroll system.

FIG. 2 illustrates the process flow of the "payroll system"-type functionality included in the present embodiment. The process flow is not strictly linear; thus, a number of the steps that will be described can be performed in a different order, or at any time. For illustration purposes, only, the process flow will be described as shown in FIG. 2.

For each employee and/or contractor included in the payroll for a particular pay period, an Employer first undertakes the step of collecting employee data 1000 (including any contractor data) for the particular time period. The employee data includes both timesheet data 1002 and non-timesheet data 1004. Non-timesheet data 1004 includes bonuses, commissions, tips, and other non-hourly or -salary based earnings accrued during the pay period that will be included in the employee's paycheck. Timesheet data 1002 includes hours worked (e.g., daily or total for pay period) and paid time off during the particular pay period, and may be collected (i.e., imported or keyed-in) on a daily basis or at the end of the pay period. If maintained on a daily basis, the system permits the Employer to "certify" the daily payroll. In one embodiment of this invention, employees' hours worked may be imported via a TCP/TP plug-in to third-party a time clock mechanism that communicates with and sends data directly to the system, in order to eliminate the need for keying-in the timesheet data. In other embodiments of this invention, employees' hours may be entered via an offline browser that automatically uploads data to a shared database from which it can be accessed by the system. Alternatively, electronic timesheets can be downloaded by the Employer for offline entry and subsequent upload to the system. These features are improvements upon traditional payroll systems, which do not include daily payroll capabilities or integrated timesheets.

Next, the system calculates the employee's income for the pay period 1010. A necessary input to this step is base rate information 1012 regarding the employee (included in employee data 30), which includes the employee's hourly pay rate for the period. This calculation step 1010 includes several sub-calculations for the pay period, such as: (1) calculation of base rate income 1015 (e.g., hourly or salary); (2) calculation of overtime 1016, if applicable, as required by law and applicable custom benefits or agreements; (3) calculation of imputed income 1017, i.e., non-paid income such as domestic-partner benefits, use of company car, per diem in excess of standard amount, life insurance in excess of standard amount, etc., for which there is a corresponding post-tax deduction (the system automatically enters a corresponding deduction so that the employee's gross income does not change); and (4) calculation of extra income 1018, i.e., non-timesheet income such as bonuses, commissions, tips, vacation pay, benefit accrual, etc. Note that traditional stand-alone payroll systems and services do not offer automatic overtime or imputed income calculations, as this invention provides. Some of these sub-calculations require the step of applying rules 1020 from rules data 120. For example, the overtime calculation may require application of Employer-specific overtime rules 120a corresponding to a union bargaining agreement. Other rules may relate to payment calculation 120b, reporting 120c, tax calculation 120d, and legal compliance 120e.

In this embodiment, the system next calculates the employee's pre-tax deductions for the pay period 1030. This calculation step 1030 may include several sub-calculations, such as: (1) calculation of the employee's 401(k) contribution 1035, if applicable; and (2) calculation of the employee's "cafeteria" plan 1036, which may cover insurance premiums, childcare expenses, out-of-pocket medical expenses, etc., if applicable. For example, step 1036 applies where the employee commits to an optional one-year fixed deduction to fund a pre-tax medical plan, which the Employer can match in a "medical savings account cafeteria" plan. Where applicable, and as a part of step 1036, the system can decide how much of the employee's contribution goes to the pre-tax cafeteria plan and how much goes to a non-deductible health insurance plan. Step 1030 requires use of employee benefits information 1032 (included in benefits data 60), such as amounts to be deducted from the employee's paycheck. Step 1030 may also require the step of applying rules 1020 from rules database 120, such as legal compliance rules 120e to ensure that the employee does not make 401(k) contributions above the annual limit, which has tax implications. In such a situation, the system can limit the employee's annual deduction or transfer the excess deduction to another deduction. Further, after determining the employee's pre-tax calculations, the system may need to calculate the Employer's matching contribution to the employee's 401(k) plan 1040, if the Employer provides such a matching benefit.

The system next calculates the employee's payroll taxes for the pay period 1050. This calculation step 1050 may include the following sub-calculations: (1) calculation of the employee's federal payroll taxes 1055, including income tax, social security (FICA), and Medicare payments; (2) calculation of the employee's state payroll taxes 1056, including income tax, disability tax, and unemployment tax payments, if applicable; (3) calculation of the employee's local payroll taxes 1057, such as city or county taxes, if applicable; and (4) calculation of the employee's international payroll taxes 1054, if applicable. Step 1050 requires use of the employee's tax withholding information 1052 (included in employee data 30), as well as tax information 1053 regarding the applicable tax authorities, including tax rates and calculations (included in tax authorities data 80 and tax tables and calculations data 84). These calculations may also require the application of rules 1020 from rules data 120, such as additional tax rules 120*d*.

After calculating the employee's payroll taxes for the pay period, the system calculates the employee's post-tax deductions for the pay period 1060. This calculation step 1060 may include several sub-calculations, such as: (1) calculation of imputed income (e.g., domestic partner benefits, etc.), if applicable, which was determined in prior step 1017; and (2) calculation of non-deductible payments to payees 1065, including benefits providers (e.g., medical insurance, life insurance, etc.) and miscellaneous payees (e.g., mortgage lenders, investment banks, insurance companies, child support agencies, childcare providers, charities, etc.) to whom payments will be made by the Employer from employee paycheck deductions. Step 1060 requires use of employee benefits information (included in benefits data 60) and miscellaneous payees information (included in payees data 70), such as amounts to be deducted from the employee's paycheck. These calculations may require the application of rules 1020 from rules data 120, such as payment rules 120*e* regarding payments to particular payees. Note that this system provides employees with the ability to select and directly access arbitrary payees for the purpose of automatic payroll deductions on a periodic or ad hoc basis.

After the system calculates the employee's taxes and deductions, the system generates the employee's paycheck for validation purposes 1070. The Employer can then view the employee's paycheck and associated raw and summary data online, in order to validate the paycheck 1080. Employee data that will be displayed by the system includes the following: name, identification number (e.g., social security number), pay rate or salary, pay period end date, status indicator regarding whether paycheck was prepaid, earnings broken out by type (e.g., regular, overtime, reimbursement, health benefits, etc.), hours (if applicable) broken out by type (e.g., regular, overtime), total pay amount broken out by type (e.g., regular, overtime, reimbursement, health benefits, etc.), deduction and tax amounts broken out by type (e.g., FICA, insurance premiums, 401(k), etc.), and a summary for the present and prior paychecks, showing employee's gross earnings, net earnings, and total deductions. If necessary, the Employer can adjust or modify the raw data online and the system will automatically recalculate the paycheck 1082 and display the revised information. The Employer can also view the raw and summary data in the context of various integrated reports that compare the employee to other employees. The combination of data display, modification, recalculation, and report generation provided by this invention facilitates the Employer's generation of accurate and timely paychecks, making it far less likely that the Employer will miss a payroll date.

The Employer can repeat the entire process of steps 1000–1080 for each employee and/or contractor on its payroll.

Payroll System/Service "Interface"

Once the Employer has completed the payroll system process for each employee on its payroll (or for as many employees as the Employer desires), the system can automatically generate and present to the Employer a summary of the payroll-related data for all employees 1090. It should be noted that this data can include as little or as much detail as the user desires, because the system retains access to the raw data used for the various payroll-related calculations. The system can "transfer" 1100 this summary data to the payroll service functionality, though this step does not typically involve a physical transfer of data, in that the integrated payroll service functionality also has access to the same raw data that was used to generate the summary payroll information 1090. The system therefore avoids the manual transfer of summary payroll data that typically occurs between a traditional payroll system and payroll service. The summary data 1090 contained in payroll data 50 can be modified by the Employer and recalculated 1092, if necessary.

Payroll Service Functionality

Unlike traditional stand alone payroll systems, which typically require the Employer to manually act as the payroll service, the embodiment of the invention described herein automatically "transfers" (i.e., utilizes) the payroll summary data 1090 from the payroll system (as well as raw payroll data, to the extent necessary) and provides full payroll service functionality.

Figure 3:
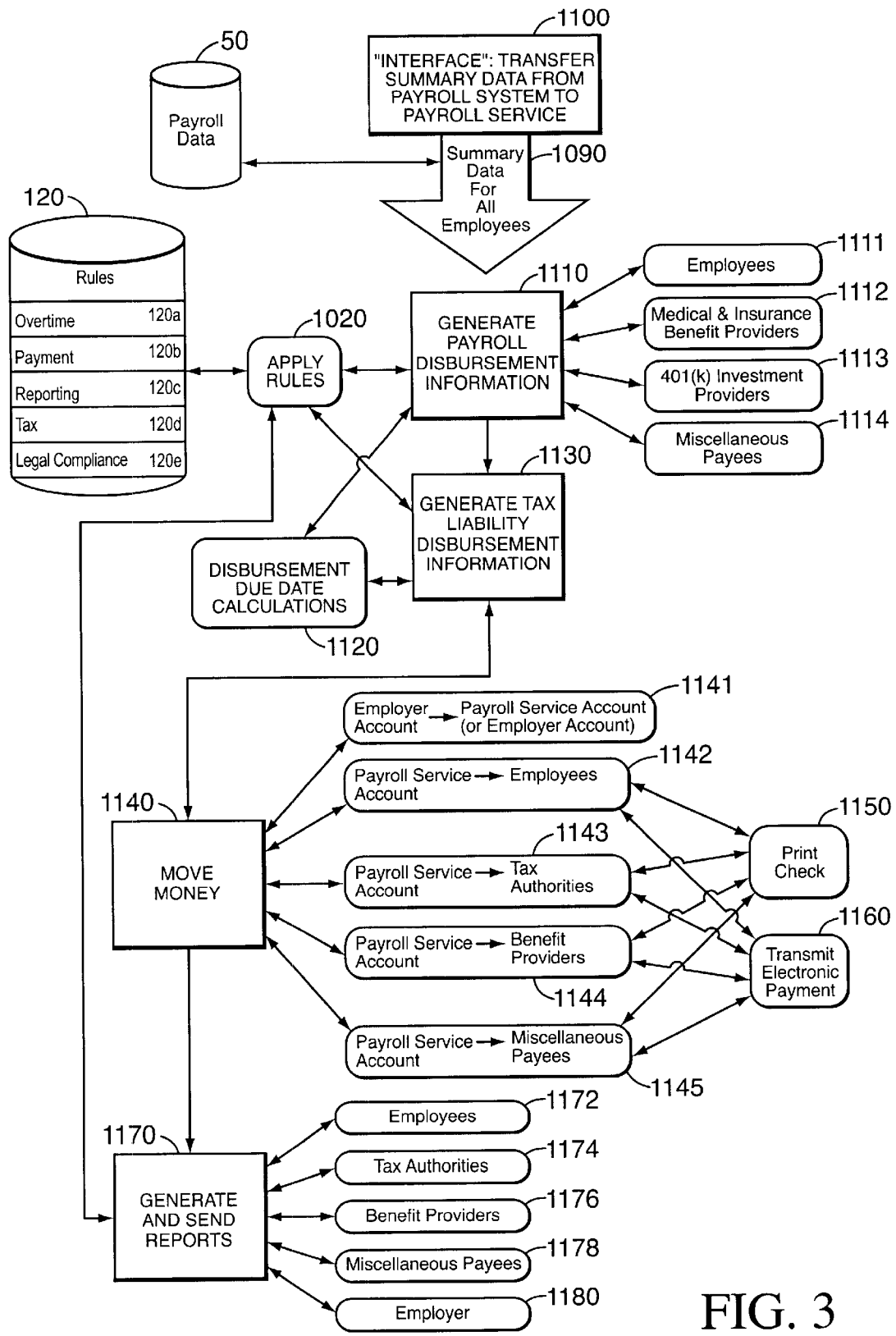
FIG. 3 shows the functionality and dynamic flow of information through a payroll service.

FIG. 3 illustrates the process flow of the "payroll service"-type fuctionality included in one embodiment of the present invention. The process flow is not strictly linear; thus, a number of the steps that will be described can be performed in a different order, or at any time. For illustration purposes, only, the process flow will be described as shown in FIG. 3.

The payroll summary data 1090 that was transferred from the payroll system functionality 1100 is available to the payroll service via payroll data 50. The system first accesses that data in order to generate payroll disbursement information 1110 for each employee, benefit provider, and miscellaneous payee to whom finds will be disbursed by the Employer. The information that will be generated includes the amount to be paid, the due date for the payment, and the method of disbursement (e.g., electronic deposit, check). In performing this step 1110, the system performs the following sub-steps: (1) generation of payroll disbursement information for each employee 1111, including net paycheck amount; (2) generation of disbursement information regarding each medical and insurance benefit provider 1112, including the amount to be paid to the provider for all employees receiving benefits, which consists of both the Employer's share and the aggregate of employees' contributions, and payment and updated enrollment information (e.g., change in marital status or dependents); (3) generation of disbursement information regarding each 401(k) investment provider 1113, including the amount to be paid to the provider for each participating employee, which consists of both the Employer's share (if Employer matches employee contributions) and the aggregate of employees' contributions; and (4) generation of disbursement information regarding miscellaneous payees 1114 (e.g., mortgage lenders, investment banks, insurance companies, child support agencies, charities, etc.) to whom payments will be made by the Employer from employee paycheck deductions, including the amount to be paid to each payee and payment and updated enrollment information.

This step 1110 also requires the calculation of due dates 1120 for each disbursement to be made, and may require the application of rules 1020 from rules data 120, such as payment rules 120*e* regarding payments to particular payees. Note that this system automatically provides disbursements to benefit providers and to arbitrary payees selected by employees.

After generating payroll disbursements, the system calculates and generates tax liability disbursements 1130. Such disbursements include payments owed to various tax authorities, including federal, state, and local governments, for both employee and Employer taxes. The information that will be generated for each tax authority includes the amount to be paid, due date for the payment, and the method of disbursement (e.g., electronic deposit, check). This step 1130 requires the calculation of due dates 1120 for each disbursement to be made, and requires the application of rules 1020 from rules data 120, including additional tax rules 120*d*.

Once disbursements have been calculated and generated, the system will move money from account to account 1140 in order to facilitate the payment of Employer's disbursements. First, the system transfers the sum total of Employer's disbursements (less any disbursement checks already printed by Employer) from Employer's account(s) to a central payment service account 1141 (or another account held by Employer for purpose of making disbursements), via an electronic transfer, such as an ACH, "FedWire," or "reverse FedWire" debit. The system next "moves" the money to particular payees in the previously-determined amounts, taking into account whether the payment is to be made via check, in which case the system will print the check 1150, or via an electronic funds transfer, in which case the system will format the data to properly transmit the electronic payment to the recipient 1160. Transfers take place from the system account to: employees 1142, via direct deposit; tax authorities 1143, via ACH+TXP and electronic funds transfer processing ("EFTPS," which is specific to federal tax payments); and benefit providers 1144 and miscellaneous payees 1145, via ACH transfers. The system will make a single payment to a particular benefit provider 1144 or miscellaneous payee 1145 on behalf of multiple Employers via one electronic transfer or check, but will send separate reports for each Employer; the system sends electronic transfers to tax authorities, however, only on behalf of one Employer per electronic transfer. Note that, unlike traditional payroll services, this system handles not only direct deposit payments to employees and electronic payments to tax authorities, but also payments (electronic and otherwise) to third-party payees.

The final step in the process is the generation and sending of reports 1170. These reports include reports to: employees 1172, such as pay stubs and annual W-2 statements; tax authorities 1174, such as Federal annual Form 940 and Federal quarterly Form 941 and California quarterly Form DE-6 and annual Form DE-7; benefit providers 1176, such as statements reporting payment per employee; miscellaneous payees 1178, such as statements identifying the particular employee(s) for whom payment was made by account number; and the Employer 1180, such as a summary of disbursements made during the pay period and other reports. This step 1170 requires the application of rules 1020 from rules data 120, including reporting rules 120*c*, which set forth the proper format for electronic reports. For example, only a small number of state tax authorities accept the electronic filing of wage reports; rules 120*c* provide the system with this information, including the required formats (reporting formats may also be found in certain tax forms contained in tax forms data 82). In an embodiment of this invention, some reports (e.g., reports for the Employer) may be accessed online using a report writer to generate the reports. Note that this system supports the generation and transmission of reports not only to Employers and tax authorities, but also to benefit providers and third-party payees.

Database Organization

The data that is stored in and manipulated by the system can be organized in a series of databases, tables, or other data structures. In the embodiment of the invention described herein, the data is organized in a series of related tables that are accessed using software procedures written in SQL data retrieval language.

The primary collections of data can be viewed conceptually at three levels: (1) system level, (2) Employer level; and (3) employee level. The system level includes collections of data that are useable and accessible across multiple Employers using the system. The Employer level includes collections of data that will contain different information for each Employer. The employee level includes collections of data that will contain different information for each employee.

1. System Level

Figure 4A:
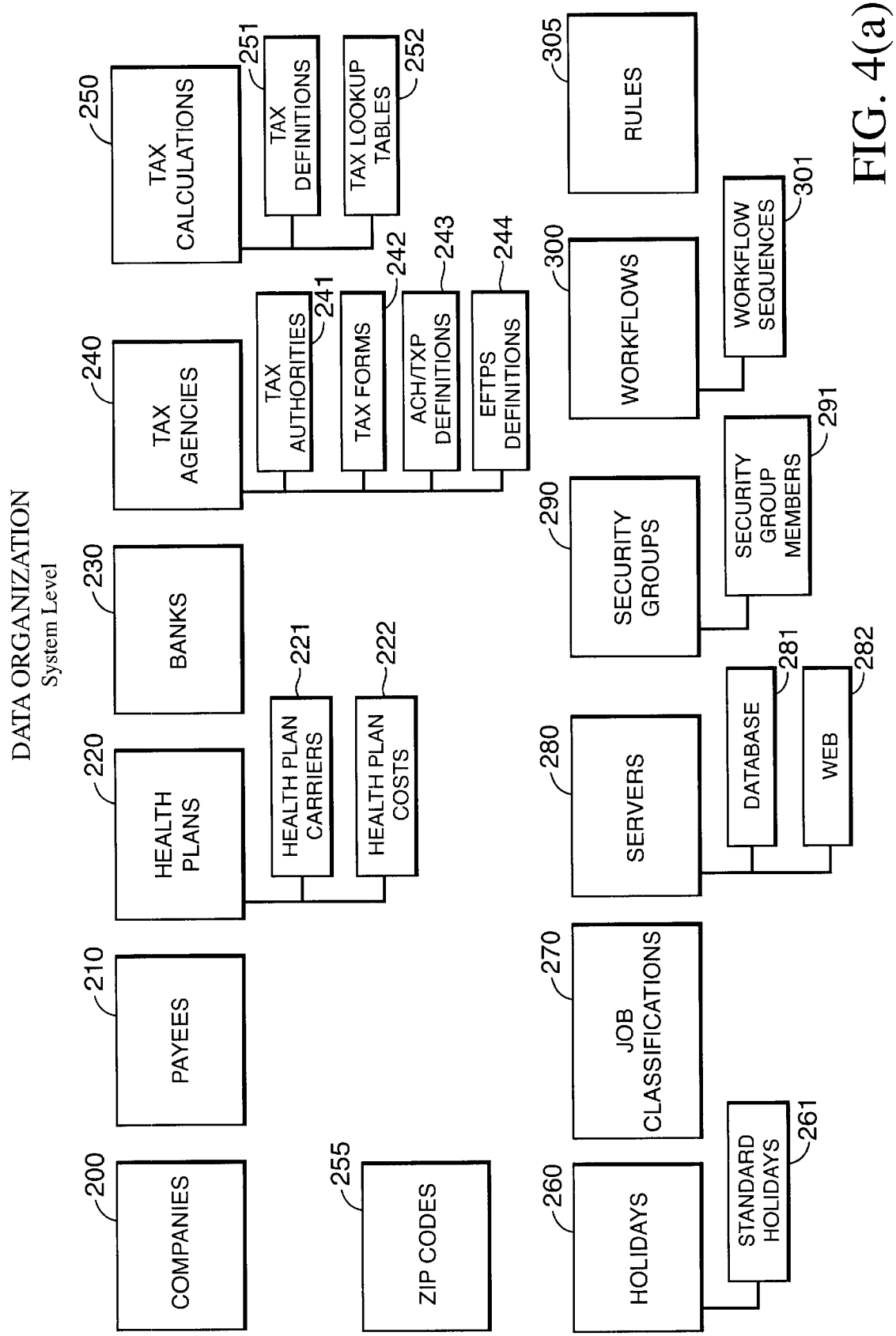
FIG. 4(a) shows the data organization of an embodiment of the present invention at the system level.

The data components at the system level include the data necessary for operation and administration of the system as well as data that is common to multiple Employers, employees, or third-party providers using the system. FIG. 4(*a*) illustrates the key data components, which are stored as tables in the present embodiment of the invention. Note that each table includes a keyed identification code or number ("ID") for each record in the table (e.g., "Companies_ ID"0 for each company, i.e., Employer, in the "Companies" table 200). The ID codes increase the data access speed.

"Companies" table 200 includes specific information about each Employer using the system, such as name, address, zip code, and dates that the company began operating and terminated operations (if applicable). The system's security functionality only permits access to information about a particular Employer to that Employer or to authorized customer support personnel.

"Payees" table 210 includes specific information about each payee to which at least one Employer or employee transmits payroll deductions, including: name, ID(s) of associated Employer(s), ID(s) of associated employee(s) for whom payments are made, employee information (e.g., account number with payee), day of month to make payment, EDI information, and bank routing and account numbers for electronic payments. The system permits each Employer to create relationships with payees in the "Payees" table 210 or to add new payees to the table. Similarly, employees can create relationships with payees in the "Payees" table 210 or add new payees to the table.

"Health Plan" table 220 includes specific information about each health plan which is available to Employers to provide to their employees, including: plan name, health plan carrier ID, and ID of payee to whom payments are made for the benefit. "Health Plans" table 220 includes related "Health Plan Carriers" 221 and "Health Plan Costs" 222 tables. "Health Plan Carriers" table 221 includes the name of each health plan carrier. "Health Plan Costs" table 223 includes: valid covered individuals (e.g., employee, certain dependents), effective date of plan, and rate schedule, including payroll deduction amount for individuals in certain age ranges. The system permits each Employer to associate with each health plan in "Health Plans" table 220 or to add new health plans to the table, including custom health plans. Employers can also use this information to compare health plans.

"Banks" table 230 includes specific information about each bank at which the system maintains accounts for facilitating electronic payments from Employers to employees, tax authorities, benefit providers, and miscellaneous payees, including: bank name, bank routing number, and account number(s). The system maintains accounts at different banks at which Employers maintain bank accounts, in order to enable intrabank transfers from Employers to the system. Such transfers reduce the risk of late payments, since intrabank transfers are automatic and same day. In addition, intrabank transfers have lower associated fees than alternatives, including "FedWire" debits. "Tax Agencies" table 240 includes specific information about each tax agency to which Employers may transmit payroll taxes, including; name, ID of associated tax authority, and bank routing and account numbers. A tax agency is a specific entity within a tax authority to which separate taxes are paid (e.g., the California Employment Development Department and the Franchise Tax Board are two tax agencies within the California tax authority). "Tax Agencies" table 240 includes related "Tax Authorities" 241, "Tax Forms" 242, "ACH/ TXP Definitions" 243, and "EFTPS Definitions" 244 tables. "Tax Authorities" table 241 includes tax authority name and indicators regarding whether registration is required and whether the Employer has a tax identification number with the authority. "Tax Forms" table 242 includes ID of tax authority and name of tax form (paper or electronic) to be filed by an Employer; this information can be used to link to a table that contains electronic versions of the tax forms. "ACH/TXP Definitions" table 243 includes: tax form ID, tax agency ID, and information necessary to execute an electronic ACH+TXP transaction. "EFTPS Definitions" table 244 includes information necessary to execute an EFTPS tax payment with the U.S. Internal Revenue Service. The system permits each Employer to associate with each tax agency in "Tax Agencies" table 240.

"Tax Calculations" table 250 includes information necessary to calculate each payroll tax included in the system, including: tax name, tax definition ID, effective date, expiration date, calculation steps, and order of steps. The calculation steps correspond to routines in stored procedures and are used to generate optimized, executable SQL statements contained in such stored procedures; the stored procedures actually calculate the taxes. Modifications to the calculations are made via updates to "Tax Calculations" table 250. "Tax Calculations" table 250 includes related "Tax Definitions" 251 and "Tax Lookup Tables" 252 tables. "Tax Definitions" table 251 includes: tax form IDs (for paying and reporting), tax authority ID, name, associated heading to be printed on employee paychecks, and associated information to be printed on Employer-generated W-2 forms. "Tax Lookup Tables" table 252 includes: tax definition ID, effective date, expiration date, minimum and maximum earnings ranges and associated tax rates, and an indicator regarding whether the information was validated.

"Zip Codes" table 255 contains information used in determining applicable tax authorities, including: city, state, zip code, area code, FIPS code (i.e., a unique numeric identifier assigned to each county by the U.S. government), and county. Each record in "Zip Codes" table 255 has an identifier that could potentially correspond to a different tax authority. For example, the same zip code may include more than one city, each of which assesses a local payroll tax. The "city" and "FIPS" fields are used to distinguish different tax authorities within the same zip code.

"Holidays" table 260 includes information regarding payroll holidays recognized by Employers, including: ID of Employers (and Employer's offices) recognizing holiday, date, name, indicator regarding whether applicable as paid holiday to salaried and hourly employees, and standard holiday ID. "Holidays" table 260 includes related "Standard Holidays" table 261. "Standard Holidays" table 261 includes information regarding each specific standard holiday (e.g., Memorial Day, Labor Day, etc.), including: name, occurrence within month (e.g., third Monday of month, day of week (i.e., if always the same weekday), date (if fixed); and an indicator regarding whether the holiday is a bank holiday. Each Employer can select which standard holidays apply to each of its offices.

"Job Classifications" table 270 includes information regarding industry-standard job classifications, including classification name and ID(s) of Employer(s) using a particular job classification. This information can be used to create pay scales based on tenure of an Employer's employees across different job classifications. Further, this information can be used to create salary surveys across different Employers using industry-standard job classifications.

"Servers" table 280 includes information regarding each computer server that is part of the system, including name and domain. "Servers" table 280 also includes related "Database Servers" 281 and "Web Servers" 282 tables. "Database Servers" table 281 includes information regarding each database server that is part of the system, including server name and TCP port. "Web Servers" table 282 includes information regarding each Internet server that is part of the system, including server name, TCP port, and an indicator regarding whether the server is secure. The system uses the server information to dynamically load balance the system and to move Employers to different servers in order to optimize system performance or to reallocate system resources when failures occur. The information can also be used to manage servers at Employers' sites.

"Security Groups" table 290 includes information about each system security group used by the system or an Employer to limit access to the system, including ID of the associated Employer and the group name. System users may include Employer administrators, employees, third-party benefit administrators, and benefit payees. For example, an Employer may provide: (i) its employees with authorization to make certain specifications, such as benefit election, direct deposit election, and miscellaneous payee election; and (ii) third-party benefit providers and payees to enter benefit and deduction information. "Security Groups" table 290 includes related "Security Group Members" table 291, which identifies group members.

"Workflows" table 300 includes information regarding each user interface workflow created by the system or an Employer, including Employer ID and related "Workflow Sequence" table 301. "Workflow Sequences" table 301 includes information regarding each sequence of user interfaces that comprise a workflow, including: workflow ID, sequence name, numeric sequence controls, option names, and accompanying text.

"Rules" table 305 includes the many calculation and rules steps that the system uses to perform calculations and generate payroll information. These rules and calculations relate to all aspects of the calculation of overtime, payments, and taxes, as well as reporting and legal compliance. In the present embodiment, the rules are stored in the form of steps that correspond to routines in "stored procedures" and which are used to generate optimized, executable SQL code contained in such stored procedures. Modifications to the calculations are made via updates to "Rules" table 250. Examples of such stored procedures include: calculation of accrued paid-time-off; calculation of imputed income; determination of applicable tax authorities for an Employer's payroll, using a commercially-available zip code database; and determination of which taxes apply to a particular employee as of a particular date, and which tax formulas to execute.

2. Employer Level

Figure 4B:
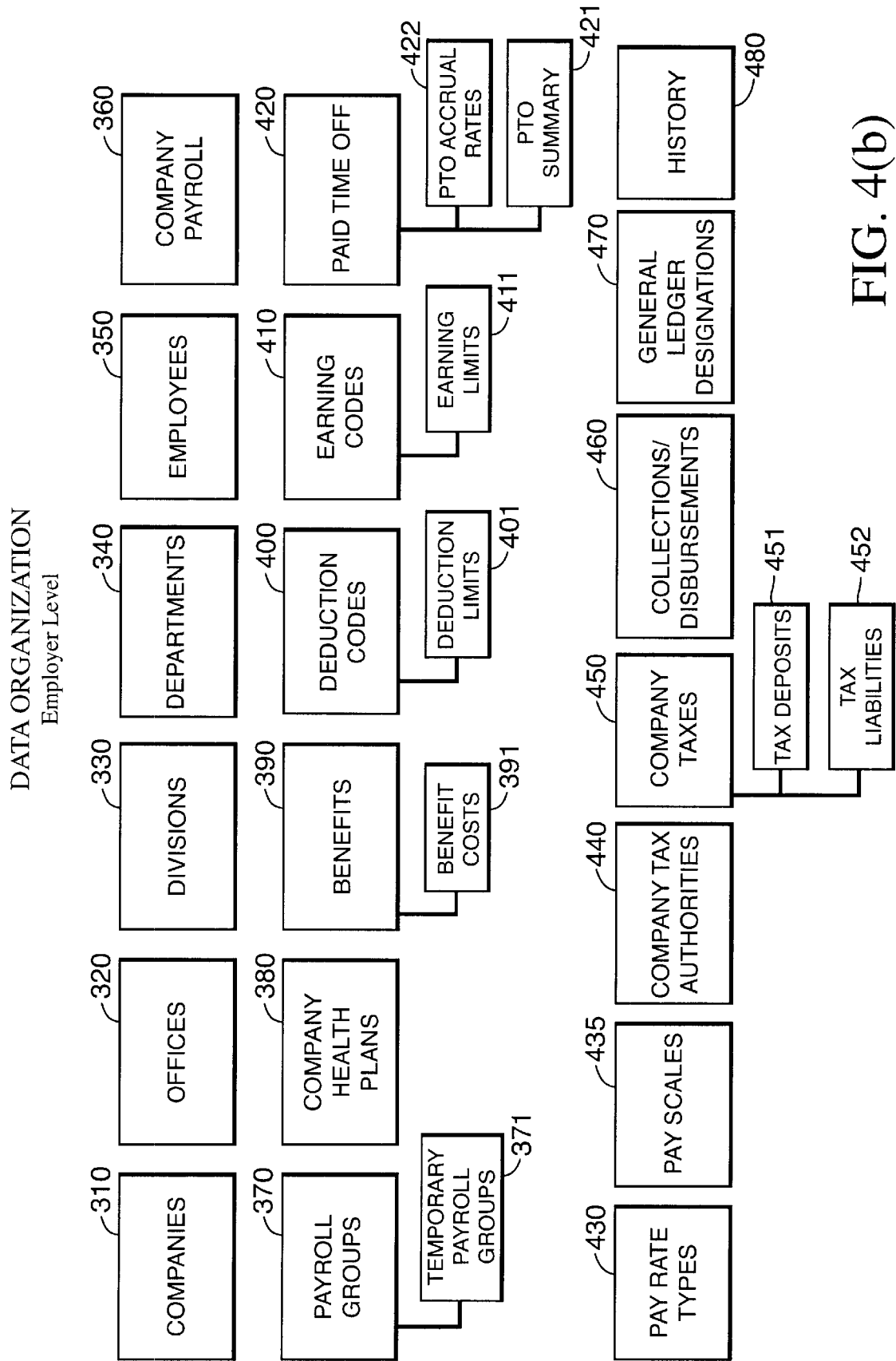
FIG. 4(b) shows the data organization of an embodiment of the present invention at the employer level.

The data components at the Employer level include data that is specific to Employers using the system. FIG. 4(b) illustrates the key data components, which are stored as tables in the present embodiment of the invention. As in the system level description, each table includes a keyed identification code or number ("ID") for each record in the table.

"Companies" table 310 includes specific information about the Employer, including name, address, zip code ID (corresponding to a sub-region within the zip code), and dates that the Employer began operating and terminated operations (if applicable).

"Offices" table 320 includes specific information about each of Employer's offices, including office name, address, and zip code ID.

"Divisions" table 330 includes specific information about each of Employer's divisions, including division name.

"Departments" table 340 includes specific information about each of Employer's departments, including department name.

"Employees" table 350 includes specific information about each of Employer's employees, including: name, social security number, address, zip code ID, and contact information.

"Company Payroll" table 360 includes information regarding Employer's payroll account, including: IDs of included employees and payroll groups, bank name, bank rotating and account numbers, and indicators regarding electronic payroll transactions.

"Payroll Groups" table 370 includes information regarding each Employer-defined payroll group, including: name, start dates of current and next payrolls, pay date of current payroll, date of last payroll, and status indicators regarding whether the current payroll is the first or last payroll of the month. "Payroll Groups" table 370 includes related "Temporary Payroll Groups" table 371, which includes the name and payroll date of any temporary payroll groups created by the Employer to make one-time payments to employees, such as bonuses.

"Company Health Plans" table 380 includes information regarding each of Employer's health insurance plans, including: benefit ID, policy group number, risk adjustment factor, renewal date, effective date, and expiration date. Such health plans may include standard health plans or health plans with custom rate tables.

"Benefits" table 390 includes information regarding each of Employer's employee benefit plans, including: deduction code ID, plan name, imputed income indicator, threshold units, imputed income multiplier, ID of payee that provides benefit, and policy group number. Such benefit plans may include standard benefit plans or customized benefit plans, such as plans that combine more than one health insurance plan. "Benefits" table 390 includes related "Benefit Costs" table 291, which includes specific information about each benefit plan, including: benefits ID, effective date, expiration date, and rate information based on the age ranges of covered individuals.

"Deduction Codes" table 400 includes information regarding payroll deductions available from the Employer's payroll, including the deduction name and ID, as well as related "Deduction Limits" table 401. The deduction codes may be global across multiple Employers or customized for a specific Employer. "Deduction Limits" table 401 includes: effective date, expiration date, and monetary limit of each type of deduction.

"Earning Codes" table 410 includes information regarding employees' earnings included in Employer's payroll, including: earnings name and ID, tax authority ID, and status indicators regarding whether earnings are to be reported as income and whether earnings accrue paid time off. The earning codes may be global across multiple Employers or customized for a specific Employer. "Earning Codes" table 410 also includes related "Earning Limits" table 411, which includes: effective date, expiration date, and monetary limit of each type of earnings.

"Paid Time Off" table 420 includes information regarding paid-time-off that may be accrued by employees, including: paid-time-off type (e.g., vacation, sick day), amount taxed as earnings, and a status indicator regarding whether there is payout at termination. "Paid Time Off" table 420 also includes related "PTO Schedules" 421 and "PTO Accrual Rates" 422 tables. "PTO Schedules" table 421 includes information regarding each type of paid time off, including: paid-time-off ID, paid-time-off name, indicators regarding whether paid time off can will be accrued by salaried and/or hourly employees, maximum hours that may be accrued, months employed before paid-time-off benefit begins, months employed before accrual commences, and maximum hours that may be accrued per year. "PTO Accrual Rates" table 422 includes paid-time-off accrual rate information, including: paid-time-off schedule ID and the maximum hours that may be accrued for ranges of employment.

"Pay Rate Types" table 430 includes information regarding each of Employer's pay rate types (e.g., standard pay, overtime, etc.), including: type, adjustment factor (wage multiplier or increment), and an indicator regarding whether overtime can be earned for the pay rate type.

"Pay Scales" table 435 includes information regarding each pay scale applicable to the job classifications used by Employer, including: job classification ID, effective date, expiration date, minimum-months-service limit, maximum-months-service limit, and pay scale wage.

"Company Tax Authorities" table 440 includes information regarding each tax authority to which the Employer pays payroll taxes, including tax authority ID and Employer's tax identification number. The applicable tax authorities are determined based upon the zip code (FIPS) and city of the Employer's (i) offices and (ii) employees and/or contractors.

"Company Taxes" table 450 includes information regarding each tax to be paid by Employer, including: tax definition ID, tax calculation alternative indicator, filing status indicator, effective date, and expiration date. "Company Taxes" table 450 includes related "Tax Deposits" 451 and "Tax Liabilities" 452 tables. "Tax Deposits" table 451 includes information regarding Employer's tax deposits, including: amount, date due, first date incurred, and last date incurred. "Tax Liabilities" table 452 includes information regarding Employer's tax liabilities, including: tax definition ID, tax deposit ID, date incurred, and amount.

"Collections/Disbursements" table 460 includes information regarding Employer's collection of funds to be transferred to the system bank accounts and subsequently disbursed to employees, tax authorities, and payees, including: payroll group ID, amount of funds, date liability incurred, date payment due, date disbursement initiated, date disbursement confirmed, and date disbursement reported. The system checks this table several times each day in order to determine whether any electronic transfers need to be effected.

"Company General Ledger Designations" table 470 includes information regarding the Employer's mapping of deduction and earnings codes to Employer's general ledger naming conventions. For example, using this system, the Employer could map a deduction code (e.g., "Dental Plan") to the Employer's internal accounting naming convention (e.g., "GL443"). The information contained in "Company General Ledger Designations" table 470 includes: division ID, office ID, department ID, deduction codes ID, earning codes ID, paid-time-off ID, tax definition ID, and general ledger designation.

"History" tables 480 includes archived information regarding additions, modifications, and deletions of the Employer's data, including the system identifier of the user who made the change, what data was changed, and when the data was changed. These tables, which mirror all of Employer's data tables, enable the system to keep working tables as small as possible, which increases processing speed. Further, these tables provide an archived backup in the event of a security or system failure, or a user entry error.

3. Employee Level

Figure 4C:
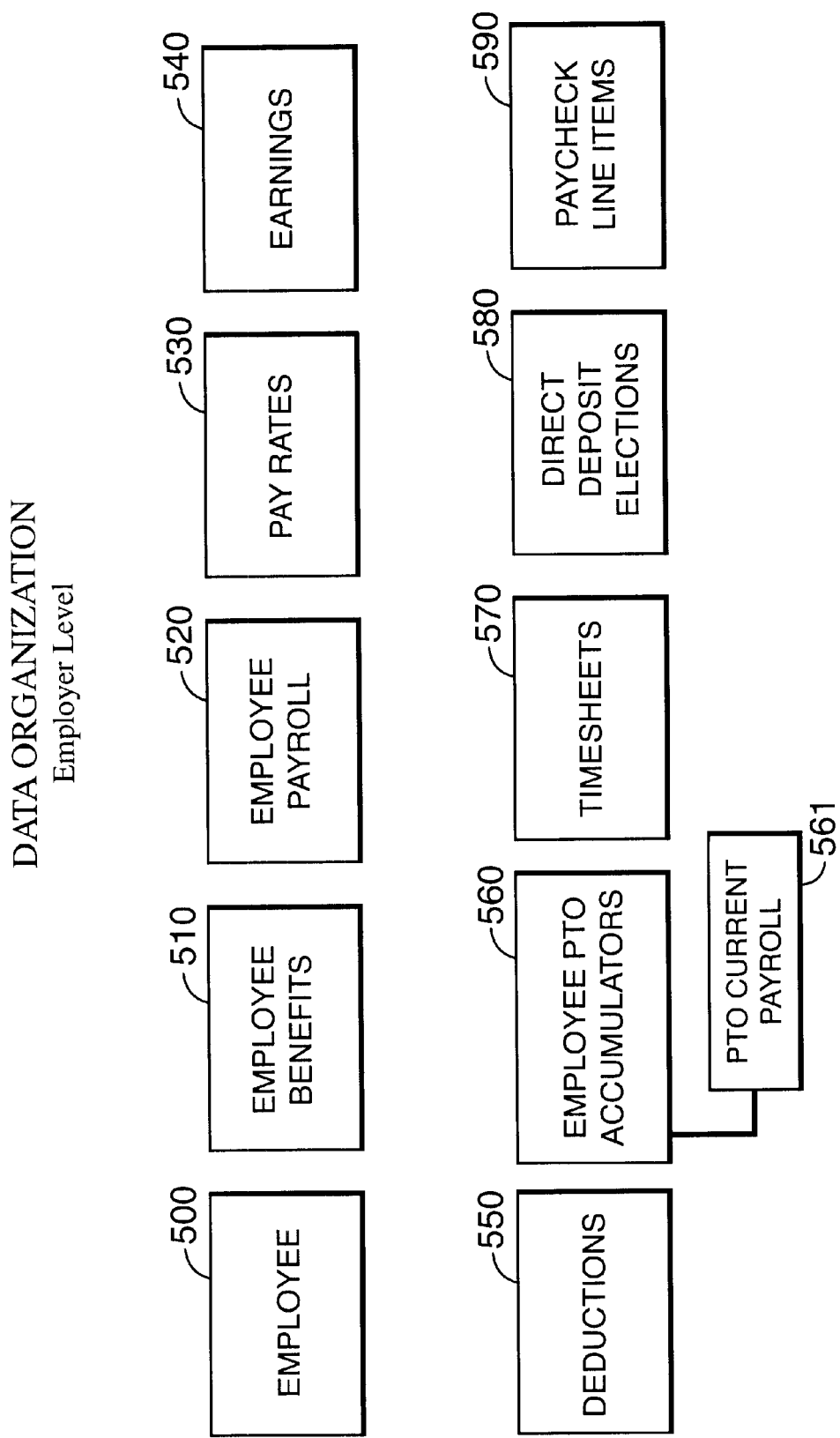
FIG. 4(c) shows the data organization of an embodiment of the present invention at the employee level.

The data components at the employee level include data that is specific to each employee and/or contractor of a company. FIG. 4(c) illustrates the key data components, which are stored as tables in the present embodiment of the invention. As in the system and Employer level descriptions, each table includes a keyed identification code or number ("ID") for each record in the table.

"Employees" table 500 (table 350 in FIG. 4(b)) includes specific information about each employee and/or contractor, including: name, social security number, address, and contact information.

"Employee Benefits" table 510 includes specific information about each benefit plan elected by an employee, including: benefit ID, effective date, expiration date, benefit units, indicator regarding whether benefit is deductible, and indicator regarding whether benefit applies to a domestic partner.

"Employee Payroll" table 520 includes specific, payroll-related information regarding each employee and/or contractor, including: employee identification number, title, home address, zip code ID, company contact information, division ID, department ID, office ID, payroll group ID, autopay multiplier, payment method, indicator regarding whether paid for holidays, exempt status, default pay rate, birth date, hire date, termination date (if applicable), marital status, and sex.

"Pay Rates" table 530 includes pay rate information regarding each employee and/or contractor, including: pay rate type ID, pay rate amount, and job classification ID. If job classification ID is used instead of pay rate type ID, then the employee's salary will be derived from "Pay Scales" table 435 instead of "Pay Rate Types" table 430.

"Earnings" table 540 includes information about each employee's and/or contractor's accumulated pay-period-to-date earnings, including: earning code ID, paid-time-off ID, year, hours worked per each calendar month, and earnings per each calendar month. The system updates these accumulators only when the Employer processes a payroll.

"Deductions" table 550 includes information about each employee's accumulated pay-period-to-date payroll deductions, including, deduction code ID, tax definition ID, year, and deductions per each calendar month. The system updates these accumulators only when the Employer processes a payroll.

"Employee PTO Accumulators" table 560 includes information about each employee's and/or contractor's paid time off, including: paid-time-off schedule ID, maximum hours carried, months employed, paid time off accrued year-to-date, paid time off used year-to-date, paid time off carried over from prior years, and the current year. "Employee PTO Accumulators" table 560 also includes related "PTO Current Payroll" table 561. "PTO Current Payroll" table 561 includes information regarding the employee's paid time off during the current payroll, including: paid-time-off ID, payroll group ID, paid time off accrued during current pay period, paid time off used during current pay period, maximum hours per payroll, and maximum hours carried over per payroll. The system uses "PTO Current Payroll" table 561 as a work table that is purged after the payroll is run.

"Timesheets" table 570 includes information regarding the employee's and/or contractor's timesheets, including: payroll group ID, pay rate type ID, date, hours per day, pay rate override, earning code ID, paid-time-off ID, indicator regarding whether timesheet approved, indicator regarding whether paid time off accrued, and indicator regarding overtime hours.

"Direct Deposit Elections" table 580 includes information regarding each employee's and/or contractor's selection for electronic direct deposits, including: effective date, bank name, bank routing and account numbers, bank account type, payroll percent deposit amount (if applicable), and payroll deposit amount (if applicable).

"Paycheck Line Items" table 590 includes information regarding each employee's and/or contractor's paycheck generated by the system, including: payroll group ID, earning code(s) ID(s), paid-time-off ID, deduction code(s) ID(s), tax definitions ID, benefit(s) ID(s), hours, paycheck amount, paid-time-off accrual, and payees ID. Certain of these data items can be entered into the system by the Employer, the employee, or third-party benefit administrators.

4. Example of Data Component Interaction

Each time a system user accesses a particular interface screen, the system executes a series of SQL commands to load data from one or more tables and, if applicable, perform calculations, in order to place data in the various fields of the screen. The first time that the user accesses the particular interface, the system downloads the data and caches the data locally, so that the data will appear instantaneously on a subsequent access of the interface. Note that system saves the data each time that the user exits an interface; thus, if a system error or hardware error occurs, the user will, at most, only lose the data entered on the current interface.

Figure 41A:
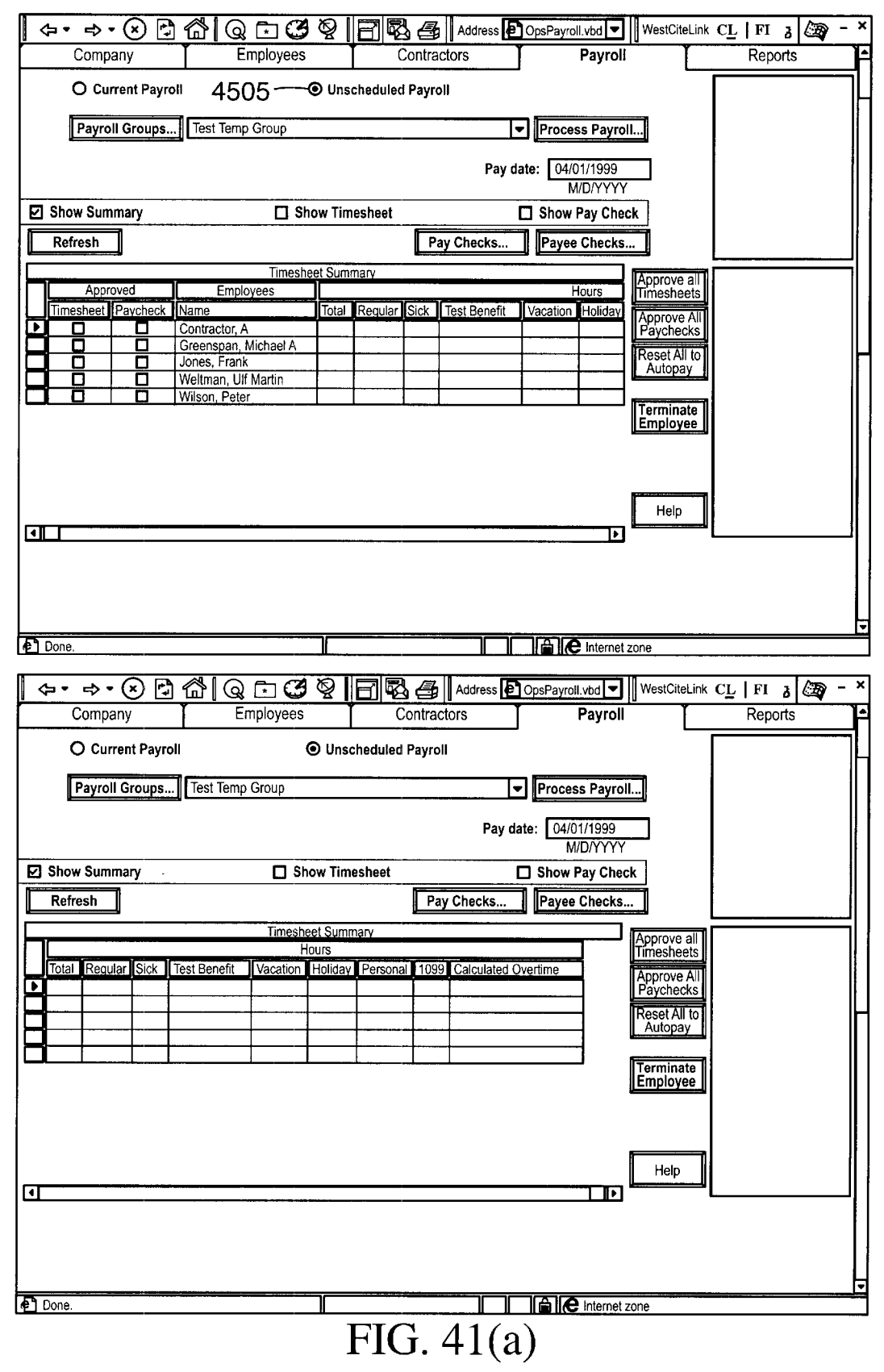

By way of example, in one embodiment of this invention, the "Show Paycheck" interface screen, as illustrated in FIG. 41(c), accesses a variety of data tables in order to display "Paycheck" table 4500 for the selected employee or contractor for the current payroll.

Figure 40A:
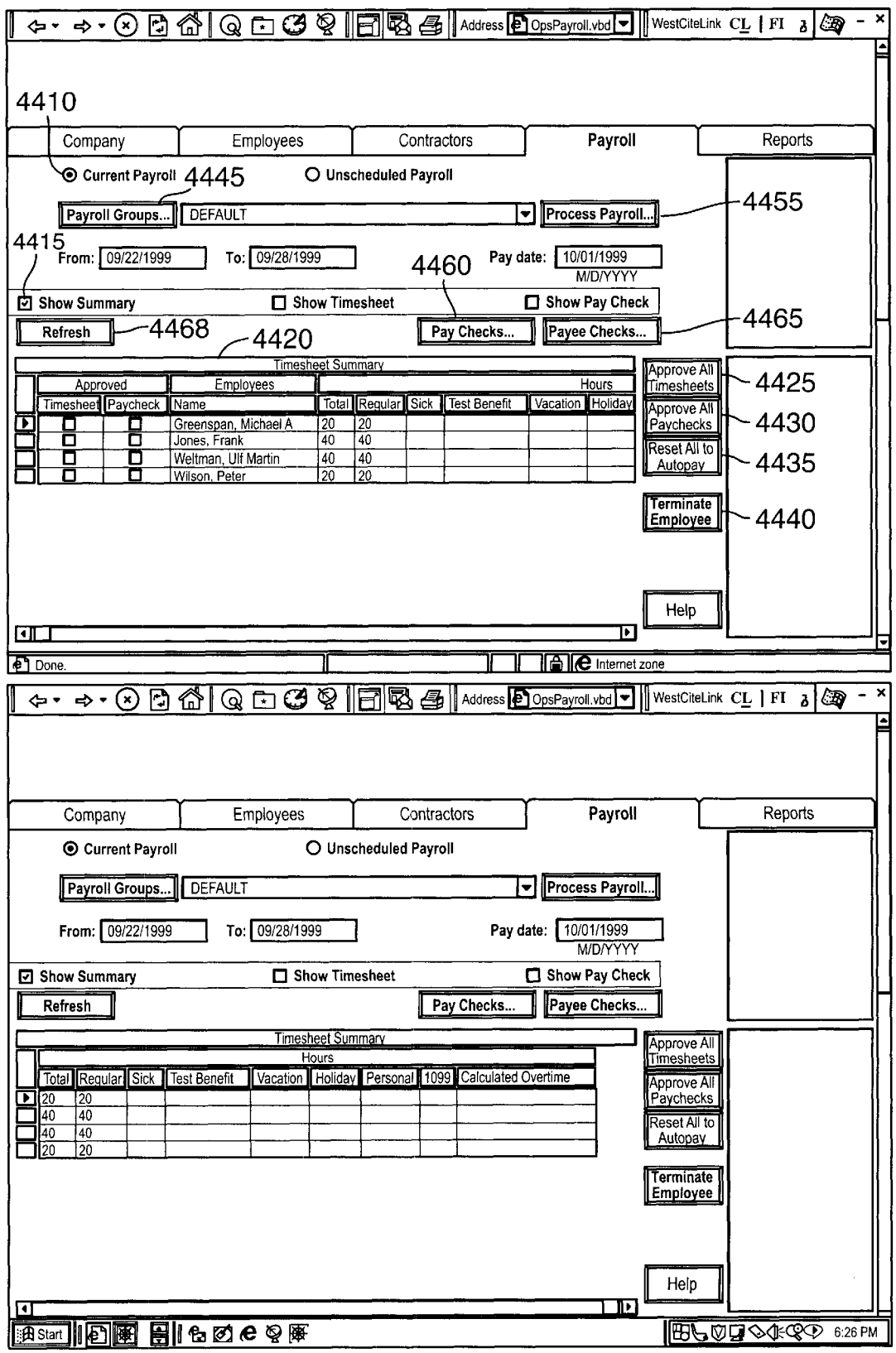
FIG. 40(a) shows a screen print of an interactive user interface for displaying a timesheet summary of a selected payroll group in the current payroll in an embodiment of the present invention.

For the selected employee (e.g., "Michael A. Greenspan"), who was selected from "Timesheet Summary" table 4420 on the "Show Timesheet" interface screen (as shown in FIG. 40(a)) the system executes an SQL call to retrieve the employee's identification number from "Employee Payroll" table 520. Using the employee's identification number as a keyed index, the system retrieves the employee's standard pay rate (e.g., $193.23) from "Pay Rates" table 530 (or "Pay Scales" table 435 if job classification used). Next, using the employee's identification number as a keyed index, the system retrieves the employee's hours per day for the current pay period for each earnings type (e.g., "Regular") from "Timesheets" table 570. The system totals the hours and calculates the amount earned (e.g., $6,084.60) by multiplying the total hours and employee's pay rate, in order to fill in the "Amount" field. If the employee had earnings of other types (e.g., overtime) during this pay period, the system would calculate and/or retrieve those hours and relevant pay rate type(s) from "Timesheets" table 510 and "Pay Rates" table 530 (or "Pay Scales" table 435 if job classification used), respectively, using a common pay-rate-type keyed index. When the Employer instructs the system to process the particular payroll, the system execute a SQL command to update "Earnings" table 540 with the employee's calculated earnings, using the employee's identification number as a keyed index.

The system next calculates the employee's deductions. The system retrieves deduction codes and deduction names available from the Employer from "Deduction Codes" table 400. Using the employee's identification number as a keyed index, the system determines the employee's applicable deductions from "Deductions" table 550, calculates the deductions for this payroll, which are displayed on the screen, and, when the Employer instructs the system to process the particular payroll, updates the employee's records in "Deductions" table 550. After deducting any pre-tax deductions from the employee's earnings, the system calculates the employee's taxes, based on the applicable taxes in "Company Taxes" table 450, using calculation formulas stored in "Tax Calculations" table 250, and also determines the employee's net earnings. When the Employer instructs the system to process the particular payroll, the system updates the employee's records in "Paycheck Line Items" table 590.

After the system processes the particular payroll, the system immediately calculates the employee's standard timesheet for the next pay period (as well as the standard timesheets of other employees within the same payroll group), which will be available for download for offline update.

A Web-Based Embodiment of the Invention

Figure 5:
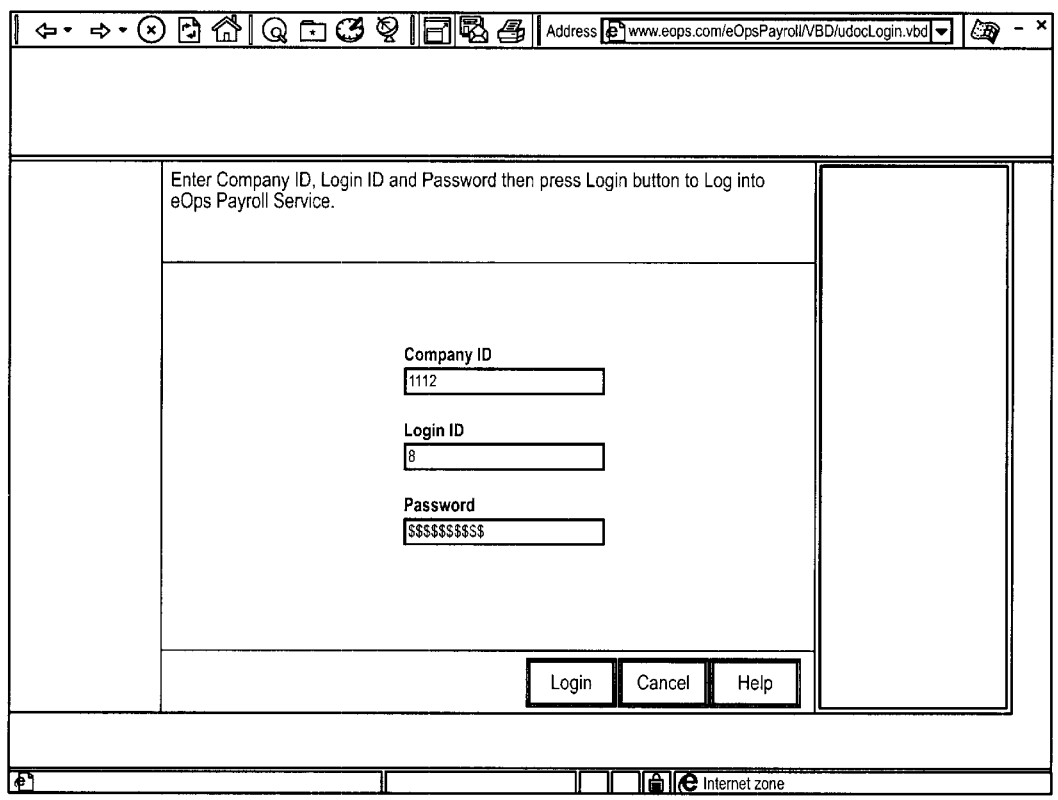
FIG. 5 shows a screen print of a login interface in an embodiment of the present invention.

When a user accesses the web-based embodiment of the invention described herein, the system presents the user with a security login interface that requires entry of the Employer's identification number, login number, and password, as shown in FIG. 5. The "Help" button that appears on this interface (and other system user interfaces) leads the user to a comprehensive, context-dependent interactive system assistance utility.

It should be noted tat, in one embodiment of the present invention, many of the user interface controls and display/formatting/report generation functionality are implemented as ActiveX controls, downloaded to the user's local system in advance or as needed to perform a particular functions. Such functionality could be implemented entirely on the local system's application server, though certain client server tradeoffs enhance the user's experience, e.g., enabling the user to quickly select items from a list by retrieving the relevant list items from the server-side database (where they are stored persistently) and downloading them for temporary storage (in a local cache) and use by an ActiveX control that is accessible to users of the system.

Figure 6:
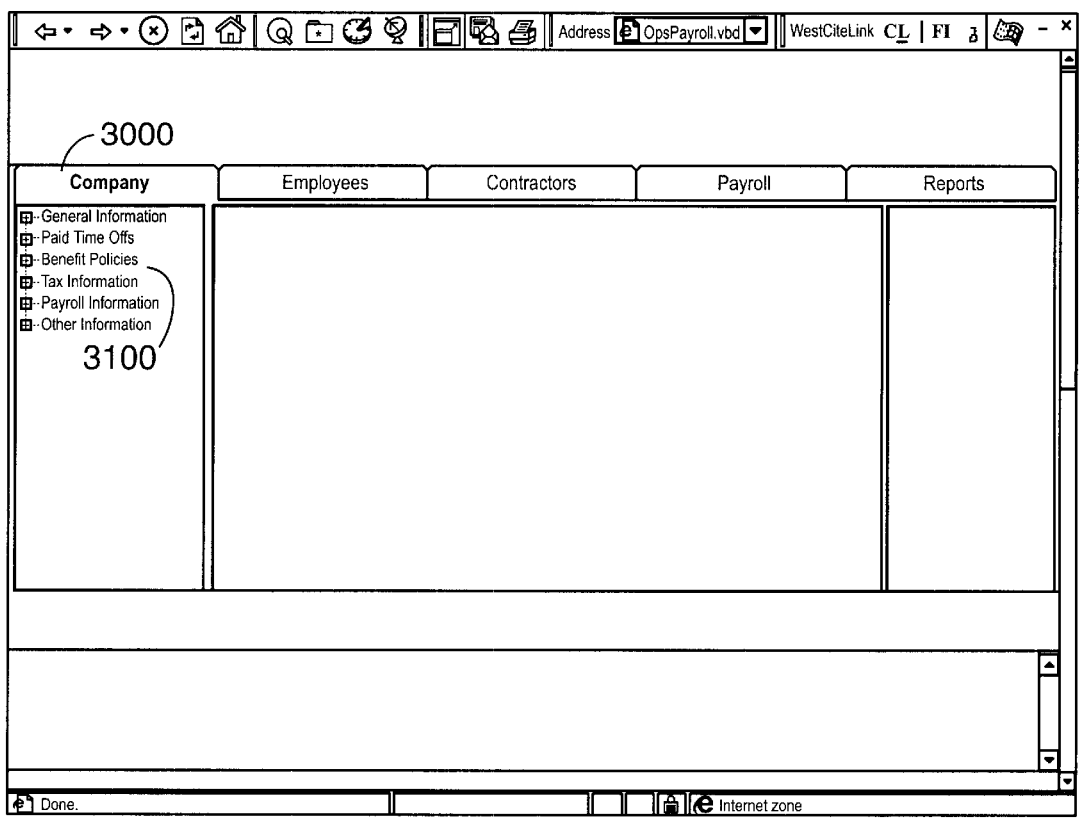
FIG. 6 shows a screen print of an interactive user interface displaying navigational options related to an Employer's payroll in an embodiment of the present invention.

The system next presents the user with an interactive user interface, as shown in FIG. 6. The interface provides the user with a number of navigational options related to the Employer's payroll, as shown in navigation bar 3000 in FIG. 6, which include the following:

input and modify information about the Employer;
input and modify information about employees;
input and modify information about contractors; and
process the payroll.

Each of these options will be described separately below.

Company Information

The company information functionality of the system provides the user with the ability to input and modify information about the Employer, including general corporate information, paid time off schedules, employee benefit plans, tax information, payroll information, payee information, and corporate holiday schedules. This option is selectable by clicking on "Company Information" in navigation bar 3000 in FIG. 6. As shown in navigation bar 3100 in FIG. 6, the system presents the user with a series of six sub-options to choose from within the "Company Information" option.

1. General Information

Figure 6A:
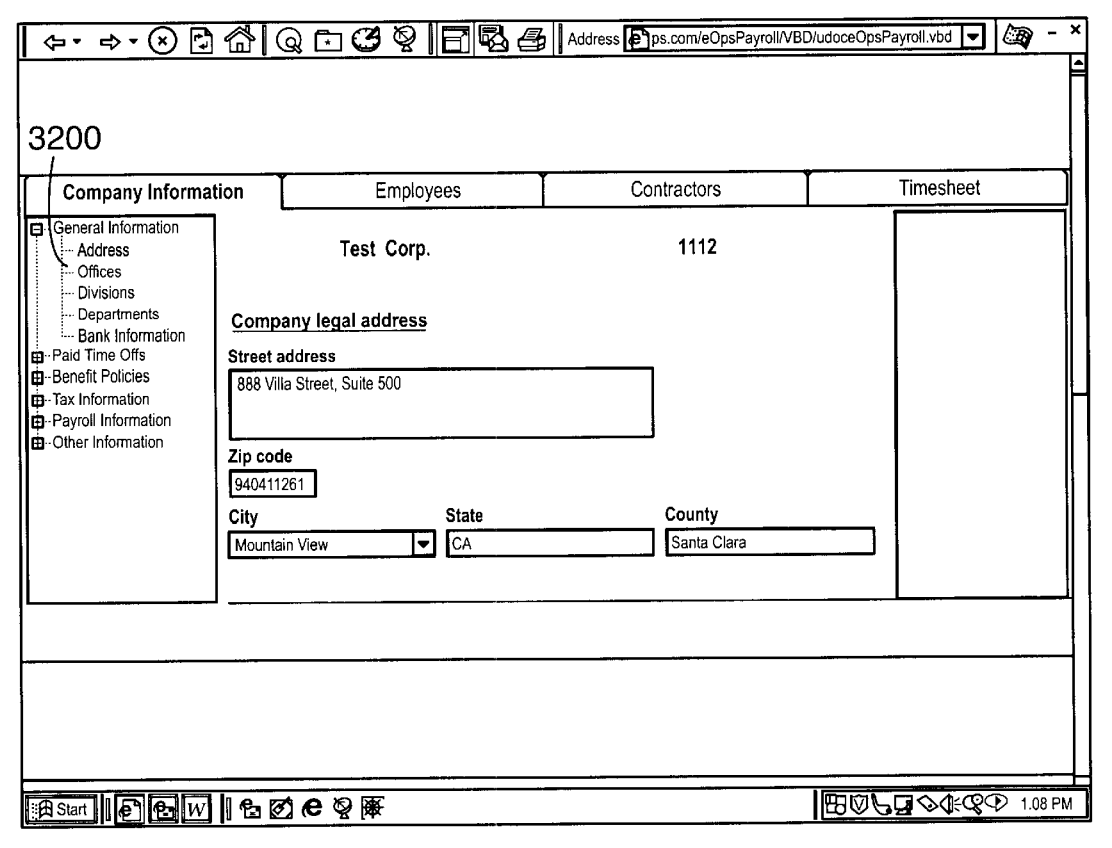

This function is divided into five user interfaces, each of which is selectable from navigation bar 3100 in FIG. 6 by clicking on "General Information," which causes the interface names in sub-menu 3200 of FIG. 6(a) to be displayed.

a. Address

The "Address" interface, illustrated by FIG. 6(a), enables input and modification of the Employer's legal address, including street address, city, state, county, and zip code. The user need only input street address and zip code, and the system generates the city, state, and county based on a zip code database. If one zip code applies to multiple cities, the system lists each of the cities in a pull-down menu, in order to enable the user to choose the correct city.

The system uses a commercially-available zip code database ("Zip Codes" table 255) to determine tax authorities that are applicable to the Employer's payroll, including federal, state, and local taxes. The system creates a list of relevant tax authorities based on the geographic locations of the Employer's offices.

b. Offices

Figure 7A:
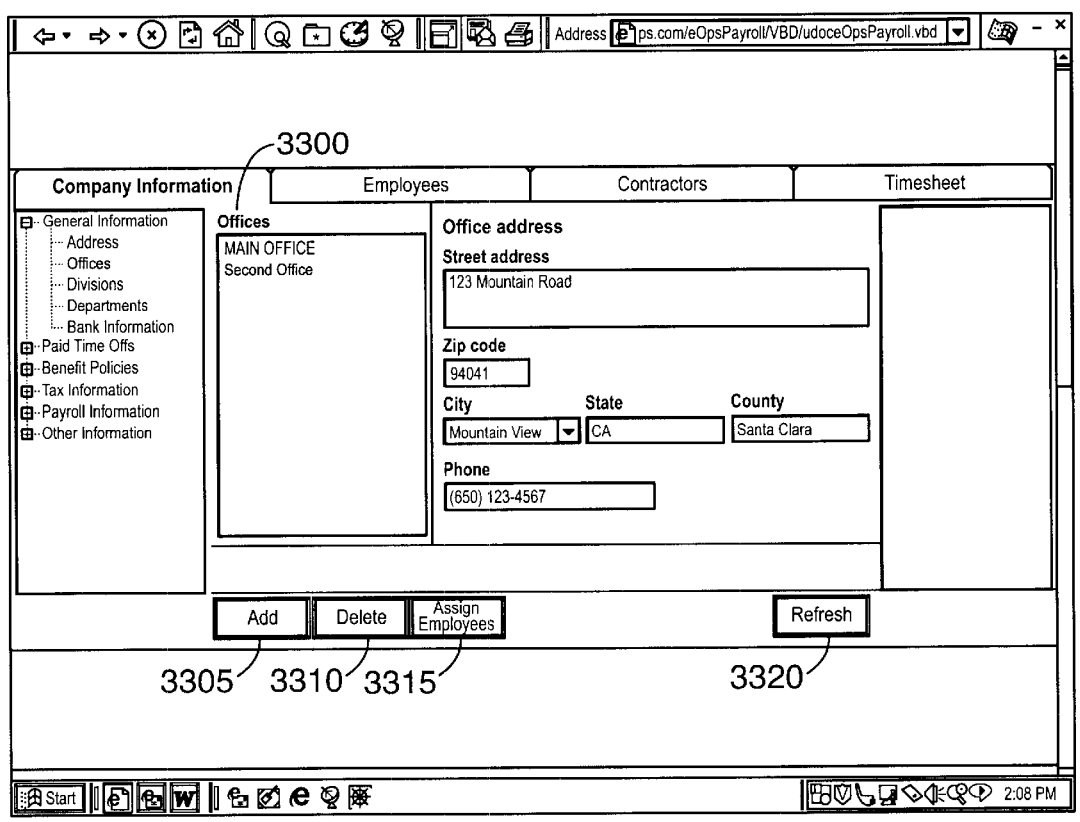
FIG. 7(a) shows a screen print of an interactive user interface for displaying an Employer's office information in an embodiment of the present invention.

The "Offices" interface, illustrated by FIG. 7(a), enables the Employer to add or delete one or more offices and office addresses. For example, as shown in FIG. 7(a), the Employer defined two offices and selected the "Second Office," which is highlighted in "Offices" field 3300 with its address displayed on the interface. The user can add an office by clicking "Add" button 3305 or delete an office by selecting the office name and clicking "Delete" button 3310.

Figure 8B:
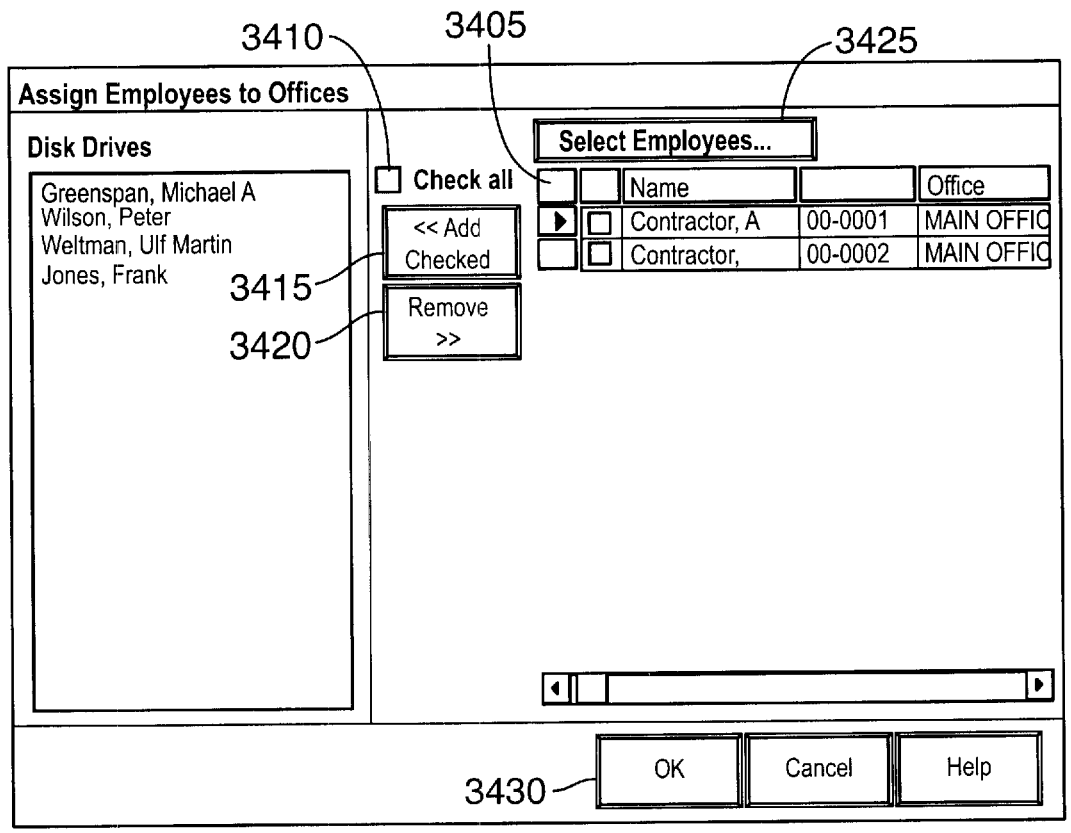
FIG. 8(b) shows a screen print of an interactive user interface for assigning employees to an Employer's divisions in an embodiment of the present invention.

The system also enables the Employer to assign or reassign employees to a particular office by clicking "Assign Employees" button 3315. If the user clicks "Assign Employees" button 3315 the system displays the "Assign Employees to Offices" interface shown in FIG. 8(a). This interface displays the names of the employees already assigned to Employer's "Second Office" (which was highlighted in FIG. 7(a)), as well as the name, employee number, office, division, and department of other employees. By clicking on box(es) 3380 adjacent to one or more listed employees or on "Check All" box 3385 and then clicking "Add Checked" button 3390, the user can assign or reassign one or more employees to the "Second Office." When an employee is reassigned to an office, the system automatically removes the employee from his previous office. Clicking "OK" button 3400 upon completion of assignment and/or reassignment of employees causes the system to save the modified information.

Figure 8C:
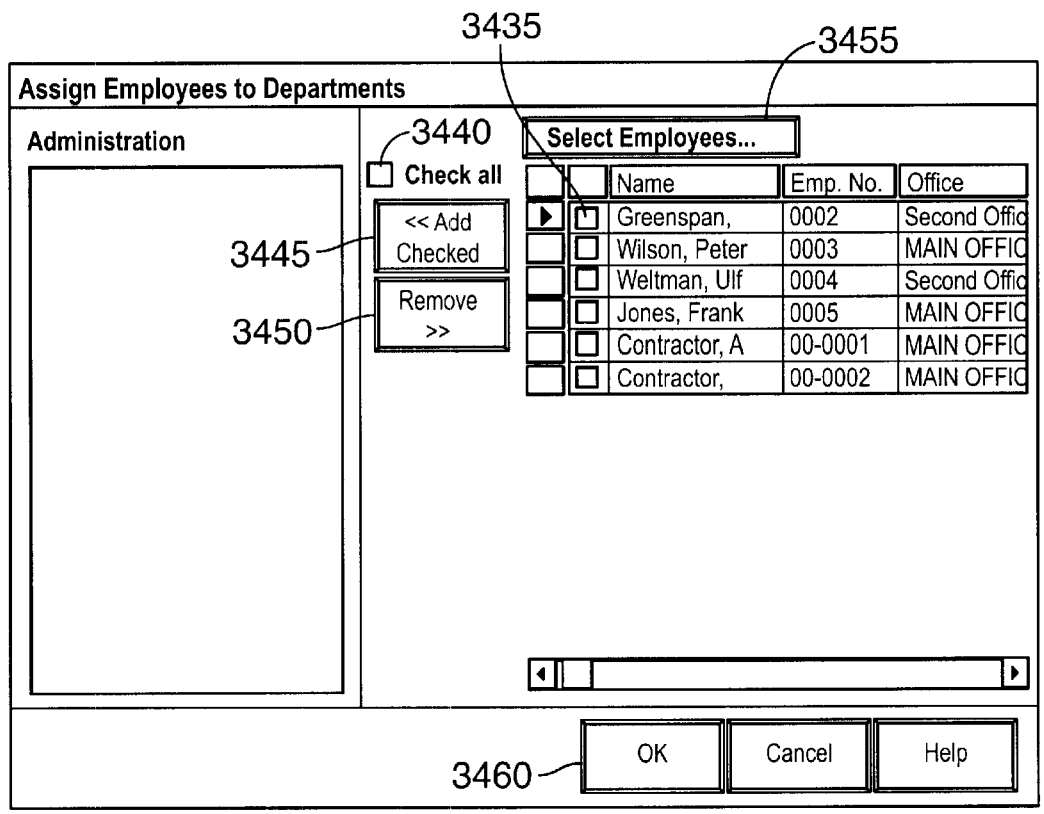
FIG. 8(c) shows a screen print of an interactive user interface for assigning employees to an Employer's departments in an embodiment of the present invention.
Figure 8D:
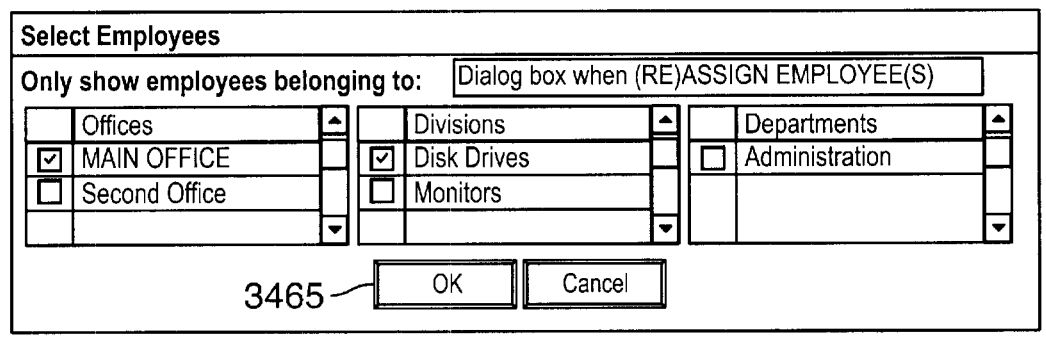
FIG. 8(d) shows a screen print of an interactive user interface for selecting employee names to be displayed in an embodiment of the present invention.

The user can change the displayed selection of employees on the "Assign Employees to Office" interface by clicking "Select Employees" button 3395. That action causes the system to display the "Select Employees" interface shown in FIG. 8(d). The "Select Employees" interface enables the user to limit the employee names displayed for assignment or reassignment to the selected office(s), division(s), and/or department(s). For example, in FIG. 8(d), the user chose to limit the displayed employees to those that work in the "Main Office" and "Disk Drives" division. Clicking "OK" button 3465 upon completion of selection of employees causes the system to save the selection criteria.

The user can refresh the information displayed on the "Offices" interface by clicking "Refresh" button 3320, as shown in FIG. 7(a).

c. Divisions

Figure 7B:
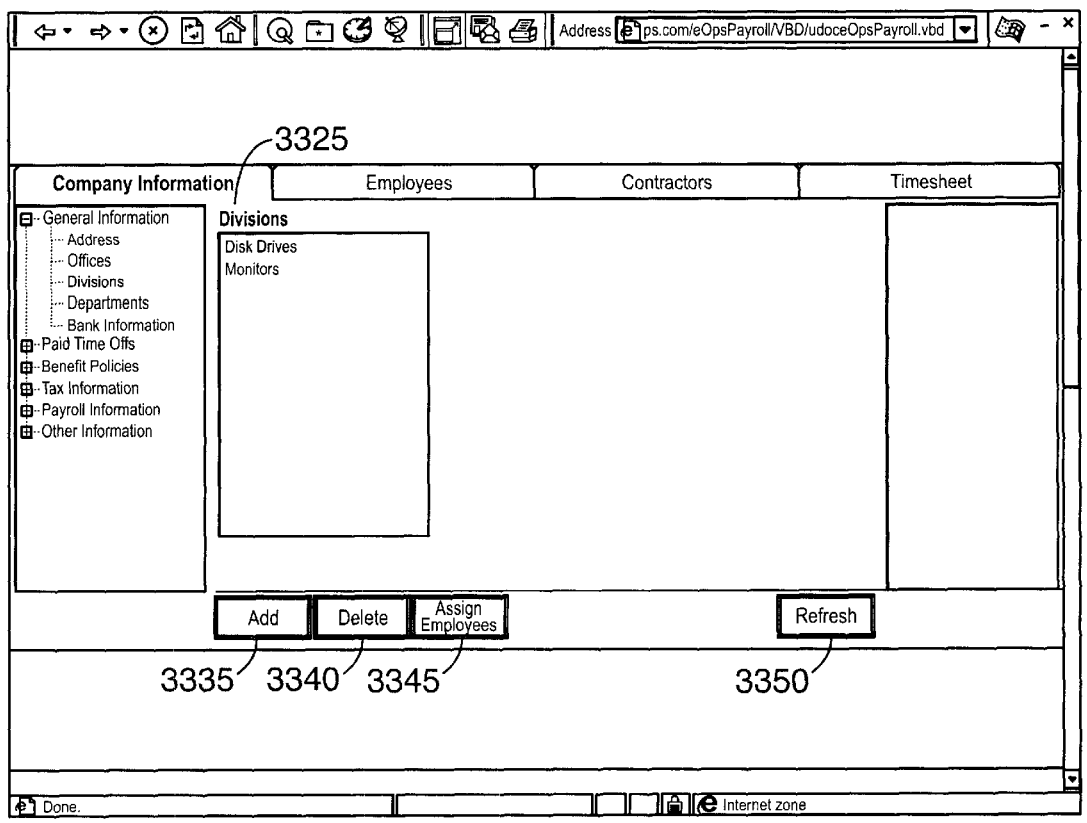
FIG. 7(b) shows a screen print of an interactive user interface for displaying an Employer's division information in an embodiment of the present invention.

The "Divisions" interface, illustrated by FIG, 7(b), enables the Employer to add or delete one or more divisions within the Employer's corporate organization. For example, as shown in FIG. 7(b), the Employer defined two divisions ("Disk Drives" "Monitors") which are listed in "Divisions" field 3325. The user can add a division by clicking "Add" button 3335 or delete a division by selecting the division name and clicking "Delete" button 3340.

The system also enables the Employer to assign or reassign employees to a particular division by clicking "Assign Employees" button 3345. If the user clicks "Assign Employees" button 3345 the system displays the "Assign Employees to Divisions" interface shown in FIG. 8(b). This interface displays the names of the employees already assigned to Employer's "Disk Drives" division (which was highlighted in FIG. 7(b)), as well as the name, employee number, office, division, and department of other employees. By clicking on box(es) 3405 adjacent to one or more listed employees or on "Check All" box 3410 and then clicking "Add Checked" button 3415, the user can assign or reassign one or more employees to the "Disk Drives" division. The user can also remove one or more employees from the "Disk Drives" division by clicking on box(es) 3405 adjacent to one or more listed employees or on "Check All" box 3410 and then clicking "Remove" button 3420. Clicking "OK" button 3430 upon completion of assignment and/or reassignment of employees will save the modified information.

The user can change the displayed selection of employees on the "Assign Employees to Divisions" interface by clicking "Select Employees" button 3425. As described above with respect to the "Assign Employees to Offices" interface, as shown in FIG. 8(a), that action causes the system to display she previously-described "Select Employees" interface shown in FIG. 8(d).

The user can refresh the information displayed on the "Divisions" interface by clicking "Refresh" button 3350, as shown in FIG. 7(b).

d. Departments

Figure 7C:
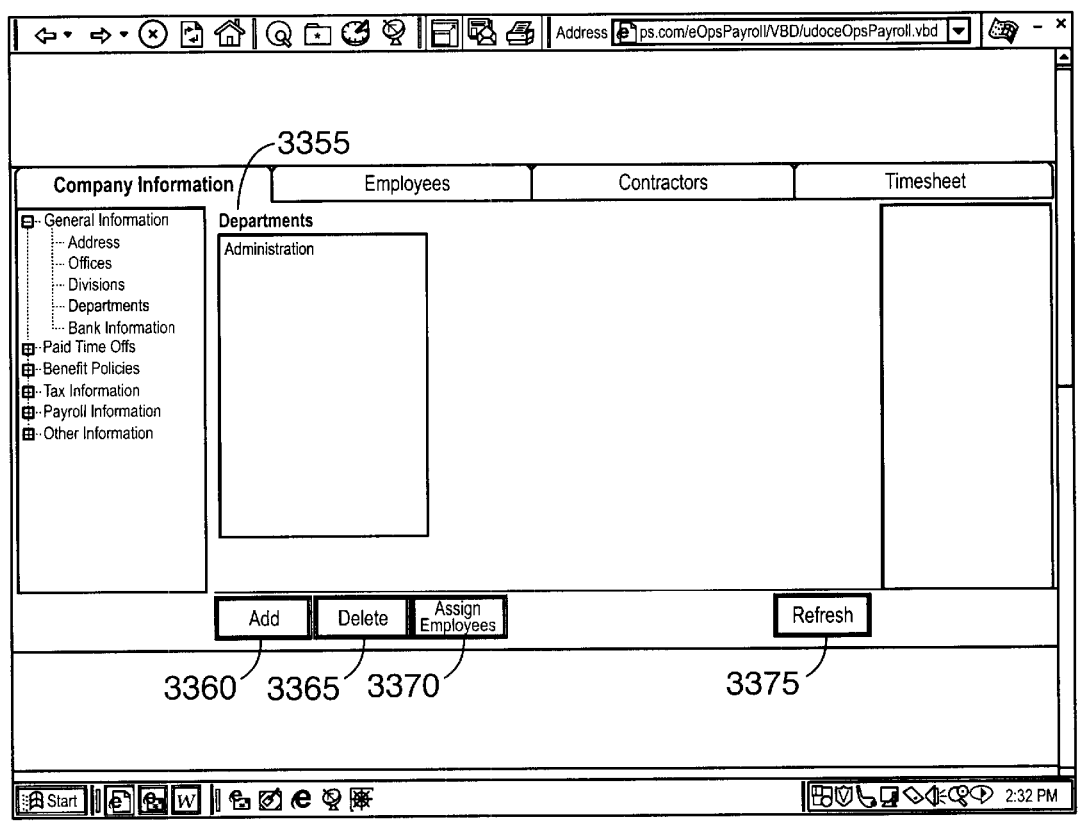
FIG. 7(c) shows a screen print of an interactive user interface for displaying an Employer's department information in an embodiment of the present invention.

The "Departments" interface, illustrated by FIG. 7(c), enables the Employer to add or delete one or more departments within the Employer's corporate organization. For example, as shown in FIG. 7(c), the Employer defined one department ("Administration") which is listed in "Departments" field 3355. The user can add a department by clicking "Add" button 3360 or delete a department by selecting the department name and clicking "Delete" button 3365.

The system also enables the Employer to assign or reassign employees to a particular department by clicking "Assign Employees" button 3370. If the user clicks "Assign Employees" button 3370 the system displays the "Assign Employees to Departments" interface shown in FIG. 8(c). This interface displays the names of the employees already assigned to Employer's "Administration" department (which was highlighted in FIG. 7(c))—in this case no employees, as well as the name, employee number, office, division, and department of other employees. By clicking on box(es) 3435 adjacent to one or more listed employees or on "Check All" box 3440 and then clicking "Add Checked" button 3445, the user can assign or reassign one or more employees to the "Administration" department. The user can also remove one or more employees from the "Administration" department by clicking on box(es) 3435 adjacent to one or more listed employees or on "Check All" box 3440 and then clicking "Remove" button 3450. Clicking "OK" button 3460 upon completion of assignment and/or reassignment of employees causes the system to save the modified information.

The user can change the displayed selection of employees on the "Assign Employees to Departments" interface by clicking "Select Employees" button 3455. As described above with respect to the "Assign Employees to Offices" interface, as shown in FIG, 8(a), that action causes the system to display the previously-described "Select Employees" interface shown in FIG. 8(d).

The user can refresh the information displayed on the "Departments" interface by clicking "Refresh" button 3375, as shown in FIG. 7(c).

e. Bank Information

Figure 9:
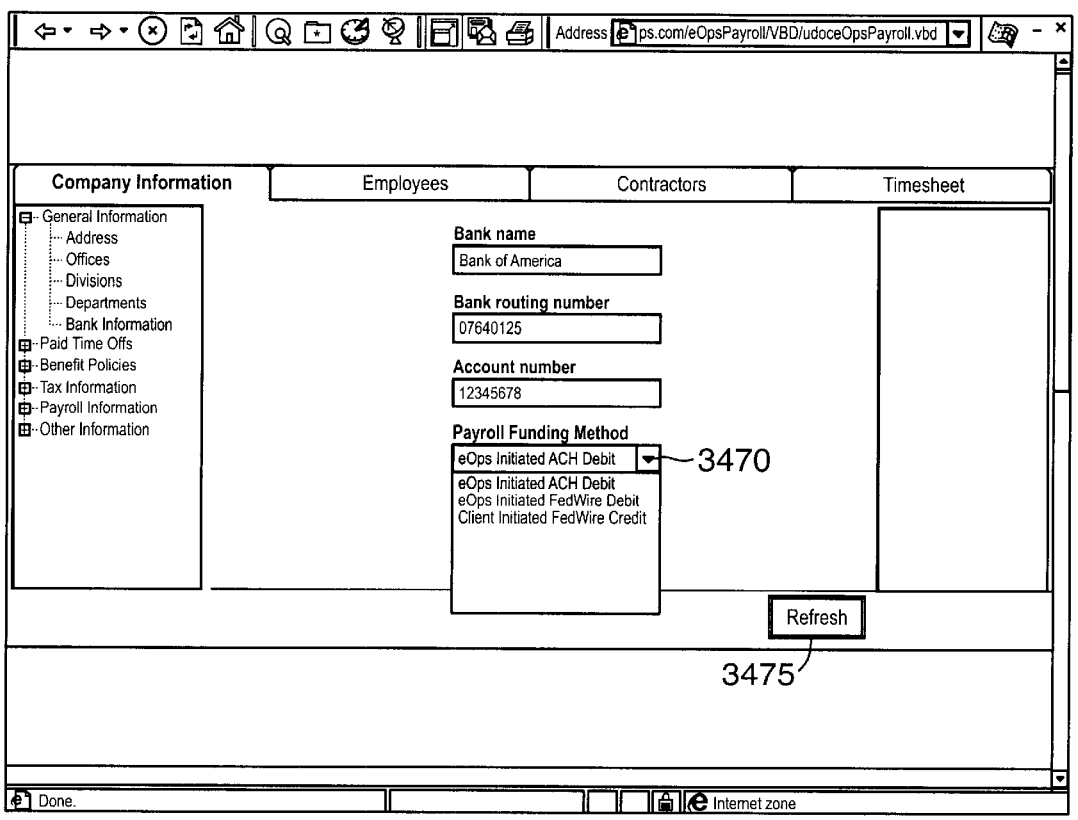
FIG. 9 shows a screen print of an interactive user interface for displaying bank information in an embodiment of the present invention.

The "Bank Information" interface, illustrated by FIG. 9, enables the Employer to input and modify the bank name, routing number, and account number for the bank account from which Employer's payroll will be funded, and the payroll funding method (selectable from pull-down menu 3470). The system validates the routing number by performing a checksum. The user can refresh the information displayed on this interface by clicking "Refresh" button 3475.

2. Paid Time Off

Figure 10:
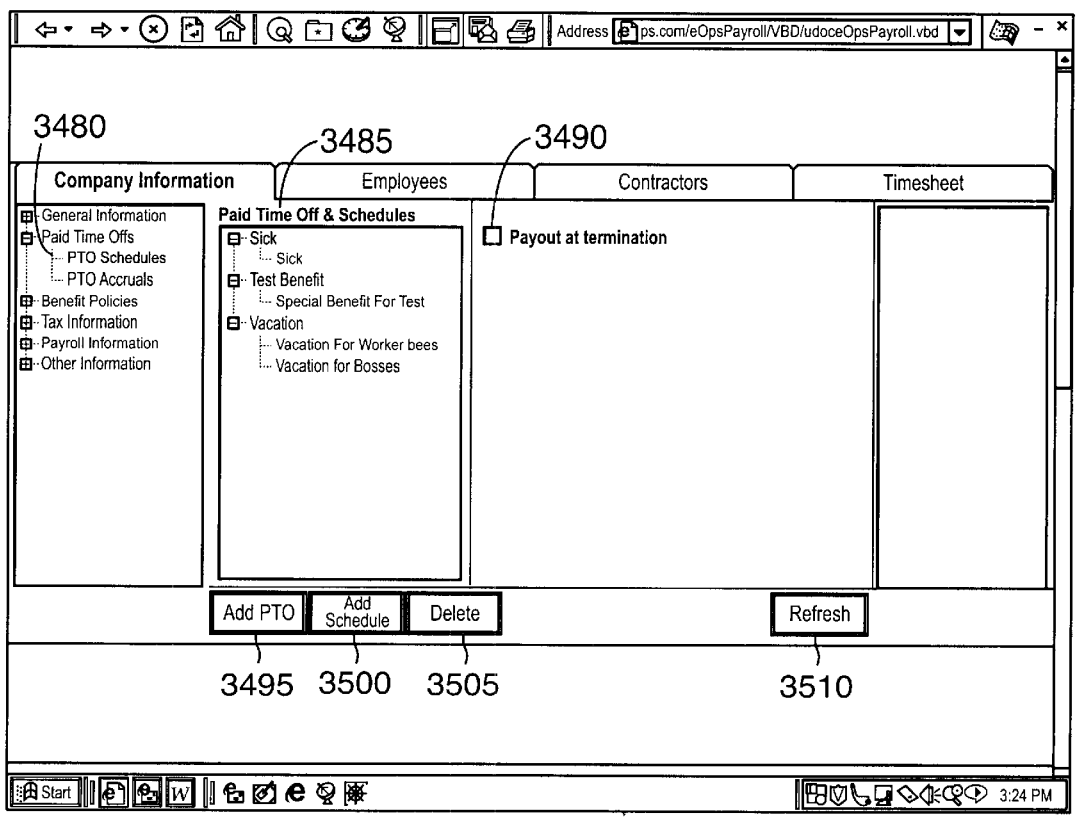
FIG. 10 shows a screen print of an interactive user interface for displaying Employer-defined paid-time-off schedules in an embodiment of the present invention.

This function is divided into two user interfaces, each of which is selectable from navigation bar 3100 in FIG. 6 by clicking on "Paid Time Off," which causes the interface names in sub-menu 3480 of FIG. 10 to be displayed.

a. Paid Time Off and Schedules

The "Paid Time Off and Schedules" interface, illustrated by FIG. 10, enables input, modification and testing of Employer-defined, paid-time-off payment schedules, such as sick time and vacation time. Thus, the system provides the Employer with the flexibility to create, test, and change paid-time-off-plans, including their accrual rates and parameters. As shown in FIG. 10, the system displays all defined paid-time-off plans and schedules in selectable list 3485. By clicking indicator box 3490, the user can specify that the accrued amount of the selected paid-time-off benefit will be payable to an employee at termination. Clicking on a schedule name causes the system to display the details regarding a particular schedule.

Figure 10A:
FIG. 10(a) shows a screen print of another view of an interactive user interface for displaying Employer-defined paid-time-off schedules in an embodiment of the present invention.

For example, as shown in FIG. 10(a), the selected paid-time-off schedule "Sick" (i.e., paid sick time) includes the following modifiable parameters: daily accrual method for salaried and hourly employees (which can be changed to other methods using pull-down menu 3515), zero maximum carry-over hours per year, paid time off available six months after start of employment, paid-time-off accrual begins at stat of employment, maximum paid time off of 40 hours per paycheck, and accrual is adjusted when accrual rate is increased. The "Accrual Rates Table" field 3520 enables the user to specify the accrual rate for the selected scheduler. For example, in FIG. 10(a), the "Sick" schedule provides for 40 hours paid-time-off accrual per year for 1 to 1200 months of employment. Any row of "Accrual Rates Table" field 3520 can be removed by selecting the row and clicking "Delete" button 3535.

Clicking "Accrual Rates Wizard" button 3525 causes the system to display the "Paid Time Off Accrual" calculator interface, as shown in FIG. 10(b). This interface enables the user to specify parameters that the system uses to calculate and fill in "Accrual Rates Table" field 3520 of FIG. 10(a), as an alternative to having the user fill in that field. Thus, the user can test different values in order to see the impact of the values on the "Accrual Rates Table." Clicking "OK" button 3540 of FIG. 10(b) upon completion of rate calculation causes the system to save the modified information.

Returning to the "Paid Time Off and Schedules" interface, as shown in FIG. 10(a), clicking "Test Table" button 3530 causes the system to display the "Test Paid Time Off Accrual" interface, as shown in FIG. 10(c). This interface enables the user to test "Accrual Rates Table" field 3520 for a particular employee by calculating and displaying the employee's annual paid-time-off accrual rate, based on the number of months the employee has been employed. Inputting the number of months of employment and clicking "Check Accrual Rate" button 3542 causes the system to calculate and display the accrual rate. Clicking "Close" button 3544 causes the system to return the user to the "Paid Time Off and Schedules" interface shown in FIG. 10(a).

Returning to the "Paid Time Off and Schedules" interface, as shown in FIG. 10, clicking "Add PTO" button 3495 causes the system to display a new paid-time-off plan in the selectable list, the name of which can be revised by the user. Clicking "Add Schedule" button 3500 causes the system to create a new schedule to be created under the selected paid-time-off plan and present the user with the detail fields regarding the particular schedule, as shown in FIG. 10(a) and described above. Clicking "Delete" button 3505 causes the selected plan or schedule to be removed. Finally, the user can refresh the information displayed on this interface by clicking "Refresh" button 3510.

b. Paid-Time-Off Accrual

Figure 11:
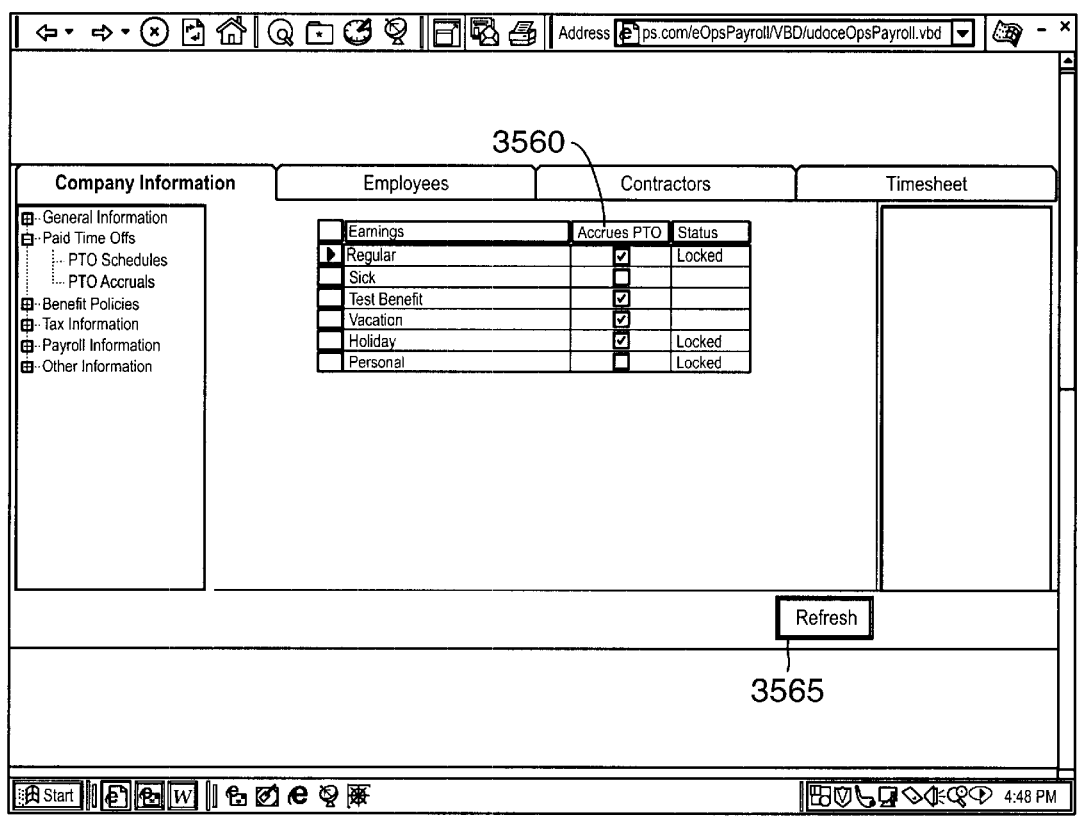
FIG. 11 shows a screen print of an interactive user interface for specifying paid-time-off accruals in an embodiment of the present invention.

The paid-time-off accruals interface, which is selectable from sub-menu 3480 in FIG. 10, enables the Employer to specify whether employees can accrue paid time off for particular earnings types (e.g., regular, sick days, vacation, holidays, personal time, etc.), when the payroll is calculated. Note that the Employer is required by law to provide accrued paid time off to employees for certain earnings types; for such earnings types, the system enforces compliance rules. As shown in FIG. 11, the user clicks the "Accrues PTO" field 3560 adjacent to a particular earnings type to activate (or deactivate) this indicator. The user can refresh the information displayed on this interface by clicking "Refresh" button 3565.

3. Benefit Policies

This function is divided into four user interfaces, each of which is selectable from navigation bar 3100 in FIG. 6 by clicking on "Benefit Policies," which causes the interface names in sub-menu 3570 of FIG. 12(a) to be displayed.

a. Benefits

The "Benefits" interface, illustrated by FIG. 12(a), enables input and modification of employee benefit plans, such as standard health and dental insurance plans, custom health insurance plans, and term life insurance. Thus, the system provides the Employer with the flexibility to create and change employee benefit plans, while viewing online the potential impact of such modifications on the Employer's payroll. This information is used to calculate pre-tax and post-tax deductions, as performed in steps 1030 and 1060, respectively, in FIG. 2.

The system displays all defined benefit plans, including custom plans, in a selectable list in the "Benefits" field 3575. Clicking on a plan name causes the system to display details regarding that plan. For example, as shown in FIG. 12(a), the selected "Health & Dental" benefit plan is a "Custom Health Plan" with an Employer deduction code of "Medical (EMPLOYER)" (selected from a pull-down menu) and a payroll deduction frequency of "First Payroll of Month." The latter "When Deducted" field 3580 includes a pull-down menu that enables the user to select the payroll frequency (e.g., "Every Payroll," "First Payroll of Month," "Last Payroll of Month," "Payroll Prior to When Payment Due").

Figure 12B:
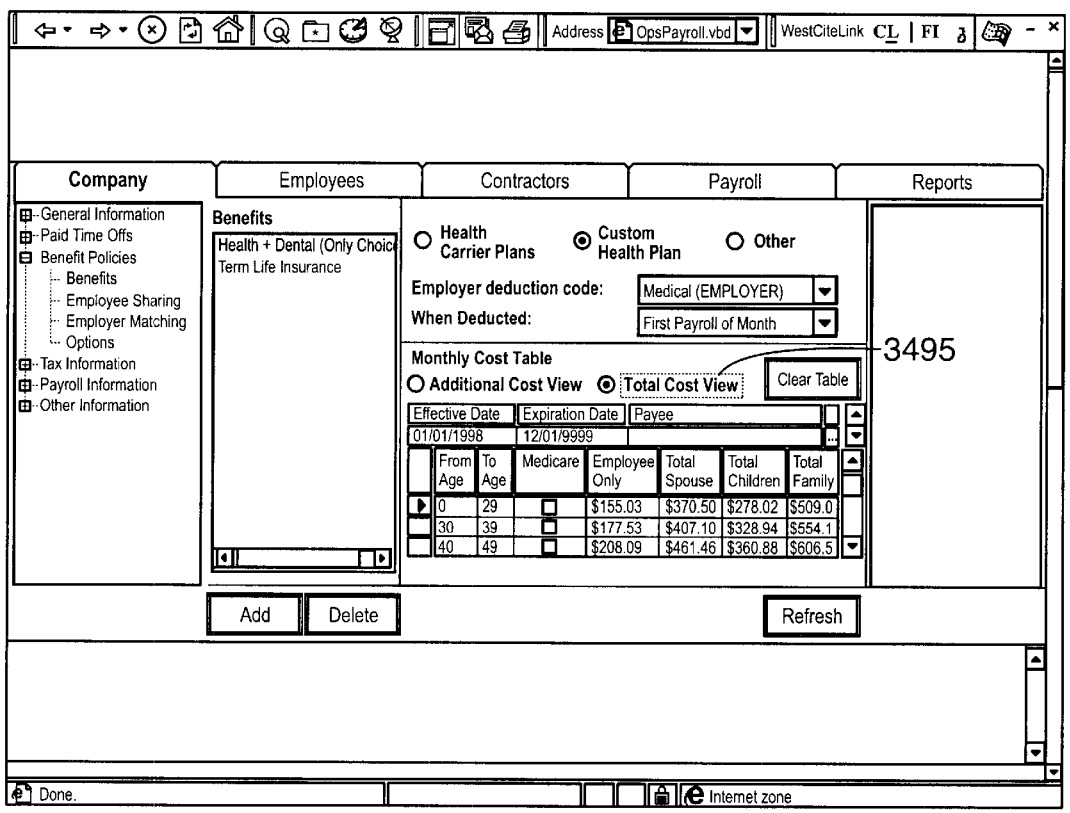
FIG. 12(b) shows a screen print of another view of an interactive user interface for displaying employee benefit plans in an embodiment of the present invention.

The "Monthly Cost Table" field 3585 displays the effective date, expiration date, and, if applicable, payee (i.e., third-party provider if not Employer) of the custom health plan. Because the "Additional Cost View" indicator 3590 is set, the "Monthly Cost Table" field 3585 also displays the payroll deduction amount, based on the employee's age, for the employee and for adding additional dependents (e.g., "Spouse," "Children," "Family"). In FIG. 12(b), the "Total Cost View" indicator 3595 is set for the same "Monthly Cost Table"; thus, the table displays the total payroll deduction amount, based on the employee's age, for the employee and added dependents. The user can delete the information contained in the "Monthly Cost Table" field 3585 by clicking "Clear Table" button 3600 in FIG. 12(a).

Figure 12C:
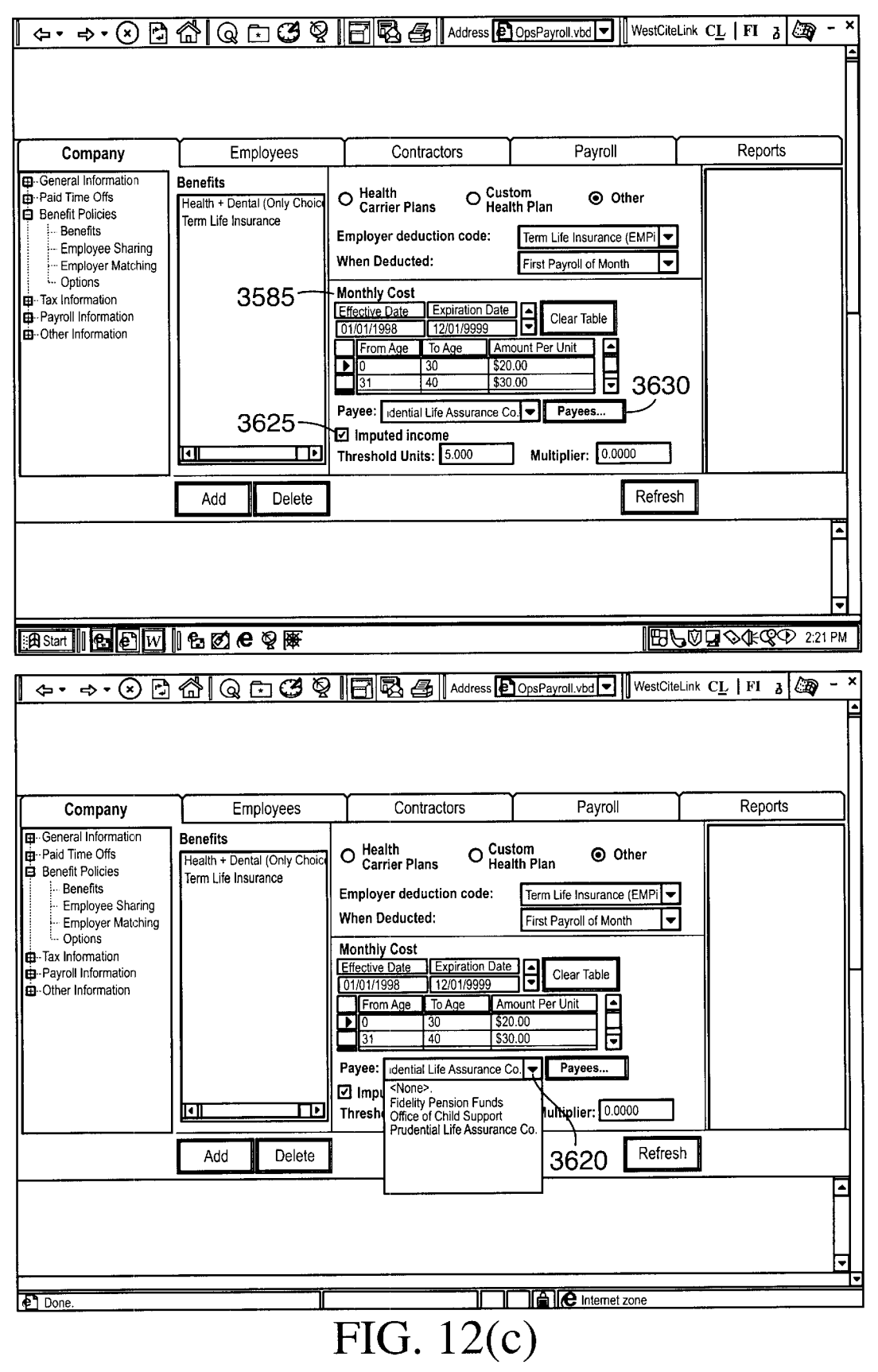
Figure 12D:
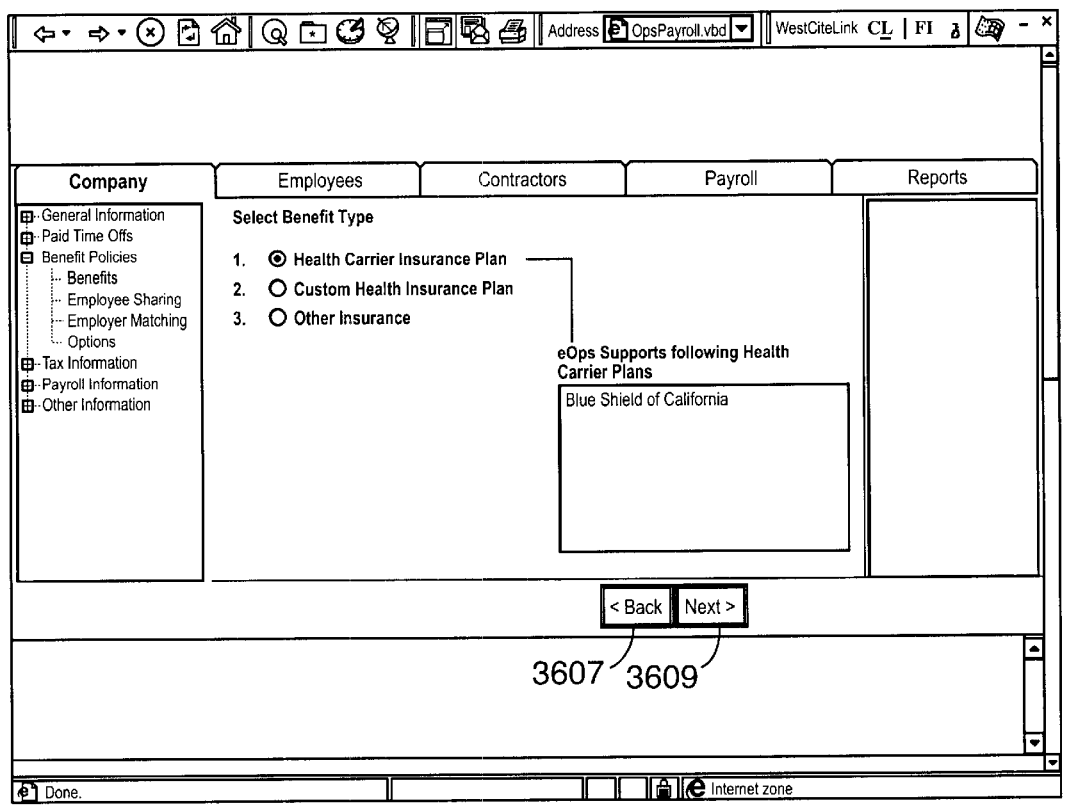
FIG. 12(d) shows a screen print of an interactive user interface for selecting employee benefit plans in an embodiment of the present invention.

The user can add a benefit plan by clicking "Add" button 3605. That action causes the system to display the "Select Benefit Type" interface, shown in FIG. 12(d). The "Select Benefit Type" interface enables the Employer to input or review information about a new benefit plan that is a standard, custom, or other insurance plan. The interface displays standard plans of third-party providers that make their products available to users of the system (e.g., "Blue Shield of California"). Clicking "Next" button 3609 causes the system to guide the user through a series of screens on which the system displays information (including benefit name, deduction code, benefit premiums, etc.) regarding standard plans or the Employer can enter information regarding custom plans. In an embodiment of this invention, this interface also provides competitive rate quote information regarding similar insurance plans gathered via an Internet information census or input by authorized third-party benefit providers. Rate information regarding standard plans can make use of employee zip code information, in addition to other factors described earlier, to determine benefit rates.

Clicking "Back" button 3607 causes the system to return the user to the previous-accessed screen.

Returning to the "Benefits" interface, as shown in FIG. 12(a), the Employer can delete a benefit plan by selecting the benefit plan name and clicking "Delete" button 3610. The user can refresh the information displayed on this interface by clicking "Refresh" button 3615.

In FIG. 12(c), the "Benefits" interface is shown for the selected "Term Life Insurance" benefit plan, which is an "Other" plan with an Employer deduction code of "Terms Life Insurance (EMPLOYER)" and a payroll deduction frequency of "Last Payroll of Month" (selected from pull-down menu of "When Deducted" field 3580 in FIG. 12(a)). In this instance, the "Monthly Cost Table" field 3585 displays the effective date, expiration date, and payroll deduction amount per unit of life insurance, based on the employee's age. The "Monthly Cost Table" also displays the name of the life insurance provider (e.g., "Prudential Life Assurance Co.") in "Payee" field 3620, which is selected from a pull-down menu of payees. There is also an indicator that specifies whether the particular benefit plan is to be treated as imputed income of employees ("Imputed Income" indicator 3625), and a field that shows the maximum number of units of the insurance benefit included in the plan, for which the benefit will not be treated as imputed income (e.g., term life insurance is typically sold in $10,000-units and income will be imputed for any more than five units paid for by the Employer).

Clicking "Payees" button 3630 causes the system to display the "Payees" interface, shown in FIG. 13. The "Payees" interface displays the following information for each benefits provider or other payee of payroll deductions: name; payment method (e.g., check or direct deposit);

Employer's account number with payee ("Payer Information" field); payee type (i.e., the type of information needed by the provider, for example, "Term Life Insurance"), which is selected from pull-down menu 3635; bank routing and account numbers; and the payee's address. The Employer can add a payee by clicking "Add" button 3640 or delete a payee by selecting the payee name and clicking "Delete" button 3645. Clicking "OK" button 3650 upon exiting the "Payees" interface causes the system to save the modified information.

b. Employee Sharing

The "Employee Sharing" interface, illustrated by FIG. 14(a), enables input and modification of benefits for which payroll deductions are shared between the Employer and the employee. Using the interface, the Employer specifies how much of the total expense will be shared by the employee. For example, an Employer may provide a health insurance plan to an employee and his family, whereby the Employer pays 50 percent and the employee pays 50 percent of the health insurance premium. The system provides the Employer with the flexibility to add and modify shared deductions, while viewing online the impact of such modifications. This information is used to calculate shared deductions, as performed in step 1040 in FIG. 2.

The system displays all employee-shared deductions in a selectable list in the "Employee Sharing" field 3655. Clicking on a deduction name causes the system to display the details regarding a particular shared deduction. As shown in FIG. 14(a), each deduction is associated with a benefit type (e.g., "Term Life Insurance," "Health & Dental"), which can be selected from pull-down menu 3660. Each deduction also includes an indicator regarding whether the Employer "pays employee share only" or "uses a sharing formula" regarding the deduction. In the example shown in FIG. 14(a), the "Pays Employee Share Only" indicator 3665 is checked, which means that for the selected benefit, the Employer will pay all of the employee's portion of the benefit, only, but not any of the portion for the employee's dependents. The Employer can add a shared deduction by clicking "Add" button 3670 or delete a shared deduction by selecting the deduction name and clicking "Delete" button 3675. The user can refresh the information displayed on this interface by clicking "Refresh" button 3680.

In FIG. 14(b), the "Uses Sharing Formula" indicator 3685 is checked. This means that the Employer will pay some or all of the employee's and employee's dependents' portions of the benefit, such portions to be determined by an Employer-defined sharing formula. Indicator 3685 includes a pull-down menu from which the type of sharing formula (e.g., "Custom Table," "Fixed Amount," "Flat Rate," "Flat Rate With Limit") can be selected. The system displays different information for a shared deduction depending upon the type of sharing formula.

In FIG. 14(b), the "Sharing Formula" is a "Custom Table." In the "Employee Share Rate Table" field 3690, the system displays effective date, expiration date, minimum input amount, maximum input amount, employee share, and marginal rate of the Employer-defined sharing formula (i.e., Employer shares for employee, only, or shares for employee and family/domestic partner). The user can delete the information contained in the "Employee Share Rate Table" field 3690 by clicking "Clear Table" button 3695.

Figure 14C:
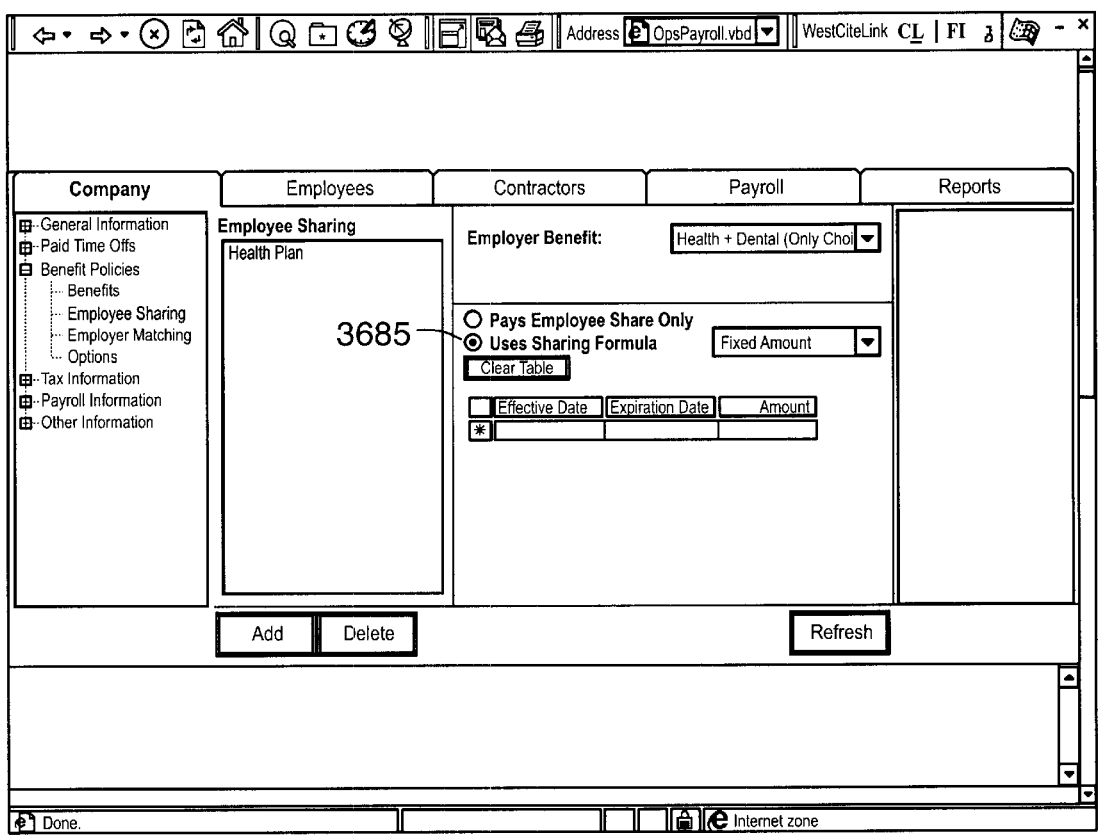
FIG. 14(c) shows a screen print of another view of an interactive user interface for displaying employee-shared deduction information in an embodiment of the present invention.

In FIG. 14(c), the "Sharing Formula" 3685 is a "Fixed Amount," i.e., the employee's shared deduction is a fixed dollar amount each payroll. The system displays the effective date, expiration date, and fixed amount of the payroll deduction.

Figure 14D:
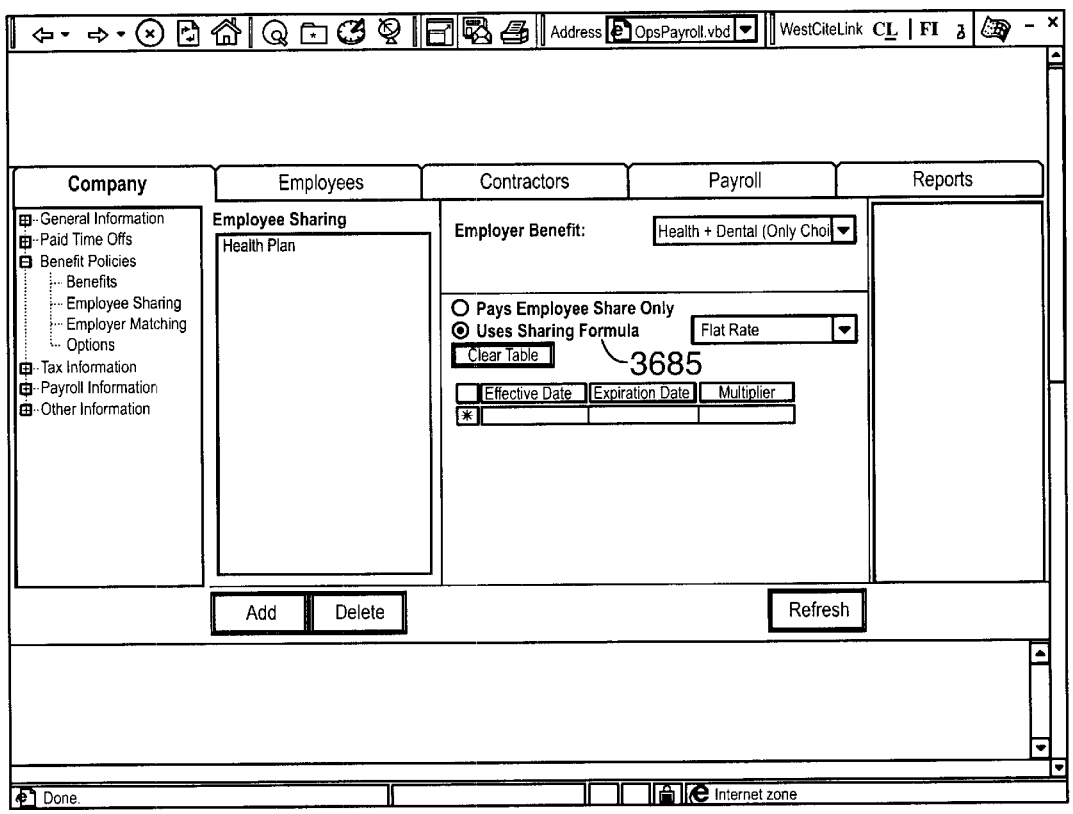
FIG. 14(d) shows a screen print of another view of an interactive user interface for displaying employee-shared deduction information in an embodiment of the present invention.

In FIG. 14(d), the "Sharing Formula" 3685 is a "Flat Rate," i.e., the employee's shared deduction is a set percentage of the total deduction each payroll. The system displays the effective date, expiration date, and percent of payroll deduction.

Figure 14E:
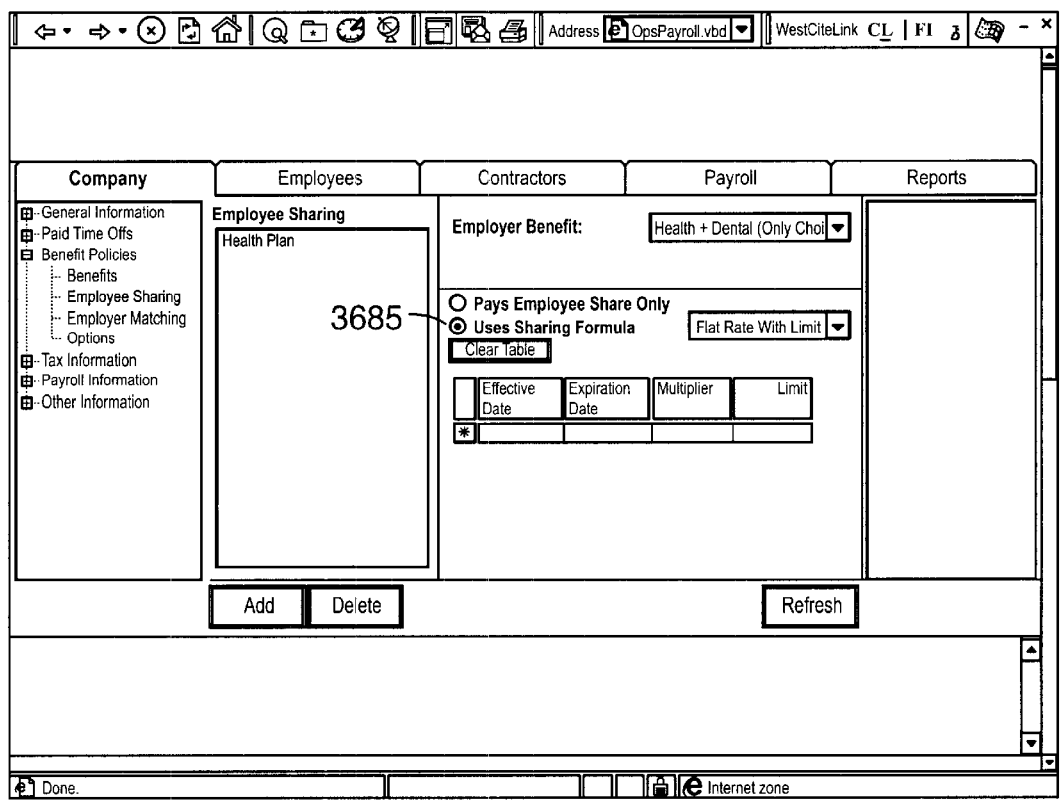
FIG. 14(e) shows a screen print of another view of an interactive user interface for displaying employee-shared deduction information in an embodiment of the present invention.

In FIG. 14(e), the "Sharing Formula" 3685 is a "Flat Rate With Limit," i.e., the employee's shared deduction is a set percentage of the total deduction each payroll up to a dollar limit. The system displays the effective date, expiration date, percent of payroll deduction, and limit of payroll deduction.

Note that employee sharing can be dependent upon a particular employee's status, e.g., division, department, union member, management, etc.

c. Employer Matching

The "Employer Matching" interface, illustrated by FIG. 15(a), enables input and modification of benefits for which employee payroll deductions are matched by the Employer. Using the interface, the Employer specifies how much of the employee deduction it will match. Examples of such matched deductions include Employer contributions to an employee 401(k) retirement plan and to employees' medical savings accounts. This information is used to calculate matching deductions, as performed in step 1040 in FIG. 2.

The system displays all Employer matched deductions in a selectable list in the "Employer Matching" field 3700. Clicking on a deduction name causes the system to display the details regarding a particular matching deduction. As shown in FIG. 15(a), each deduction is associated with an employee-deduction type (e.g., "401(k) Above Annual Limit"), that can be selected from pull-down menu 3705. The Employer can add a matching deduction by clicking "Add" button 3710 or delete a matching deduction by selecting the deduction name and clicking "Delete" button 3715. The user can refresh the information displayed on this interface by clicking "Refresh" button 3720.

Each matching deduction is also associated with a "Matching Formula," and the interface includes a pull-down menu 3725 from which the type of matching formula (e.g., "Custom Table," "Fixed Amount," Flat Rate," "Flat Rate With Limit") can be selected. The system displays different information for a matching deduction depending upon the type of matching formula.

In FIG. 15(a), the "Matching Formula" is a "Custom Table." In the "Employer Matching Rate Table" field 3730, the system displays effective date, expiration date, minimum input amount, maximum input amount, Employer share, and multiplier of the Employer-defined matching formula. The user can delete the information contained ia the "Employer Matching Rate Table" field 3730 by clicking "Clear Table" button 3735.

Figure 15B:
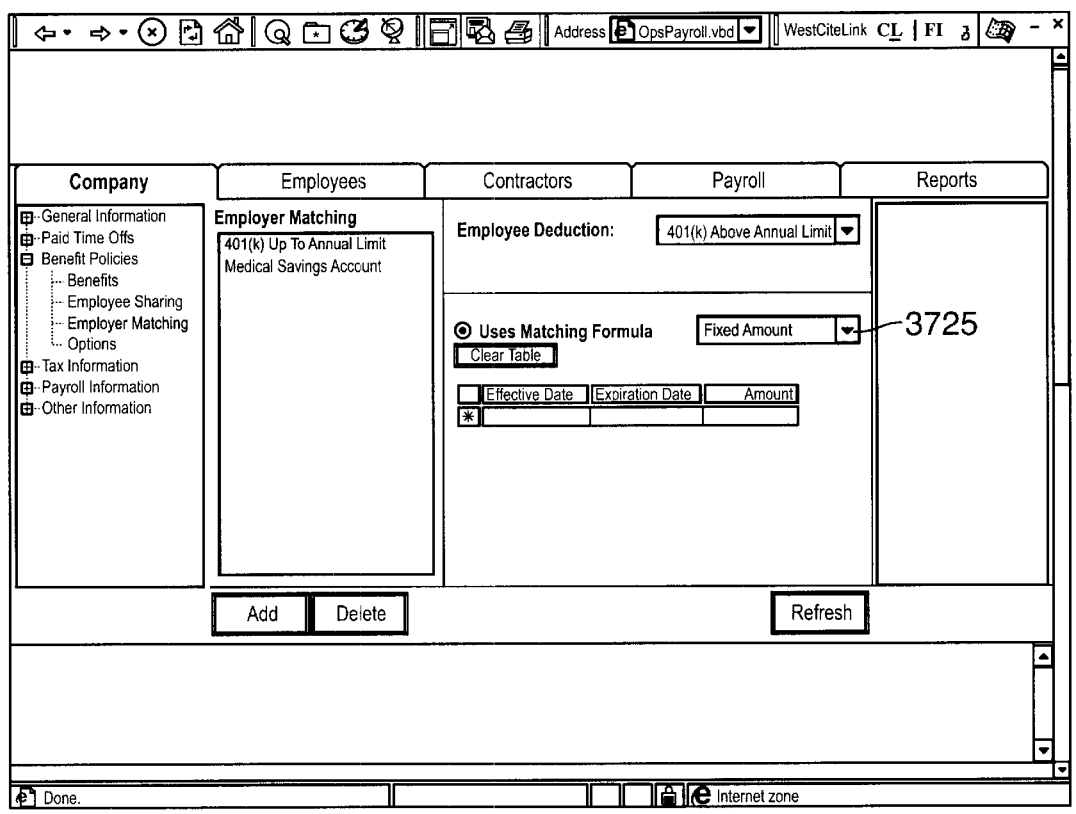
FIG. 15(b) shows a screen print of another view of an interactive user interface for displaying Employer-matching deduction information in an embodiment of the present invention.

In FIG. 15(b), the "Matching Formula" 3725 is a "Fixed Amount," i.e., the Employer's matching deduction is a fixed dollar amount each payroll. The system displays the effective date, expiration date, and fixed amount of the payroll deduction.

Figure 15C:
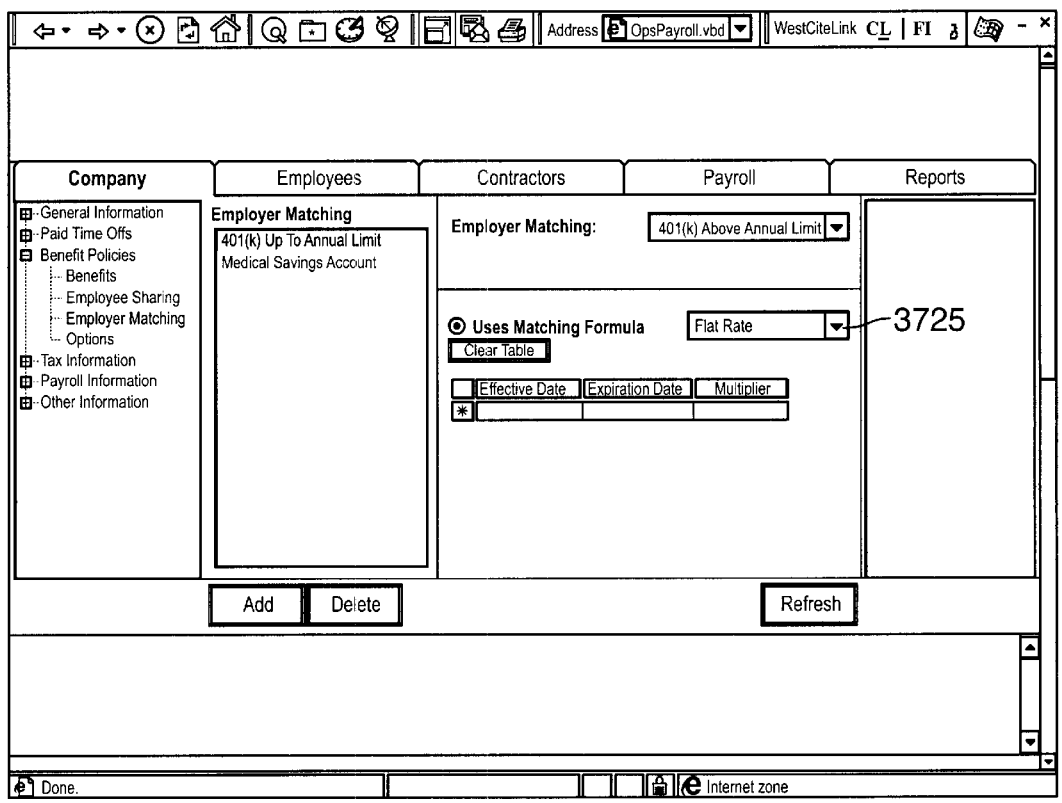
FIG. 15(c) shows a screen print of another view of an interactive user interface for displaying Employer-matching deduction information in an embodiment of the present invention.

In FIG. 15(c), the "Matching Formula" 3725 is a "Flat Rate," i.e., the Employer's matching deduction is a set percentage of the employee's total deduction each payroll. The system displays the effective date, expiration date, and percent of payroll deduction.

Figure 15D:
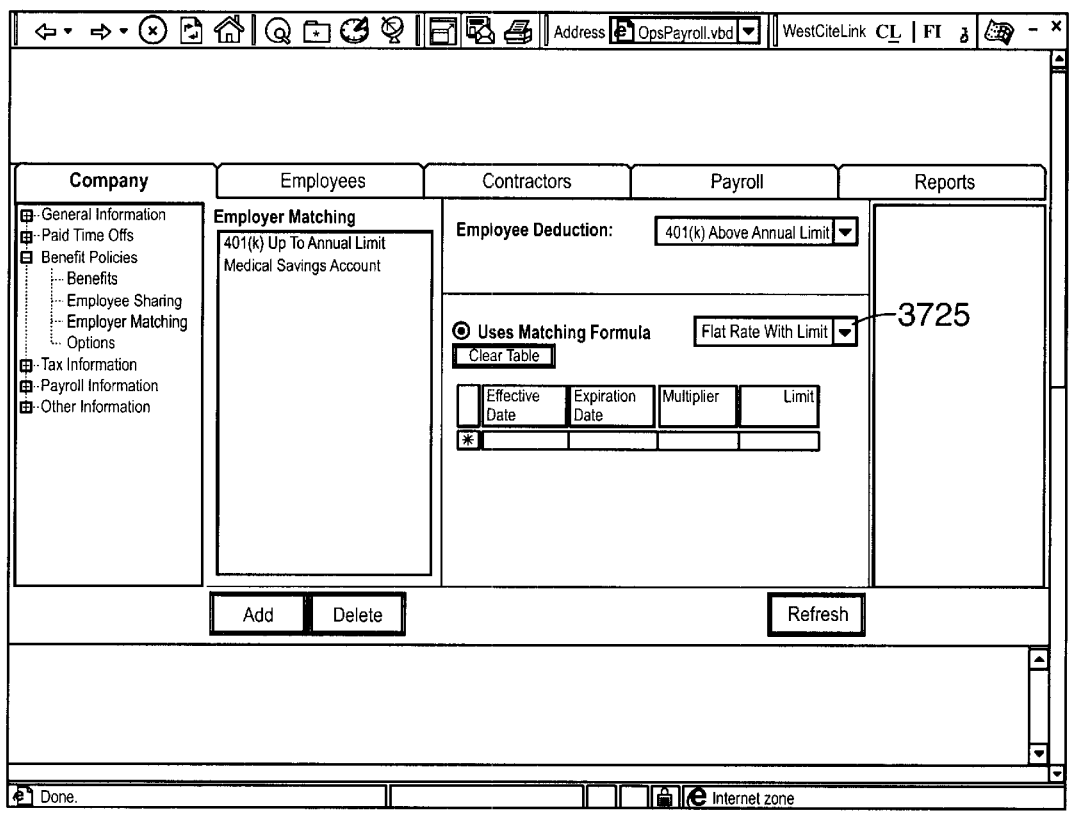
FIG. 15(d) shows a screen print of another view of an interactive user interface for displaying Employer-matching deduction information in an embodiment of the present invention.

In FIG. 15(d), the "Matching Formula" 3725 is a "Flat Rate With Limit," i.e., the Employer's matching deduction is a set percentage of the employee's total deduction each payroll up to a dollar limit. The system displays the effective date, expiration date, percent of payroll deduction, and limit of payroll deduction.

Note that employer matching can be dependent upon a particular employee's status, e.g., division, department, union member, management, etc.

d. Options

Figure 15E:
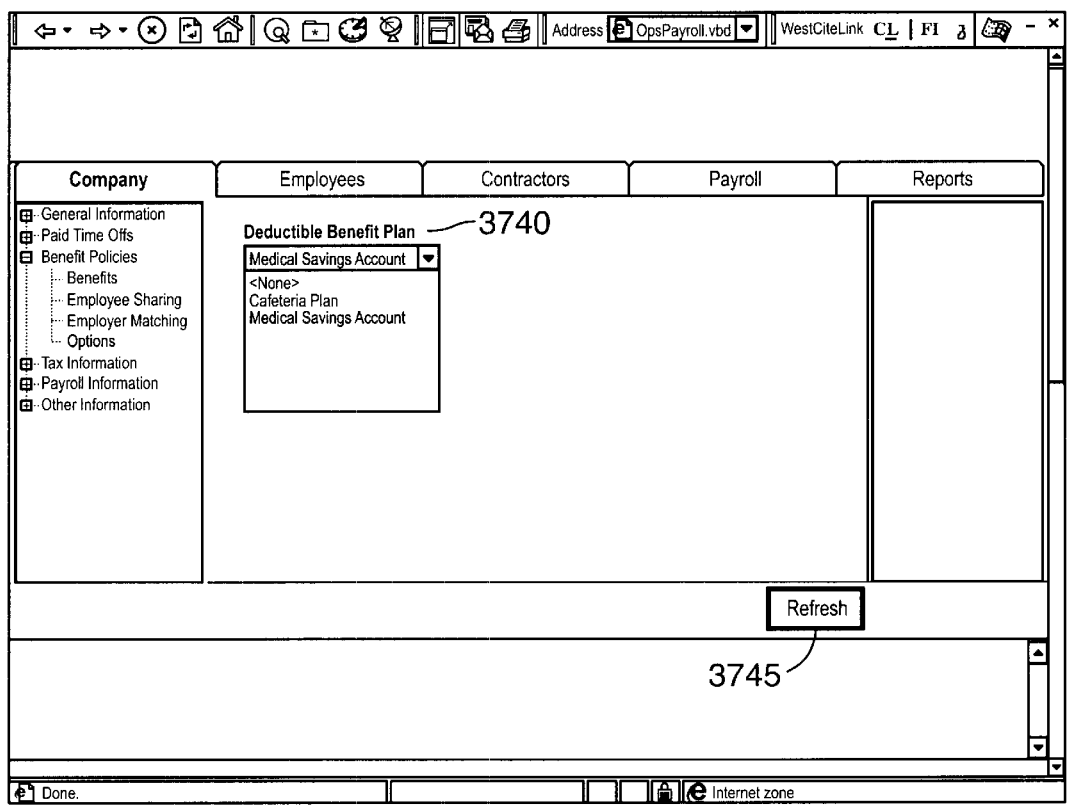
FIG. 15(e) shows a screen print of an interactive user interface for selecting tax-deductible benefit plans in an embodiment of the present invention.

The "Options" interface, illustrated by FIG. 15(e), enables input and modification of Employer-provided, tax-deductible benefit plans in which employees can choose to sum their pre-tax deductions. The system displays all tax-deductible benefit plans (e.g., "Cafeteria Plan," "Medical Savings Account") in a selectable list in the "Deductible Benefit Plan" field 3740. The selected plan is the plan that will be made available to employees. The system accounts for the employees' year-to-date contributions, as well as any applicable matching contributions from the Employer, and ensures that disbursements are limited to any applicable annual limits for which legal compliance by the Employer is required. The user can refresh the information displayed on this interface by clicking "Refresh" button 3745.

4. Tax Information

Referring again to navigation bar 3100 in FIG. 6, the next sub-option within the "Company Information" option is the "Tax Information" function. This function displays tax authorities applicable to the Employer's payroll, as determined by the system based on the city and zip code of each of Employer's offices. New information regarding tax authorities is automatically updated by the system when such amendents are received and the system stores the updated information in tax authorities data 80. For example, if the Employer adds an office in a state in which Employer is not presently located, the system automatically updates Employer's tax information with the taxes applicable to the new location. If a tax authority requires Employer-specific information, for example, the unemployment insurance rate, the system automatically requests such information. This information is used to calculate payroll taxes, as performed in step 1050 in FIG. 2, and generate tax disbursement information, as performed in step 1130 in FIG. 3.

Figure 16:
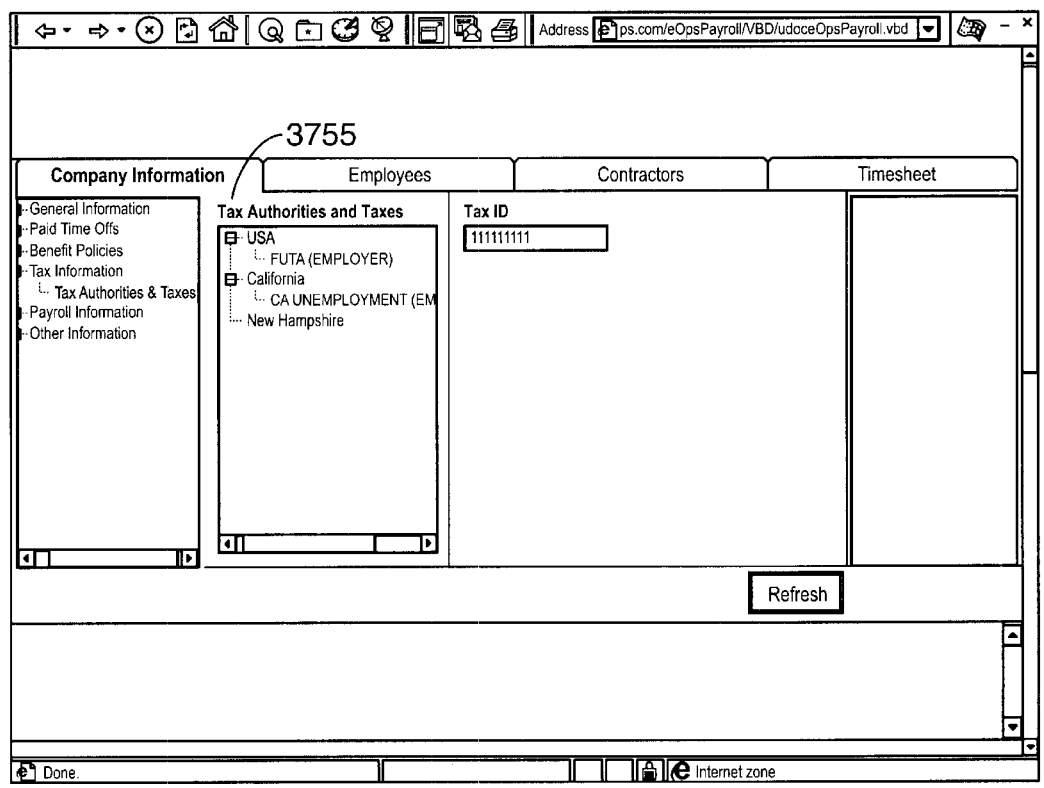
FIG. 16 shows a screen print of an interactive user interface for displaying information regarding payroll taxes in an embodiment of the present invention.

The "Tax Authorities and Taxes" interface, illustrated by FIG. 16, displays the applicable tax authorities organized by geographic region (e.g., United States, California) in a selectable list in the "Tax Authorities and Taxes" field 3755. Specific taxes are listed under each region. Clicking on a specific tax authority causes the system to request input of the Employer's tax identification number with that authority (e.g., "11111111" in FIG. 16). Clicking on a specific tax name causes the system to display details regarding that tax.

Figure 16A:
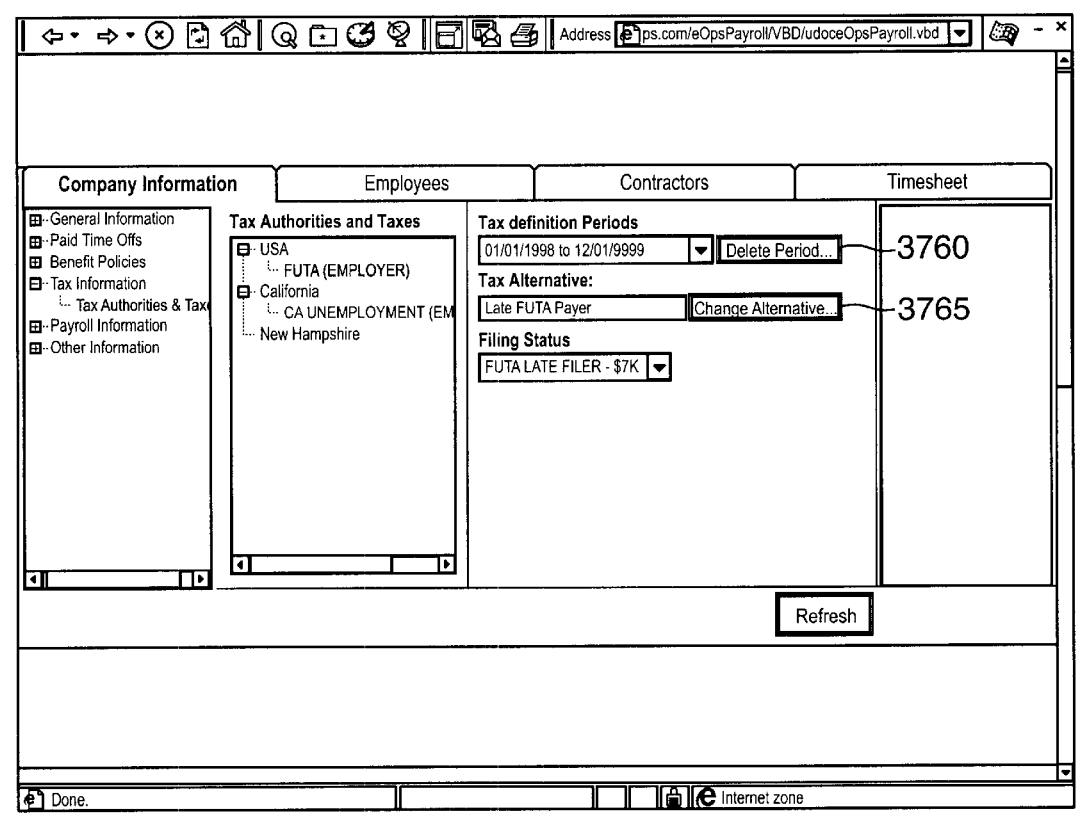
Figure 17:
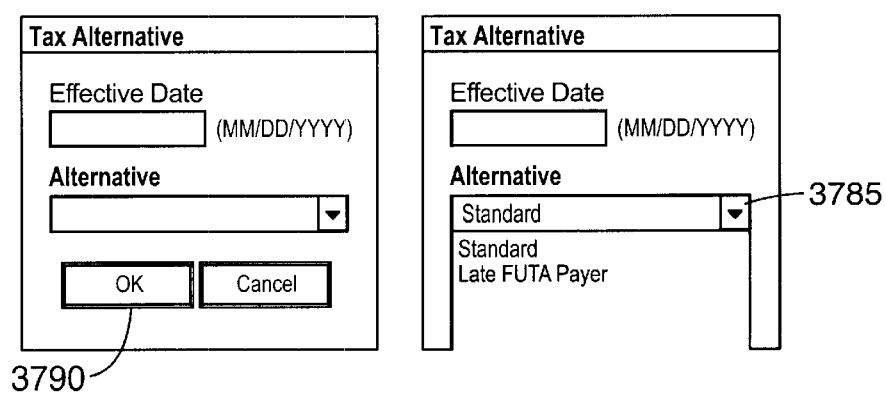
FIG. 17 shows a screen print of an interactive user interface for specifying alternative payroll taxes in an embodiment of the present invention.

For example, as shown in FIG. 16(a), the user selected the federal unemployment tax ("FUTA (EMPLOYER)") tax and the system displayed the tax definition period, tax alternative, and filing status. The user can delete a particular tax period by selecting the tax period from a pull-down menu and clicking "Delete Period" button 3760. Clicking "Change Alternative" button 3765 causes the system to display the "Tax Alternative" interface, shown in FIG. 17. The "Tax Alternative" interface allows the user to specify a new tax alternative for the selected tax, which is selectable from pull-down menu 3785. Clicking "OK" button 3790 upon exiting the "Tax Alternative," interface causes the system to save the modified information.

Figure 16B:
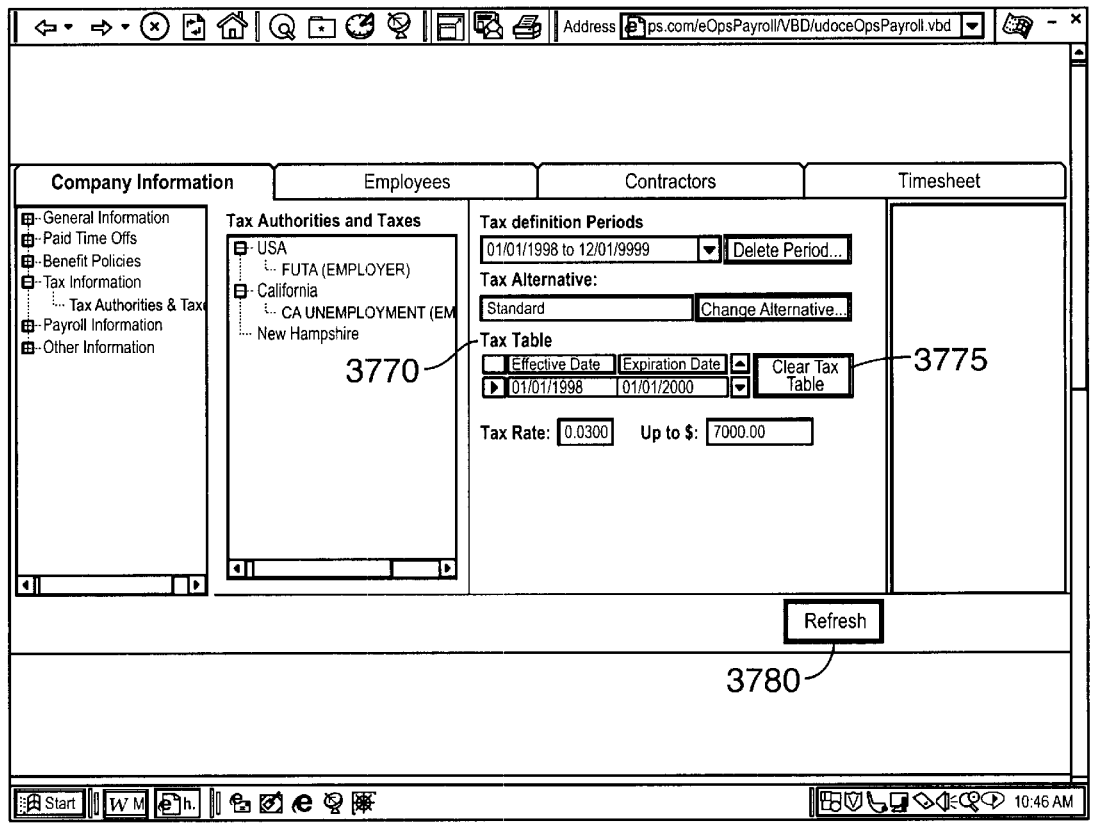
FIG. 16(b) shows a screen print of another view of an interactive user interface for displaying information regarding payroll taxes, including a tax table, in an embodiment of the present invention.

In FIG. 16(b), the user selected the California unemployment tax ("CA UNEMPLOYMENT (EMPLOYER)") and the system displayed the tax definition period, tax alternative, and "Tax Table" field 3770, which includes the effective date, expiration date, tax rate, and dollar limit for calculating the tax. Clicking "Clear Tax Table" button 3775 causes the system to clear the displayed information in "Tax Table" field 3770. The user can refresh the information displayed on this interface by clicking "Refresh" button 3780.

5. Payroll Information

Figure 18A:
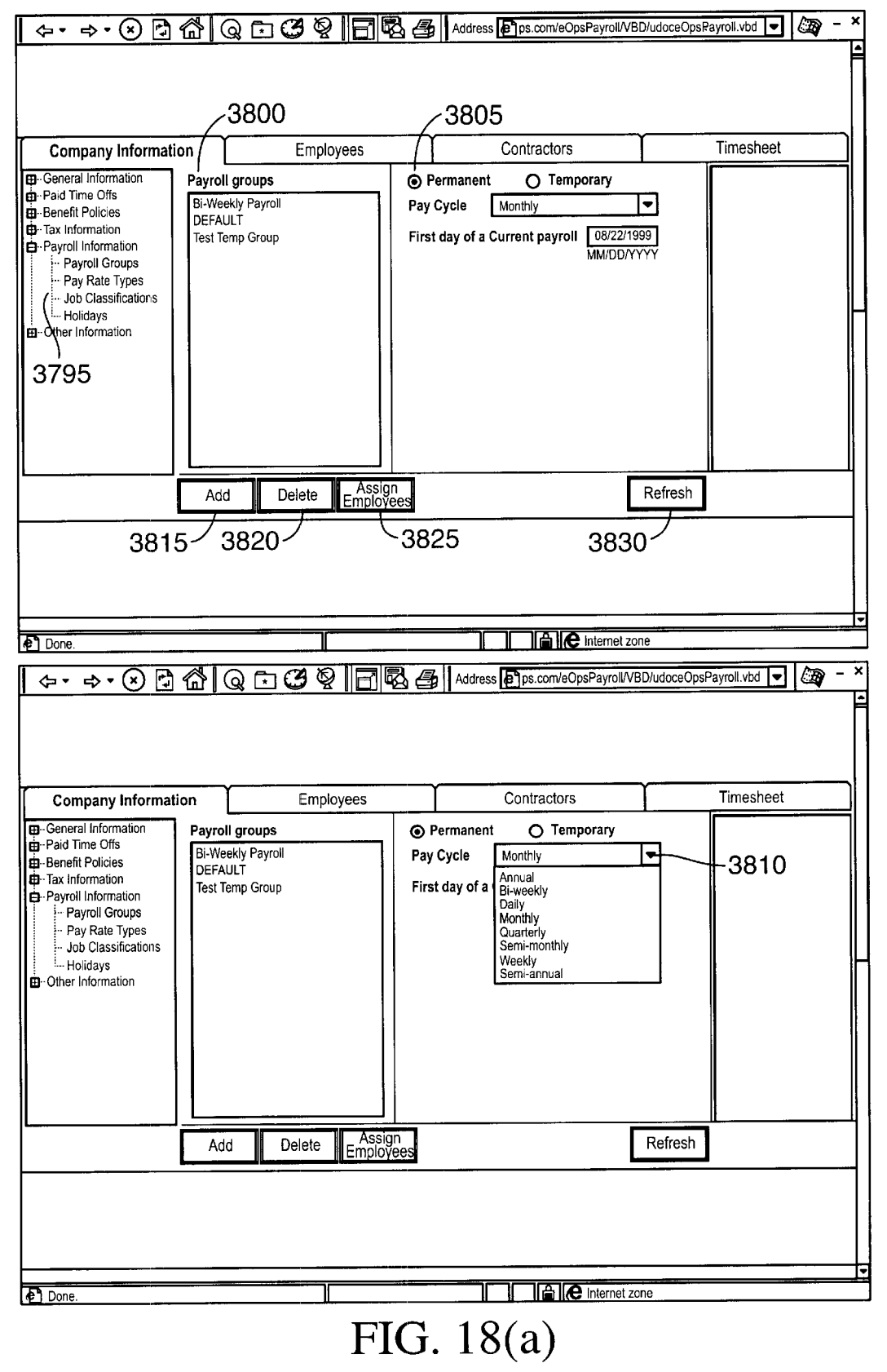

This function is divided into four user interfaces, each of which is selectable from navigation bar 3100 in FIG. 6 by clicking on "Payroll Information," which causes the interface names in sub-menu 3795 of FIG. 18(a) to be displayed.

a. Payroll Groups

The "Payroll Groups" interface, illustrated by FIG. 18(a), enables input and modification of Employer-defined payroll groups. Payroll groups allow the Employer to process separate payrolls, for example, separate payrolls for employees in different offices or divisions or a temporary payroll on a specific date.

The system displays all defined payroll groups in a selectable list in the "Payroll Groups" field 3800. Clicking on a payroll group name causes the system to display details regarding that plan. For example, as shown in FIG. 18(a), the selected "DEFAULT" payroll group is a "permanent" group (as specified by indicator field 3805), has a "monthly" pay cycle (as selected from "Pay Cycle" pull-down menu 3810), and has a current payroll that begins on Aug. 22, 1999.

The system also enables the Employer to assign or reassign employees to a particular payroll group by selecting a group name in "Payroll Groups" field 3800 and clicking "Assign Employees" button 3825. That action causes the system to display the "Assign Employees to Payroll Groups" interface shown in FIG. 19. This interface displays the names of the employees already assigned to the "DEFAULT" payroll group (which was highlighted in FIG. 18(a)), as well as the name and employee number of other employees. By clicking on the box(es) 3850 adjacent to one or more listed employees or on "Check All" box 3855 and then clicking "Add Checked" button 3860, the user can assign or reassign one or more employees to the "DEFAULT" payroll group. By selecting one of the employee names listed in the payroll group and clicking "Remove" button 3865, the user can remove an employee from the "DEFAULT" payroll group. Clicking "OK" button 3875 upon completion of assignment and/or reassignment of employees causes the system to save the modified information.

The user can change the displayed selection of employees on the "Assign Employees to Payroll Groups" interface by clicking "Select Employees" button 3870. That action causes the system to display the previously-described "Select Employees" interface shown in FIG. 8(d). The "Select Employees" interface enables the user to limit the employee names displayed for assignment or reassignment to the selected office(s), division(s), and/or department(s). For example, in FIG. 8(d), the user chose to limit the displayed employees to those that work in the "Main Office" and "Disk Drives" division.

Figure 18B:
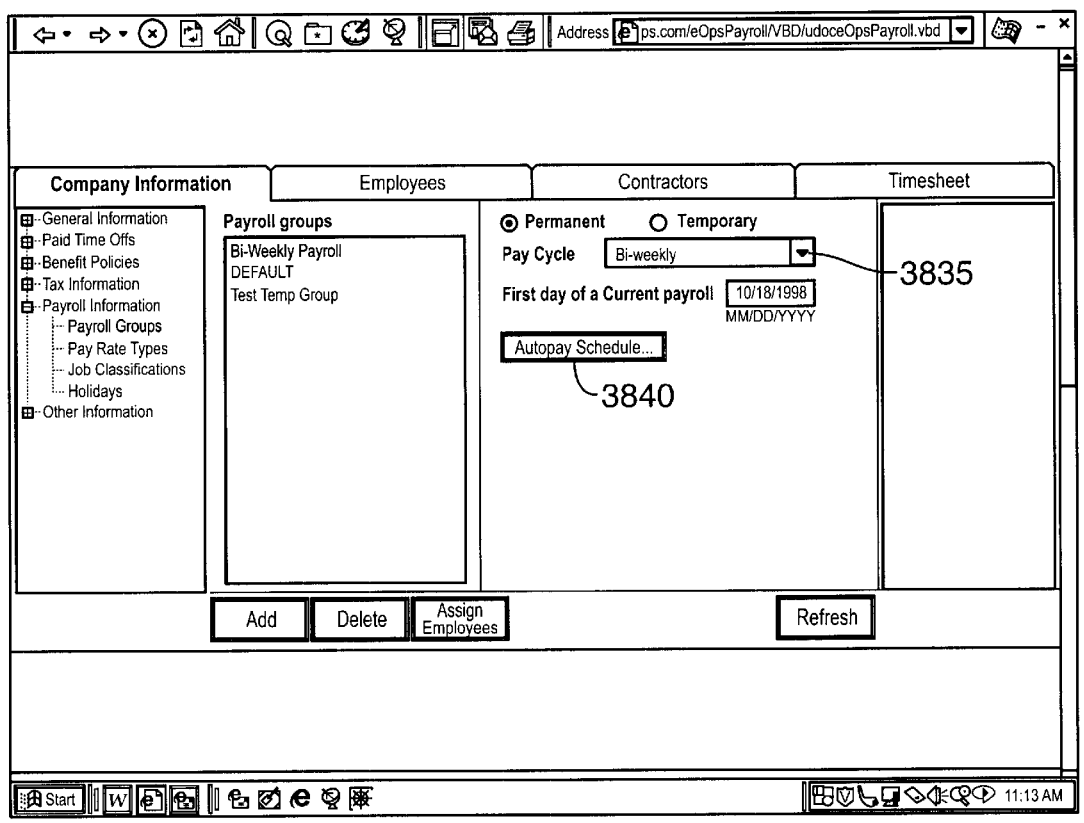
FIG. 18(b) shows a screen print of another view of an interactive user interface for displaying Employer-defined payroll groups in an embodiment of the present invention.
Figure 19:
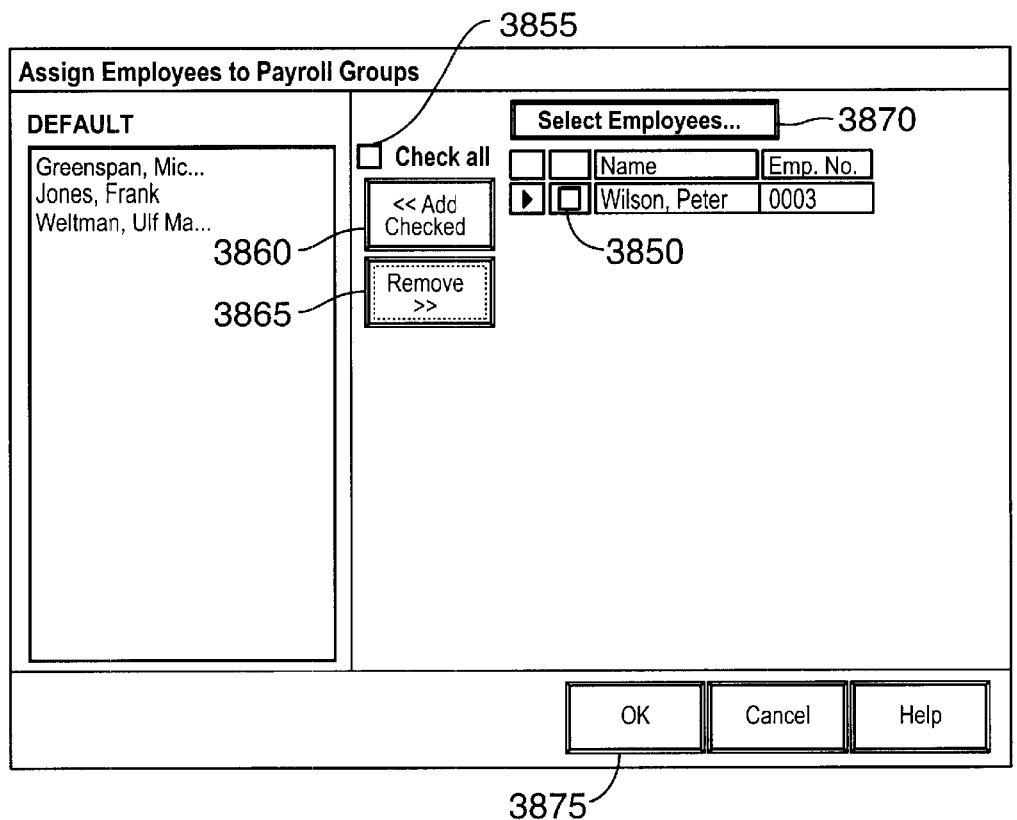
FIG. 19 shows a screen print of an interactive user interface for assigning employees to an Employer's payroll groups in an embodiment of the present invention.
Figure 20:
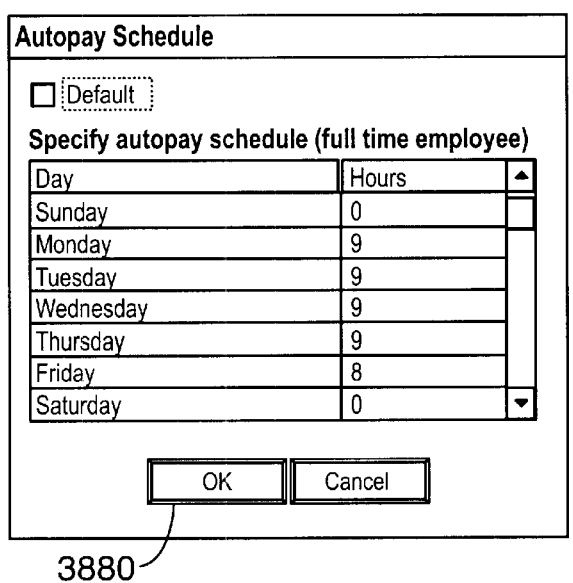
FIG. 20 shows a screen print of an interactive user interface for specifying an Employer-defined autopay schedule in an embodiment of the present invention.

If the selected payroll group (e.g., "Bi-Weekly Payroll") has a "weekly" or "bi-weekly" pay cycle (as selected from "Pay Cycle" pull-down menu 3835), as shown in FIG. 18(b), the user can specify an "autopay schedule" by clicking "Autopay Schedule" button 3840. Note that the system provides warning messages for (and may not permit) payroll cycles that are not allowed by the relevant tax authorities, e.g., monthly payroll cycles in California. An "autopay schedule" includes a specified number of hours per workday and can be used for an employee with a fixed working schedule, i.e., an employee who works the same number of hours each pay period, so that a timesheet need not be entered for that employee. Clicking "Autopay Schedule" button 3840 causes the system to display the "Autopay Schedule" interface, shown in FIG. 20. On this interface, the Employer can define an "autopay schedule," including the days of the workweek and how many hours the employee works per day, and can specify whether the schedule will be a default schedule. The system automatically applies overtime rules for certain autopay schedules e.g., certain bi-weekly pay cycles). Clicking "OK" button 3880 upon completion of defining the "autopay schedule" causes the system to save the modified information.

As shown in FIG. 18(*c*), the selected "Test Temp Group" payroll group is a "temporary" group (as specified by indicator field 3845) and has a current pay date of Apr. 1, 1999. "Temporary" payroll groups can be used by the Employer to make one-time payments to employees, such as bonuses.

The Employer can add a payroll group by clicking "Add" button 3815 or delete a payroll group by selecting the group name and clicking "Delete" button 3820, as shown in FIG. 18(*a*). The user can refresh the information displayed on this interface by clicking "Refresh" button 3830.

b. Pay Rate Types

Figure 21A:
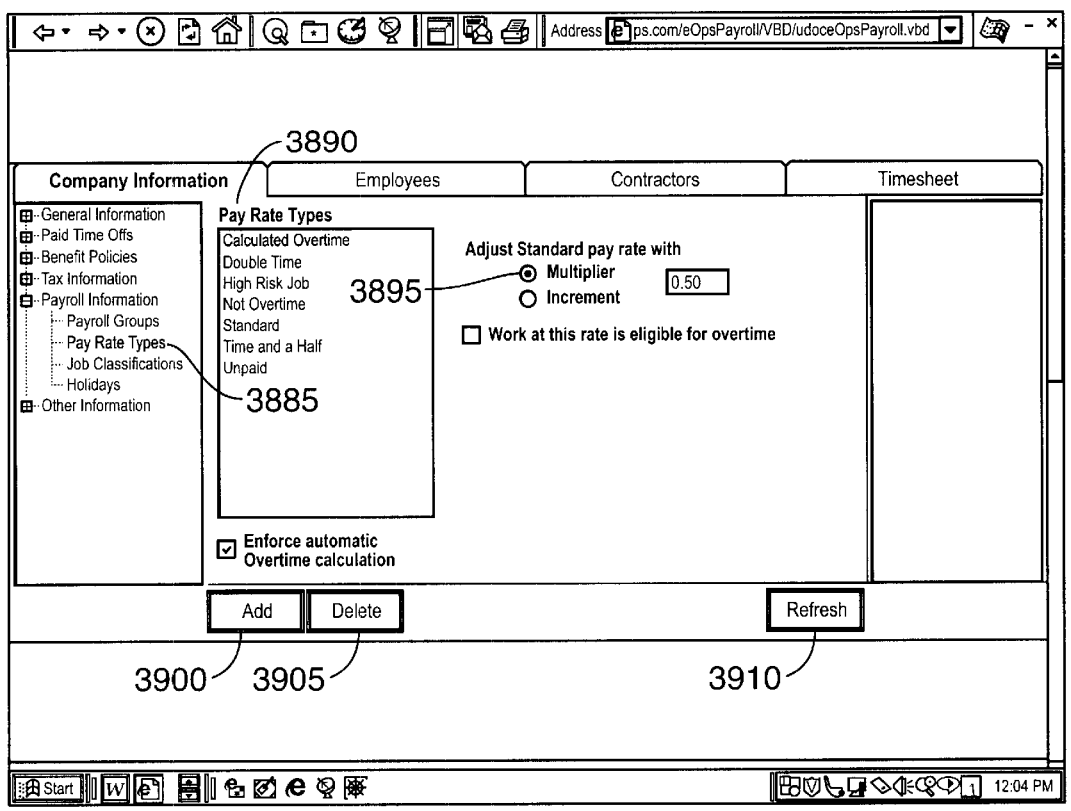
FIG. 21(a) shows a screen print of an interactive user interface for displaying Employer-defined pay rate types in an embodiment of the present invention.
Figure 21B:
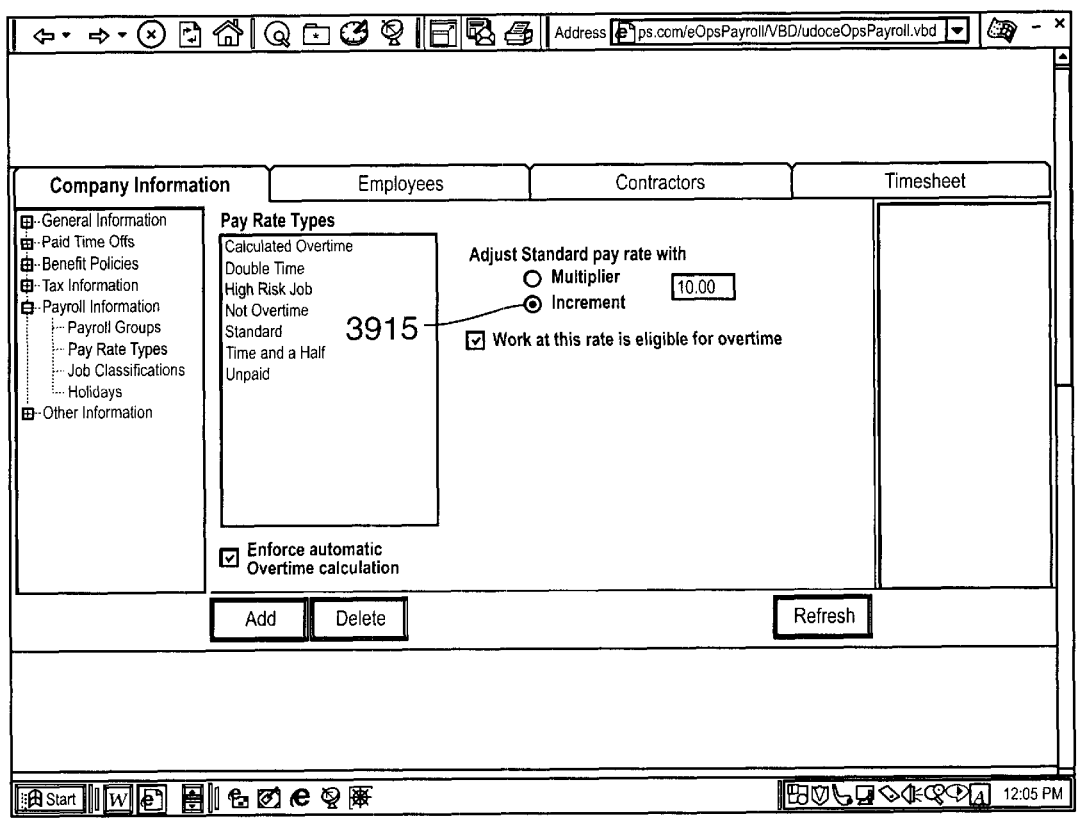
FIG. 21(b) shows a screen print of another view of an interactive user interface for displaying Employer-defined pay rate types in an embodiment of the present invention.

The "Pay Rate Types" interface, illustrated by FIG. 21(*a*), is selectable from sub-menu 3885 and enables input and modification of Employer-defined pay rate types. Such pay rate types may include: calculated overtime, double time, non-overtime, standard, time-and-a-half, and unpaid time, or Employer-defined rates, e.g., for high risk jobs. This information is used to calculate employees' income, as performed in step 1010 in FIG. 2.

The system displays all pay rate types in a selectable list in "Pay Rate Types" field 3890. Clicking on a pay rate type causes the system to display details regarding that rate type. For example, as shown in FIG. 21(*a*), the selected "Calculated Overtime" rate type adjusts the standard pay rate with a multiplier of 0.50 (as shown in "Multiplier" field 3895); the system allows the Employer to modify the multiplier in this field where permitted by law. Indicators on this interface show that for this pay rate the system will enforce automatic overtime calculation (which can be disabled) and that work at this pay rate is not eligible for additional overtime calculation.

As shown in FIG. 21(*b*), the selected "High Risk Job" rate type adjusts the standard pay rate by adding an increment of $10.00 to the hourly pay rate (as shown in "Increment" field 3915); the Employer can modify the increment in this field. Indicators on this interface show that for this pay rate the system will enforce automatic overtime calculation (which can be disabled) and that work at this pay rate is eligible for additional overtime calculation.

The Employer can add a pay rate type by clicking "Add" button 3900 or delete a pay rate type by selecting the rate type and clicking "Delete" button 3905, as shown in FIG. 21(*a*). The user can refresh the information displayed on this interface by clicking "Refresh" button 3910.

Note that the system enables Employers to use pay rate types for purposes of "job costing," i.e., tracking the internal cost of certain types of work.

c. Job Classifications

Figure 22:
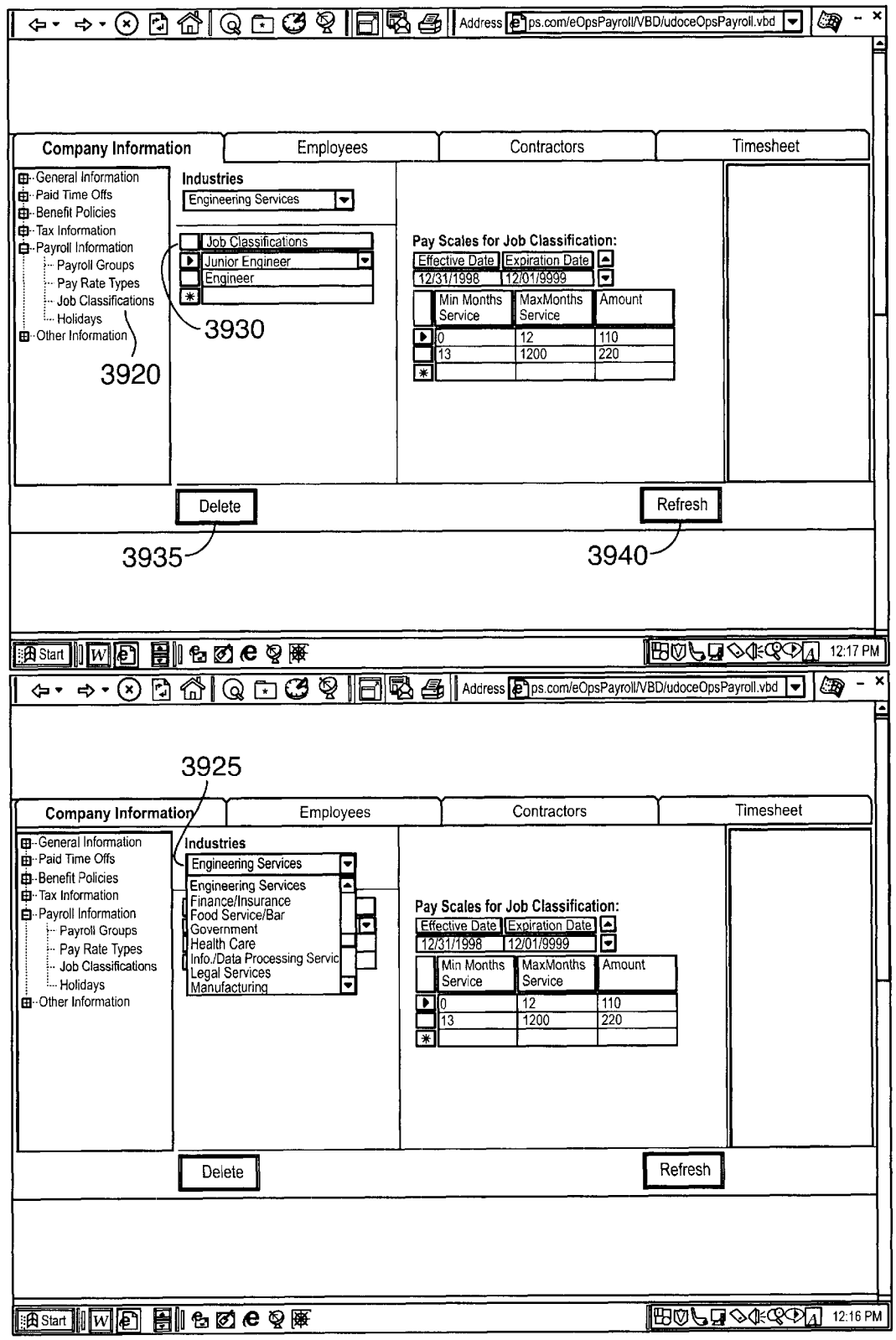
FIG. 22 shows a screen print of an interactive user interface for displaying Employer-defined pay scales for particular job classifications in an embodiment of the present invention.

The "Job Classifications" interface, illustrated by FIG. 22, is selectable from sub-menu 3920 and enables input and modification of Employer-defined pay scales for particular job classifications. The job classifications may be standard industry classifications or Employer-defined classifications. In an embodiment of this invention, pay scales for particular job classifications across an industry can be aggregated from multiple Employers that use the system, in order to create comparative salary survey data that shows typical salaries for particular jobs.

As shown in FIG. 22, the system displays standard industries in "Industries" pull-down menu 3925. When the user selects a particular industry, for example "Engineering Services," the system displays the standard job classifications within that industry in a selectable list in "Job Classifications" field 3930. The system also displays daily custom job classifications defined by the particular Employer within that industry. Selecting a particular job classification, for example "Junior Engineer" (denoted by the arrow adjacent to the classification), causes the system to display the Employer-defined pay scale for that classification, including: effective date, expiration date, and pay rate scheduled across periods of service (e.g., 0–12 mos.=$110/hour; 13–1200 mos.=$220/hour).

The Employer can delete a job classification by selecting the classification and clicking "Delete" button 3935. The user can refresh the information displayed on this interface by clicking "Refresh" button 3940.

d. Holidays

Figure 23:
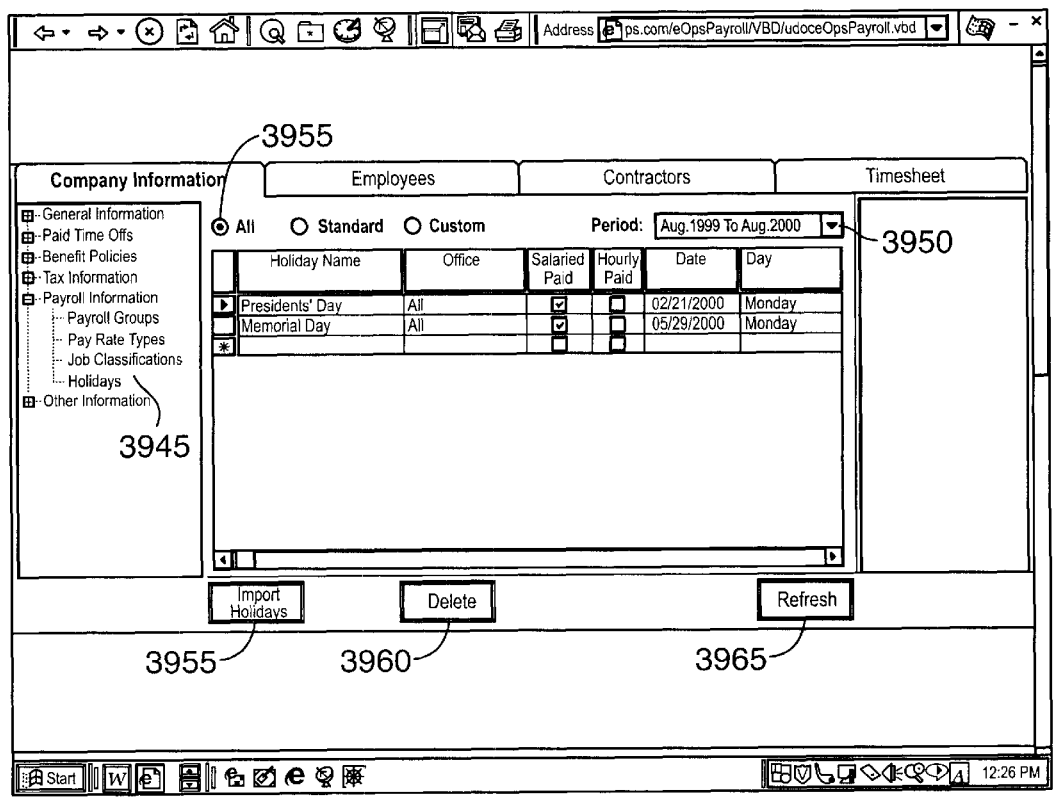
FIG. 23 shows a screen print of an interactive user interface for displaying an Employer's holiday schedule in an embodiment of the present invention.
Figure 23A:
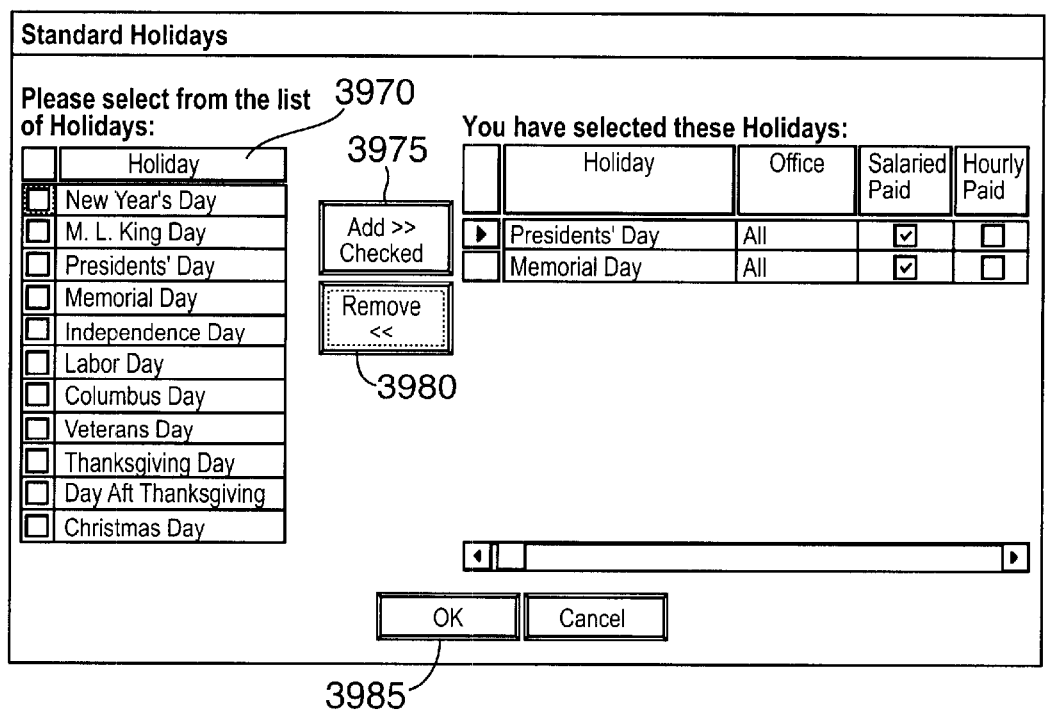
FIG. 23(a) shows a screen print of an interactive user interface for selecting holidays to be included in an Employer's holiday schedule in an embodiment of the present invention.

The "Holidays" interface, illustrated by FIG. 23, is selectable from sub-menu 3945 and displays and enables modification of the Employer's holiday schedule, including custom scheduling of holidays by office, for example if certain holidays are applicable only to certain of Employer's offices. For the time period specified in the pull-down menu of "Period" field 3950, (e.g., next 12 months, past 12 months, "All"), the system displays each holiday recognized by Employer. Depending upon the user's selection of status indicator 3955, the system displays all holidays, standard holidays, or custom holidays. The information displayed for each holiday includes the following: holiday name, applicable Employer offices (or "All"), an indicator regarding whether salaried employees are paid for the holiday, an indicator regarding whether hourly employees are paid for the holiday, the date of the holiday, and the weekday of the holiday. The user can change the value of the indicators regarding salaried and hourly employees.

Clicking "Import Holidays" button 3955 enables the user to import additional holidays from the standard holidays data 100. The system displays the "Standard Holidays" interface, as shown in FIG. 23(*a*). This interface displays a list of all standard holidays in "Holiday" field 3970. By clicking one or more of the boxes adjacent to the holiday names and clicking "Add Checked" button 3975, the user can select the additional holidays to import, which are displayed on the interface. The user can then modify any of the fields associated with the selected holiday, including applicable office (or "All") and indicators regarding salaried and hourly employees. For example, an Employer could change the "Independence Day" holiday (July 4) to the weekday nearest that date. The user can remove a holiday from the selected list by clicking a box adjacent to a holiday name and clicking "Remove" button 3980. Clicking "OK" button 3985 causes the system to add the selected holiday to the list displayed on the "Holiday" interface shown in FIG. 23.

The Employer can delete a holiday by selecting the holiday name and clicking "Delete" button 3960, as shown in FIG. 23. The user can refresh the information displayed on this interface by clicking "Refresh" button 3965.

6. Other Information

Figure 24:
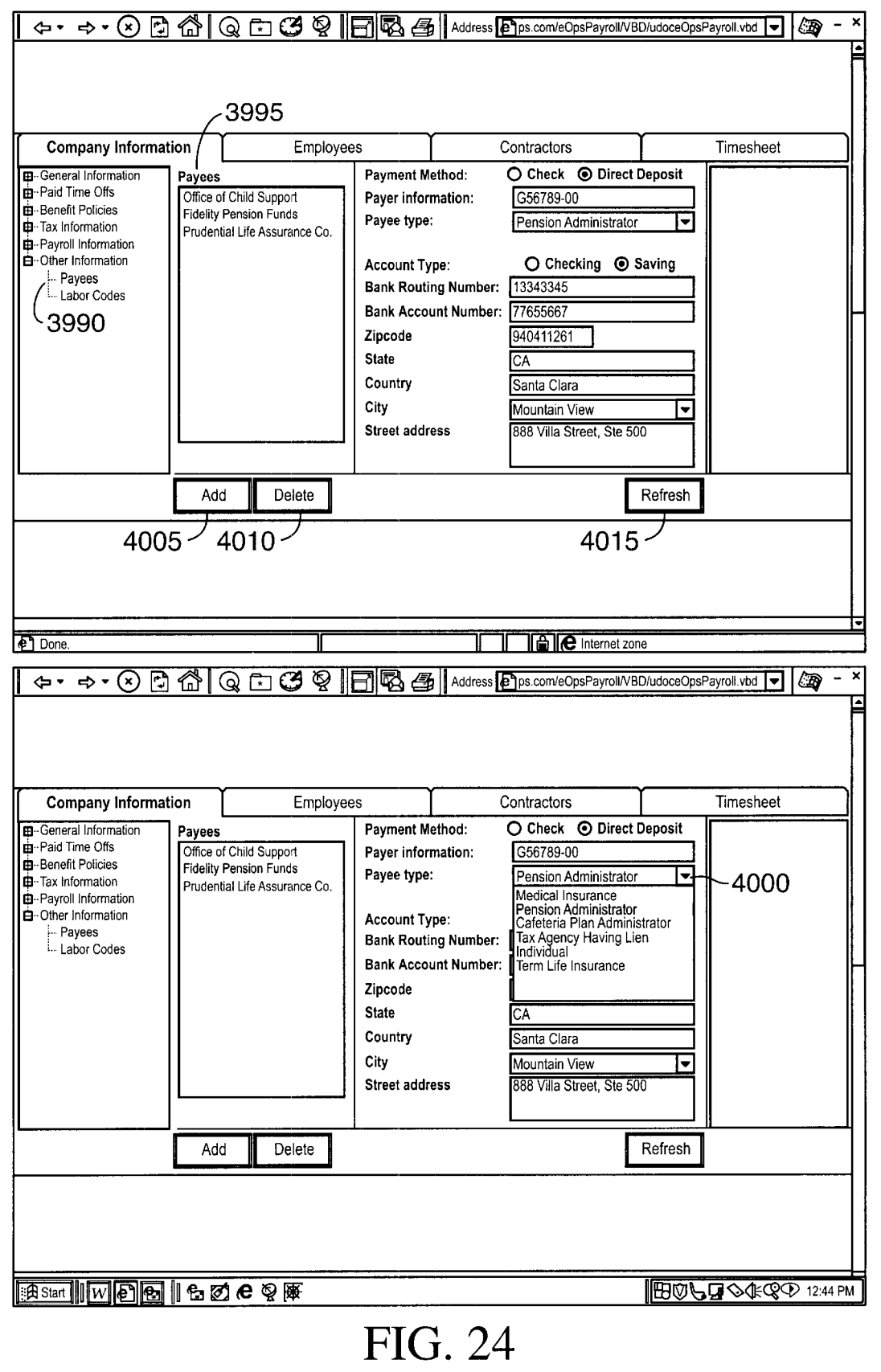
Figure 24A:
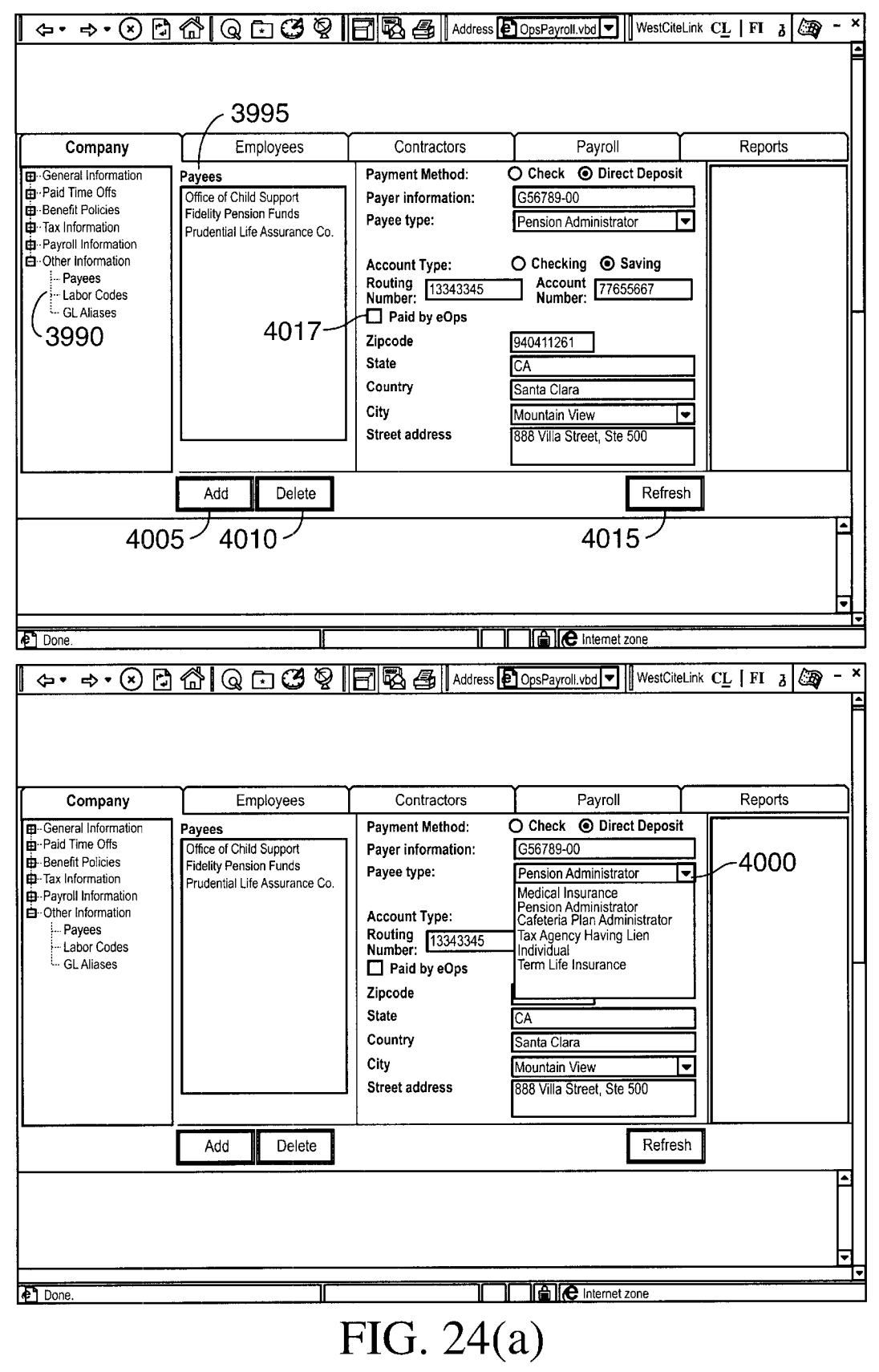
Figure 24B:
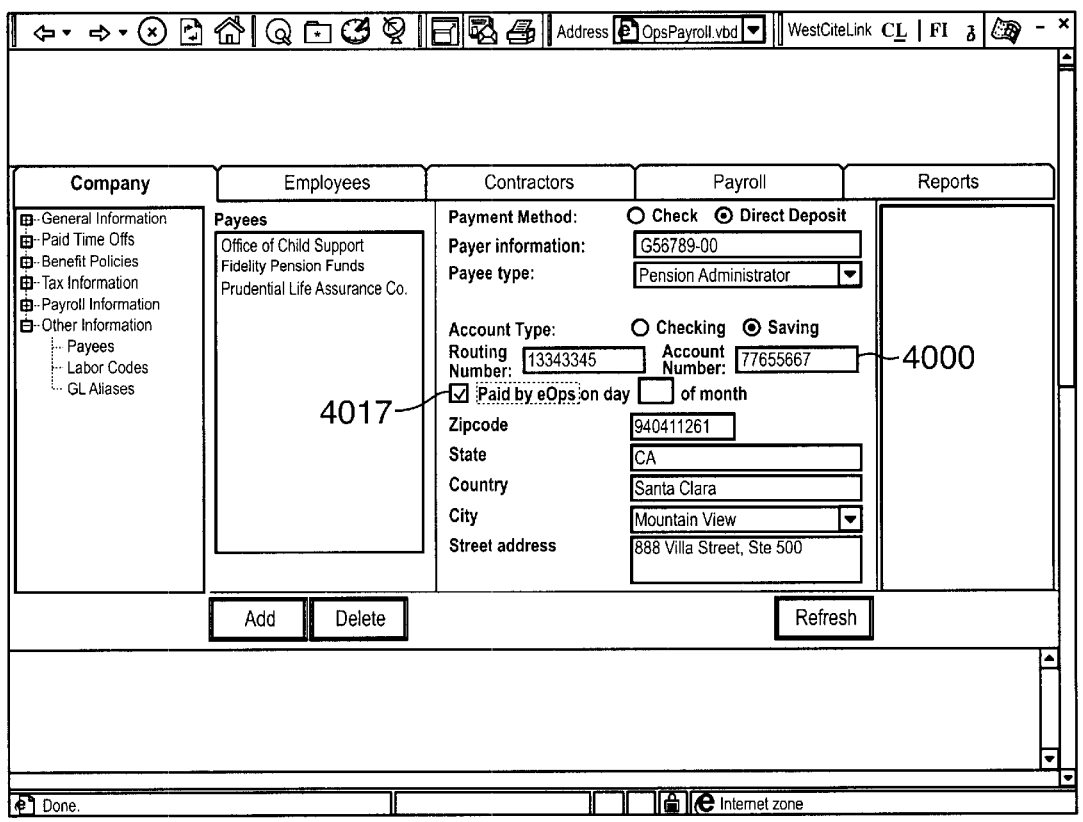
FIG. 24(b) shows a screen print of another view of an interactive user interface for displaying information regarding payees to whom payments will be made from payroll deductions in an embodiment of the present invention.

This function is divided into three user interfaces, each of which is selectable from navigation bar 3100 in FIG. 6 by clicking on "Other Information," which causes the interface names in sub-menu 3990 of FIG. 24(*a*) to be displayed.

a. Payees

The "Payees" interface, illustrated by FIG. 24(*a*), enables input and modification of payees to whom payments will be made from payroll deductions. These payees are included in payees data 70. This functionality provides the system with the flexibility of supporting employees' periodic payroll deductions to third-party payees who are not benefit providers, a feature that is not included in traditional payroll systems and services. This information is used to generate payroll disbursement information and disburse funds to miscellaneous payees, as performed in steps 1110 and 1140, respectively, in FIG. 2.

The system displays all payee names in a selectable list in the "Payees" field 3995. Clicking on a payee name causes the system to display details regarding that payee. For example, as shown in FIG. 24(*a*), the user selected "Fidelity Pension Funds." For each payee, the system displays the following information: method by which payee will be paid (e.g., check, direct deposit); payer's account number (with payee); payee type, as selected from pull-down menu 4000 (i.e., information required by the payee that is used to define the report sent to the payee along with the disbursement, for example, pension administrator, medical insurance, term life insurance, mortgage lender, child support agency, charity, etc.); payee's bank account and routing numbers; a status indicator 4017 regarding whether the system (i.e.. "eOps") pays the particular payee; and payee's address.

As shown in FIG. 24(*b*), when status indicator 4017 is set, the system also displays the day of the month on which the system pays the payee. Status indicator 4017 will be set for payees that have an established relationship with the system.

As shown in FIG. 24(*a*), the Employer can add a payee by clicking "Add" button 4005 or delete a payee by selecting the payee and clicking "Delete" button 4010. The user can refresh the information displayed on this interface by clicking "Refresh" button 4015.

b. Labor Codes

Figure 25A:
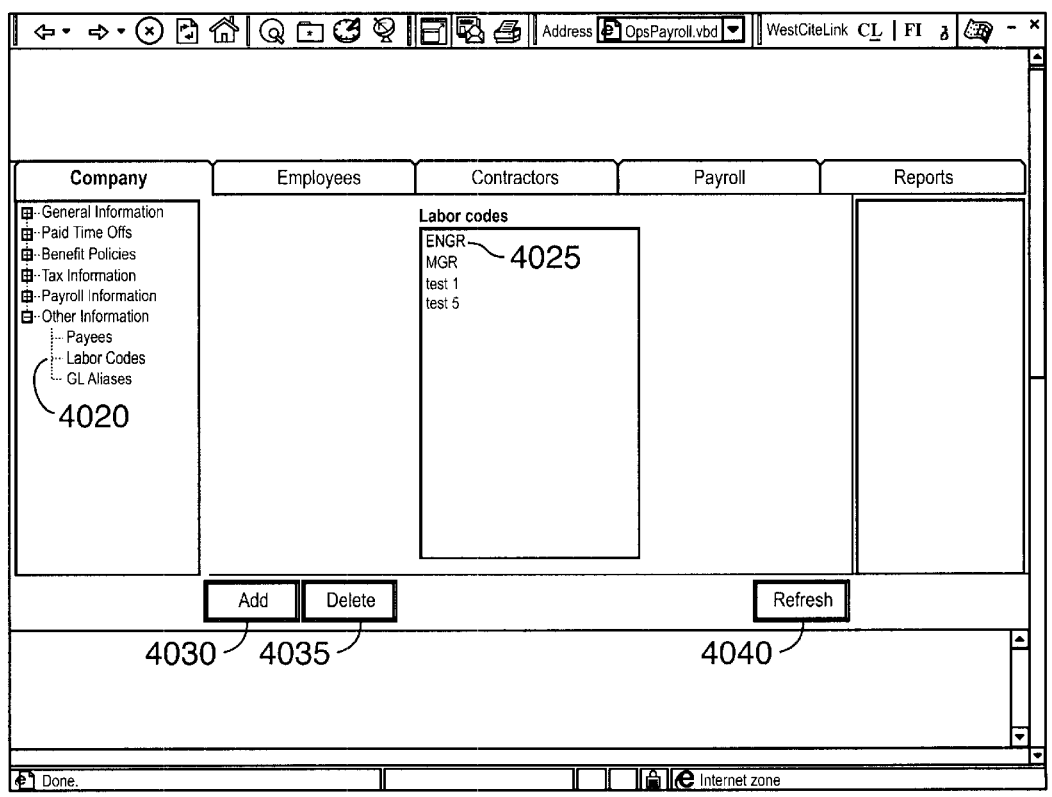
FIG. 25(a) shows a screen print of an interactive user interface for displaying labor codes in an embodiment of the present invention.
Figure 25B:
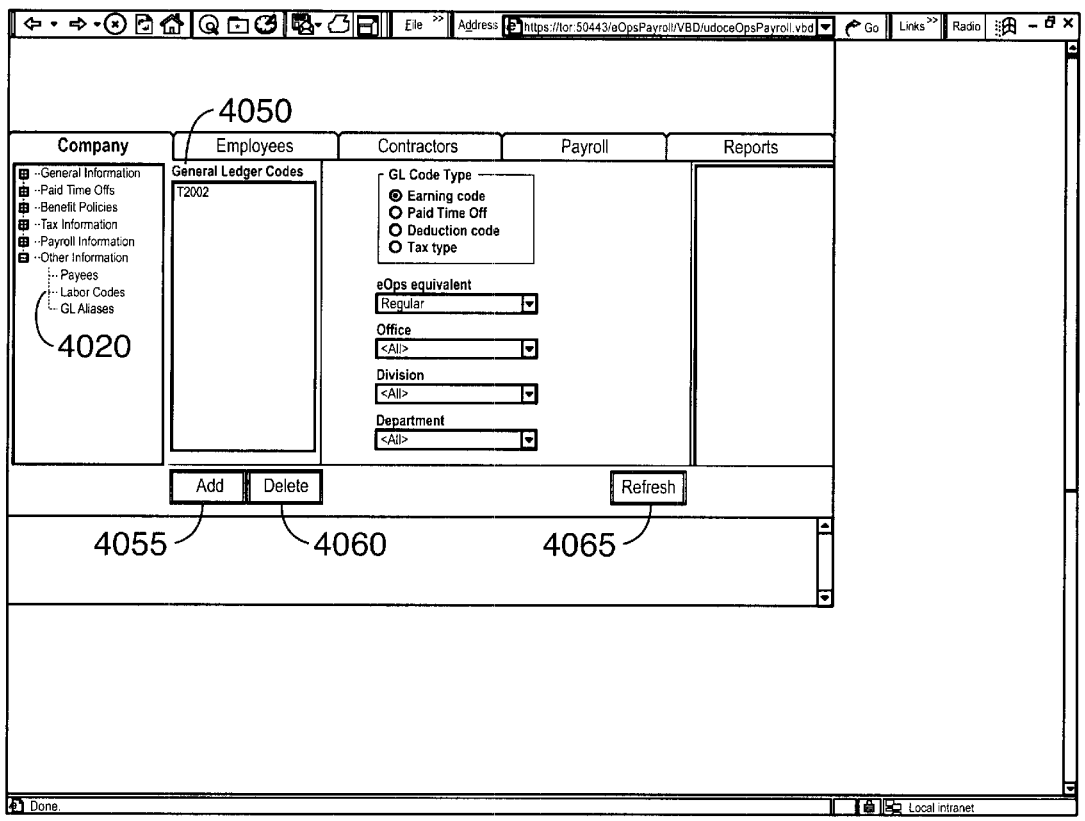
FIG. 25(b) shows a screen print of an interactive user interface for defining general ledger codes in an embodiment of the present invention.

The "Labor Codes" interface, illustrated by FIG. 25(*a*), is selectable from sub-menu 4020 and enables modification of industry-defined or Employer-defined labor codes (e.g., "Engineers," "Managers") used for reporting. The system displays all labor codes in a selectable list in the "Labor Codes" field 4025. The Employer can add a labor code by clicking "Add" button 4030 or delete a labor code by selecting the labor code and clicking "Delete" button 4035. The user can refresh the information displayed on this interface by clicking "Refresh" button 4040.

c. General Ledger Designations

The "General Ledger Codes" interface, illustrated by FIG. 25(*b*), is selectable from sub-menu 4020 and enables the Employer to map earning, paid-time-off, deduction, and tax codes to Employed-defined, general ledger naming conventions or codes. The system displays all general ledger codes in a selectable list in the "General Ledger Codes" field 4050. For each general ledger code, the interface enables the Employer to specify: code type (e.g., "Earning Code," "Paid Time Off," "Deduction Code," "Tax Type"), as well as whether the code is specific to a particular office, division, and/or department. The Employer can add a general ledger code by clicking "Add" button 4055 or delete a general ledger code by selecting the code and clicking "Delete" button 4060. The user can refresh the information displayed on this interface by clicking "Refresh" button 4065.

Employee Information

The employee information functionality of the system provides the user with the ability to input and modify information about the Employer's employees, including personal information, address information, payroll information, earnings and deductions information, benefits information, and tax information. This information is included in employee data 30. This option is selectable by clicking on "Employees" in navigation bar 3000 in FIG. 6. As shown in navigation bar 4100 in FIG. 26, the system presents the user with a series of five sub-options to choose from within the "Employees" option.

Figure 26:
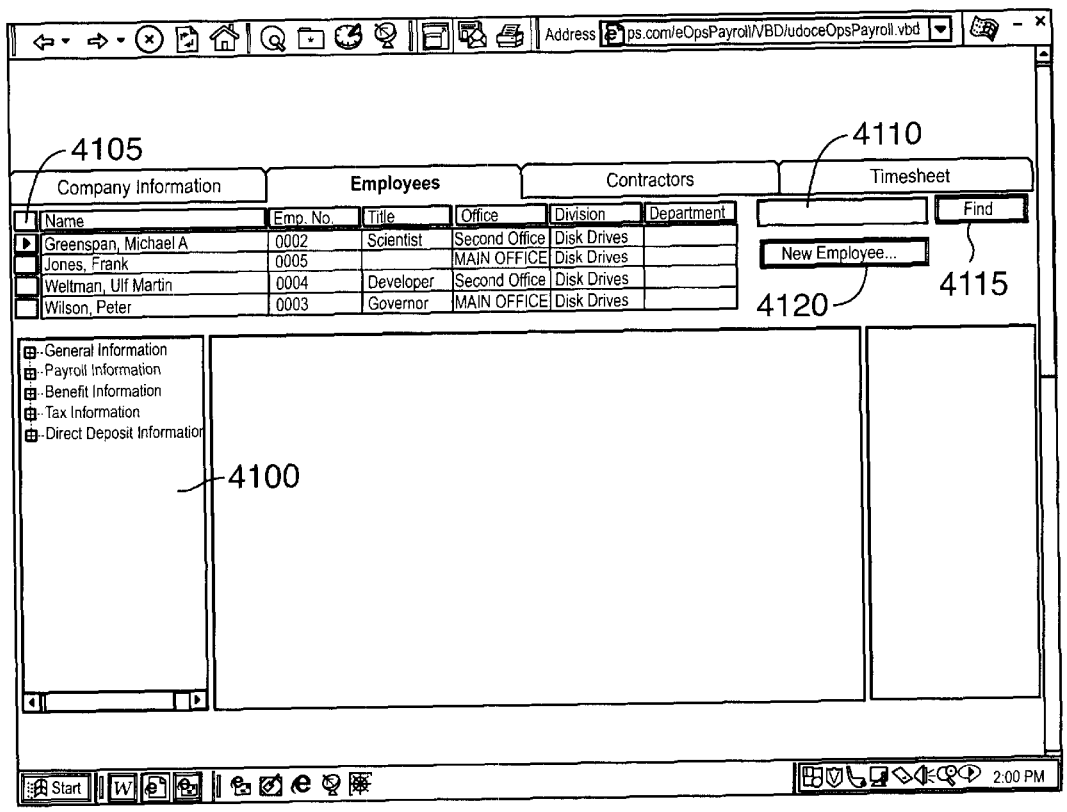
FIG. 26 shows a screen print of an interactive user interface for selecting an employee for payroll processing in an embodiment of the present invention.
Figure 26A:
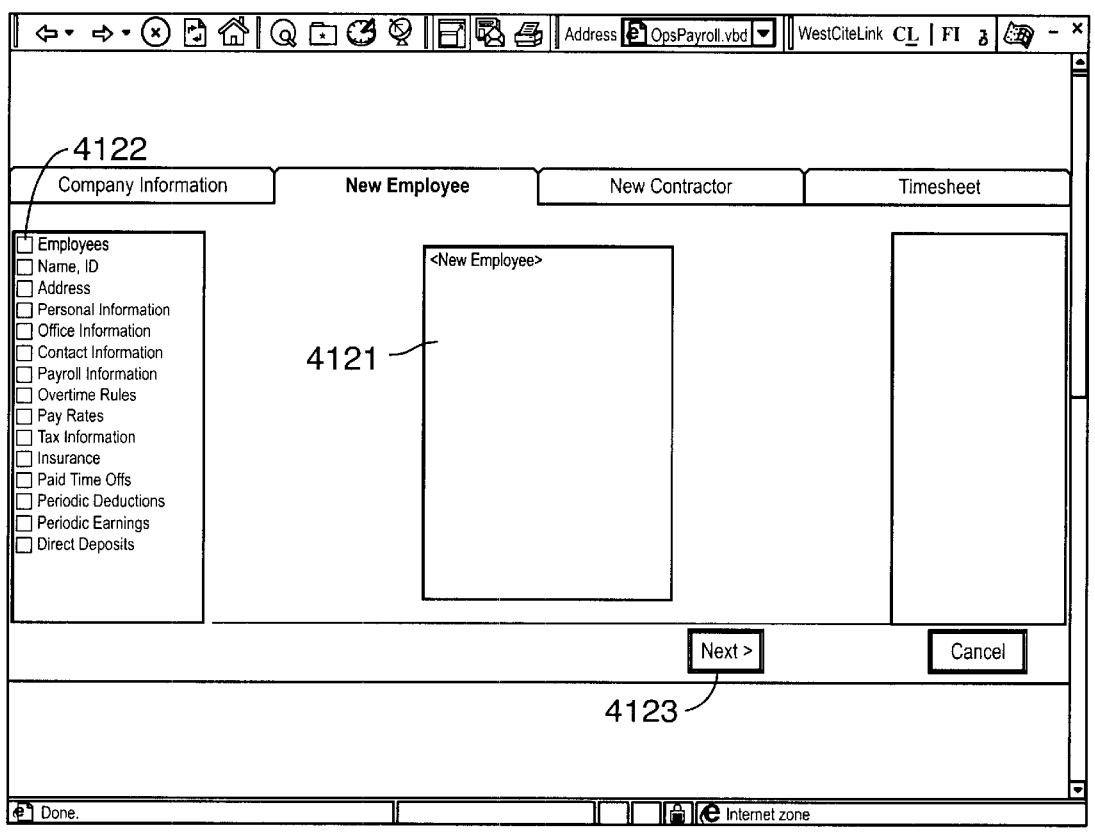
FIG. 26(a) shows a screen print of an interactive user interface for commencing input of information regarding a new employee in a workflow sequence in an embodiment of the present invention.
Figure 26B:
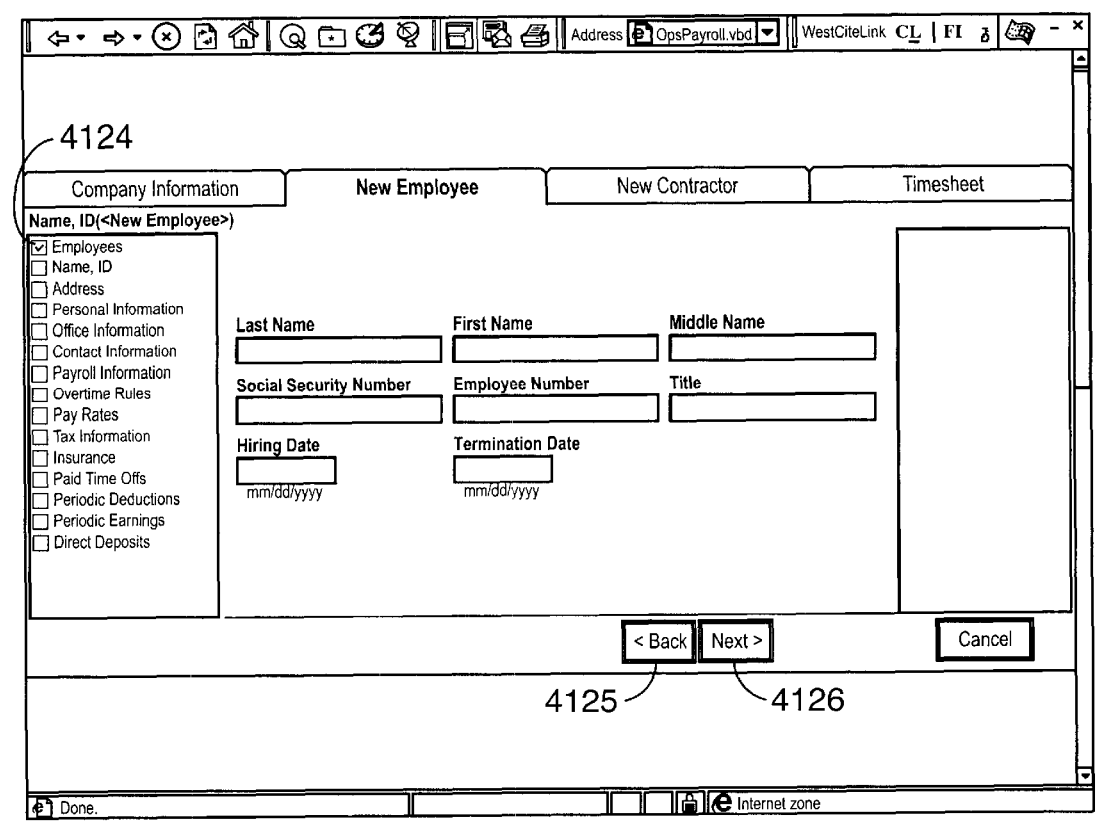

Each sub-option within the "Employees" option includes a feature that enables the user to select a particular employee from the display list of company employees, as shown in FIG. 26. By clicking on the name of an employee (e.g., "Greenspan, Michael A.") in display list 4105, the user can select an employee for the purpose of reviewing or modifying the employee's information. The user can also enter an employee name in field 4110 and click "Find" button 4115 in order to locate a particular employee within the list of company employees, which is a useful function in the event that there is a long list of employees. Clicking "New Employee" button 4120 causes the system to display the "New Employee" interface, as shown in FIG. 26(*a*). This interface enables the Employer to enter a new employee into employee data 30. The system guides the user through a workflow sequence that includes a subset of the sub-options of the "Employees" option—described below—such that all required information regarding the new employee (identified in new employee list 4121) will be input. Each sub-option to be completed is listed as a step in option list 4122, with the current option highlighted. Clicking "Next" button 4123 causes the system to navigate the user to the next interface in the new employee entry process.

For example, as shown in FIG. 26(*b*), the current option in list 4124 is "Name, ID," which requires the input of certain name and identification information regarding the new employee. As each option is completed, the system places a check mark adjacent to the respective option name in list 4124. Failure to input any of the required information will result in an error message and the system will not permit the user to advance to the next interface. Clicking "Back" button 4125 causes the system to navigate the user back to the prior interface (e.g., "Employees"). Clicking "Next" button 4126 causes the system to navigate the user forward to the next interface (e.g., "Address"). A system software "wizard" enables the user to navigate backwards and forwards among the workflow screens while preserving data already entered on any of the screens.

1. General Information

This function is divided into three user interfaces, each of which is selectable from navigation bar 4100 in FIG. 26 by clicking on "General Information," which causes the interface names in sub-menu 4125 of FIG. 27(*a*) to be displayed.

a. Personal Information

The "Personal Information" interface, illustrated by FIG. 27(*a*), enables input and modification of personal information regarding the selected employee, including: name, employee number, title, social security number, date of birth, marital status (selectable from pull-down menu 4130), race (selectable from pull-down menu 4135), and gender. The user can refresh the information displayed on this interface by clicking "Refresh" button 4140.

b. Home Address

The "Home Address" interface, illustrated by FIG. 27(*b*), enables input and modification of home address information regarding the selected employee, including: street address, city, state, county, zip code, telephone number, fax number, and e-mail address. The system uses the employee's zip code and city to determine applicable tax authorities and tax rules. The user can refresh the information displayed on this interface by clicking "Refresh" button 4145.

c. Contact Information

Figure 27A:
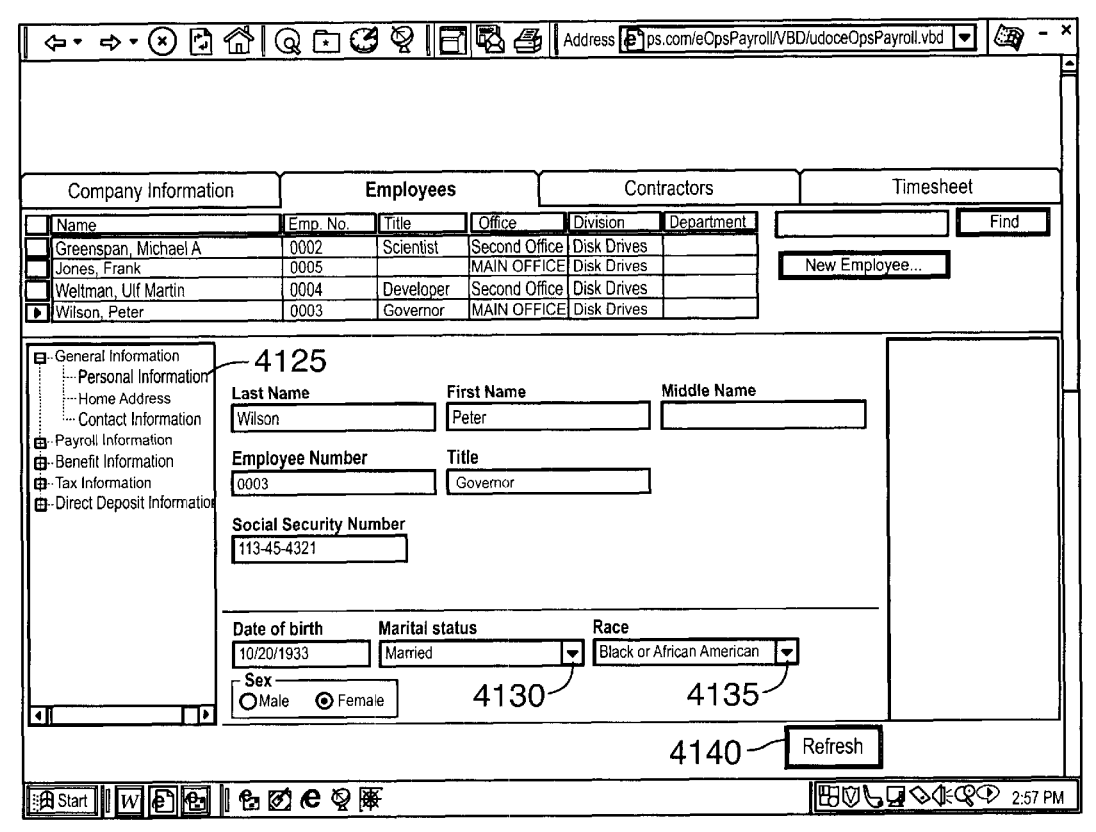
Figure 27B:
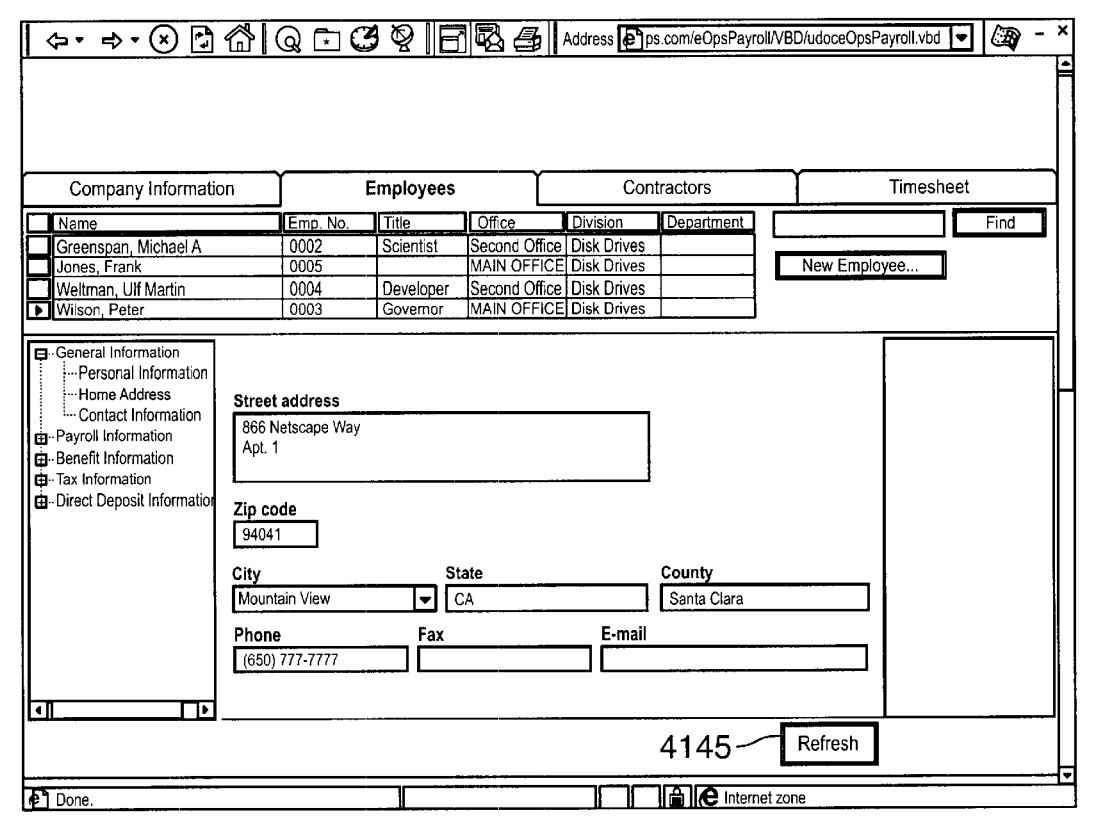
Figure 27C:
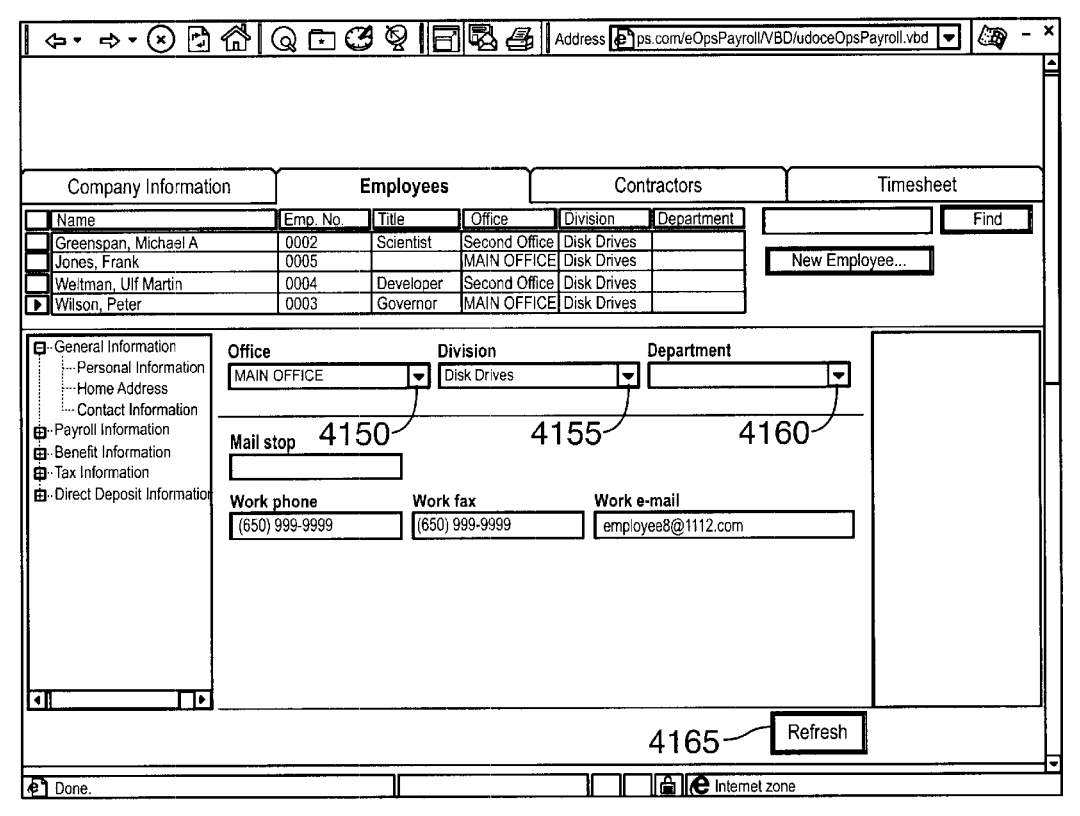

The "Contact Information" interface, illustrated by FIG. 27(c), enables input and modification of Employer contact information regarding the selected employee, including: Employer-defined office (selectable from pull-down menu 4150), Employer-defined division (selectable from pull-down menu 4155), Employer-defined department (selectable from pull-down menu 4160), mail stop, work telephone number, work fax number, and work e-mail address. The user can refresh the information displayed on this interface by clicking "Refresh" button 4165.

2. Payroll Information

Figure 28A:
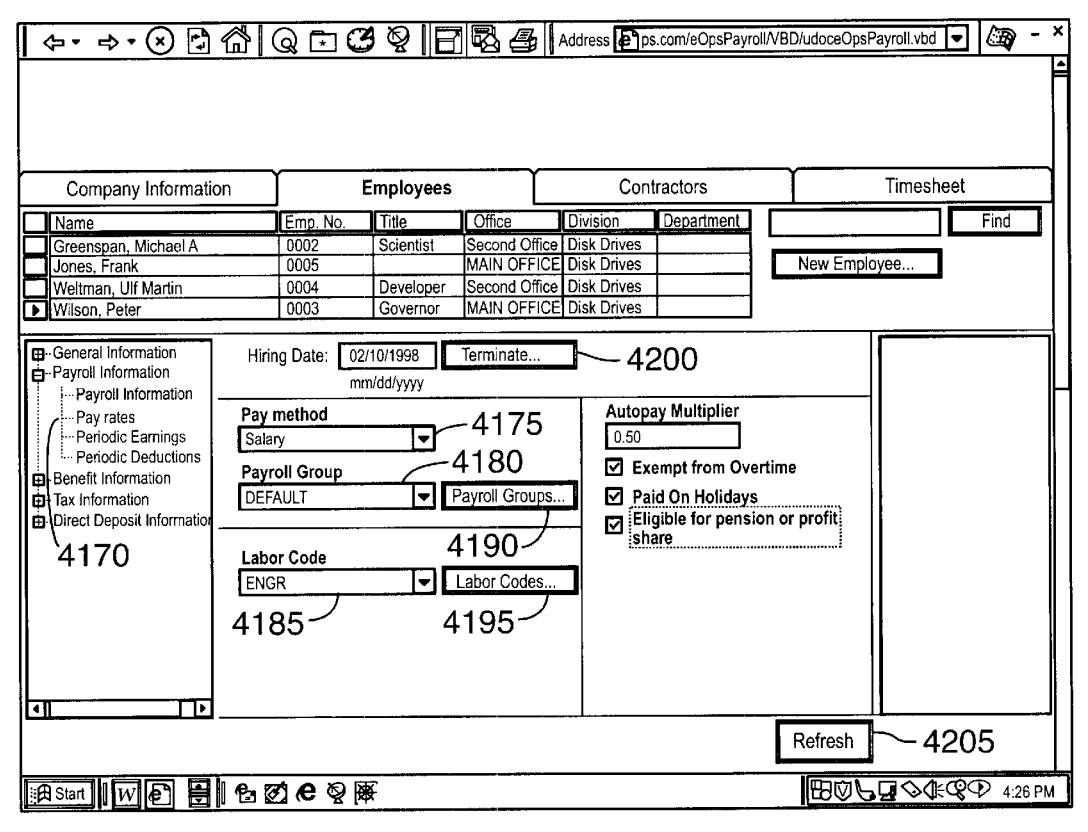

This function is divided into four user interfaces, each of which is selectable from navigation bar 4100 in FIG. 26 by clicking on "Payroll Information," which causes the interface names in sub-menu 4170 of FIG. 28(a) to be displayed.

a. Payroll Information

The "Payroll Information" interface, illustrated in FIG. 28(a), enables input and modification of payroll information regarding the selected employee, including: hiring date, payment method (selectable from pull-down menu 4175, e.g., salary, hourly), Employer-defined payroll group (selectable from pull-down menu 4180), Employer-defined labor code (selectable from pull-down menu 4185), "auto-pay" multiplier (e.g., for part-time employee who works same schedule every day—4 hours/day—multiplier set to 0.5), status indicator regarding whether the employee is exempt from overtime pay, status indicator regarding whether the employee is paid for holidays, and status indicator regarding whether the employee is eligible for pension or profit sharing, as reported on fie employee's W-2 form. This information is used to calculate the employee's income, as performed in step 1010 in FIG. 2.

Figure 18C:
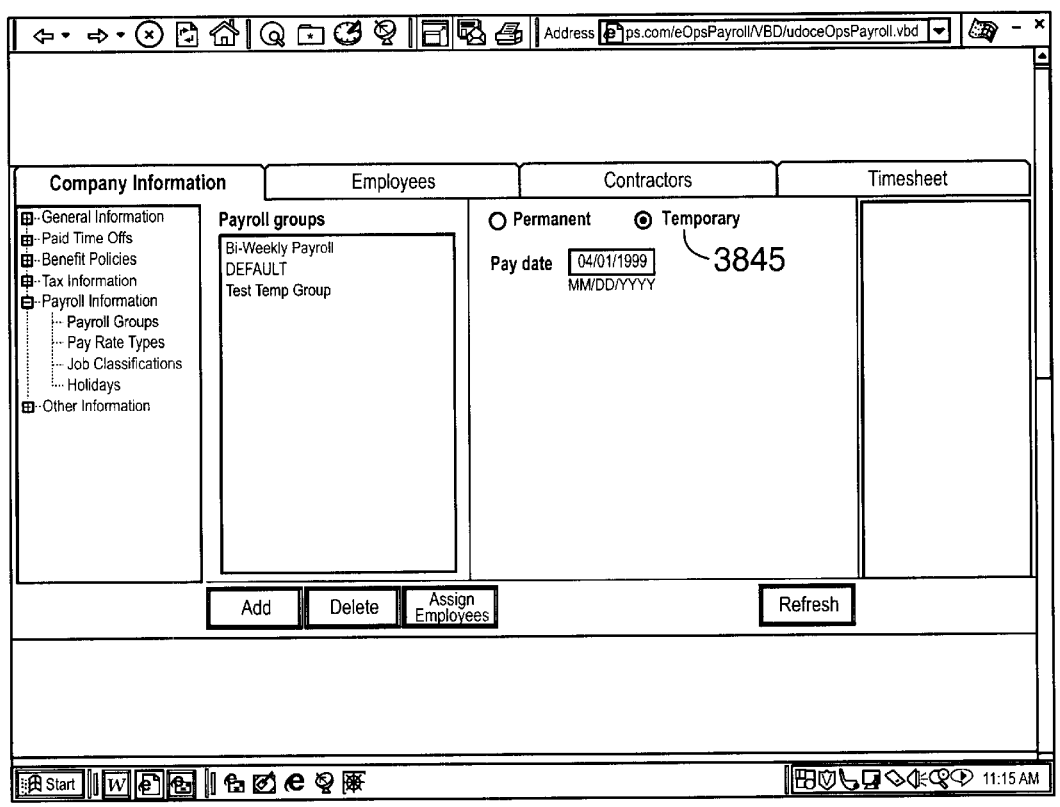
FIG. 18(c) shows a screen print of another view of an interactive user interface for displaying Employer-defined payroll groups in an embodiment of the present invention.

Clicking "Payroll Groups" button 4190 causes the system to display the previously-described "Payroll Groups" interface, shown in FIGS. 18(a)–(c), which enables the user to view and modify the payroll group, including assignment or reassignment of employees. Clicking "Labor Codes" button 4195 causes the system to display the previously-described "Labor Codes" interface, shown in FIG. 25, which enables the user to view and modify the labor codes.

Figure 28B:
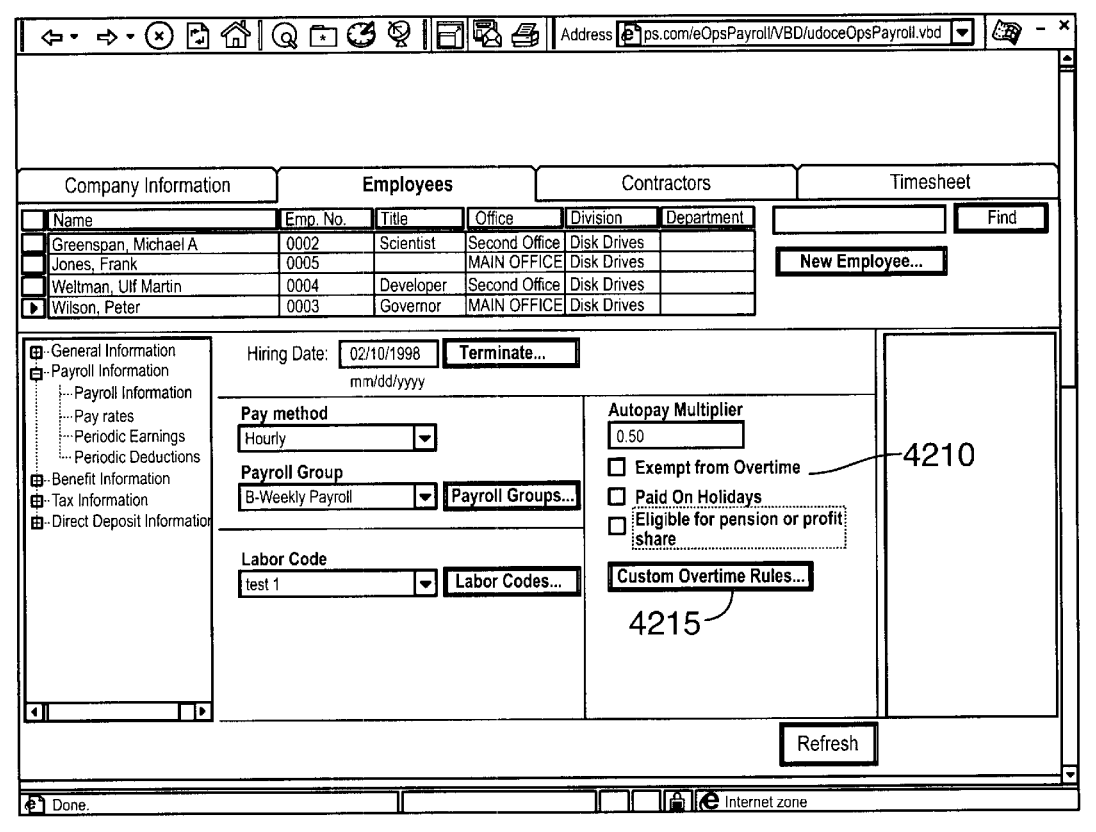
Figure 28C:
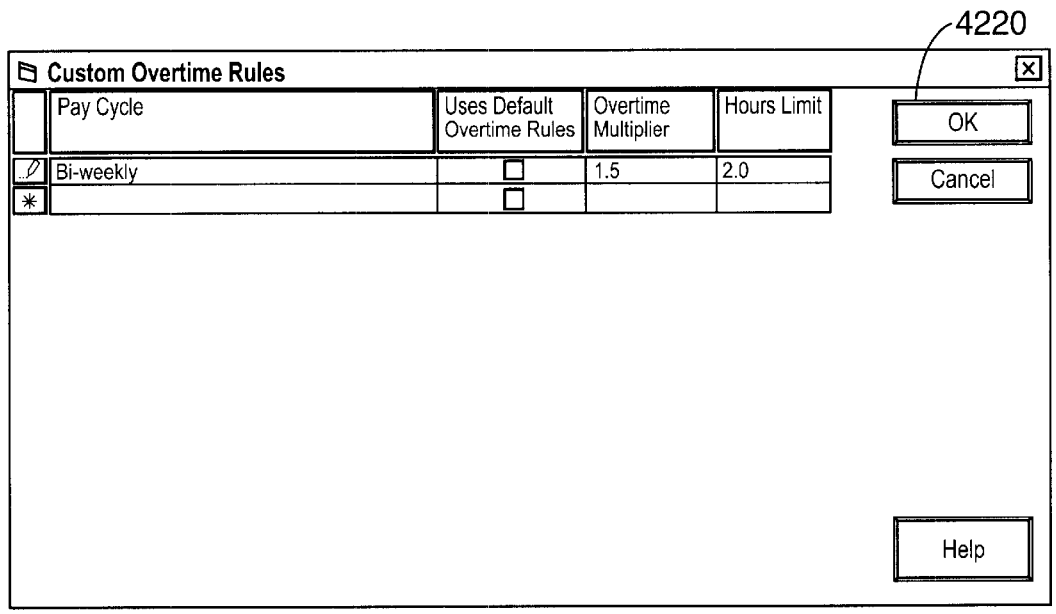
FIG. 28(c) shows a screen print of an interactive user interface for displaying Employer-defined overtime rules in an embodiment of the present invention.

If the selected employee is not exempt from overtime pay (as indicated by exemption indicator 4210), as shown in FIG. 28(b), the user can view and modify any customized overtime rules applicable to the employee by clicking "Custom Overtime Rules" button 4215. That action causes the system to display the "Custom Overtime Rules" interface, illustrated by FIG. 28(c), which displays and enables modification of such rules, including the following properties: pay cycle (e.g., "Bi-weekly"), indicator regarding whether default overtime rules apply, overtime multiplier, and overtime hours limit. This functionality enables the Employer to input custom overtime rules, e.g., overtime rates determine by union bargaining agreements.

Figure 29:
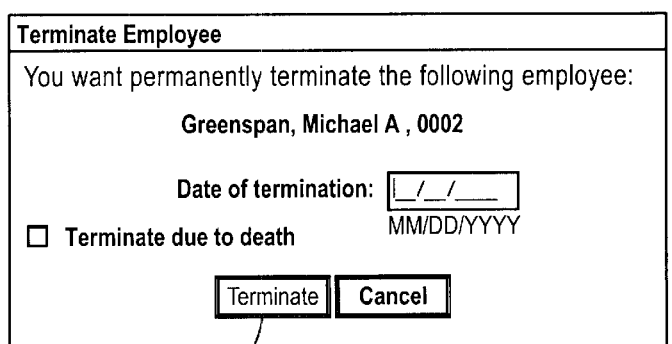
FIG. 29 shows a screen print of an interactive user interface for setting the termination date of an employee in an embodiment of the present invention.

The "Payroll Information" interface also provides the Employer with functionality to record the termination of an employee. Such functionality is activated by clicking "Terminate" button 4200, as shown in FIG. 28(a). That action causes the system to display the "Terminate Employee" interface shown in FIG. 29. This interface displays the name and employee number of the selected employee and enables the Employer to set the termination date of an employee, as well as a status indicator regarding whether the termination is due to death of the employee. Clicking "Terminate" button 4222 causes the system to record the particular employee's status as terminated. Using this information, the system enables an Employer to print a final paycheck or W-2 report on demand to give to a terminated employee on the employee's final workday. By setting the employee's termination date in advance, the Employer can issue a prorated final paycheck, including prorated earnings and deductions. The system permits the Employer to enter a termination date subsequent to the current payroll period; when the payroll period that includes the termination date occurs, the system performs all payroll calculations related to the termination.

The user can refresh the information displayed on the "Payroll Information" interface by clicking "Refresh" button 4205 in FIG. 28(a).

b. Pay Rates

Figure 30A:
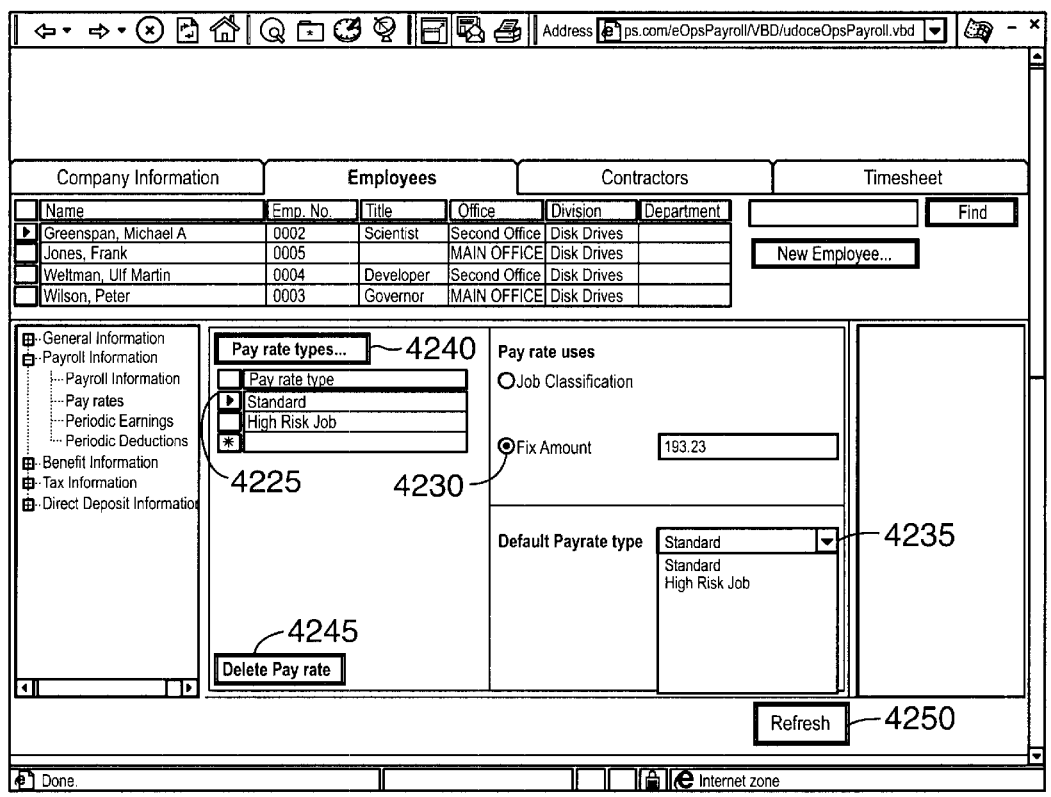
FIG. 30(a) shows a screen print of an interactive user interface for displaying pay rate information regarding a particular employee in an embodiment of the present invention.

The "Pay Rates" interface, illustrated in FIG. 30(a), enables modification of the pay rate types applicable to the selected employee. This information is used to calculate the employee's income, as performed in step 1010 in FIG. 2. The system displays the employee's pay rate types in a selectable list in "Pay Rate Type" field 4225. For each applicable pay rate type, the system displays a status indicator regarding whether the particular pay rate is derived from the employee's pay rate type or job classification. For example, in FIG. 30(a), in which a "Standard" pay rate type is displayed, the "Fix Amount" use indicator 4230 is set with an hourly rate amount of $193.23. The employee's default pay rate type (e.g., "Standard") can be changed in pulldown menu 4235. Clicking "Pay Rate Types" button 4240 causes the system to display the previously-described "Pay Rate Types" interface, shown in FIGS. 21(a)–(b), which enables the user to view and modify Employer-defined pay rate types.

Figure 30B:
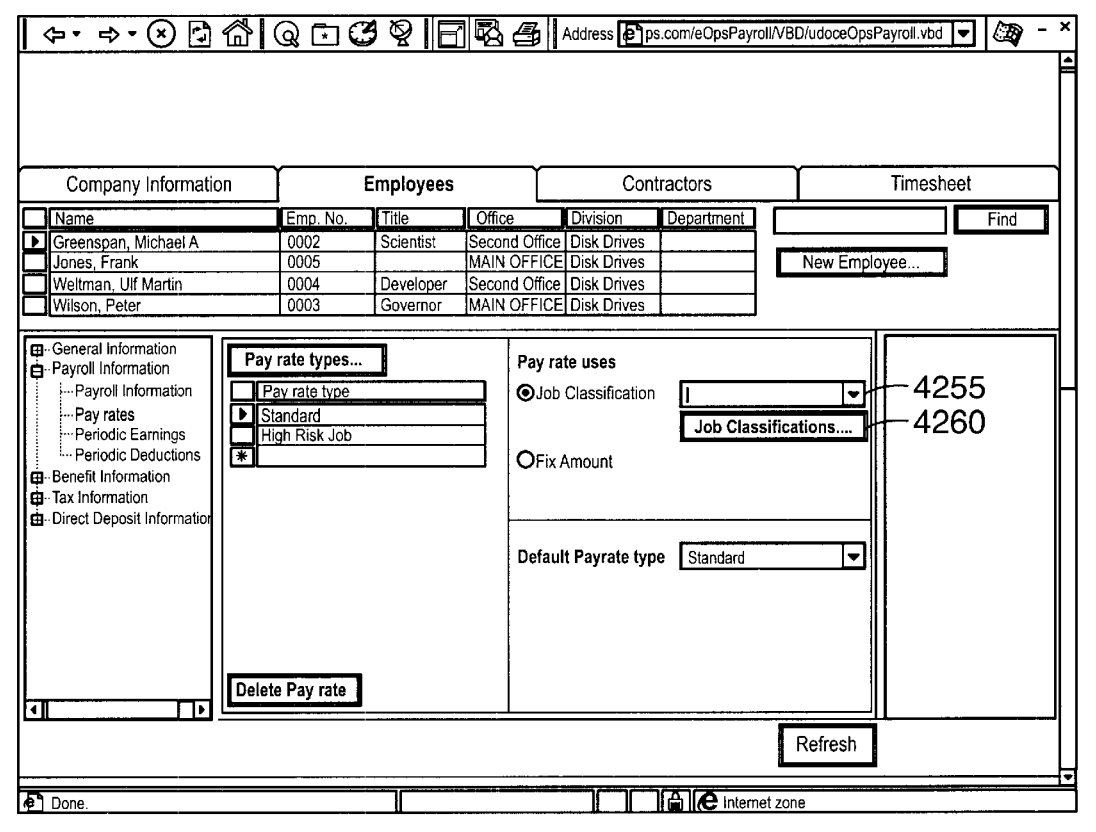

In FIG. 30(b), the "Job Classification" use indicator is set with job classifications listed in associated pull-down menu 4255. Clicking "Job Classifications" button 4260 causes the system to display the previously-described "Job Classifications" interface, shown in FIG. 22, which enables input and modification of Employer-defined pay scales for particular job classifications.

As shown in FIG. 30(a), the Employer can delete a pay rate type from the employee's list by selecting the pay rate type in "Pay Rate Type" field 4225 and clicking "Delete Pay Rate" button 4245. The user can refresh the information displayed on this interface by clicking "Refresh" button 4250.

c. Periodic Earnings

Figure 31:
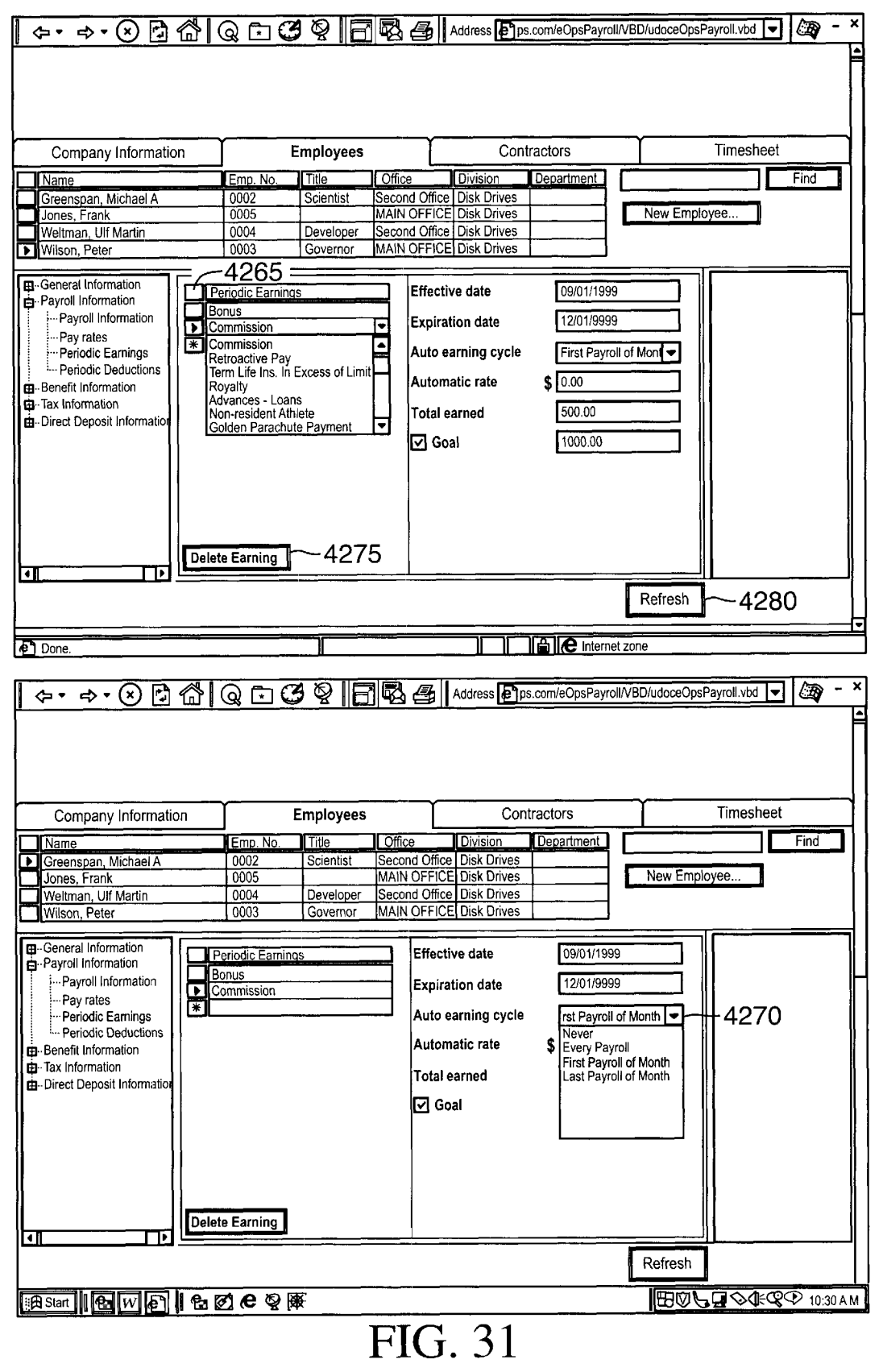

The "Periodic Earnings" interface, illustrated in FIG. 31, displays and enables modification of periodic earnings (i.e., non-wage payments and fringe benefits) applicable to the elected employee. This information is used to calculate the employee's income, as performed in step 1010 in FIG. 2. The system displays the applicable periodic earnings (e.g., "Commission," "Bonus," "Non-business Use of Company Car") in a selectable list in "Periodic Earnings" field 4265. For the highlighted periodic earning, the system displays information including: effective date, expiration date, automatic earning cycle (selectable from pull-down menu 4270), automatic rate, total periodic earnings, and periodic earnings goal, if applicable, including indicator and goal amount.

The Employer can delete a periodic earning from the employee's list by selecting the earning in "Periodic Earnings" field 4265 and clicking "Delete Earning" button 4275. The user can refresh the information displayed on this interface by clicking "Refresh" button 4280.

d. Periodic Deductions

Figure 32:
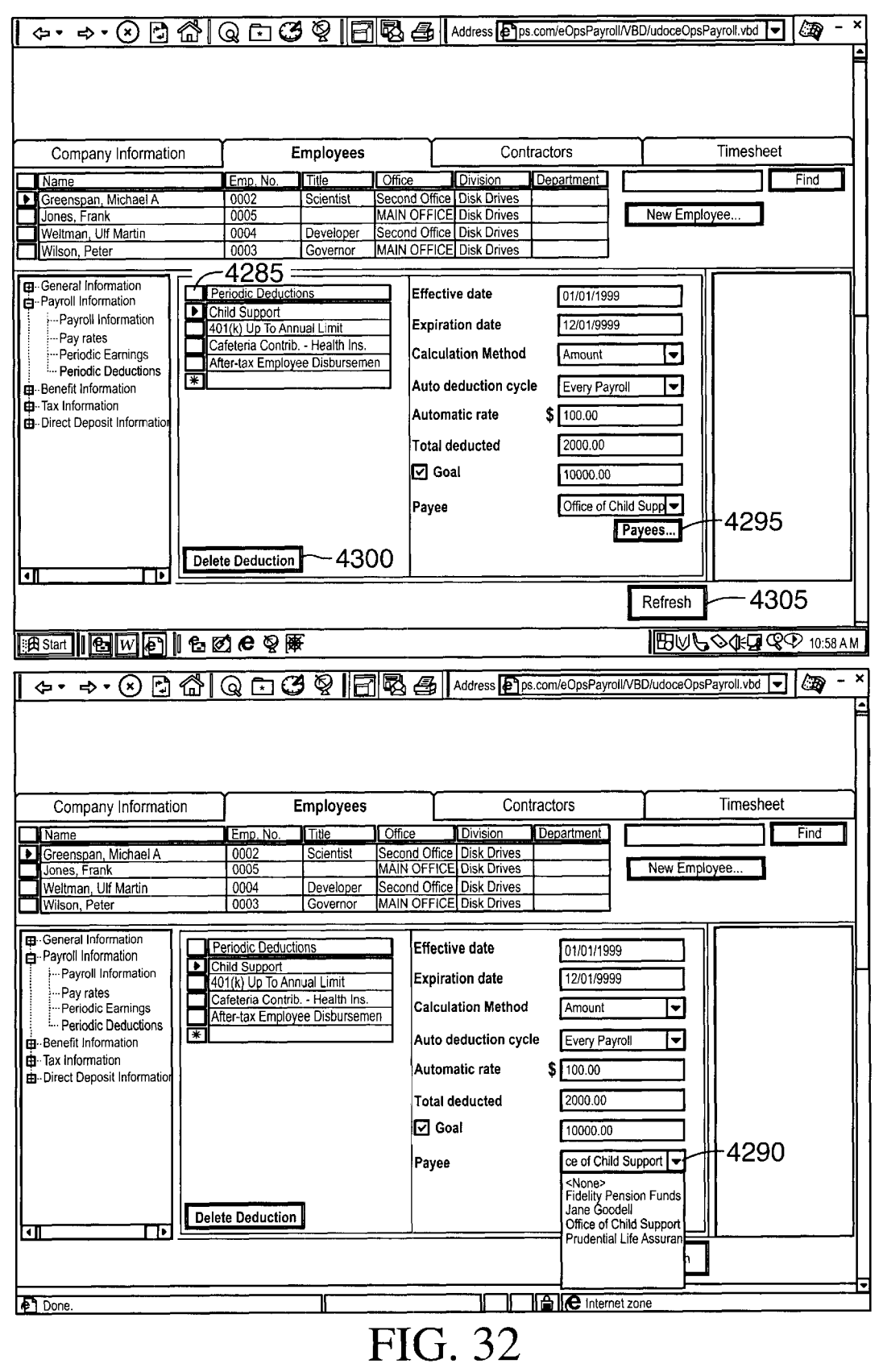

The "Periodic Deductions" interface, illustrated in FIG. 32, displays and enables modification of periodic paycheck deductions applicable to the selected employee. This information is used to calculate pre-tax and post-tax payroll deductions (including liens), as performed in steps 1030 and 1060, respectively, in FIG. 2. These deductions can include non-benefit deductions that are a periodic, fixed amount (or percentage), such as mortgage payments, child support, or charitable contributions. The system displays the applicable periodic deductions (e.g., "Child Support," "401(k) Up To Annual Limit") in a selectable list in "Periodic Deductions" field 4285. For the highlighted periodic deduction, the system displays information including: effective date, expiration date, calculation method (selectable from pull-down menu, e.g., fixed amount, percent of net wages, percent of gross wages, etc.), automatic deduction cycle (selectable from pull-down menu, e.g., never, every payroll, first payroll of month, last payroll of month), automatic rate, total periodic deductions, periodic deductions goal, if applicable, including indicator and amount, and payee name (selectable from pull-down menu 4290). The system will automatically handle the tax consequences of employees' pre-tax deductions, based on the payee information contained in payees data 70, without requiring any additional paperwork or data entry. Clicking "Payees" button 4295 causes the system to display the previously described "Payees" interface, shown in FIG. 13, which enables the user to view information regarding the highlighted payee.

The Employer can delete a periodic deduction from the employee's list by selecting the deduction in "Periodic Deductions" field 4285 and clicking "Delete Deduction" button 4300. The user can refresh the information displayed on this interface by clicking "Refresh" button 4305.

3. Benefit Information

Figure 33:
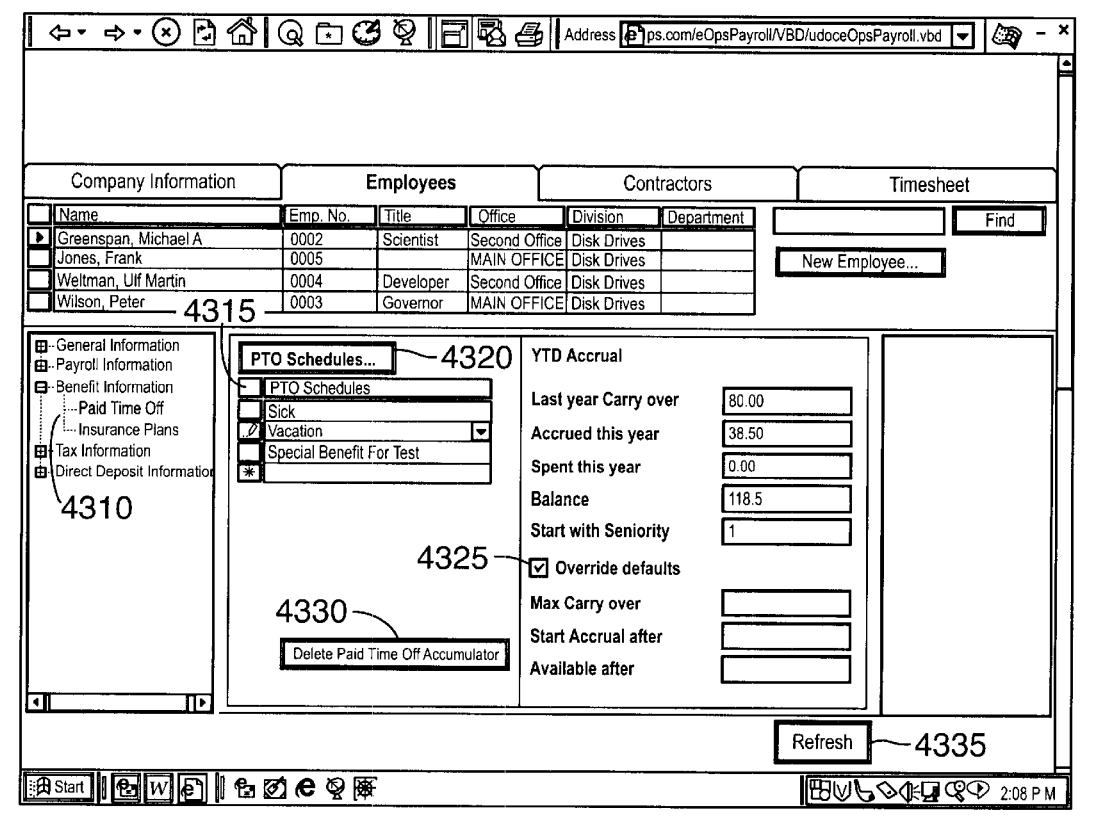

This function is divided into two user interfaces, each of which is selectable from navigation bar 4100 in FIG. 26 by clicking on "Benefit Information," which causes the interface names in sub-menu 4310 of FIG. 33 to be displayed.

a. Paid Time Off

The "Paid Time Off" interface, illustrated in FIG. 33, displays and enables modification of paid-time-off schedules applicable to the selected employee. The system displays the applicable schedules (e.g., "Sick," "Vacation") in a selectable list in "PTO Schedules" field 4315. For the highlighted paid-time-off schedule, the system displays year-to-date accrual information, including: accrual carried over from prior year, amount accrued during current year, amount used during current year, calculated balance, and "seniority" in terms of the amount of paid time off that the employee starts with. For example, if two new employees begin working for Employer and one receives no seniority while the other receives 5-years' seniority, the second employee will immediately receive 3-weeks' annual vacation (i.e., awarded by Employer upon 5-years' service) and will top out at the Employer's limit of 5-weeks' annual vacation before the first employee. If "Override Defaults" indicator 4325 is set, the system overrides schedule defaults for a particular employee and display the following additional information: maximum carry over, date to begin accrual, and date accrued benefit becomes available to the employee.

Clicking "PTO Schedules" button 4320 causes the system to display the previously-described "Paid Time Off and Schedules" interface, shown in FIGS. 10–10(*a*), which enables the user to view and modify Employer-defined paid-time-off schedules. The Employer can delete a paid-time-off schedule from the employee's list by selecting the schedule in "PTO Schedules" field 4315 and clicking "Delete Paid Time Off Accumulator" button 4330. The user can refresh the information displayed on this interface by clicking "Refresh" button 4335.

b. Insurance Plans

Figure 34A:
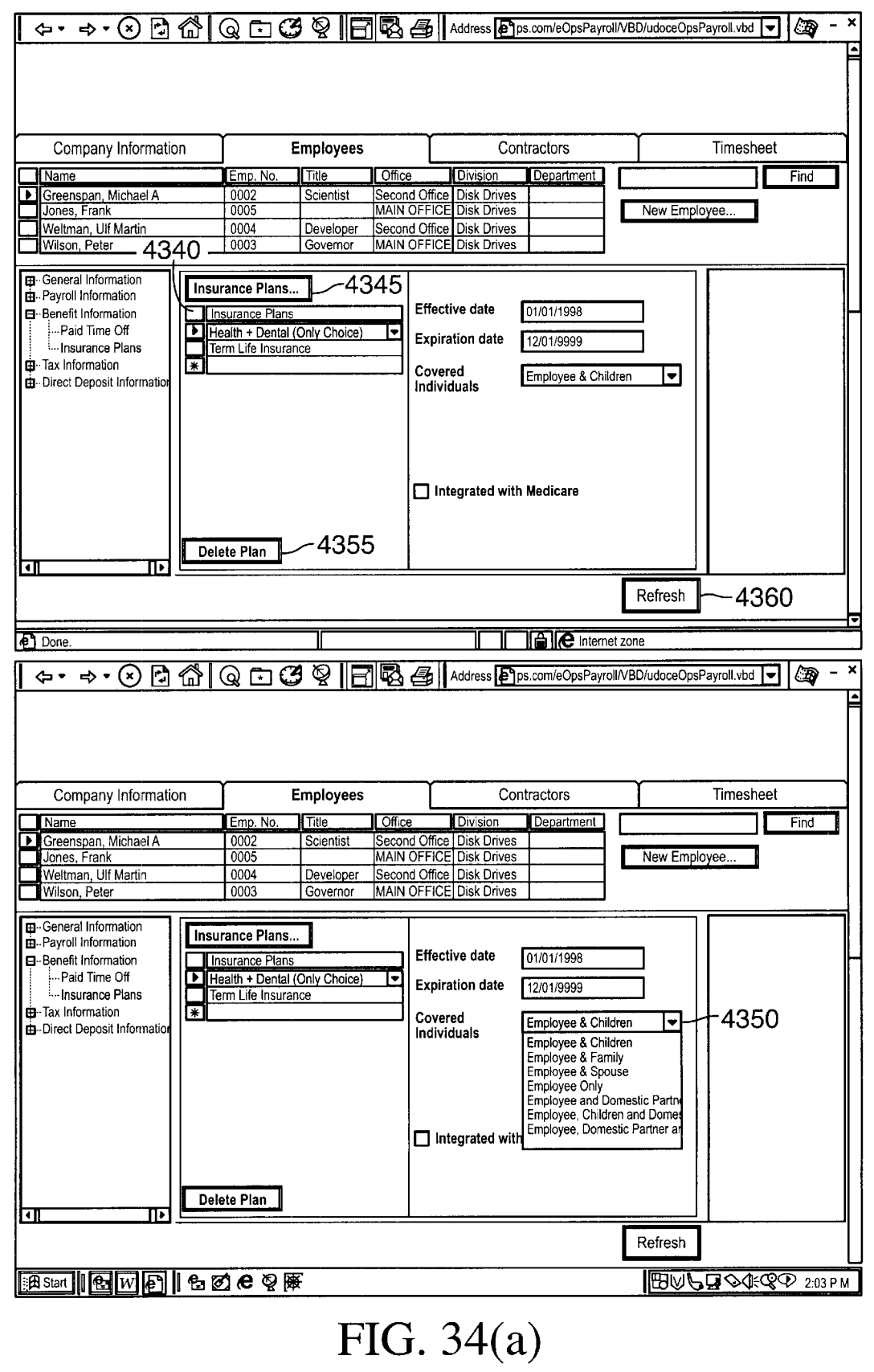
Figure 34B:
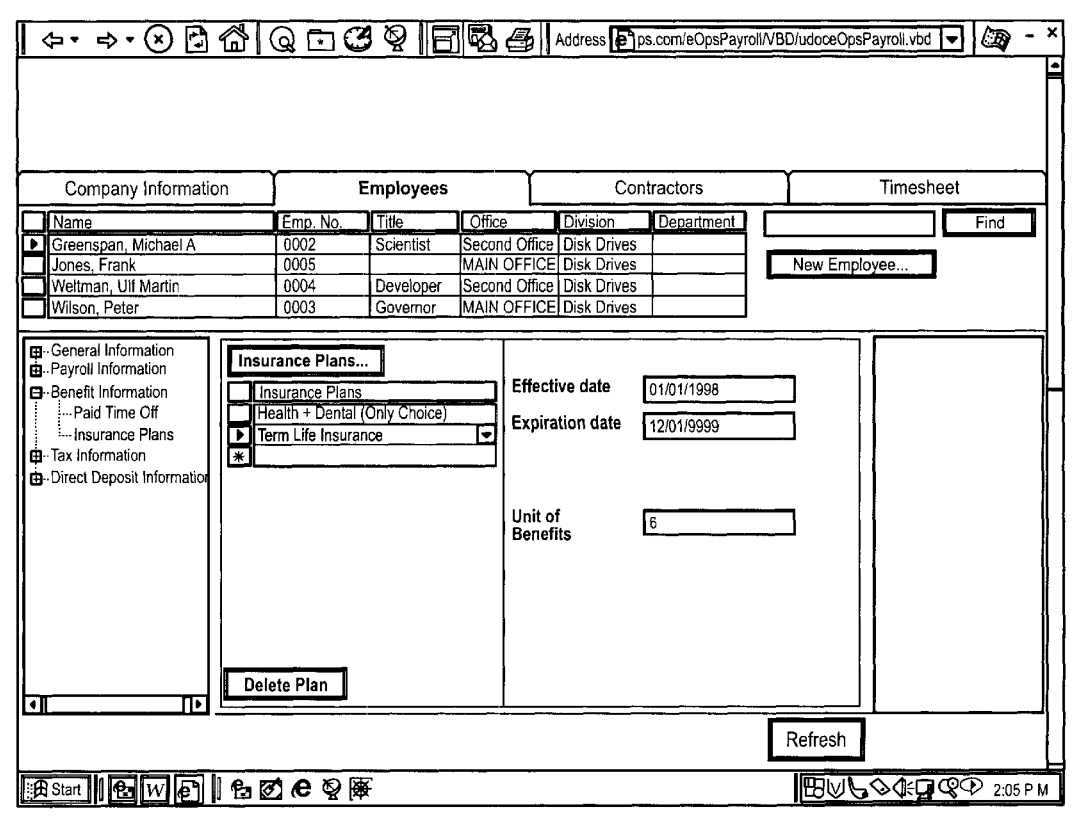

The "Insurance Plans" interface, illustrated in FIG. 34(*a*), displays and enables modification of insurance plans applicable to the selected employee. The system displays the applicable insurance plans (e.g., "Health & Dental," "Term Life Insurance") in a selectable list in "Insurance Plans" field 4345. In FIG. 34(*a*), in which the user selected the "Health & Dental" insurance plan, the system displays information including: effective date, expiration date, covered individuals (selectable from pull-down menu 4350), and a status indicator regarding whether the insurance plan is integrated with Medicare. Clicking "Insurance Plans" button 4345 causes the system to display the previously-described "Benefits" interface, shown in FIGS. 12(*a*)–12(*c*), which enables the user to view and modify employee benefit plans.

In FIG. 34(*b*), in which the user selected the "Term Life Insurance" plan, the system displays information including: effective date, expiration date, and number of units of the benefit.

As shown in FIG, 34(*a*), the Employer can delete an insurance plan from the employee's list by selecting the plan in "Insurance Plans" field 4340 and clicking "Delete Plan" button 4355. The user can refresh the information displayed on this interface by clicking "Refresh" button 4360.

4. Tax Information

Figure 35A:
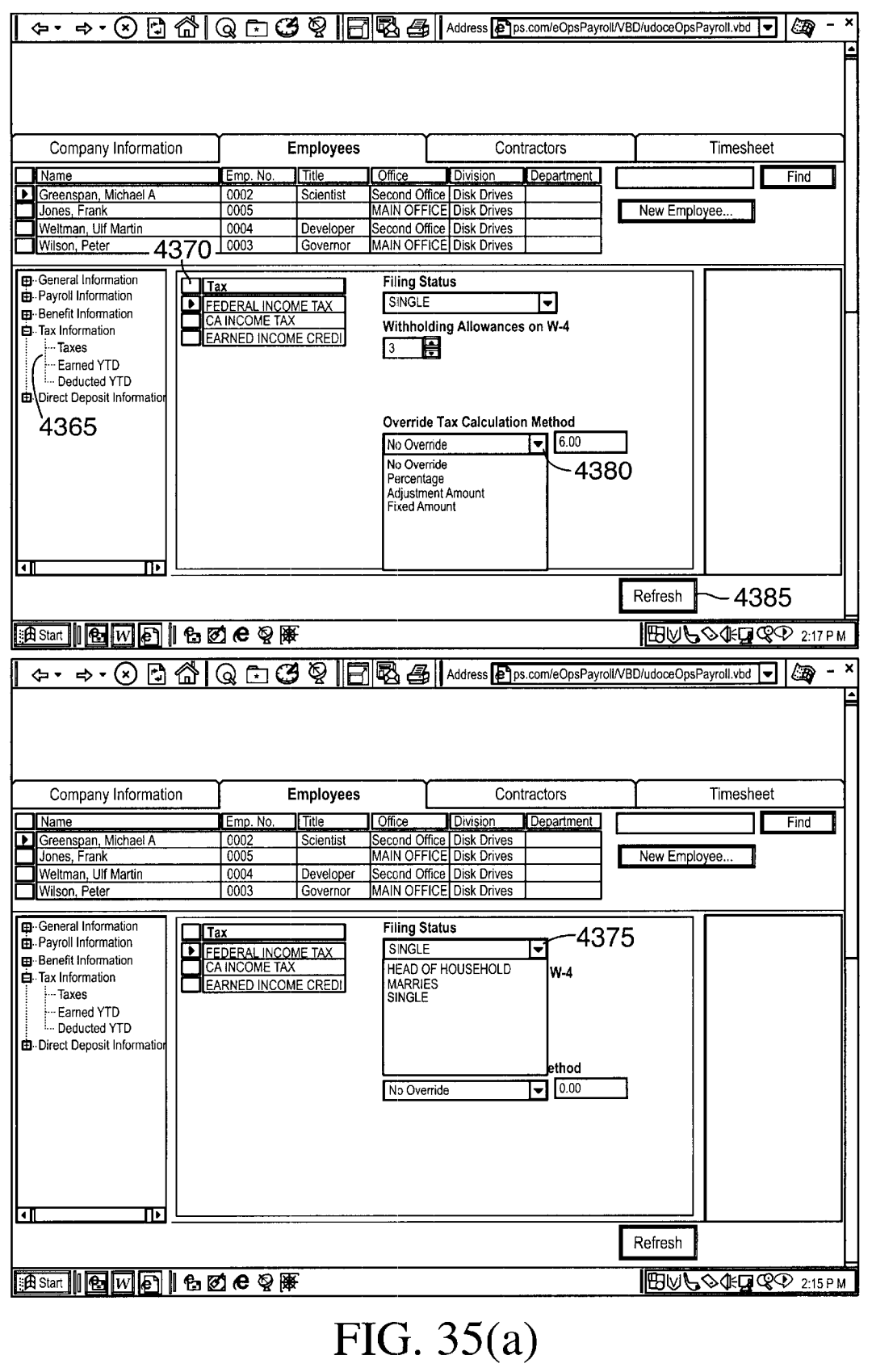
Figure 35B:
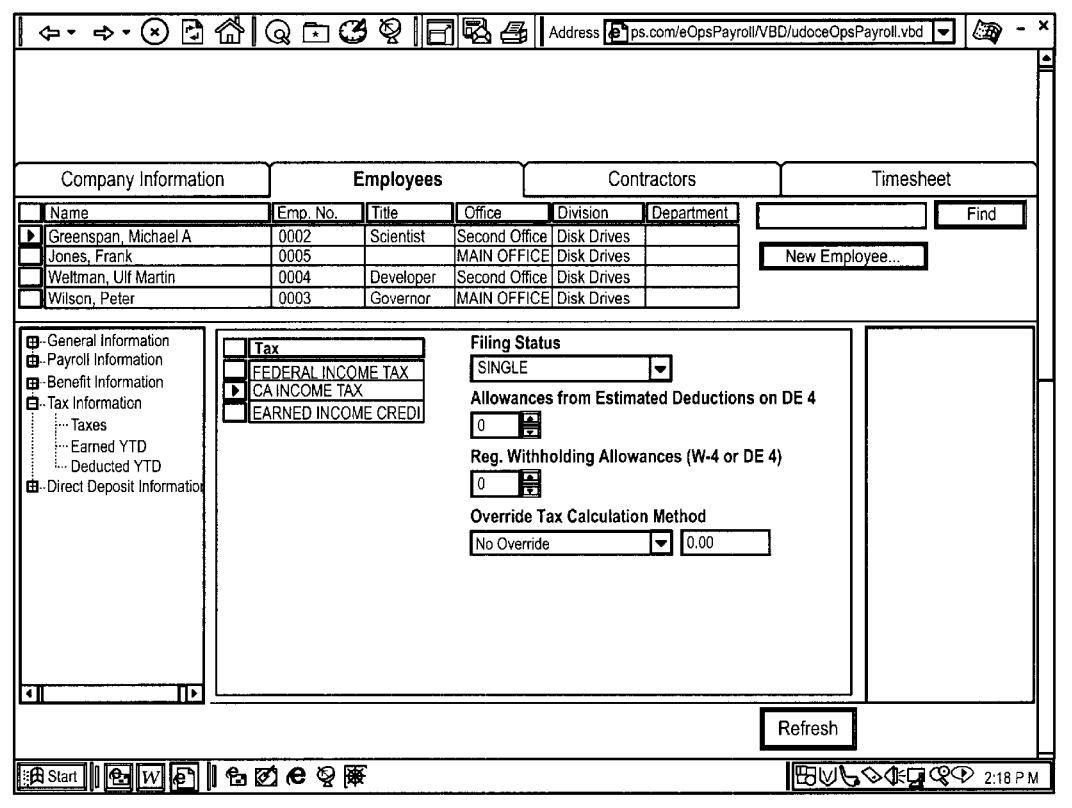

This function is divided into three user interfaces, each of which is selectable from navigation bar 4100 in FIG. 26 by clicking on "Tax Information," which causes the interface names in sub-menu 4365 of FIG. 35(*a*) to be displayed.

a. Taxes

The "Taxes" interface, illustrated in FIG. 35(*a*), displays and enables modification of tax withholding information for taxes applicable to the selected employee. This information is used to calculate payroll taxes, as performed in step 1050 in FIG. 2.

The system displays the applicable employee-withholding taxes in a selectable list in "Tax" field 4370. In FIG. 35(*a*), in which the user selected "FEDERAL INCOME TAX," the system displays information regarding the employee's federal income tax including: filing status (selectable from pull-down menu 4375, e.g., single, head of household, married), number of W-4 withholding allowances, and a possible method to override the calculated tax amounts or rates, if applicable (selectable from pulldown menu 4380, e.g., none, percentage, adjustment amount, fixed amount).

In FIG. 35(*b*), in which the user selected "CA INCOME TAX," the system displays information regarding the employee's California income tax including filing status, number of DE-4 allowances, number of regular (W-4) withholding allowances, and override tax calculation method and amount/rate, if applicable.

Note that the system customizes the "Taxes" interface based on information specific to the particular tax authority. This data is stored in the system server in tax authorities data 80, rather than programmed into the client.

The user can refresh the information displayed on this interface by clicking "Refresh" button 4385, as shown in FIG. 35(*a*).

b. Earned Year-To-Date

Figure 36:
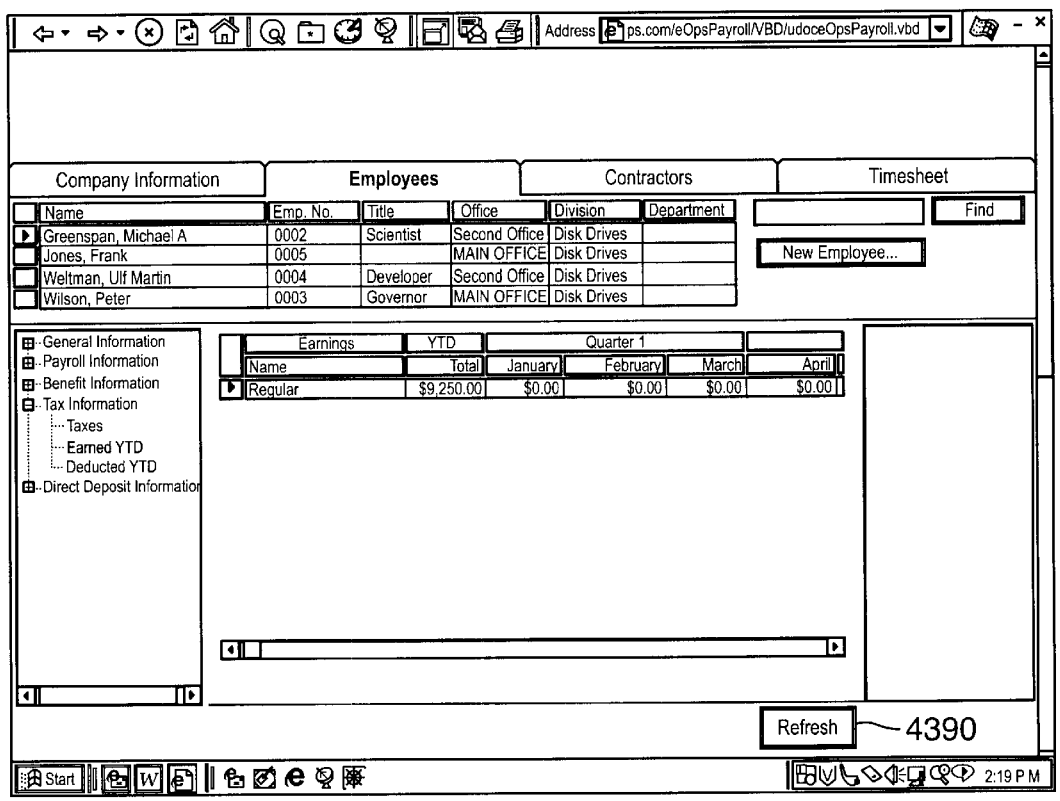
FIG. 36 shows a screen print of an interactive user interface for displaying year-to-date taxable earnings of a particular employee in an embodiment of the present invention.

The "Earned YTD" interface, illustrated in FIG. 36, displays year-to-date taxable earnings of the selected employee broken out by month and by type, for example regular income and taxable benefits. The user can refresh the information displayed on this interface by clicking "Refresh" button 4390.

c. Deducted Year-To-Date

Figure 37:
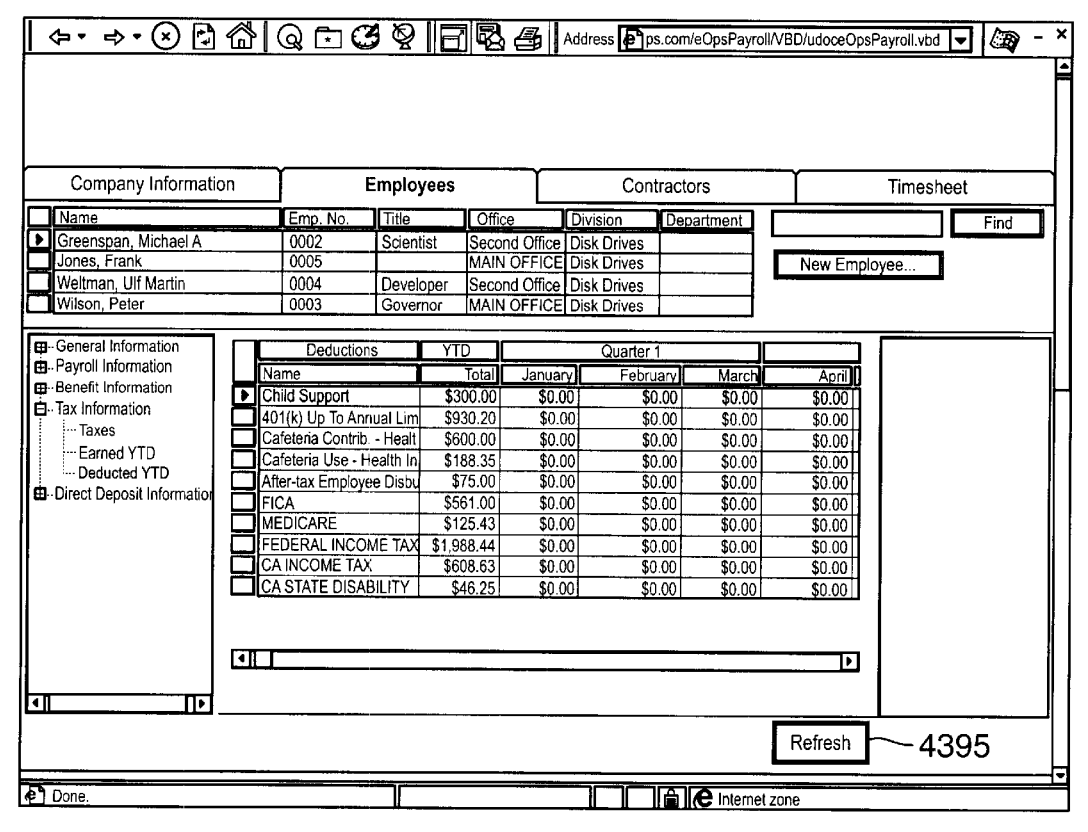

The "Deducted YTD" interface, illustrated in FIG. 37, displays year-to-date tax deductions of the selected employee broken out by month and by type, for example, federal income tax, California income tax, FICA, Medicare, California disability tax, 401(k) contribution, pre-tax health insurance payments, etc. The user can refresh the information displayed on this interface by clicking "Refresh" button 4395.

5. Direct Deposit Information

This function consists of one user interface which is selectable from navigation bar 4100 in FIG. 26 by clicking on "Direct Deposit Information," which causes the "Direct Deposits" interface name to be displayed.

Figure 38:
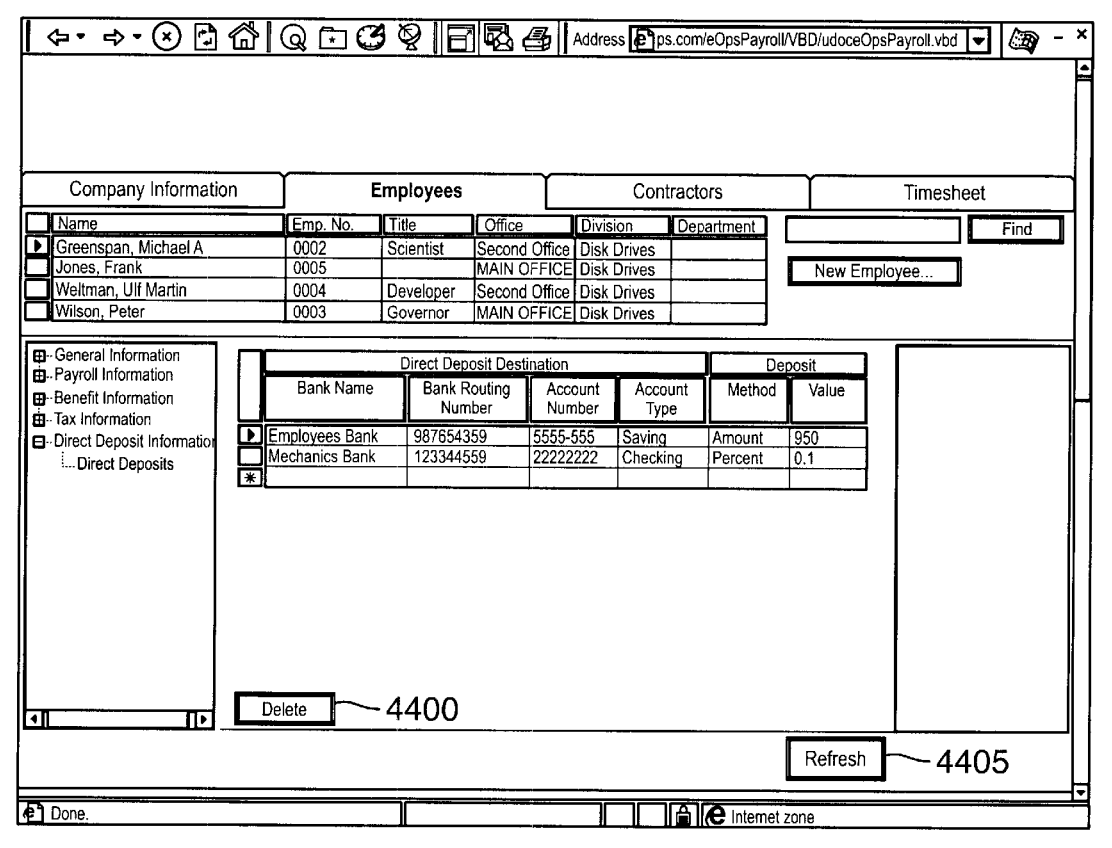

The "Direct Deposits" interface, illustrated in FIG. 38, displays and enables modification of direct deposit information regarding the selected employee. Each employee can designate one or more financial institutions for the electronic direct deposit of all or portions of the employee's paycheck. For each direct deposit destination, the system displays and allows entry of information including: bank name, bank routing number, deposit account number, deposit account type (e.g., checking, savings), deposit method (e.g., fixed amounts percentage), and deposit amount or percentage. The system performs to checksum to validate the bank routing number. This information is used to disburse payments to employees, as performed in step 1142 in FIG. 3.

The Employer can delete a direct deposit destination from the employee's list by selecting the particular destination and clicking "Delete" button 4400. The user can refresh the information displayed on this interface by clicking "Refresh" button 4405. The Employer can permit employees to access and change their respective direct deposit elections.

Contractor Information

The contractor information functionality of the system provides the user with the ability to input and modify information about the independent contractors who are included within Employer's payroll, including personal information, address information, payroll information, earnings and deductions information, and tax information. Much of this information is the same as the type of information stored regarding employees, except that certain information is not necessary for contractors, including paid-time-off and benefits, which contractors typically do not receive. This option is selectable by clicking on "Contractors" in navigation bar 3000 in FIG. 6. As shown in navigation bar 4535 in FIG. 39, the system presents the user with a series of three sub-options to choose from within the "Contractors" option.

Figure 39:
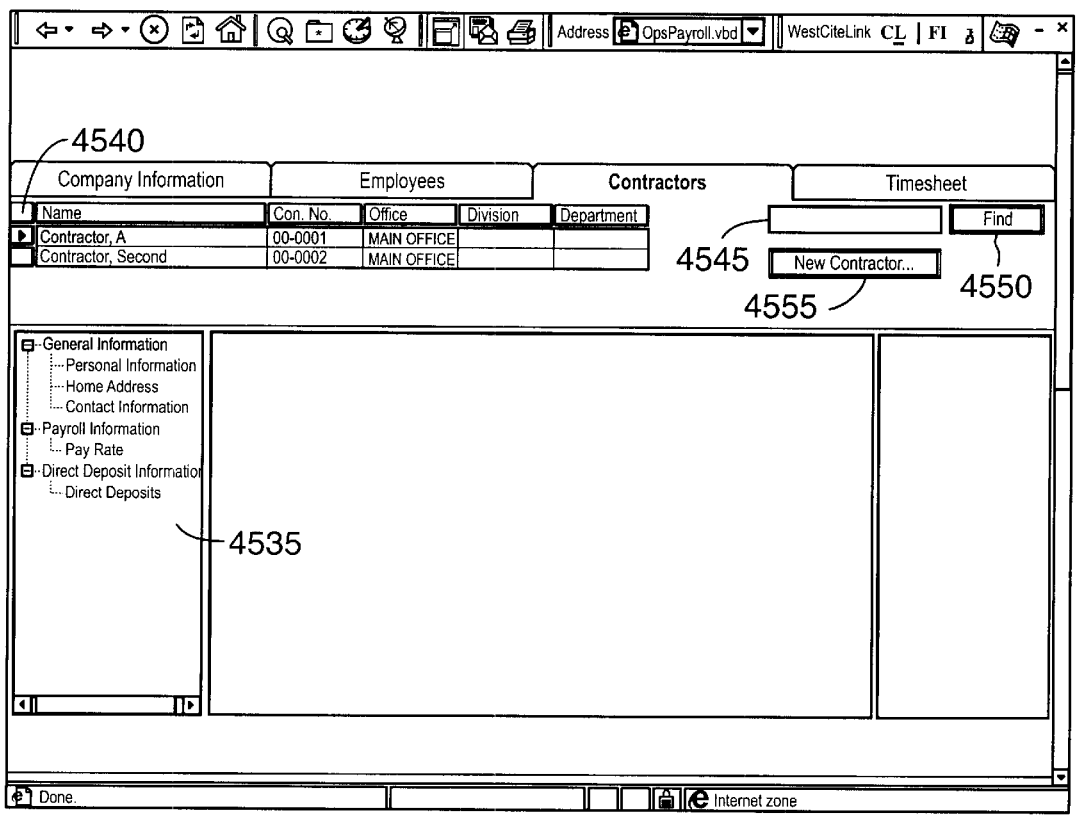
FIG. 39 shows a screen print of an interactive user interface for selecting a contractor for payroll processing in an embodiment of the present invention.

Each sub-option within the "Contractors" option includes a feature that enables the user to select a particular contractor from the display list of contractors, as shown in FIG. 39. By clicking on the name of a contractor (e.g., "Contractor, A.") in display list 4540, the user can select a contractor for the purpose of reviewing or modifying the contractor's information. The user call also enter a contractor name in field 4545 and click "Find" button 4550 in order to locate a particular contractor within the list of company contractors, which is a useful function in the event that there is a long list of contractors.

Figure 39A:
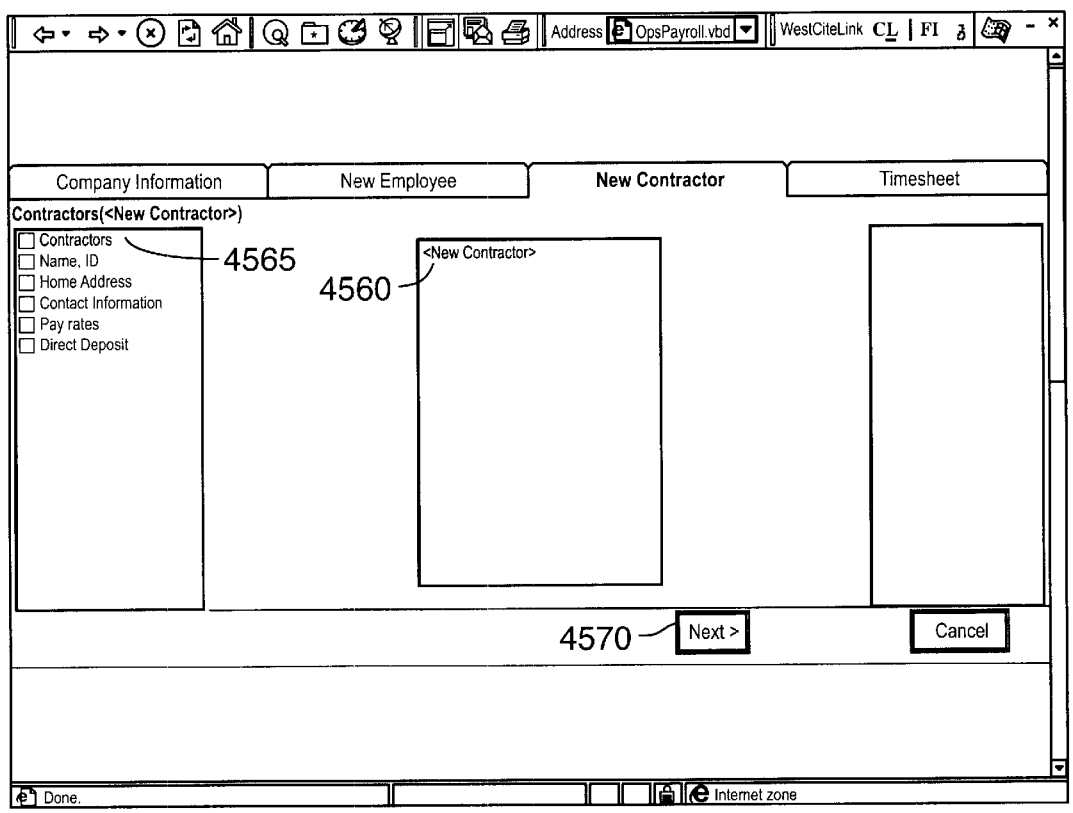
FIG. 39(a) shows a screen print of an interactive user interface for commencing input of information regarding a new contractor in a workflow sequence in an embodiment of the present invention.

Clicking "New Contractor" button 4555 causes the system to display the "New Contractor" interface, as shown in FIG. 39(a). This interface enables the Employer to enter a new contractor into employee data 30. The system guides the user through a workflow sequence that includes a subset of the sub-options of the "Contractors" option—described below—such that all required information regarding the new contractor (identified in new contractor list 4560) will be input. Each sub-option to be completed is listed as a step in option list 4565, with the current option highlighted. Clicking "Next" button 4570 causes the system to navigate the user to the next interface in the new contractor entry process.

Figure 39B:
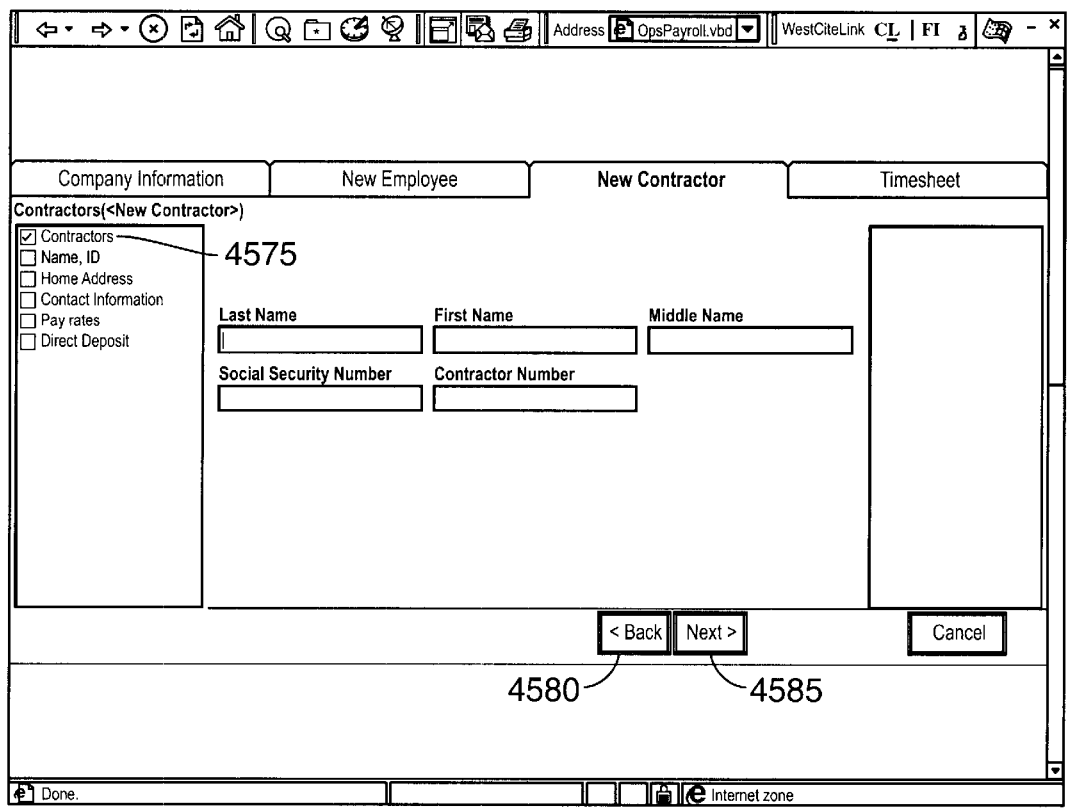
FIG. 39(b) shows a screen print of an interactive user interface for inputting information regarding a new contractor in a workflow sequence in an embodiment of the present invention.

For example, as shown in FIG. 39(b), the current option in list 4575 is "Name, ID," which requires the input of certain name and identification information regarding the new contractor. As each option is completed, the system will place a check mark adjacent to the respective option name in list 4575. Failure to input any of the required information will result in an error message and the user will not be able to advance to the next interface. Clicking "Back" button 4580 causes the system to navigate the user back to the prior interface (e.g., "Contractors"). Clicking "Next" button 4585 causes the system to navigate the user forward to the next interface (e.g., "Home Address"). A system software "wizard" enables the user to navigate backwards and forwards among the workflow screens while preserving data already entered on any of the screens.

1. General Information

This function is divided into three user interfaces, each of which is selectable from navigation bar 4500 in FIG. 39 by clicking on "General Information," which causes the interface names "Personal Information," "Home Address," and "Contact Information" to be displayed.

a. Personal Information

The "Personal Information" interface (not shown) is the same as the employee "Personal Information" interface illustrated by FIG. 27(a) and enables input and modification of personal information regarding the selected contractor, including: name, contractor number, title, social security number, date of birth, marital status (selectable from pull-down menu, race (selectable from pull-down menu), and gender.

b. Home Address

The "Home Address" interface (not shown) is the same as the employee "Home Address" interface illustrated by FIG. 27(b) and enables input and modification of home address information regarding the selected contractor, including: street address, city, state, county, zip code, telephone number, fax number, and e-mail address. The system uses the contractor's zip code and city to determine applicable tax authorities and tax rules.

c. Contact Information

The "Contact Information" interface (not shown) is similar to the employee "Contact Information" interface illustrated by FIG. 27(c) and enables input and modification of company contact information regarding the selected contractor, including: Employer-defined office (selectable from pull-down menu), Employer-defined division (selectable from pull-down menu), and Employer-defined department (selectable from pull-down menu).

2. Payroll Information

This function consists of one user interface which is selectable from navigation bar 4535 in FIG. 39 by clicking on "Payroll Information," which causes the "Pay Rates" interface name to be displayed.

The "Pay Rates" interface for contractors is the same as that for employees, as illustrated by FIGS. 30(a)–(b) and previously described. This interface enables modification of the pay rate types applicable to the selected contractor. This information is used to calculate the contractor's income, as performed in step 1010 in FIG. 2.

3. Direct Deposit Information

This function consists of one user interface which is selectable from navigation bar 4535 in FIG. 39 by clicking on "Direct Deposit Information," which causes the "Direct Deposits" interface name to be displayed.

The "Direct Deposits" interface for contractors is the same as that for employees, as illustrated by FIG. 38 and previously described. This interface displays and enables modification of direct deposit information regarding the selected contractor. Each contractor can designate one or more financial institutions for the electronic direct deposit of all or portions of the contractor's paycheck. This information is used to disburse payments to contractors, as performed in step 1142 in FIG. 3.

Timesheet and Payroll Features

The timesheet and payroll functionality of the system enables the Employer to process (i) current, (ii) out-of-order, or (iii) unscheduled payrolls for a particular pay date, including: review, recalculation (if necessary), and approval of individual and aggregated timesheets and paychecks; generation of payroll disbursements to employees, tax authorities, benefit providers, and miscellaneous payees of employees; generation of checks and electronic transactions for payment of the disbursements; and generation of payroll reports. This option is selectable by clicking on "Payroll" in navigation bar 3000 in FIG. 6.

The "Payroll" option allows the Employer to view, process, and generate reports regarding current, regularly-scheduled payrolls, out-of-order payrolls, or unscheduled payrolls, such as bonus distributions. This distinction is made by the user's selection of either (i) the "Current Payroll" indicator 4410, as shown in FIG. 40(a), or (ii) the "Unscheduled Payroll" indicator 4510, as shown in FIG. 41(a). Within the selected payroll, the Employer can also specify a particular Employer-defined payroll group from pull-down menu 4450, as shown in FIG. 40(a), including a temporary payroll group created for purposes of a special payroll. For example, an Employer could create a temporary payroll group for an out-of-order (i.e., future) payroll for the purpose of forecasting future expenses. Clicking "Payroll Groups" button 4445 causes the system to display the previously-described "Payroll Groups" interface, shown in FIGS. 18(a)–(c), which enables the user to view and modify the payroll group, including assignment or reassignment of employees. For the selected payroll, the system displays and enables modification of the inclusive dates of the payroll as well as the pay date.

For each payroll to be processed, the timesheet and payroll interface enables the Employer to view the payroll from three reporting views: (1) aggregated timesheet summary for all employees within the selected payroll group; (2) timesheet detail for a particular employee within the selected payroll group; and (3) paycheck detail for a particular employee within the selected payroll group. The user can view one, two, or all three of these views on the same screen, depending upon the user's setting of certain display indicators.

1. Show Timesheet Summary

As shown in FIG. 40(a), if the user checks "Show Summary" indicator 4415, the system displays "Timesheet Summary" table 4420 for the selected payroll and payroll group, in this case the "DEFAULT" group within the current payroll. The displayed information corresponds to summary data 1090 in FIG. 2.

For each employee and contractor in the payroll group for the pay period, the table displays information including: name, total hours worked, regular hours worked, hours per each Employer-defined paid-time-off schedule (e.g., sick, vacation, personal, holiday), Form 1099 hours, calculated overtime hours, and status indicators showing (i) whether the employee's timesheet is approved and (ii) whether the employee's paycheck is approved. Clicking "Approve All Timesheets" button 4425 causes the system to approve all individual timesheets for the pay period for the employees and contractors in the selected payroll group. Similarly, clicking "Approve All Paychecks" button 4430 causes the system to approve all individual paychecks for the pay period for the employees and contractors in the selected payroll group. The system requires that an employee's timesheet be approved before the employee's paycheck can be approved, and that the paycheck be approved before the paycheck can be printed (or deposited electronically). Note that the Employer can set security levels to control approval of timesheets and paychecks.

Clicking "Reset All to Autopay" button 4435 causes the system to reset to "autopay" all individual timesheets (regular hours and holidays) for the employees and contractors in the selected payroll group. The "autopay" function is used for employees who work the same amount of hours each pay period. The user can refresh the information displayed on this interface by clicking "Refresh" button 4468.

The timesheet and payroll interface also provides the Employer with funtionality to record the termination of an employee. Such functionality is activated by clicking "Terminate Employee" button 4440. As described above with respect to the "Payroll Information" interface, as shown in FIG. 28(a), that action causes the system to display the previously-described "Terminate Employee" interface shown in FIG. 29.

FIG. 41 (a) illustrates the "Show Summary" option where the user selected "Unscheduled Payroll" indicator 4505, in order to process a one-time payroll with a pay date of Apr. 1, 1999.

2. Show Timesheet Detail

Figure 40B:
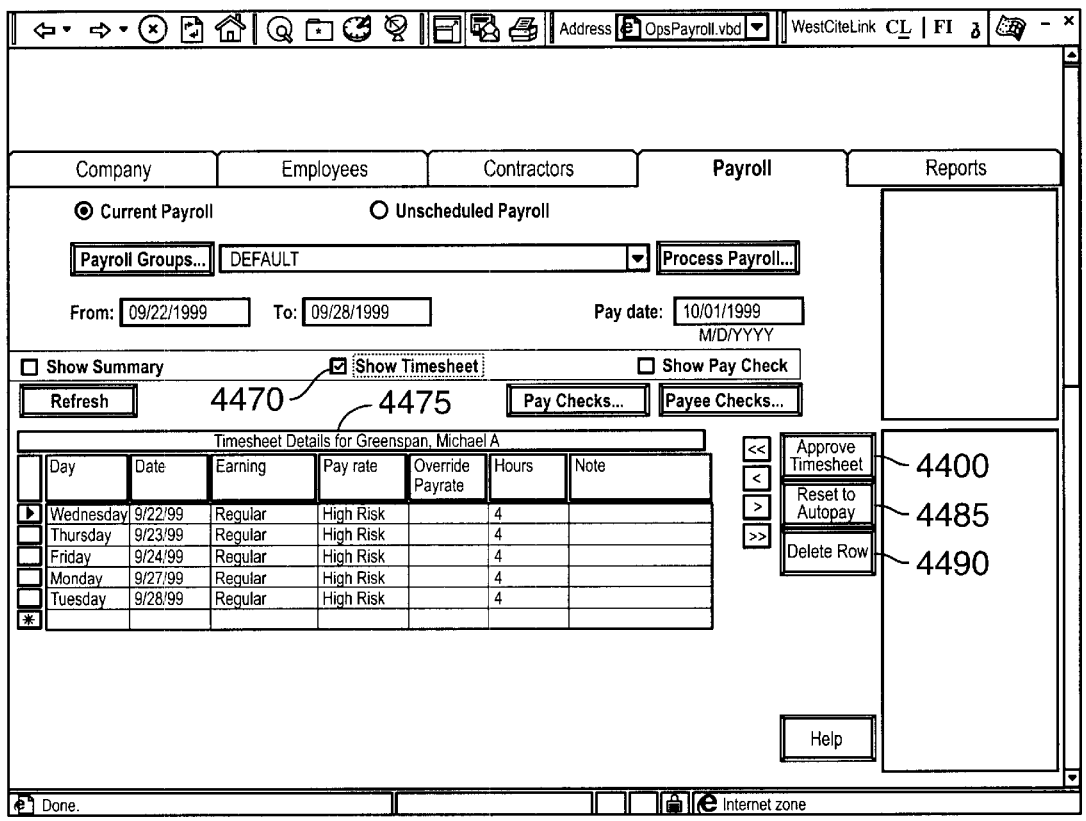
FIG. 40(b) shows a screen print of an interactive user interface for displaying a timesheet of a particular employee in the current payroll in an embodiment of the present invention.

As shown in FIG. 40(a), the user can select a particular employee or contractor by clicking on that employee's record in "Timesheet Summary" table 4420. Once the user has selected an employee or contractor, if the user checks "Show Timesheet" indicator 4470, as shown in FIG. 40(b), the system displays "Timesheet Details" table 4475 for the selected employee or contractor for the current payroll, including the following information, broken out by each day of the pay period: weekday and date, earning type (e.g., "Regular"), pay rate type (eg, "High Risk"), override pay rate type (if applicable), hours per day, and any explanatory notes. The displayed information corresponds to timesheet data 1002 collected in step 1000 in FIG. 2.

Figure 41B:
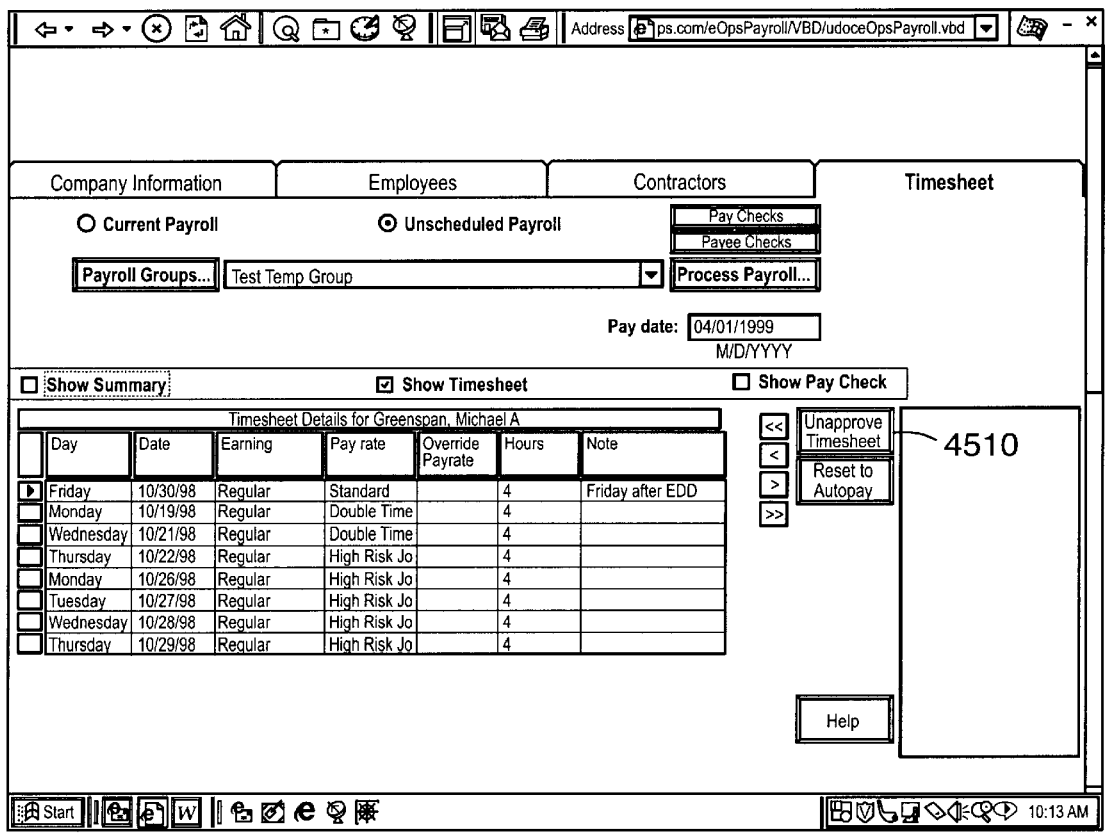
FIG. 41(b) shows a screen print of an interactive user interface for displaying a timesheet of a particular employee in an unscheduled payroll in an embodiment of the present invention.
Figure 41C:
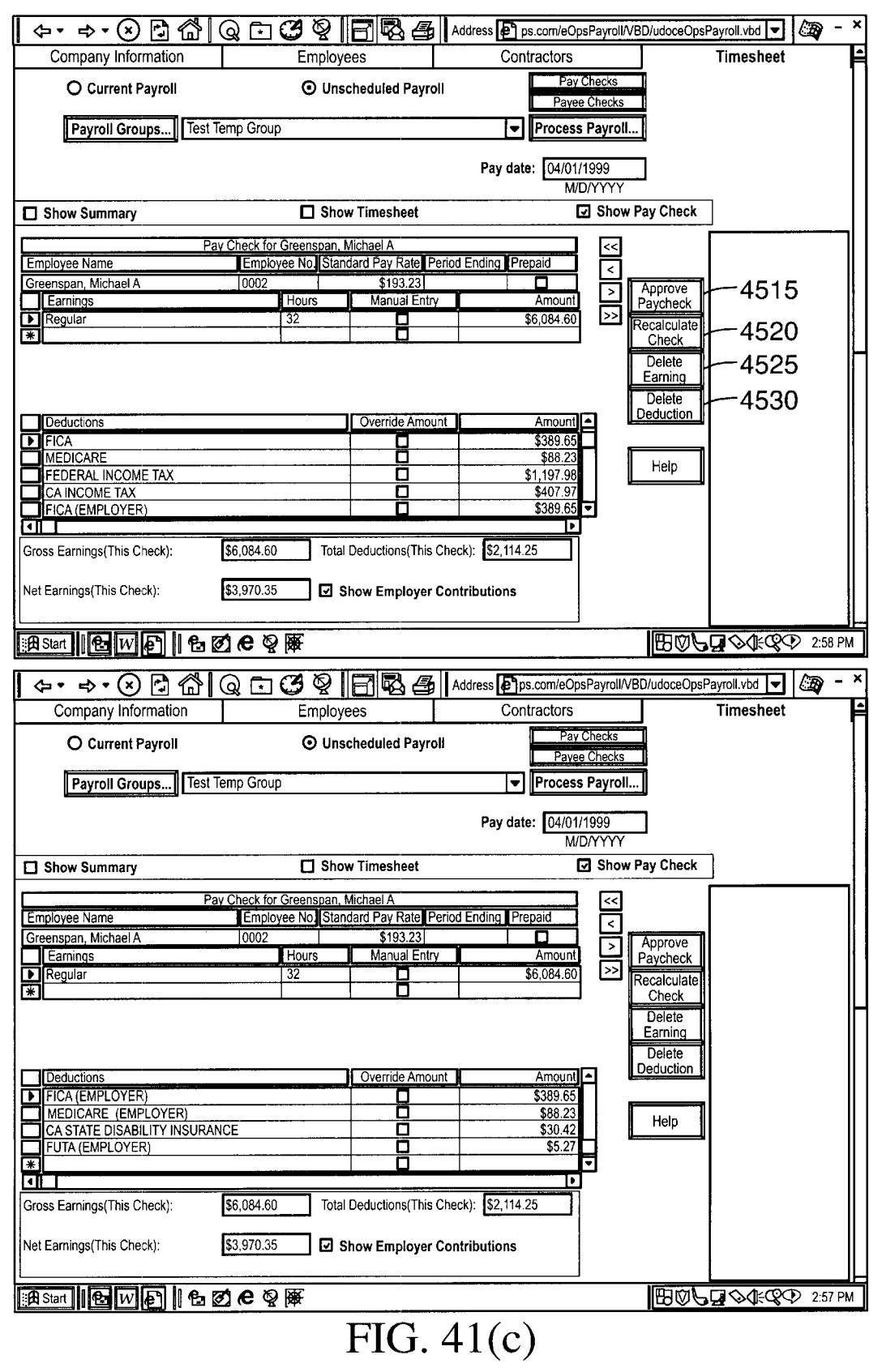

If the employee's displayed timesheet has not yet been approved, clicking "Approve Timesheet" button 4480 causes the system to approve the timesheet. Conversely, if the timesheet has already been approved, as shown in FIG. 41(b), the user can cause the system to "unapprove" the timesheet by clicking "Unapprove Timesheet" button 4510, thus allowing the Employer to modify the timesheet record. Clicking "Reset to Autopay" button 4485, as shown in FIG. 40(b), causes the system to reset the employee's timesheet to "autopay." Selecting a particular daily entry in the timesheet and clicking "Delete Row" button 4490 causes the system to delete that row.

In an embodiment of this invention, the system includes an integrated interface for online and/or offline entry of time and billing information regarding work performed by employees and/or contractors. Time and billing information includes the hourly rates that the Employer charges customers for work performed by employees and/or contractors as well as the number of hours billed by the employees and/or contractors. The interface enables such information to flow directly into the timesheets of the employees and/or contractors, without necessitating double entry of the information into the system.

FIG. 41(b) illustrates the "Show Timesheet" option for an unscheduled payroll.

3. Show Paycheck Detail

Figure 40C:
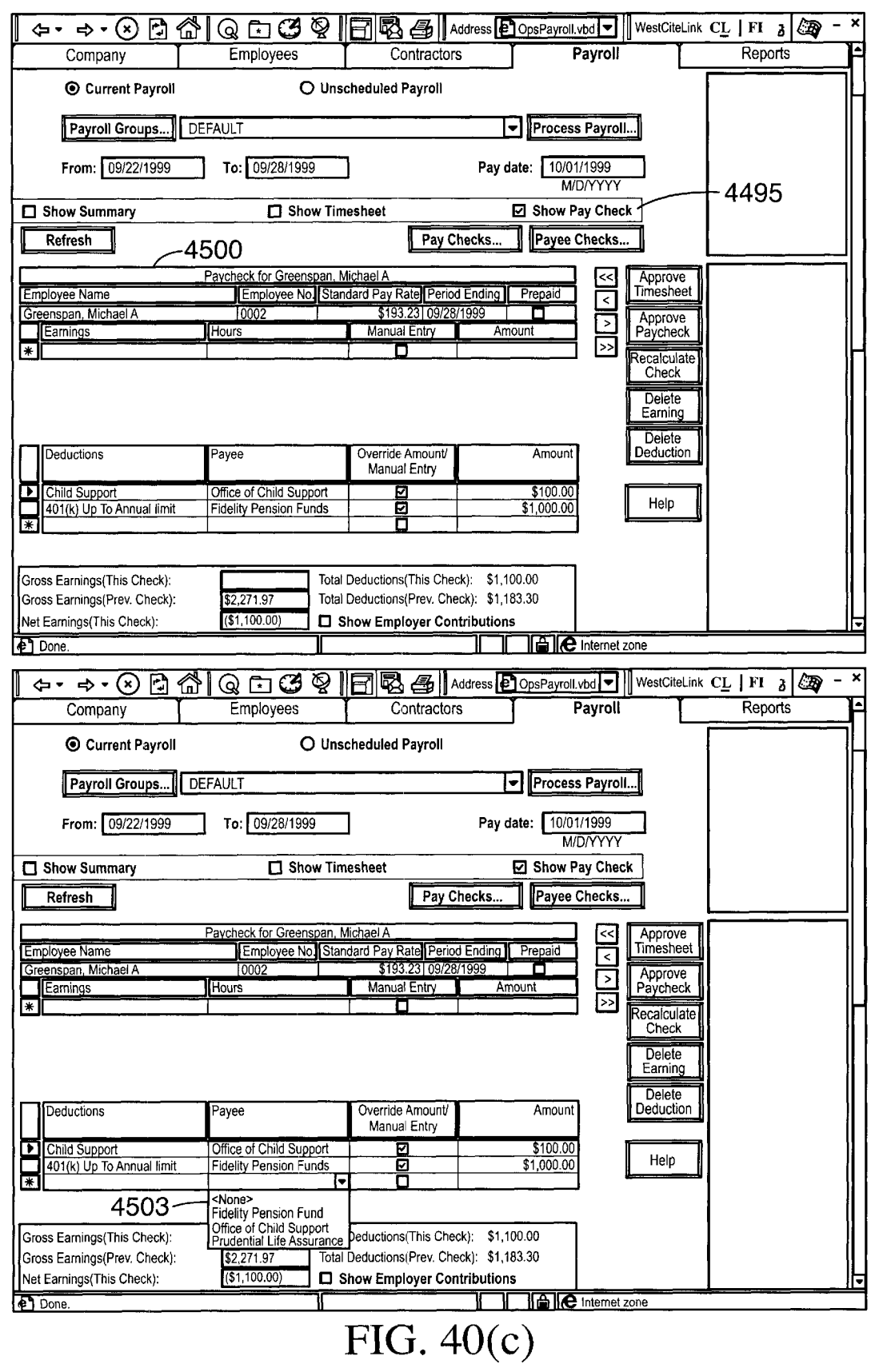

Once the user has selected an employee or contraction, if the user checks "Show Paycheck" indicator 4495, as shown in FIG. 40(c), the system displays "Paycheck" table 4500 for the selected employee or contractor for the current payroll, including the following information: name; employee identification number; standard pay rate; pay period end date; status indicator regarding whether the employee's paycheck was prepaid (e.g., if employee terminated/resigned and last day occurred prior to pay date); earnings and hours broken out by pay rate type (e.g., regular, overtime, reimbursement, health benefits, etc.); and deduction amounts broken out by type (e.g., federal income tax, state income tax, FICA, insurance premiums, 401(k) contributions, etc.), including payee name and any deduction override amounts (if applicable). Pull-down menu 4503 enables selection of a payee name for a particular deduction by the Employer or employee (if authorized by the Employer). "Paycheck" table 4500 also includes a summary for the present and prior paychecks, showing: gross earnings, net earnings, total deductions, and, if selected, Employer contributions on behalf of the employee. FIG. 41(c) illustrates an example of such a table for an employee included in an unscheduled payroll.

If the employee's displayed paycheck has not yet been approved, clicking "Approve Paycheck" button 4515, as shown in FIG. 41(c), causes the system to approve the paycheck. Conversely, if the paycheck has already been approved, button 4515 will read "Unapprove Paycheck" and the user can cause the system to "unapprove" the paycheck sheet by clicking that button, thus allowing the Employer to modify the paycheck record. Clicking "Recalculate Check" button 4520, as shown in FIG. 41(c), causes the system to recalculate the displayed paycheck based on any modifications made to the paycheck record. Note that the system automatically recalculates an unapproved paycheck as additional information is entered into the record.

Selecting a particular "Earnings" entry in the paycheck record and clicking "Delete Earning" button 4525 causes the system to delete that earning. Similarly, selecting a particular "Deductions" entry in the paycheck record and clicking "Delete Deduction" button 4530 causes the system to delete that deduction. This function corresponds to the paycheck validation performed in step 1080 in FIG. 2.

4. Process Payroll

At any time during the user's navigation through the timesheet and payroll functionality, and from any interface, the user can submit the selected payroll for electronic processing by clicking "Process Payroll" button 4455, as shown in FIG. 40(a). That action causes the system to display the "Process Payroll" interface shown in FIG. 42. This interface enables the Employer to enter information regarding the payroll prior to electronic processing of the payroll, including pay date, payroll funding method (selectable from "Payroll Funding Method" pull-down menu 4600, thus permitting override of the Employer's default method, and status indicators regarding whether all employees will be prepaid electronically 4605 or paid with checks (i.e., no direct deposit payments) 4610. Clicking "OK" button 4615 commences payroll processing. Such processing includes electronic payments to employees, tax authorities, benefit providers, and miscellaneous payees in accordance with disbursement calculations and rules, or generation of checks to those employees, tax authorities, benefit providers, and miscellaneous payees who do not accept electronic payments. This processing corresponds to the various functions performed in steps 1110 through 1180 in FIG. 3.

Figure 43:
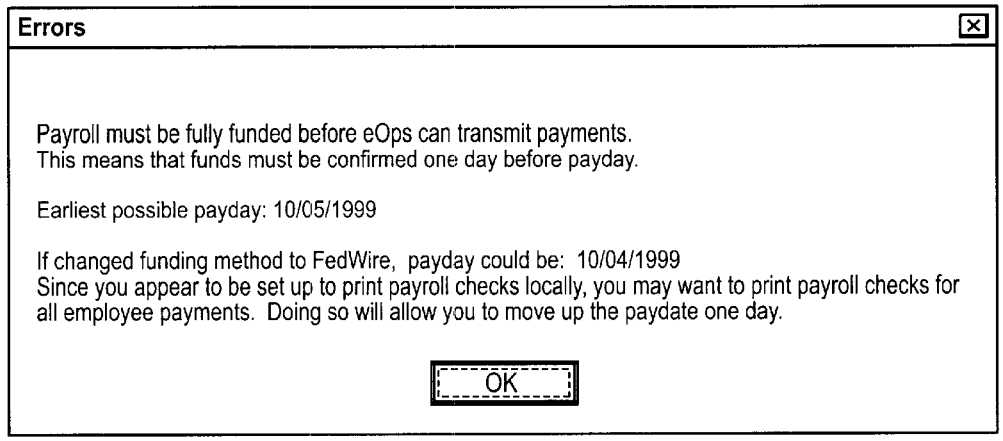
FIG. 43 shows a screen print of a system message regarding funding of a particular payroll in an embodiment of the present invention.
Figure 44:
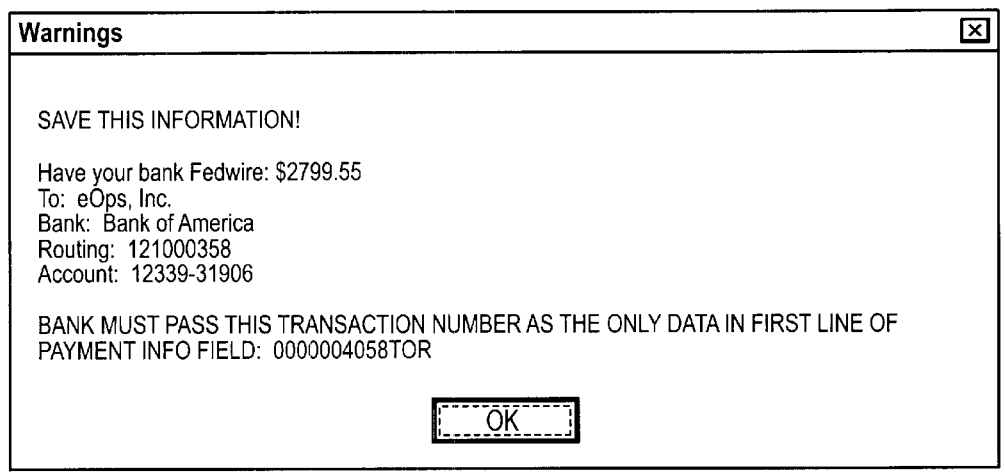
FIG. 44 shows a screen print of a system message providing information regarding an Employer-initiated "FedWire" payroll transaction in an embodiment of the present invention.

In the situation where an Employer does not have sufficient time to fund a payroll, the system enables the Employer to submit the payroll for processing on the scheduled payroll date and print paychecks the same day. First, the system displays a message, as shown in FIG. 43, which informs the Employer that the payroll must be fully funded with funds confirmed at least one day before the payroll date and displays the earliest possible date (e.g., "Oct. 5, 1999"). The message also informs the Employer that, by initiating a "FedWire" credit and printing paychecks locally, the Employer can move up the payroll date by one day (c.1 "Oct. 4, 1999"). The Employer can initiate a "FedWire" transaction by selecting "Client Initiated FedWire Credit" from the "Payroll Funding Method" pull-down menu 4600 on the "Process Payroll" interface shown in FIG. 42. Following that selection, the system displays a message, as shown in FIG. 44. The message instructs the Employer to have the Employer's bank transmit a FedWire to the system bank account and provides the following information necessary for the FedWire: transfer amount (needed to fund payroll); system bank name, account, and routing number; and transaction number.

In one embodiment of this invention, an example of the electronic transfer of funds via an ACH transfer (CCD+EDI TXP Addenda record) from the system to the bank account of an employee, tax authority, benefit provider, or miscellaneous payee, includes the following steps. The system application server 10 contains a scheduler that is set to initiate ACH transactions to a particular bank at predetermined times each day. At that time, the server executes an EDI map file that calls various stored procedures which run against system data tables (e.g., "Tax Deposits" table 451, "Collection/Disbursements" table 460). The stored procedures use SQL data access calls to retrieve data regarding electronic transfers to be executed. The EDI system then places such information in a single ACH-file according to "NACH:A" banking conventions. The system next encrypts and digitally signs the ACH file and transfers the file to the system's FTP site for retrieval by the destination bank within 30 minutes (in another embodiment, the system will "push" the ACH file to the destination bank's FTP site). The bank then retrieves the ACH file from its server, deletes the file from the system's FTP site, and decrypts the file. Once the file is decrypted, the bank can process the file in the ACH system and electronically credit/debit the appropriate bank account(s).

After the system notifies the user that payroll processing is complete (shortly after clicking "Process Payroll" button 4455), the user can (i) Commence the printing of employee paychecks by clicking "Pay Checks" button 4460, and (ii) commence the printing of checks to payees by clicking "Payee Checks" button 4465.

a. Printing Checks

Figure 45A:
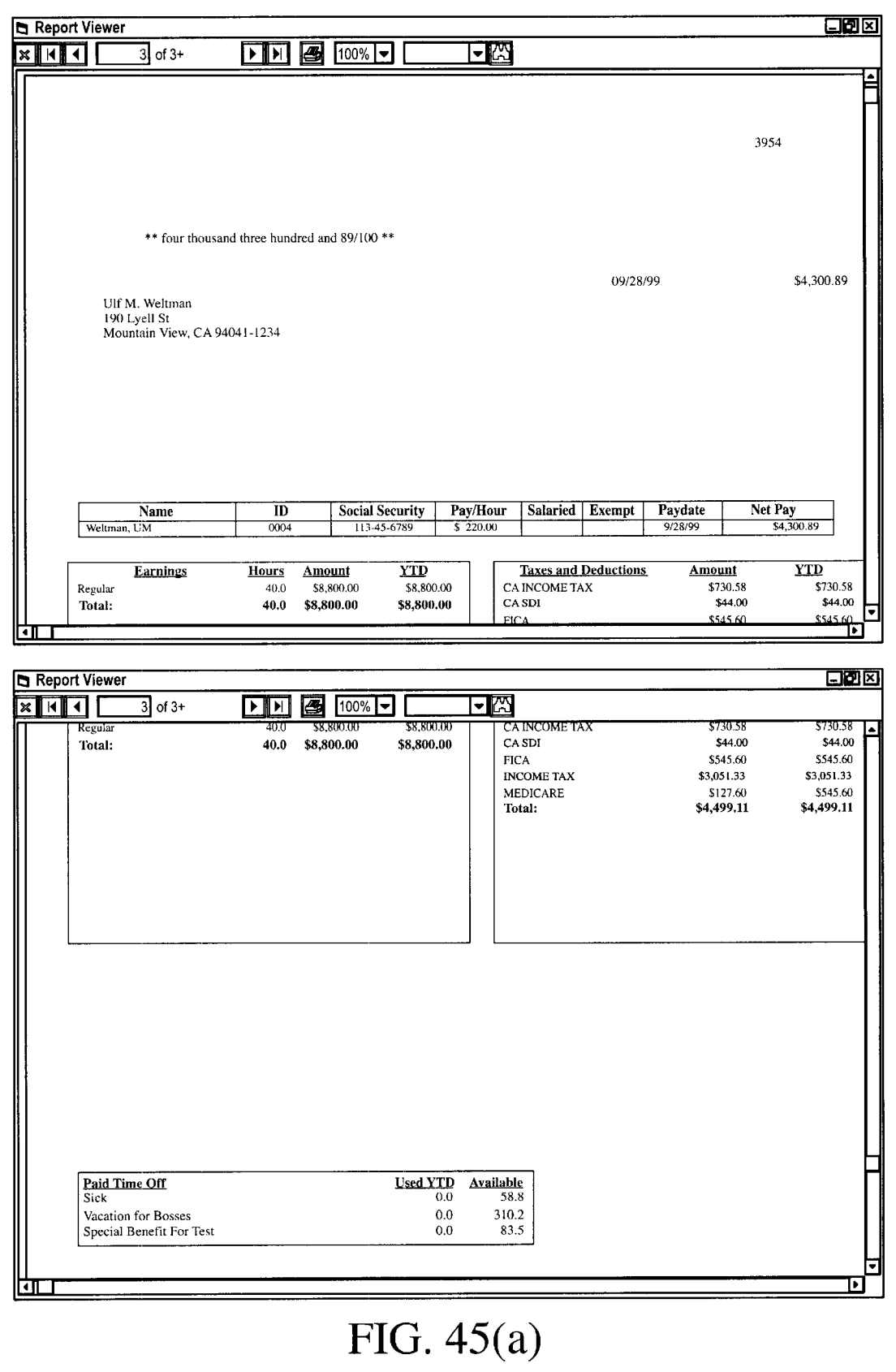

Clicking "Pay Checks" button 4460 causes the system to print for each employee in the payroll group either (i) an actual paycheck and pay stub, if the employee did not authorize electronic payment by direct deposit, or (ii) a pay stub, if the employee authorized electronic payment by direct deposit. FIG. 45(a) illustrates a paycheck. and pay stub for an employee who did not receive payment by direct deposit. The pay stub provides identifying information regarding the employee and particular payment, as well as current and year-to-date earnings, deductions, taxes, and paid-time-off information. FIG. 45(b) illustrates a pay stab for an employee who received payment by direct deposit. The pay stub provides identifying information regarding the employee and particular payment, as well as current and year-to-date earnings, deductions, taxes, paid-time-off, and direct deposit transaction information. Note that the system provides a "Report Viewer" interface that enables the user to view paychecks and pay stubs online, and to export information in many standard formats to customer accounting systems, spreadsheets, etc.

Figure 46A:
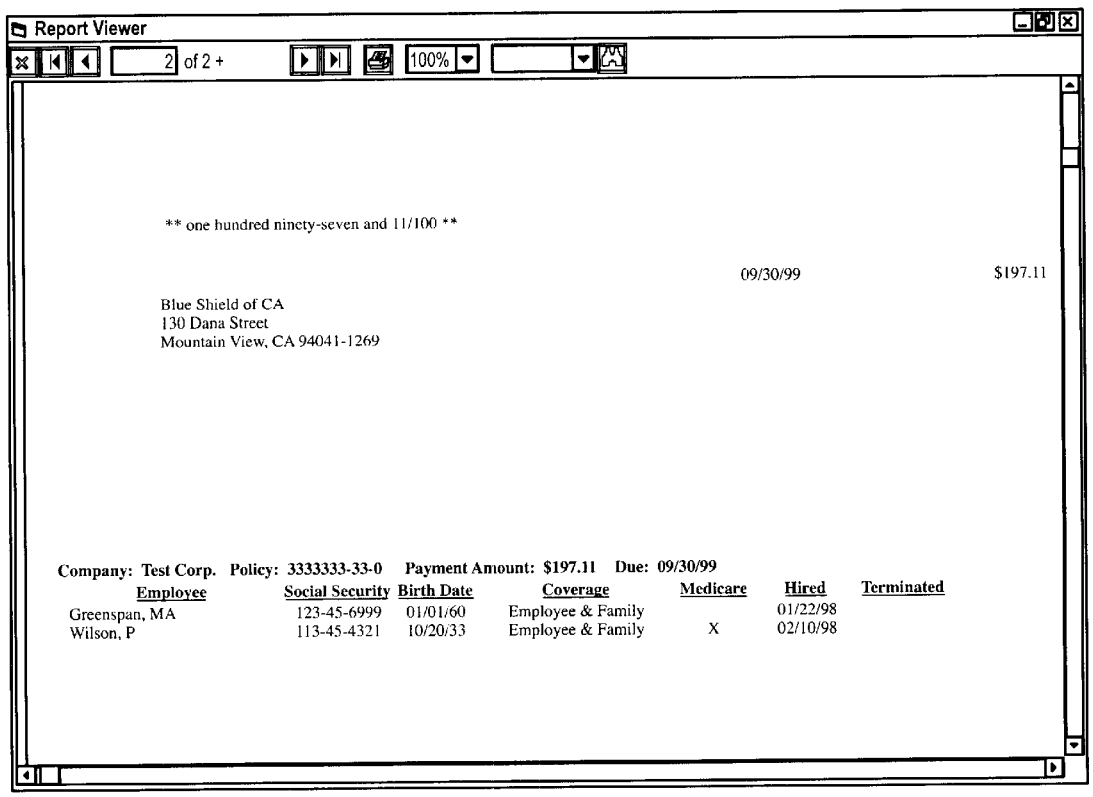
FIG. 46(a) shows a printout of a payee check and payment summary generated by an embodiment of the present invention.
Figure 46B:
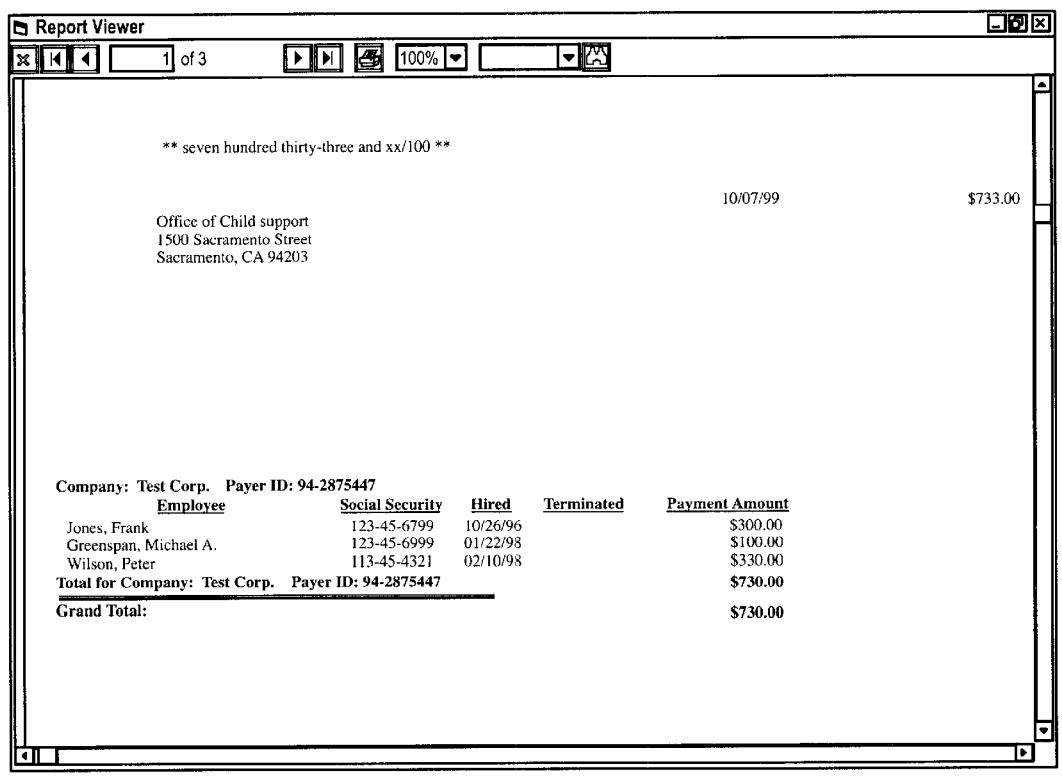
FIG. 46(b) shows a printout of another payee check and payment summary generated by an embodiment of the present invention.

Clicking "Payee Checks" button 4465 causes the system to print for each benefit provider or miscellaneous payee to be paid during the current payroll period either (i) an actual check and payment summary, if the payee did not authorize electronic payment, or (ii) a payment summary, if the payee authorized electronic payment. FIGS. 46(a)–(b) illustrate checks and payment summaries for payees who did not receive electronic payments. FIG. 46(a) shows a check and payment summary to a medical insurance benefit provider. The summary provides a list of employees included within the payment, including benefit information regarding each employee. Similarly, FIG. 46(b) shows a check and payment summary to a child support agency. The summary provides a list of employees included within the payment, including identifying information regarding each employee. The system "Report Viewer" interface enables the user to view payee checks and payment summaries online.

The system permits Employers to order paycheck stock online. The system obtains information about specific employers needed for printing such paycheck stock (e.g., Employer name, address, bank routing and account numbers) from system data tables.

b. Reporting

In addition to executing electronic payments and generating paychecks and checks to payees, the system generates and transmits reports, including reports to employees (e.g., pay stubs, annual W-2 statements), tax authorities (e.g., Federal Form 941), benefit providers (e.g., quarterly summary of 401(k) contribution by employees), miscellaneous payees (e.g., payment summaries regarding particular employee(s) for whom payment was not made), and Employers (e.g., summary of disbursements made during pay period).

An example of the electronic transmission of a report via an EDI file from the system to a tax authority includes the following steps. The system application server 10 contains a scheduler that is set to initiate the transmission of reports to a particular tax authority at predetermined times each day. At that time, the server executes an EDI map file that calls various stored procedures that run against system data tables. The stored procedures use SQL data access calls to retrieve data regarding electronic reports to be transmitted. The EDI system then places such information in one or more EDI files according to standards (e.g., AC X12, XML, or proprietary formats) provided by the particular tax authority. The system next places the files in a directory from which they are sent to the tax authority via modem, Internet, vale-added network, or custom communications software package, as specified by the tax authority. After receipt of the files the tax authority sends a confirmation message.

An example of the electronic transmission of an EFTPS tax payment and report via an EDI file from the system to the U.S. Internal Revenue Service (which must be sent the day before a tax deposit is due) includes the following steps. The system application server 10 contains a scheduler that is set to initiate FTP transactions to a bank that is a designated "Federal Treasury Agent" at predetermined times each day. At that time, the server executes an EDI map file that calls various stored procedures that run against system data tables. The stored procedures use SQL data access calls to retrieve data regarding the payment and reporting information to be transmitted. The EDI system places such information in one EDI file according to the ASC X12 format. The system next encrypts the file and sends the file via modem or the Internet to the Federal Treasury Agent bank for processing. The Federal Treasury Agent decrypts the file and processes the file in the ACH system, which performs a bulk debit against the payroll system's account for the amounts to be paid to the Internal Revenue Service by all of the Employers whose payments are included in the transmission. Within one hour after receipt of the original EDT file, the Federal Treasury Agent sends a functional acknowledgement EDI file to the system, which provides conformation of receipt of the original EDI file. Within three hours after receipt of the original EDI file, the Federal Treasury Agent sends an acknowledgement EDI file to the system, which provides confirmation that each individual tax payment was accepted, as well as an "EFT" number for each Employer's tax payment type. The system then sends an acknowledgement EDI file to the Federal Treasury Agent to acknowledge receipt of the confirmation file. Note that the confirmations received by the system are stored in data tables with appropriate links back to the original information sent, such that the system can verify the date that any given report or tax payment has been transmitted and received. The system can also be automated to resolve any transmission errors, based on the system's knowledge of possible error codes related to the transmission.

Additional Features

In addition to the features described herein, embodiments of this invention may include further features integrated into the system.

The system includes electronic copies of forms of third-party payroll systems and services, in order to enable an Employer to seamlessly convert to this system and to populate system databases with the Employer's information front such other systems or services The system can provide Employers with the ability to form affiliate relationships with third-party providers of employee benefit plans, e.g., 401(k) plans or insurance plans. The system handles the electronic flow of data and money between employees and the provider, and enables the Employer to provide personalized benefit plan options from which employees could select, based on aggregated census data provided by the system. The system also enables the providers to market their plans to Employers and employees, including links to providers' web sites.

The system can provide users with customizable, automated electronic mail "alerts." For example, the system automatically sends such alerts or reminder messages, based on designated roles (e.g., Employer system administrator, Employer payroll administrator, etc.) to an Employer when new information or rules relevant to the Employer are added to the system, e.g., the reaction of a new tax law. Such alerts can also be used in the event of a system error or when system maintenance will be performed.

The system can enable the automated processing of written authorizations or signatures. For example, a user can electronically transmit an "image" bearing the user's signature along with an authorization code. If the system recognizes the authorization code, the system imports the image as a binary large object or "blob" and electronically attach the signature to a predetermined form. The system electronically forwards the "signed" form to the appropriate recipient (e.g., tax authority), thus eliminating the need for manual data entry and the forwarding of faxes.

Additional forms-handling functionality causes required forms to be transmitted to an Employer in PDF format, including an identification code and an electronically-generated bar code. After entering the necessary information in the form, the Employer returns the form to the system electronically. The bar code provides the system with information regarding the necessary steps to complete processing of the form (e.g., send form to tax authority, store data, etc.).

The foregoing description of the preferred embodiment of the invention has been presented for purposes of illustration and description. It is not intended to be exhaustive or to limit the invention to the precise forms disclosed. Obviously, many modifications and variations will be apparent to practitioners skilled in this art. One skilled in the art will readily appreciate that other applications may be substituted for those set forth wherein without departing from the spirit and scope of the present invention. Accordingly, the invention should only be limited by the Claims included below.

What is claimed is:

1. A system for interactive calculation of payroll information including:

a first site including:

storage means storing first employer payroll-related data provided by a first employer, including an indication of hours worked during a workday by a first employer employee, and second employer payroll-related data provided by a second employer, including an indication of hours worked during a workday by a second employer employee;

calculation means for performing payroll-related calculations, the calculation means operatively connected to the storage means, the calculation means using the first employer payroll-related data stored in the storage means and outputting first employer processed payroll-related data for storage in the storage means, and using the second employer payroll-related data stored in the storage means and outputting second employer processed payroll-related data for storage in the storage means;

communication means for receipt of first employer payroll-related data from the first employer and second employer payroll-related data from the second employer and for communication of first employer processed payroll-related data to the first employer and second employer processed payroll-related data to the second employer, the communication means operatively connected to the storage means;

a second site associated with the first employer, the second site including:

data entry means for entry of first employer payroll-related data for communication to the first site;

communication means for communication of first employer payroll-related data to the first site and for receipt of first employer processed payroll-related data from the first site;

means for a user to review first employer processed payroll-related data received from the first site, and, in response, to enter a change to the payroll-related data used by the first site to calculate the reviewed first employer processed payroll-related data; and means for communicating the change to the first site for use in recalculating the processed payroll-related data, and for receiving recalculated processed payroll-related data from the first site.

2. The system as in claim 1, in which:

the second site further includes means:

for the first employer to specify a format of data to be used in a report based on the first employer's data and the second site communication means includes means for communicating the specified format to the first site; and the first site includes means for generating and communicating reports, including means for receiving the format specification from the second site, means for formatting a report in compliance with the format specification, and means for communicating the formatted report to the second site.

3. The system as in claim 1, further including:

means at the second site for the first employer to specify a first policy applicable to a first group of first employer employees and a second policy applicable to a second group of first employer employees, the second site communication means including means for communicating the first and second policies to the first site; and the first site calculation means includes means for applying the first policy to a portion of the first employer payroll-related data concerning the first group and for applying the second policy to a portion of the first employer payroll-related data concerning the second group.

4. The system as in claim 1, in which:

the calculation means includes means for receiving an indication that an employee has been terminated, and means for generating a final paycheck and W2 for the terminated employee prior to the end of a normal pay period.

5. The system as in claim 1, in which:

the first site further includes:

means for calculating: (i) a first disbursement amount to a first payee, based on the first employer payroll-related data; (ii) a second disbursement amount to a second payee, based on the first employer payroll-related data; (iii) a third disbursement amount to the first payee, based on the second employer payroll-related data; and (iv) a fourth disbursement amount to the second payee, based on the second employer payroll-related data; and means for disbursing a fifth disbursement amount to the first payee, the fifth disbursement amount including the first disbursement amount and the third disbursement amount, and for disbursing a sixth disbursement amount to the second payee, the sixth disbursement amount including the second disbursement amount and the fourth disbursement amount.

6. A method for interactive payroll-related calculations including:

receiving payroll-related data from a first employer, the data including an indication of hours worked for a first employer employee during a workday;

performing calculations using the first employer payroll-related data, the calculations resulting in processed first employer payroll-related data;

communicating the processed first employer payroll-related data to the first employer;

receiving a modification to the first employer payroll-related data from the first employer;

performing calculations using the modification, the calculations resulting in modified processed first employer payroll-related data;

communicating the modified processed first employer payroll-related data to the first employer;

continuing the process of receiving modifications, performing calculations and communicating modified data to the first employer until the receipt of an indication from the first employer that no additional modifications are required;

after receipt of the indication from the first employer, generating final first employer payroll-related data and using that data to generate paycheck information, disbursement information and benefits information;

receiving payroll-related data from a second employer, the data including an indication of hours worked for a second employer employee during a workday;

performing calculations using the second employer payroll-related data, the calculations resulting in processed second employer payroll-related data, communicating the processed second employer payroll-related data to the second employer;

receiving a modification to the second employer payroll-related data from the second employer;

performing calculations using the modification, the calculations resulting in modified processed second employer payroll-related data;

communicating the modified processed second employer payroll-related data to the second employer;

continuing the process of receiving modifications, performing calculations and communicating modified data to the second employer until the receipt of an indication from the second employer that no additional modifications are required;

after receipt of the indication from the second employer, generating final second employer payroll-related data and using that data to generate paycheck information, disbursement information and benefits information;

whereby, a central site may communicate with the first employer to interactively generate payroll data for the first employer and may communicate with the second employer to interactively generate payroll data for the second employer, and the communication and generation for the first employer may at least partially overlap in time with the communication and generation for the second employer.

7. The method of claim 6, further including:

communicating the first employer paycheck information to the first employer for use in printing paychecks by the first employer; and communicating the second employer paycheck information to the second employer for use in printing paychecks by the second employer.

8. The method of claim 6, in which:

the processed first employer payroll-related data includes data based on a first deduction amount related to deductions from a first employee's paycheck, the modification received from the first employer includes a change to the first deduction amount, the change having been entered by the first employee at a computer terminal after the first employee reviewed at least a portion of the processed first employer payroll-related data at the computer terminal, and the modified processed first employer payroll-related data communicated to the first employer includes a modification based on the change to the first deduction amount.

9. The method of claim 6, in which:

the calculations performed using the first employer payroll-related data include:
  generating benefits-related data, and
  determining whether the benefits-related data is consistent with rules associated with a benefits plan.

10. The method of claim 9, in which:

the processed first employer payroll-related data communicated to the first employer includes an indication that the benefits-related data is not consistent with the benefits plan rules; and the modification received from the first employer relates to the benefits-related data.

11. A system for interactive payroll-related calculation including:

storage means storing payroll-related information received from a first employer, including an indication of hours worked by a first employee during a workday and storing payroll-related information received from a second employer, including an indication of hours worked by a second employee during a workday;

calculation means for performing calculations on the first employer payroll-related information to generate processed first employer information, and for performing calculations on the second employer payroll-related information to generate processed second employer information;

communication means for receipt of the first employer payroll-related information from the first employer and the second employer payroll-related information from the second employer and for communication of the processed first employer information to the first employer and the processed second employer information to the second employer;

communication means for receiving a modification to the first employer information from the first employer, the modification having been received in response to communication of the processed first employer payroll-related information to the first employer, calculation means for using the modification to generate modified processed first employer information; and communication means for communicating the modified processed first employer information to the first employer and for receiving an indication that no additional modifications are desired by the first employer.

12. A system as in claim 11, in which:

the payroll-related information received from the first employer includes an indication that a supervisor of the first employee has checked the indication of hours worked by the first employee.

13. A system as in claim 11, further including:

communications means for the receipt of communications from the first employer specifying a format of data to be used in a report, and the system further includes means for generating a report formatted in compliance with the specification received from the first employer and means for communicating the report to the first employer.

14. The system as in claim 11, further including:

means for receiving an indication that a bonus is owed to an employee, and means for generating a paycheck containing the bonus prior to the end of a normal pay period.

15. An interactive payroll and benefit system comprising:
(a) a data entry component which can accept:
  (i) first payroll and benefit data entered for a first employer at a first location, the first payroll and benefit data including the number of hours worked by an employee of the first employer during a workday, and
  (ii) second payroll and benefit data entered for a second employer at a second location, the second payroll and benefit data including the number of hours worked by an employee of the second employer during a workday;
(b) a communication component which can exchange information between a third location and each of the first and second locations, the information including the first payroll and benefit data and the second payroll and benefit data;
(c) a paycheck calculation component which can calculate for a pay period:
  (i) elements of a paycheck for the employee of the first employer using the first payroll and benefit data received from the first location via the communication component, and
  (ii) elements of a paycheck for the employee of the second employer using the second payroll and benefit data received from the second location via the communication component; and
(d) an employer tax liability calculation component which can calculate federal and state tax liability amounts for the first and second employers based at least in part upon the respective first and second payroll and benefit data received from the respective first and second locations via the communication component;
(e) wherein the interactive payroll and benefit system can enable the correction of an error following the receipt at the first location of the paycheck for the employee of the first employer by:
  (i) enabling the first employer to modify the first payroll and benefit data via the data entry component,
  (ii) transmitting the modified first payroll and benefit data to the third location via the communication component,
  (iii) recalculating, via the paycheck calculation component, elements of the paycheck for the employee of the first employer using the modified first payroll and benefit data received from the first location, and
  (iv) recalculating the federal and state tax liability amounts for the first employer via the employer tax liability calculation component.

16. A system including:
one or more communications ports;
one or more processing units; and
a digital memory or memories storing:
  (a) payroll-related information provided by a first employer, including an indication of hours worked by an employee during a workday, and payroll-related information provided by a second employer, including an indication of hours worked by an employee during a workday;
  (b) a computer program which receives as input the first employer payroll-related information and generates as output processed first employer information and which receives as input the second employer payroll-related information and generates as output processed second employer information;
  (c) a computer program which causes the processed first employer information to be communicated to the first employer through a communications port;
  (d) a computer program which receives modifications to the first employer information from the first employer, performs calculations using the modifications, generates modified processed first employer information and communicates the modified processed first employer information to the first employer through the communications port; and
  (e) a computer program which receives an indication from the first employer that no further modifications are desired by the first employer, and, based on the indication, invokes a computer program which performs final processing based on the processed first employer information stored in the digital memory as of the time of receipt of the indication.

17. The system of claim 16, in which:
the digital memory or memories includes a computer program which takes as input an indication received through a communications port from the first employer, the indication signifying that an employee has been terminated, and, based on the indication, controls one or more processing units to generate a final paycheck for the terminated employee prior to the end of a normal pay period.

18. The system as in claim 16, in which:
the digital memory or memories includes a computer program which (i) takes as input the first employer payroll-related information and controls one or more of the processing units to calculate a first disbursement amount to a first payee; (ii) takes as input the first employer payroll-related information and controls one or more of the processing units to calculate a second disbursement amount to a second payee; (iii) takes as input the second employer payroll-related information and controls one or more of the processing units to calculate a third disbursement amount to the first payee; (iv) takes as input the second employer payroll-related information and controls one or more of the processing units to calculate a fourth disbursement amount to the second payee; (v) calculates a fifth disbursement amount to the first payee, the fifth disbursement amount including the first disbursement amount and the third disbursement amount, (vi) calculates a sixth disbursement amount to the second payee, the sixth disbursement amount including the second disbursement amount and the fourth disbursement amount; and (vii) provides to one or more of the communications ports the fifth disbursement amount for communication to the first payee and the sixth disbursement amount for communication to the second payee.

19. The system as in claim 16, in which:
the final processing program includes programming which controls one or more of the processing units to calculate first paycheck amounts, and provides to one or more of the communications ports the first paycheck amounts for communication to the first employer for use in printing paychecks by the first employer.

20. The system as in claim 16, in which:
the processed first employer information communicated to the first employer includes electronic representations of paychecks for viewing by the first employer to determine whether modifications are required.

21. An interactive computerized payroll-related system including:
- a first site including:
  - storage means for the storage of payroll-related information from a first employer, including an indication of hours worked during a workday by an employee and payroll-related information from a second employer, including an indication of hours worked during a workday by an employee;
  - calculation means for:
    - using the payroll-related information received from the first employer to calculate employee gross income and disbursement amounts;
    - using modified payroll-related information received from the first employer to recalculate employee gross income or disbursement amounts; and
    - using a termination indication received from the first employer to determine that no additional recalculations are required;
    - using the payroll-related information received from the second employer to calculate employee gross income and disbursement amounts;
    - using modified payroll-related information received from the second employer to recalculate employee gross income or disbursement amounts; and
    - using a termination indication received from the second employer to determine that no additional recalculations are required;
  - communication means for communication of information to and from remote parties, including:
    - means for sending:
      - calculated first employer employee gross income and disbursement amounts to the first employer, and
      - calculated second employer employee gross income and disbursement amounts to the second employer; and
    - means for receiving:
      - from the first employer: payroll-related information for use in calculating employee gross income and disbursement amounts, modifications to the payroll-related information for use in recalculating employee gross income or disbursement amounts, and an indication that no additional recalculations are required;
      - from the second employer: payroll-related information for use in calculating employee gross income and disbursement amounts, modifications to the payroll-related information for use in recalculating employee gross income or disbursement amounts, and an indication that no additional recalculations are required; and
  - disbursement means used to disburse disbursement amounts to parties other than the first or second employer,
- a second site associated with the first employer, the second site including:
  - data entry means for entry of first employer payroll-related information and modifications to the first employer payroll-related information, the modifications being entered in response to receipt of employee gross income and disbursement amounts from the first site;
  - communication means for electronically communicating the first employer payroll-related information to the first site, for receiving from the first site calculated employee gross income and disbursement amounts, for communicating modifications to the first employer payroll-related information the first site, the modifications being in response to receipt of the calculated employee gross income and disbursement amounts, for receiving from the first site recalculated employee gross income and disbursement amounts, and for communicating to the first site an indication that no additional recalculations are required; and
- a third site associated with the second employer, the third site including:
  - data entry means for entry of second employer payroll-related information and modifications to the second employer payroll-related information, the modifications being entered in response to receipt of employee gross income and disbursement amounts from the first site;
  - communication means for electronically communicating the second employer payroll-related information to the first site, for receiving from the first site calculated employee gross income and disbursement amounts, for communicating modifications to the second employer payroll-related information the first site, the modifications being in response to receipt of the calculated employee gross income and disbursement amounts, for receiving from the first site recalculated employee gross income and disbursement amounts, and for communicating to the first site an indication that no additional recalculations are required.

22. The system of claim 21, in which:

the first employer payroll-related information includes an indicator that the indication of hours worked by the employee has been checked by a supervisor of that employee.

23. The system of claim 21, in which:

the first site also includes means for generating paycheck information for communication to the second site for use in printing paychecks at the second site.

24. The system as in claim 21, in which:

the second site further includes means for the first employer to specify a format of data to be used in a report based on the first employer's data and the second site communications means includes means for communicating the specified format to the first site; and the first site includes means for generating and communicating reports, including means for receiving the format specification from the second site, means for formatting a report in compliance with the format specification, and means for communicating the formatted report to the second site.

25. The system of claim 21, in which:

the second site data entry means includes a timeclock for entering the indication of hours worked during a workday by an employee.

26. A method including:

receiving payroll information from a first employer;

using the first employer payroll information to calculate first employer disbursement amounts and employee gross income amounts;

communicating the calculated first employer disbursement amounts and employee gross income amounts to the first employer;

in response to communication of the calculated first employer disbursement amounts and employee gross income amounts, receiving from the first employer modifications to the payroll information;

using the modifications to recalculate first employer disbursement amounts or employee gross income amounts;

communicating the recalculated amounts to the first employer;

repeating the receipt of modifications, recalculation and communicating recalculated amounts until receiving an indication from the first employer that the most recently communicated amounts are acceptable;

following receipt of the indication, communicating final employee gross income and disbursement amounts to the first employer and making disbursements to a party other than the first employer based on the final disbursement amounts;

receiving payroll information from a second employer;

using the second employer payroll information to calculate second employer disbursement amounts and employee gross income amounts;

communicating the calculated second employer disbursement amounts and employee gross income amounts to the second employer;

in response to communication of the calculated second employer disbursement amounts and employee gross income amounts, receiving from the second employer modifications to the payroll information;

using the modifications to recalculate second employer disbursement amounts or employee gross income amounts;

communicating the recalculated amounts to the second employer;

repeating the receipt of modifications, recalculation and communicating modified amounts until receiving an indication from the second employer that the most recently communicated amounts are acceptable;

following receipt of the indication, communicating final employee gross income and disbursement amounts to the second employer and making disbursements to a party other than the second employer based on the final disbursement amounts.

27. The method of claim 26, further including:

receiving an indication from the first employer that an employee has been terminated; and generating a final paycheck for the terminated employee prior to the end of a normal pay period.

28. The method of claim 26, in which:

the making of disbursements to a party based on the final first employer and second employer disbursement amounts includes the following:

calculating: (i) a first disbursement amount to a first payee, based on the final first employer disbursement amounts; (ii) a second disbursement amount to a second payee, based on the final first employer disbursement amounts; (iii) a third disbursement amount to the first payee, based on the final second employer disbursement amounts; and (iv) a fourth disbursement amount to the second payee, based on the final second employer disbursement amounts;

disbursing a fifth disbursement amount to the first payee, the fifth disbursement amount including the first disbursement amount and the third disbursement amount; and disbursing a sixth disbursement amount to the second payee, the sixth disbursement amount including the second disbursement amount and the fourth disbursement amount.

29. The method of claim 26, further including:

calculating first paycheck amounts based on the final first employer employee gross income amounts and calculating second paycheck amounts based on the final second employer employee gross income amounts, communicating the first paycheck amounts to the first employer for use in printing paychecks by the first employer; and communicating the second paycheck amounts to the second employer for use in printing paychecks by the second employer.

30. The system as in claim 29, further including:

the communication of first paycheck amounts to the first employer includes communicating electronic representations of paychecks to the first employer for viewing by the first employer, the electronic representations being based on the first paycheck amounts; and the communication of first paycheck amounts to the second employer includes communicating electronic representations of paychecks to the second employer for viewing by the second employer, the electronic representations being based on the second paycheck amounts.

31. A computerized payroll-related system including:

communication means for the receipt of payroll-related information from a first employer and a second employer, the received payroll-related information including indications of hours worked in a workday by employees;

storage means for the storage of the payroll-related information from the first employer and the second employer;

calculation means for using the payroll-related information received from the first employer to calculate first employer employee gross income and disbursement amounts and to use the payroll-related information received from the second employer to calculate second employer employee gross income and disbursement amounts;

communication means for sending the calculated first employer employee gross income and disbursement amounts to the first employer and for sending the calculated second employer employee gross income and disbursement amounts to the second employer;

communication means for receiving modifications to the first employer payroll-related information from the first employer and for receiving modifications to the second employer payroll-related information from the second employer;

calculation means for calculating changes to the first employer employee gross income or disbursement amounts based on modifications received from the first employer and for calculating changes to the second employer employee gross income or disbursement amounts based on modifications received from the second employer;

communication means for sending modified information to the first employer and the second employer, based on the calculated changes, and for receiving an indication from the first employer and the second employer that no additional changes are desired;

processing means, operating in response to receipt of the indication, for specifying final first employer employee gross income and disbursement data and for specifying final second employer employee gross income and disbursement data;

communication means for sending the final first employer employee gross income and disbursement data to the first employer and for sending the final second employer employee gross income and disbursement data to the second employer; and disbursement means for disbursing the final disbursement amounts to one or more parties other than the first or second employer.

32. The system as in claim 31, including:

means for receiving communications from the first employer specifying a change in paycheck deduction amounts relating to the paycheck of a first employee, the change having been entered at a computer terminal by the first employee; and means for receiving communications from the second employer specifying a change in paycheck deduction amounts relating to the paycheck of a second employee, the change having been entered at a computer terminal by the second employee.

33. The system as in claim 31, including:

means for receiving communications from the first employer specifying a change in a policy related to a first employee's paystub, the change having been specified by the first employee; and means for receiving communications from the second employer specifying a change in a policy related to a second employee's paystub, the change having been specified by the second employee.

34. The system as in claim 31, further including:

means for (i) applying the rules of a first benefits plan to data related to a first employee, the first employee data being included within the first employer payroll-related information, and for determining whether the first employee data is consistent with the first benefits plan rules; and (ii) applying the rules of a second benefits plan to data related to a second employee, the second employee data being included within the second employer payroll-related information, and for determining whether the second employee data is consistent with the second benefits plan rules.

35. The system as in claim 34, in which:

the communications means includes means for communicating messages to the first employer and the second employer specifying that employee data is not consistent with benefits plan rules.

36. A computerized payroll-related system including:

a communications port;

one or more processing units; and one or more digital memories storing:

payroll-related information received through the communications port from a first employer, including an indication of hours worked during a workday by an employee;

payroll-related information received through the communications port from a second employer, including an indication of hours worked during a workday by an employee;

a computer program taking as input the first employer payroll-related information and the second employer payroll-related information and generating as output first employer employee gross income, first employer disbursement amounts; second employer employee gross income and second employer disbursement amounts;

a computer program taking as input the first employer employee gross income and disbursement amounts and communicating the first employer employee gross income and disbursement amounts through the communications port to the first employer and taking as input the second employer employee gross income and disbursement amounts and communicating the second employer employee gross income and disbursement amounts through the communications port to the second employer;

a computer program taking as input modifications to the first employer payroll-related information, the modifications received from the first employer and generating as output modified first employer employee gross income and disbursement amounts and taking as input modifications to the second employer payroll-related information, the modifications received from the second employer, and generating as output modified second employer employee gross income and disbursement amounts;

a computer program sensitive to the receipt of a termination indication from the first employer and the second employer and, in response to receipt of the indication from the first employer, generating final first employer employee gross income and disbursement amounts and communicating those amounts to the first employer and, in response to receipt of the indication from the second employer, generating final second employer employee gross income and disbursement amounts and communicating those amounts to the second employer; and a computer program taking as input the final first employer disbursement amounts and the final second employer disbursement amounts and communicating the disbursement amounts through the communications port to one or more parties other than the first or second employer.

37. The system as in claim 36, in which:

the first employer payroll-related information includes information entered by the first employer through two workflows communicated to the first employer from the computerized payroll-related system and the second employer payroll-related information includes information entered by the second employer through two workflows communicated to the second employer by the second payroll-related system.

38. The system as in claim 36, in which:

the digital memory or memories includes a computer program calculation module which takes as input the first employer payroll-related information and an indication that a bonus is owed to an employee, the indication having been received from the first employer through one of the communications ports; and controls one or more of the processing units to generate a paycheck for the employee containing the bonus prior to the end of a normal pay period.

39. The system as in claim 36, in which:

the digital memory or memories includes a computer program calculation module which controls one or more of the processing units to format at least a portion of the information communicated to the first employer and the second employer in a format designed for viewing in a web browser.

40. The system as in claim 39, in which:

the information received from the first employer and the information received from the second employer includes information entered through a web browser interface.

* * * * *